(12) United States Patent
Yamauchi et al.

(10) Patent No.: US 7,934,266 B2
(45) Date of Patent: Apr. 26, 2011

(54) CONTENTS REPRODUCTION DEVICE, CONTENTS REPRODUCTION CONTROL METHOD, PROGRAM

(75) Inventors: Yasuharu Yamauchi, Tokyo (JP); Kiyoshi Satomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 865 days.

(21) Appl. No.: 10/572,589

(22) PCT Filed: Jul. 21, 2005

(86) PCT No.: PCT/JP2005/013412
§ 371 (c)(1),
(2), (4) Date: Mar. 20, 2006

(87) PCT Pub. No.: WO2006/009217
PCT Pub. Date: Jan. 26, 2006

(65) Prior Publication Data
US 2008/0247731 A1    Oct. 9, 2008

(30) Foreign Application Priority Data
Jul. 21, 2004    (JP) .................................. 2004-213625

(51) Int. Cl.
*G06F 7/04* (2006.01)
*G06F 17/30* (2006.01)
*H04N 7/16* (2011.01)
*G06F 21/00* (2006.01)

(52) U.S. Cl. ................ 726/30; 726/26; 726/27; 726/28; 726/29; 705/51; 705/57; 705/59

(58) Field of Classification Search .............. 726/26–30; 705/51, 57, 59, 26
See application file for complete search history.

(56) References Cited

U.S. PATENT DOCUMENTS
7,093,296 B2 * 8/2006 Nusser et al. .................... 726/26
(Continued)

FOREIGN PATENT DOCUMENTS
JP        10-177523 A        6/1998
(Continued)

OTHER PUBLICATIONS
U.S. Appl. No. 10/570,616, filed Mar. 3, 2006, Tanaka.
(Continued)

*Primary Examiner* — Shin-Hon Chen
(74) *Attorney, Agent, or Firm* — Oblon, Spivak, McClelland, Maier & Neustadt, L.L.P.

(57) ABSTRACT

A content reproduction apparatus 20 includes: a storage section 230 for storing a source-ID list L and method identification information 232; a reproduction control method determination section 240 for determining a method to control reproduction of a content on the basis of the method identification information 232; a first reproducibility determination section 242a, which is used for producing a result of determination as to whether or not a content to be reproduced is reproducible by determining whether or not a source ID attached to the content is a source ID included in the source-ID list L in case the reproduction control method determination section 240 determines that the method to control reproduction of a content is a first reproduction control method; a second reproducibility determination section 242b, which is used for producing a result of determination as to whether or not a content to be reproduced is reproducible on the basis of usage rule information described in a license issued to the content in case the reproduction control method determination section 240 determines that the method to control reproduction of a content is a second reproduction control method; and a reproduction execution section 244 for reproducing a content determined as a reproducible content.

26 Claims, 52 Drawing Sheets

U.S. PATENT DOCUMENTS

| | | | |
|---|---|---|---|
| 2002/0120577 A1* | 8/2002 | Hans et al. | 705/59 |
| 2003/0078853 A1* | 4/2003 | Peinado et al. | 705/26 |
| 2004/0081044 A1* | 4/2004 | Sako et al. | 369/47.31 |
| 2005/0177516 A1* | 8/2005 | Vandewater et al. | 705/57 |
| 2007/0100755 A1* | 5/2007 | Kragt et al. | 705/51 |

FOREIGN PATENT DOCUMENTS

| | | |
|---|---|---|
| JP | 2000-195162 A | 7/2000 |
| JP | 2001-142786 | 5/2001 |
| JP | 2001-519562 A | 10/2001 |
| JP | 2002-123496 A | 4/2002 |
| JP | 2002-514326 | 5/2002 |
| JP | 2003-69940 A | 3/2003 |
| JP | 2003-132173 A | 5/2003 |
| JP | 2003-173381 A | 6/2003 |
| JP | 2003-317376 | 11/2003 |
| JP | 2003-323351 A | 11/2003 |
| JP | 2004-112239 A | 4/2004 |
| JP | 2005-141635 | 6/2005 |
| JP | 2006-506882 A | 2/2006 |
| WO | WO 2004/047108 A2 | 6/2004 |

OTHER PUBLICATIONS

U.S. Appl. No. 10/567,642, filed Feb. 9, 2006, Kawakami.
U.S. Appl. No. 10/569,984, filed Feb. 28, 2006, Tanaka.
U.S. Appl. No. 10/572,035, filed Mar. 15, 2006, Tanaka.
U.S. Appl. No. 10/572,580, filed Mar. 20, 2006, Tanaka.
Japanese Office Action issued Sep. 14, 2010 in corresponding Japanese Application No. 2005-202954.

* cited by examiner

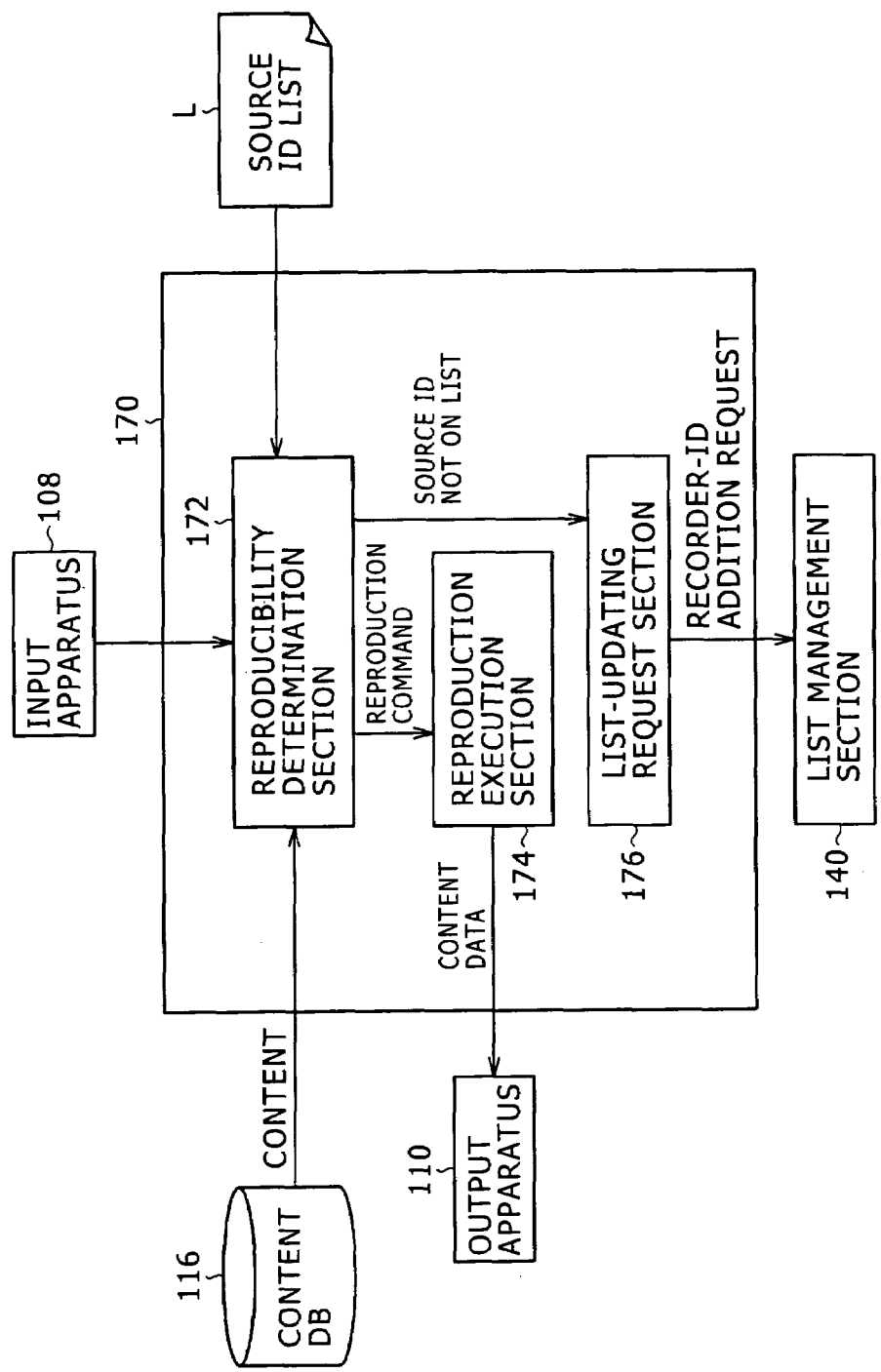

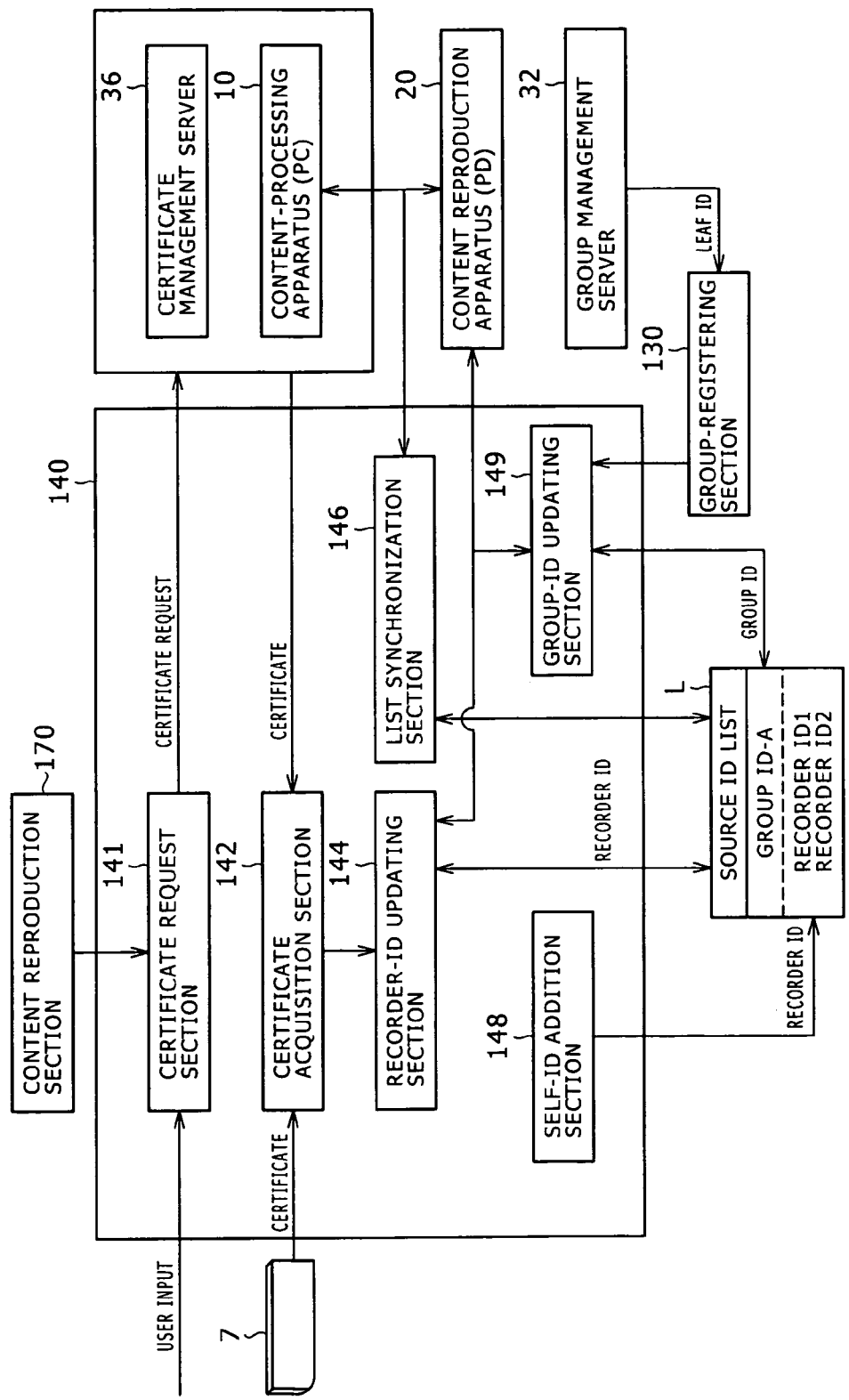

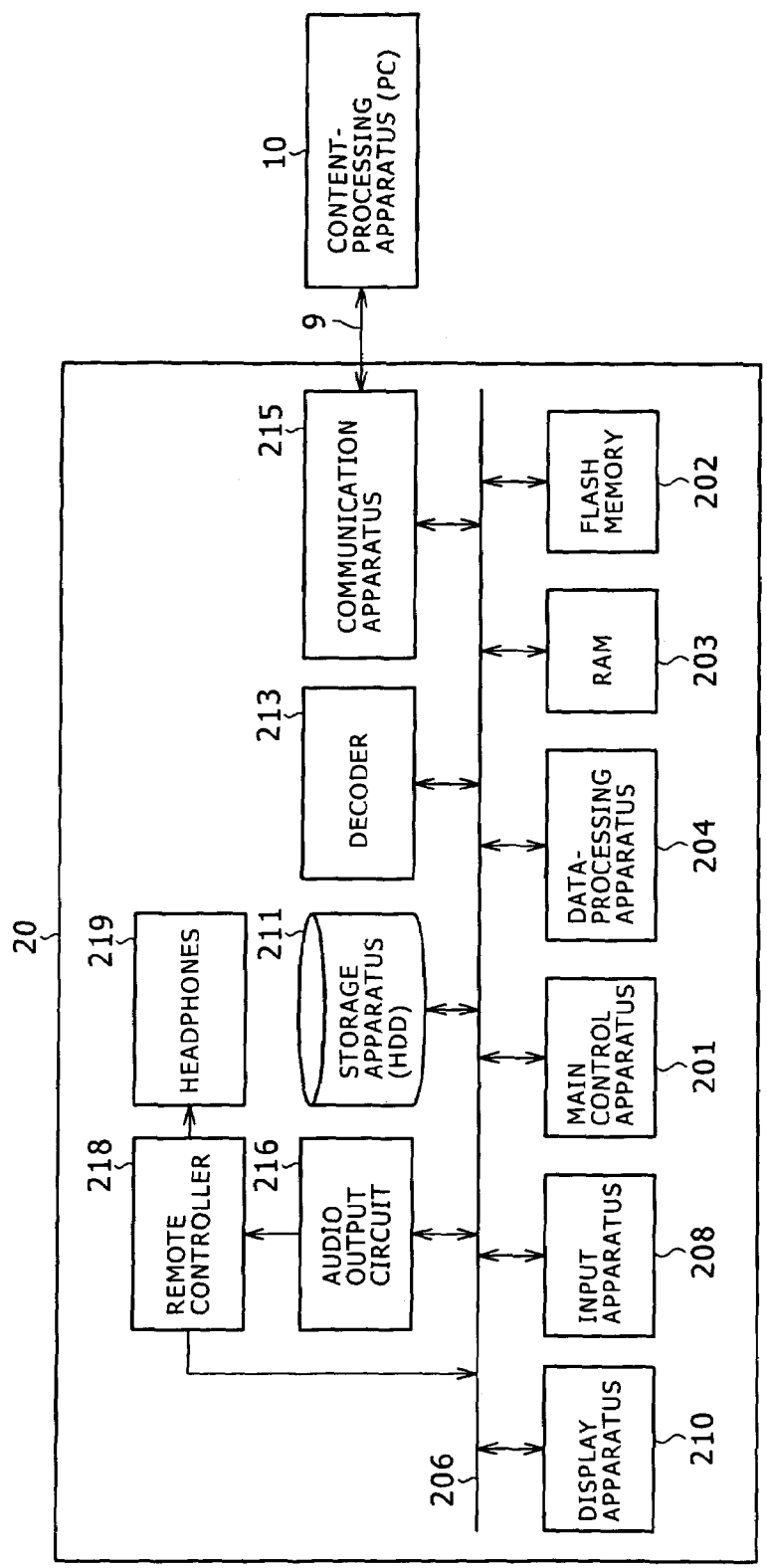

FIG. 12

| USER ID | CREDIT CARD NUMBER | LEAD ID | EQUIPMENT ID | RECORDER ID |
|---|---|---|---|---|
| Yamada Taro | XXX-XXXX | LEAF ID-A | TERMINAL ID1 | RECORDER ID1 |
| | | | TERMINAL ID2 | RECORDER ID2 |
| | | | DEVICE ID1 | — |
| | | | DEVICE ID2 | — |
| Suzuki Jiro | YYY-YYYY | LEAF ID-B | TERMINAL ID10 | RECORDER ID10 |
| | | | DEVICE ID12 | — |
| | | | DEVICE ID13 | — |
| ... | ... | ... | ... | ... |

3241  3242  3243  3244  3245

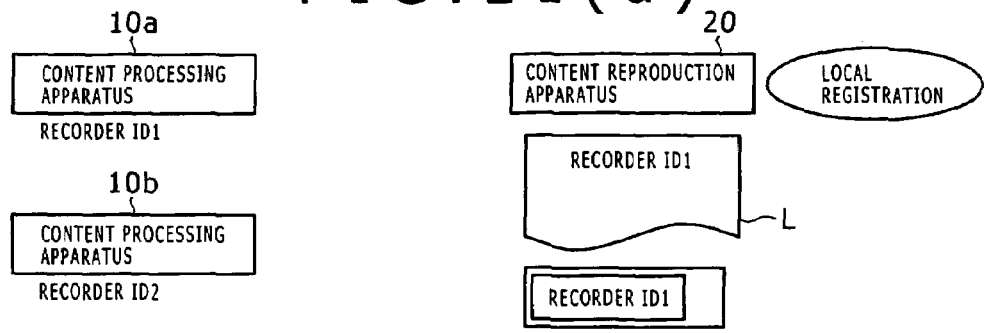
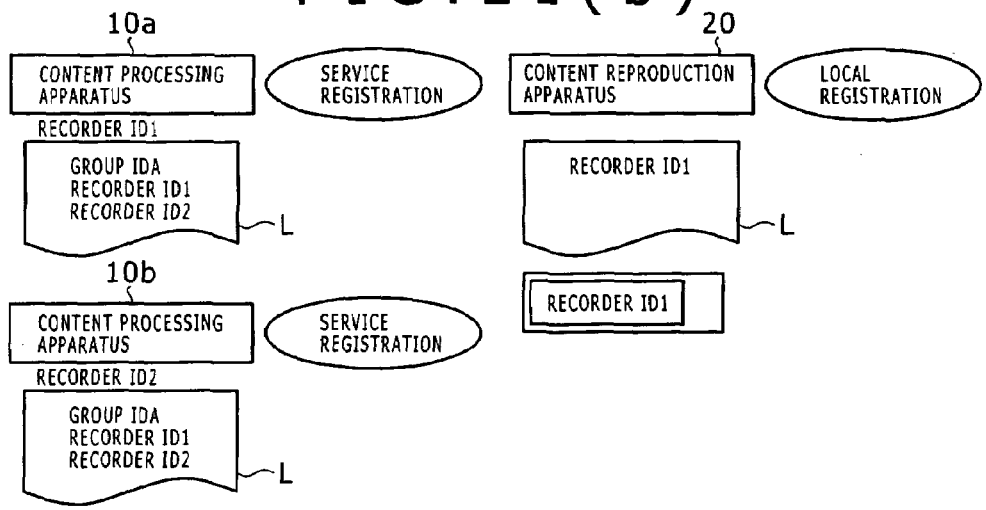
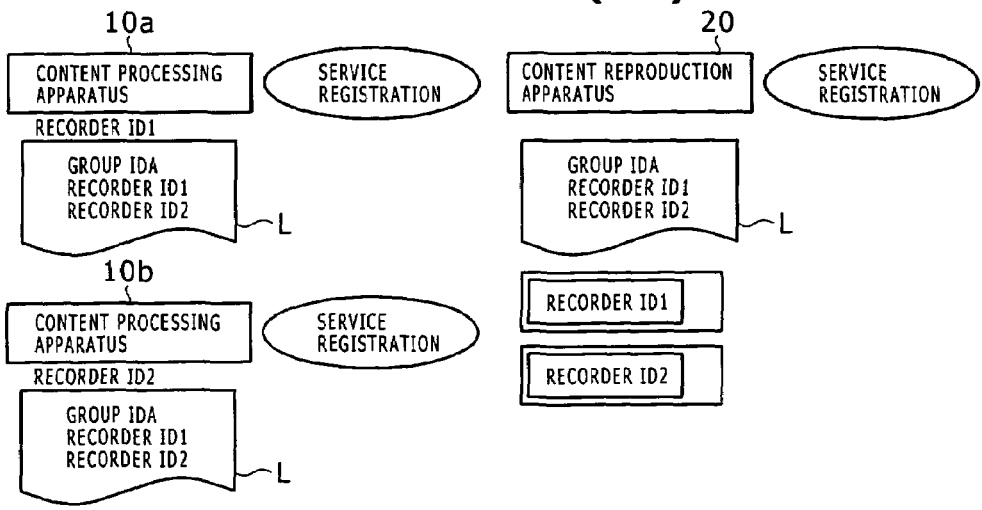

CONTENTS REPRODUCTION DEVICE, CONTENTS REPRODUCTION CONTROL METHOD, PROGRAM

TECHNICAL FIELD

The present invention relates to content reproduction apparatus, content reproduction control methods and programs. More particularly, the present invention relates to a content reproduction apparatus, a content reproduction control method and a program, which conform to a plurality of copyright management methods.

BACKGROUND ART

A digital content such as a musical content is different from the conventional content in that the digital content can be copied a plurality of times without deterioration of its quality. For this reason, in recent years, the number of illegal acts such as acts distributing and exchanging contents without permissions given by the authors of the contents have been increasing in accordance with popularization of the Internet, increasing speeds of apparatus such as PCs (Personal Computers) and rising capacities of storage devices.

In order to prevent these illegal acts, efforts are made to popularize a copyright management system utilizing a DRM (Digital Rights Management) technology imposing limitations on distributions and utilizations of contents. In the copyright management system, as proposed in an SDMI (Secure Digital Music Initiative) and the like, it is general that the copyright of a content is managed in accordance with a method (referred to hereafter as a check-in/check-out method). In the method, utilization (reproduction and copying) of a content is limited on the basis of usage rule information described in a license (right information).

As for the content reproduction apparatus, a PD (Portable Device) having excellent portability has been becoming popular. In a PD conforming to the conventional SDMI, only copyright management is performed as follows. The reproduction of the content is controlled based on a license, which is attached to the content, checked out from a PC or the like in accordance with the check-in/check-out method cited above. For more information, refer to Japanese Patent Laid-open No. 2002-312211.

DISCLOSURE OF INVENTION

However, the conventional PD mentioned above conforms only to one copyright management method so that the PD has a problem that the PD is not capable of controlling reproduction of a content created in accordance with a plurality of copyright management methods different from each other.

Thus, in order to cope with differences between foreign copyright management methods and domestic ones, it has been necessary to develop and design a PD of a different model. In particular, as is obvious from intentions of users in both Japan and foreign countries, the users desire a PD conforming to a user-friendly copyright management method offering a high degree of freedom to utilize contents rather than a PD conforming to the check-in/check-out method based on the SDMI cited above.

It is thus an object of the present invention addressing the problems described above to provide a novel and improved content reproduction apparatus, a content reproduction control method and a program that are capable of executing control of reproduction of a content conforming to a plurality of copyright management methods different from each other.

In order to solve the problems described above, in accordance with a first aspect of the present invention, the content reproduction apparatus includes:

a storage section for storing a source-ID list showing sources of contents allowed to be reproduced and method identification information each showing a method to control reproduction of contents;

a reproduction control method determination section for determining a method to control reproduction of a content on the basis of the method identification information;

a first reproducibility determination section for producing a result of determination as to whether or not a content to be reproduced is reproducible by determining whether or not a source ID attached to the content is a source ID included in the source-ID list in case the reproduction control method determination section determines that the method to control reproduction of a content is a first reproduction control method;

a second reproducibility determination section for producing a result of determination as to whether or not a content to be reproduced is reproducible on the basis of usage rule information described in a license issued to the content in case the reproduction control method determination section determines that the method to control reproduction of a content is a second reproduction control method; and a reproduction execution section for reproducing a content indicated by the determination result produced by the first reproducibility determination section or the second reproducibility determination section as a reproducible content.

In addition, the source ID may include a group ID generated as an ID unique to each of users registered in a copyright management server. In addition, a group ID for a user making a request for transmission of a content from a content distribution server to a content-processing apparatus may be added to the transmitted content.

As an alternative, the source ID may include a recorder ID generated as an ID unique to each content-processing apparatus having a ripping section for ripping out a content from a recording medium. In addition, the content-processing apparatus having a ripping section may attach a recorder ID assigned to the content-processing apparatus itself to a content ripped off from a recording medium.

The usage rule information may include a limit of the number of times the content can be reproduced. In addition, the usage rule information may also include a deadline of a period in which the content can be reproduced.

The content reproduction apparatus may further include a communication section for setting a connection to a content-processing apparatus and communicating with the content-processing apparatus. The content-processing apparatus may be capable of updating the method identification information.

Furthermore, the content reproduction apparatus may further include a display section for displaying the title information of one content or a plurality of contents held in the content reproduction apparatus. The display section may display title information of contents determined by the first reproducibility determination section or the second reproducibility determination section to be reproducible contents and title information of contents determined by the first reproducibility determination section or the second reproducibility determination section to be irreproducible contents in such a way that the title information of the reproducible contents can be distinguished from the title information of the irreproducible contents.

The content reproduction apparatus may further include a content select section for selecting at least one title from those displayed on the display section as title information of reproducible contents. The storage section may also be used for storing content management information associating the title information of every content with location information at which the content has been stored. The reproduction execution section may read out a content indicated by title information selected by the content select section on the basis of the content management information and reproduce the content.

In addition, the display section may display a title list showing title information of contents determined to be reproducible contents with a color and/or at a degree of luminance, which are different from those for irreproducible-content title information.

The display section may display a title list showing title information of contents determined to be reproducible contents and title information of contents determined to be irreproducible contents in such a way that the title information of the reproducible contents and the title information of the irreproducible contents can be distinguished from each other.

Furthermore, the display section may display a title list showing title information of contents determined to be reproducible contents and title information of contents determined to be irreproducible contents by adding different icons to the displayed title information of the reproducible contents and the displayed title information of the irreproducible contents, respectively.

The content reproduction apparatus may further include a communication section for setting a connection to a content-processing apparatus and communicating with the content-processing apparatus. In this case, the resource-ID list stored in the storage section may be updated on the basis of a source-ID list owned by the content-processing apparatus when the content reproduction apparatus is registered through the content-processing apparatus in the same equipment group as the content-processing apparatus in a group management server.

The content reproduction apparatus may be a portable content reproduction apparatus having a hard-disk drive.

In addition, in order to solve the problems described above, in accordance with another aspect of the present invention, there is provided a content reproduction control method for controlling reproduction of a content in a content reproduction apparatus. The content reproduction control method includes:

a reproduction control method determination step of determining a method to control reproduction of a content on the basis of method identification information each showing a method to control reproduction of contents;

a first reproducibility determination step of producing a result of determination as to whether or not a content to be reproduced is reproducible by determining whether or not a source ID attached to the content is a source ID included in the source-ID list in case the method to control reproduction of a content is determined to be a first reproduction control method at the at the reproduction control method determination step;

a second reproducibility determination step of producing a result of determination as to whether or not a content to be reproduced is reproducible on the basis of usage rule information described in a license issued to the content in case the method to control reproduction of a content is determined to be a second reproduction control method at the reproduction control method determination step; and a reproduction step of reproducing a content indicated by the determination result produced at the first reproducibility determination step or the second reproducibility determination step as a reproducible content.

In addition, the source ID may include a group ID generated as an ID unique to each of users registered in a copyright management server.

As an alternative, the source ID may include a recorder ID generated as an ID unique to each content-processing apparatus having a ripping section for ripping out a content from a recording medium.

The usage rule information may include a limit of the number of times the content can be reproduced. In addition, the usage rule information may also include a deadline information of a period in which the content can be reproduced.

The content reproduction control method may further include the step of updating the method identification information.

Furthermore, the content reproduction control method may further include a display step of displaying the title information of one content or a plurality of contents held in the content reproduction apparatus. The display step may be executed to display title information of contents determined at the first reproducibility determination step or the second reproducibility determination step to be reproducible contents or to be irreproducible contents in such a way that the title information of the reproducible contents can be distinguished from the title information of the irreproducible contents.

Moreover, the content representation step may further include a select step of selecting at least one title from those displayed on the display section as title information of reproducible contents. The reproduction step may be executed to read out a content indicated by title information selected at the content select step on the basis of the content management information associating the title information of every content with location information used for storing the content and reproduce the content.

In addition, the display step may be executed to display a title list showing title information of contents determined to be reproducible contents with a color and/or at a degree of luminance, which are different from those for irreproducible content titles also shown on the title list as for title information of contents determined to be irreproducible contents.

The display step may be executed to display a title list showing title information of contents determined to be reproducible contents and title information of contents determined to be irreproducible contents in such a way that the title information of the reproducible contents and the title information of the irreproducible contents can be distinguished from each other.

Furthermore, the display step may be executed to display a title list showing title information of contents determined to be reproducible contents and title information of contents determined to be irreproducible contents by adding different icons to the reproducible contents and the irreproducible contents, respectively.

In addition, the content reproduction control method may further include the step of requesting a copyright management server through a content-processing apparatus connected to the content reproduction apparatus to register the content reproduction apparatus in the same apparatus group as the content-processing apparatus and the step of updating the resource-ID list owned by the content reproduction apparatus on the basis of a source-ID list owned by the content-processing apparatus.

In order to solve the problems described above, in accordance with a further aspect of the present invention, a program for controlling reproduction of a content in a content reproduction apparatus includes:

a reproduction control method determination process of determining a method to control reproduction of a content on the basis of method identification information each showing a method to control reproduction of contents;

a first reproducibility determination process of producing a result of determination as to whether or not a content to be reproduced is reproducible by determining whether or not a source ID attached to the content is a source ID included in the source-ID list in case the method to control reproduction of a content is determined to be a first reproduction control method in the reproduction control method determination process;

a second reproducibility determination process of producing a result of determination as to whether or not a content to be reproduced is reproducible on the basis of usage rule information described in a license issued to the content in case the method to control reproduction of a content is determined to be a second reproduction control method in the reproduction control method determination process; and a reproduction process of reproducing a content determined by the determination result produced in the first reproducibility determination process or the second reproducibility determination process as a reproducible content.

In accordance with the present invention described above, a content reproduction apparatus is capable of implementing control of reproduction of contents in conformity with two different copyright management methods. Thus, it is possible to not only raise the degree of convenience provided to the user but also increase the efficiency of the development work and hence reduce the cost since the works to develop and design a content reproduction apparatus of a different model are no longer required.

In addition, the content reproduction apparatus is not only compatible with the conventional check-in/check-out method, but also capable of keeping up with a copyright management method scheme for controlling reproduction of contents on the basis a source ID assigned to every content and a source ID list. Thus, the content reproduction apparatus is capable of keeping up with a user-friendlier copyright management method scheme offering a higher degree of freedom to utilize contents to the user.

BRIEF DESCRIPTION OF DRAWINGS

FIG. 1 is an explanatory diagram showing an outline of a group-registering process in a content-sharing system according to a first embodiment of the present invention.

FIG. 2 is a block diagram showing main configuration elements composing the content-sharing system provided by the same embodiment.

FIG. 3 is a block diagram showing an outline of the entire configuration of the content-sharing system provided by the same embodiment.

FIG. 4 is a block diagram showing the hardware configuration of the content-processing apparatus provided by the same embodiment.

FIG. 5 is a block diagram showing an outline of functions of the content-processing apparatus provided by the same embodiment.

FIG. 6(a) is an explanatory diagram showing an outline of the structure of a content conforming to a copyright management method provided by the same embodiment and an outline of the structure of a content conforming to a check-in/check-out method.

FIG. 6(b) is an explanatory diagram showing an outline of the structure of a content conforming to the copyright management method provided by the same embodiment and an outline of the structure of a content conforming to the check-in/check-out method.

[FIG. 7]
FIG. 7 is a block diagram showing an outline of functions of a content reproduction section provided by the same embodiment.

[FIG. 8]
FIG. 8 is a block diagram showing an outline of the configuration of a list management section provided by the same embodiment.

[FIG. 9]
FIG. 9 is a block diagram showing an outline of the hardware configuration of the content reproduction apparatus provided by the same embodiment.

FIG. 10 is a block diagram showing an outline of functions of the content reproduction apparatus provided by the same embodiment.

FIG. 11 is a block diagram showing an outline of functions of servers provided by the same embodiment.

[FIG. 12]
FIG. 12 is an explanatory diagram showing the data structure of a group-registering database provided by the same embodiment.

FIG. 13 shows timing charts representing basic flows of a content-sharing method provided by the same embodiment.

FIG. 14 shows timing charts representing a group-registering process to register a content-processing apparatus (PC) provided by the same embodiment.

FIG. 15 shows timing charts representing an apparatus group-deregistering process to deregister a content-processing apparatus (PC) provided by the same embodiment.

FIG. 16 shows timing charts representing a group-registering process to register a content reproduction apparatus (PD) provided by the same embodiment.

FIG. 17 shows timing charts representing a group-deregistering process to deregister a content reproduction apparatus (PD) provided by the same embodiment.

FIG. 18 shows a flowchart representing a content reproduction control process carried out by a content-processing apparatus (PC) provided by the same embodiment, in accordance with a group management method.

FIG. 19 shows a flowchart representing a process to update a list of source IDs in a content-processing apparatus provided by the same embodiment.

FIG. 20(a) is an explanatory diagram showing an outline configuration of a local-registering process according to the same embodiment.

FIG. 20(b) is an explanatory diagram showing an outline configuration of a local-registering process according to the same embodiment.

FIG. 20(c) is an explanatory diagram showing an outline configuration of a local-registering process according to the same embodiment.

[FIG. 21(a)]

FIG. 21(a) is an explanatory diagram showing an outline configuration of a source-ID list in either of the local-registering process and a service-registering process, which are carried out in accordance with the same embodiment.

[FIG. 21(b)]

FIG. 21(b) is an explanatory diagram showing an outline configuration of a source-ID list in either of the local-registering process and the service-registering process, which are carried out in accordance with the same embodiment.

[FIG. 21(c)]

FIG. 21(c) is an explanatory diagram showing an outline configuration of a source-ID list in either of the local-registering process and the service-registering process, which are carried out in accordance with the same embodiment.

[FIG. 21]

FIG. 23 shows a flowchart representing an outline of a registering process for either of a content reproduction apparatus and a content-processing apparatus, which are provided by the same embodiment.

FIG. 24 shows a flowchart representing an outline of the registering process for either of a content reproduction apparatus and a content-processing apparatus, which are provided by the same embodiment.

FIG. 25 shows a flowchart representing an outline of another continuation of the registering process for either of a content reproduction apparatus and a content-processing apparatus, which are provided by the same embodiment.

FIG. 26 is an explanatory diagram showing an outline of a warning screen provided by the same embodiment.

FIG. 27 is an explanatory diagram showing an outline of a warning screen provided by the same embodiment.

FIG. 28 is an explanatory diagram showing an outline of an input screen, which is displayed when a service-registering process is carried out in accordance with the same embodiment.

FIG. 29 is a block diagram showing an outline configuration of a copyright management section employed in a content-processing apparatus according to the same embodiment.

FIG. 30 is a diagram showing an outline sequence of a service-registering process applied to a content reproduction apparatus in accordance with the same embodiment.

FIG. 31 is a diagram showing an outline sequence of a service-registering process applied to a content-processing apparatus in accordance with the same embodiment.

FIG. 32 is a block diagram showing a functional configuration of a content-processing apparatus according to the same embodiment.

FIG. 33 shows a flowchart representing a process to display a title list of contents in a content-processing apparatus according to the same embodiment.

FIG. 34 shows a flowchart representing a process to delete irreproducible contents from a content-processing apparatus according to the same embodiment.

FIG. 35 shows a flowchart representing a process to display a title list of contents in a content reproduction apparatus according to the same embodiment.

FIG. 36 shows a flowchart representing a process to delete irreproducible contents from a content reproduction apparatus according to the same embodiment.

FIG. 37 shows a flowchart representing a process carried out by a content-processing apparatus to drive a content reproduction apparatus to reproduce a content in the content reproduction apparatus in accordance with the same embodiment.

FIG. 38 shows a flowchart representing a process to display a title list of contents in a content reproduction apparatus according to the same embodiment.

FIG. 39 is a diagram showing a screen layout displaying a typical title list of contents in a content reproduction apparatus according to the same embodiment.

FIG. 40 is a diagram showing a screen layout displaying a typical title list of contents in a content reproduction apparatus according to the same embodiment.

FIG. 41 is a diagram showing a screen layout displaying another typical title list of contents in accordance with the same embodiment.

FIG. 42 is a diagram showing a screen layout displaying a further typical title list of contents in accordance with the same embodiment.

FIG. 43 is a diagram showing a screen layout displaying a still further typical list of title information of contents in accordance with the same embodiment.

FIG. 44 is a diagram showing a screen layout illustrating a typical screen display in a process to delete an irreproducible content in accordance with the same embodiment.

FIG. 45 is a block diagram showing a functional configuration of a content-processing apparatus according to the same embodiment.

FIG. 46 shows a flowchart representing a process to transfer a content from a content reproduction apparatus to a content-processing apparatus in accordance with the same embodiment.

FIG. 47 shows a flowchart representing a determination process carried out in a transfer mode in a content reproduction apparatus according to the same embodiment.

FIG. 48 shows a flowchart representing a process to transfer a content from a content reproduction apparatus to a content-processing apparatus by adoption of a group management method in accordance with the same embodiment.

FIG. 49 shows a flowchart representing a process to transfer a content from a content reproduction apparatus to a content-processing apparatus by adoption of a check-in/check-out method in accordance with the same embodiment.

FIG. 50 shows a flowchart representing a process to transfer a content from a content-processing apparatus to a content reproduction apparatus in accordance with the same embodiment.

FIG. 51 shows a flowchart representing a process to transfer a content from a content-processing apparatus to a content reproduction apparatus by adoption of a copyright management method in accordance with the same embodiment.

FIG. 52 shows a flowchart representing a check-in/check-out process from a content-processing apparatus to a content reproduction apparatus by adoption of a check-in/check-out method in accordance with the same embodiment.

FIG. 53 is a diagram showing a screen layout displayed to request the user to transfer a transfer of a content in accordance with the same embodiment.

FIG. 54 shows a flowchart representing a typical process to control reproduction of a content in a content reproduction apparatus (PD) according to the same embodiment.

FIG. 55 shows a flowchart representing another typical process to control reproduction of a content in a content reproduction apparatus (PD) according to the same embodiment.

FIG. 56(a) is an explanatory diagram showing a typical title list appearing on a display apparatus employed in a content reproduction apparatus (PD) according to the same embodiment.

FIG. 56(b) is an explanatory diagram showing a typical title list appearing on a display apparatus employed in a content reproduction apparatus (PD) according to the same embodiment.

FIG. 56(c) is an explanatory diagram showing a typical title list appearing on a display apparatus employed in a content reproduction apparatus (PD) according to the same embodiment.

BEST MODES FOR CARRYING OUT THE INVENTION

Figure 1:
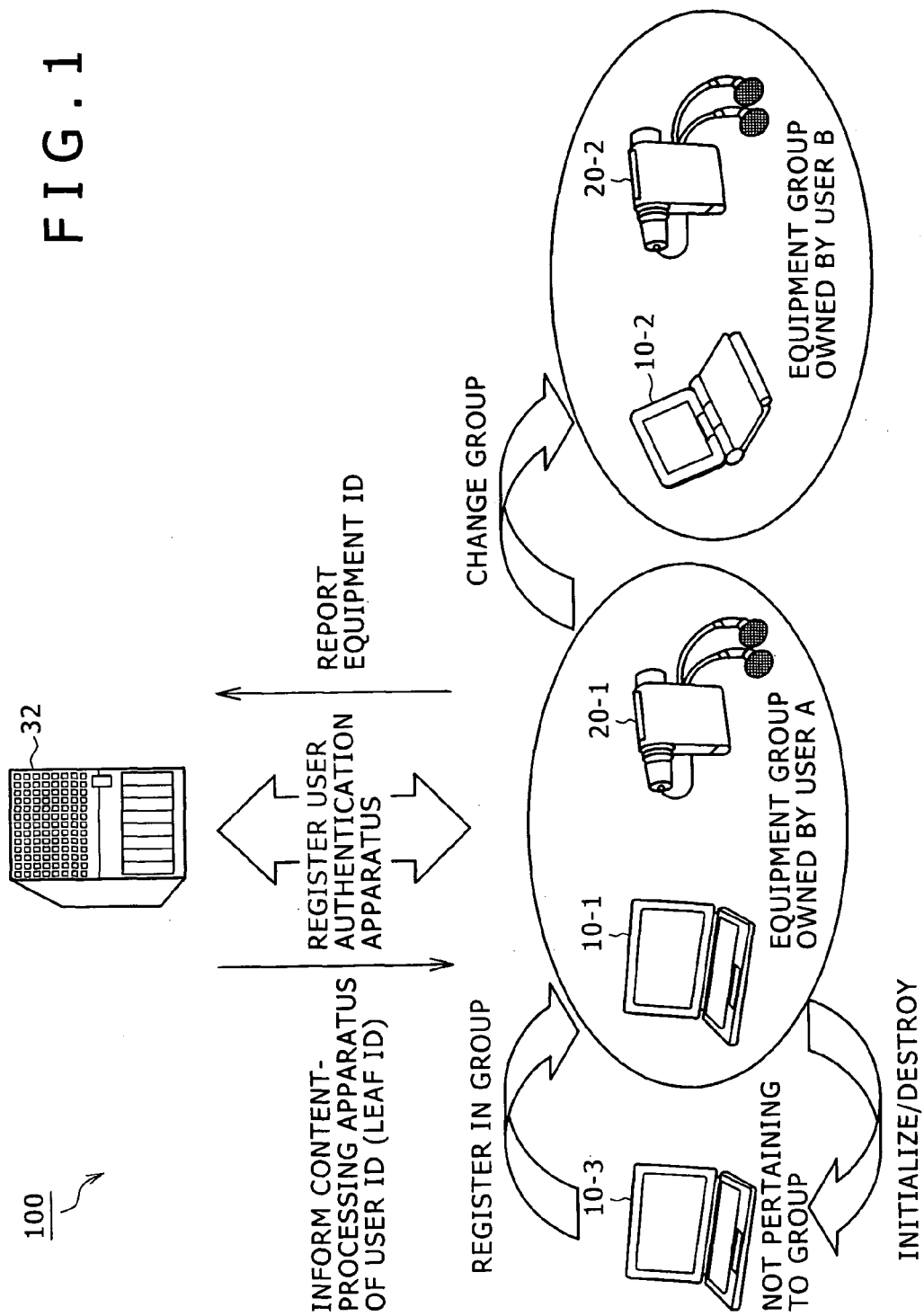
[FIG. 1]

Preferred embodiments of the present invention are explained in detail by referring to the figures, which are described above, as follows. It is to be noted that configuration elements virtually having functional configurations identical with each other are denoted by the same reference numeral throughout this specification as well as the figures, and the explanation of the identical elements is given only once.

First Embodiment

A content-sharing system according to a first embodiment and its configuration elements are explained as follows.

1. Outline of Copyright Management According to a Group Management Method

First of all, the following description explains a content-sharing system for executing management of copyrights by adoption of a group management method according to an embodiment.

The content-sharing system according to an embodiment has been designed as a copyright management system for managing utilization of contents in a plurality of equipment (content-processing apparatus, content reproduction apparatus, or the like) and protecting copyrights of the contents. That is to say, the content-sharing system limits sharing of contents among equipment owned by different users in order to reliably avoid illegal utilization of the contents through acts to distribute a large number of contents by way of the Internet.

On the other hand, this content-sharing system has also been designed as a system for rendering a content-sharing service of allowing contents to be shared to a certain degree among a plurality of equipment owned by the same user (which also means a limited-range user group such as a family, friends or employees of the same company. In the following description, the user means such a user group of a limited range).

Such a content-sharing system according to the embodiment allows contents to be shared in the range of private use while managing copyrights of the contents. The content-sharing system adopts a copyright management method (or a copyright management scheme of a group management method to be described later) capable of enhancing the convenience of sharing contents among a plurality of equipment owned by the same user and raising the degree of freedom to utilize the contents.

As described above, in the conventional copyright management system adopting only the check-in/check-out method conforming to the SDMI, illegal utilization of contents is restrained by limiting the number of copies made for a content (or the number of check-in/check-out operations carried out on a content) for every content on the basis of a license serving as right information used for establishing an authority to utilize the content. In such a system, every time a content is copied from a content-processing apparatus to another, (that is, each time check-in/check-out operations are carried out) in the content-processing apparatuses, a copyright management process must be performed. Thus, the conventional system has shortcomings of a complicated system configuration, a longer processing time, a lower degree of freedom to utilize contents in the range of private use and a lack of convenience. In addition, in the case of the conventional copyright management system adopting the check-in/check-out method, the user must always utilize the system by being aware of a copy source of a copied content and the number of copy operations done so far for every content. Further, it is impossible to achieve the original object of the copyright management system to prevent a content from being copied to equipment owned by others.

On the other hand, the content-sharing system according to the embodiment is characterized in that the system is capable of implementing management of copyrights on the basis of not only the conventional check-in/check-out method, but also a group management method. In a copyright management system based on the group management method, a source of a content is used as a content utilization management unit. To put it concretely, a user initially owning a content or equipment creating a content is taken as the content utilization management unit. That is to say, management of copyrights is executed to allow or disallow reproduction of a content in each equipment on the basis of the source of the content.

To put it more concretely, in the copyright management system based on the group management method, a plurality of equipment owned by each user is registered by a group management server in a group assigned to the user. In each of the equipment registered in a group, reproduction of a content is controlled on the basis of a source ID identifying the source of the content and a list of such source IDs. Thus, contents pertaining to the same source can be copied among the equipment registered in an apparatus group assigned to equipment owned by the same user and reproduced in each of the equipment with a high degree of freedom.

It is to be noted that the content mentioned above can be any content including an audio content, a video content, an electronic book (E-book), a game or software. The audio content can be a piece of music, a speech or a radio program whereas the video content includes a still or moving image such as a movie, a television program, a video program, a photo, a drawing or a figure. The content in the following description is the audio content or, to be more specific, an audio content distributed by a server or an audio content ripped off from a musical CD. However, the content in this present invention is not limited to such an audio content.

By referring to FIG. 1, the following description explains an outline of a group-registering process carried out in a content-sharing system 100 implemented by the embodiment as a system for executing copyright management based on the group management method described above. It is to be noted that FIG. 1 is an explanatory diagram showing the outline of the group-registering process carried out in the content-sharing system 100 according to the embodiment.

As shown in FIG. 1, PCs 10-1 and 10-2 each serving as a content-processing apparatus as well as PDs 20-1 and 20-2 each functioning as a content reproduction apparatus are put in respectively an equipment group owned by user A and an equipment group owned by user B. In the typical configuration shown in the figure, the equipment group owned by user A includes the content-processing apparatus 10-1 and the content reproduction apparatus 20-1 whereas the equipment group owned by user B includes the content-processing apparatus 10-2 and the content reproduction apparatus 20-2. A process to put equipment in a group can be implemented in the group management server 32 as a group-registering process carried out for every user on a content-processing apparatus 10 and a content reproduction apparatus 20.

The group-registering process is exemplified by a concrete example to put the PC functioning as the content-processing apparatus 10-1 owned by user A in an apparatus group. First, user A operates the content-processing apparatus 10-1 owned by itself to make an access to the group management server 32, which then authenticates the user. Subsequently, the content-processing apparatus 10-1 transmits the equipment ID of the content-processing apparatus 10-1 to the group management server 32. The equipment ID is a terminal ID. Then, the group management server 32 stores the equipment ID of the content-processing apparatus 10-1 by associating the ID with user A. In this way, the group-registering process is carried out to put the content-processing apparatus 10-1 in an equipment group assigned to user A. Subsequently, the group management server 32 transmits identification information used for identifying user A to the content-processing apparatus 10-1. The identification information is a leaf ID to be described later. The content-processing apparatus 10-1 stores the identification information received from the group management server 32 in storage means of its own. In the same way, any other content-processing apparatus 10 can be registered in a group. As for a content reproduction apparatus 20 (PD), its group-registering process is carried out through a content-processing apparatus 10 (PC) as will be described later in detail.

In a group-registering process described above, one equipment (a content-processing apparatus 10 or a content reproduction apparatus 20) can be registered only in an equipment group assigned to a single user. That is to say, one apparatus cannot be registered in different apparatus groups of different users. Thus, if the ownership of the content-processing apparatus 10-2 is changed from user A to user B, for example, it is necessary to change the group to which the content-processing apparatus 10-2 pertains. That is to say, the content-processing apparatus 10-2 must be de-registered from the equipment group assigned to user A and a group-registering process must be carried out to newly register the content-processing apparatus 10-2 in an apparatus group assigned to user B.

In addition, when user A newly purchases a content-processing apparatus 10-3, for example, the content-processing apparatus 10-3 is initially to a state of pertaining to no group. Thus, in the same way as that described above, a group-registering process can be carried out to register the content-processing apparatus 10-3 in the equipment group assigned to user A. On the other hand, the content-processing apparatus 10-1 can be de-registered from the group to put in a state of pertaining to no group.

As described above, in the content-sharing system 100, any equipment owned by a user can be registered in a group assigned to the user in the group management server 32, which manages such groups in user units. As a result, a content can be freely shared by equipment registered in the same equipment group assigned to the same user. On the other hand, a content cannot be shared by equipment registered in the different equipment groups assigned to different users.

In order to solve the above problem, a management method to share a content in such a situation has been proposed. An outline of this management method is explained by referring to FIG. 2. It is to be noted that FIG. 2 is a block diagram showing main configuration elements composing the content-sharing system 100 provided by the embodiment.

Figure 2:
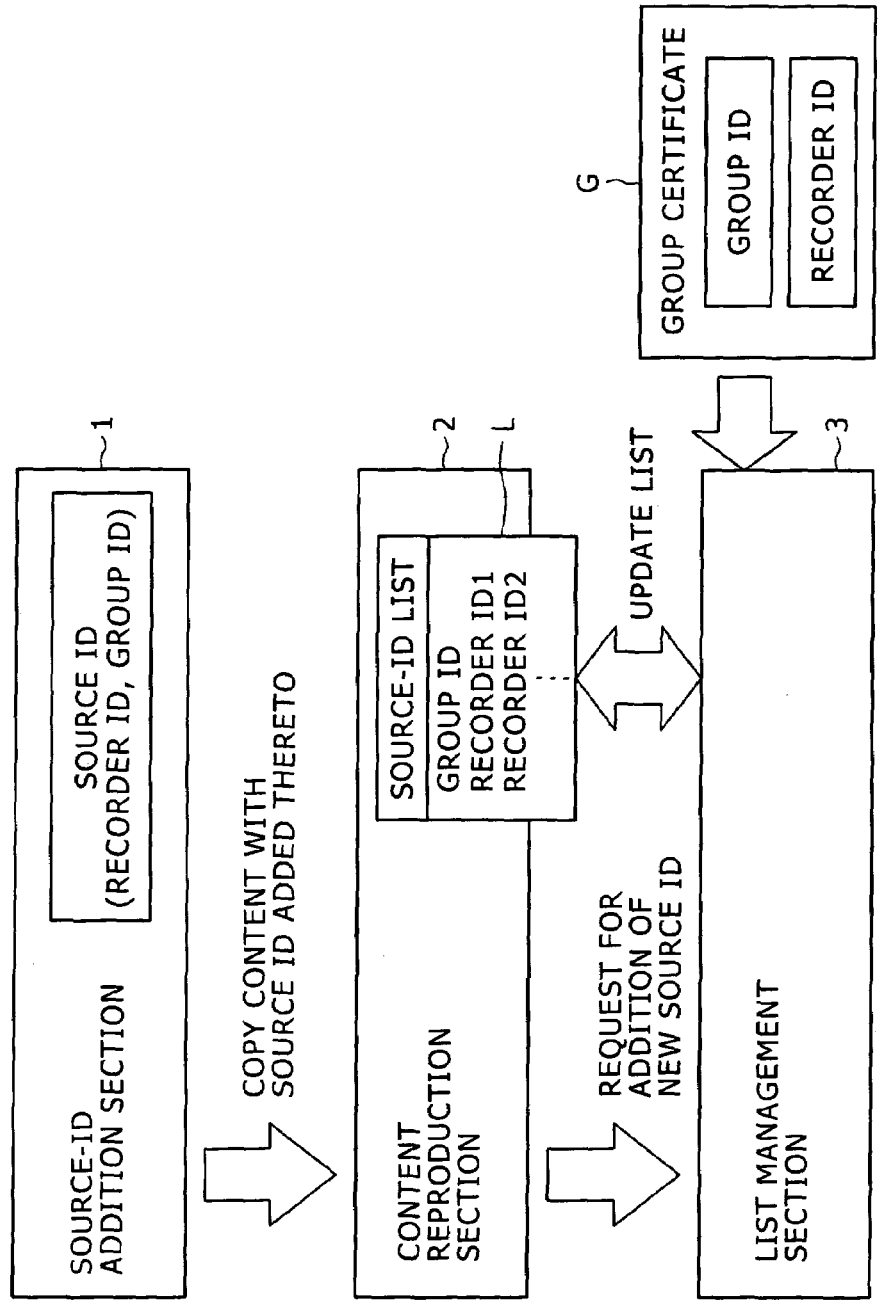
[FIG. 2]

As shown in FIG. 2, the content-sharing system 100 according to the embodiment has main configuration elements including a source-ID addition section 1, a content reproduction section 2 and a list management section 3.

The source-ID addition section 1 provided in the content-processing apparatus 10 has a function for adding a source ID used for identifying the source of a content to the content. It is to be noted that an operation to add a source ID to the content means an operation to associate the source ID with the content. For example, the operation to add a source ID to the content is an operation to add the source ID data to a file (the content file) or an operation to associate a file of the source ID data with a content file.

The source of a content means an entity at an individual-user level as an entity of the content shared in the content-sharing system 100. To put it concretely, the source of a content implies:

(1) a user who acquired the content by purchasing the content through utilization of a content distribution service; or
(2) a content-processing apparatus 10 or the like, which created the content by carrying out a ripping or self-recording process.

Thus, the source ID is an identifier assigned to every content source as an identifier unique to the content source. By assigning a source ID to a content, the source of the content distributed in the content-sharing system 100 can be identified.

In the case of the embodiment, examples of the source ID are a recorder ID or a group ID. The recorder ID is a source ID used for a case in which the source of a content is a content-processing apparatus 10. The group ID is a source ID used for a case in which the source of a content is a user.

Thus, a recorder ID is an identifier assigned to each content-processing apparatus 10 (PC) or the like having a content-ripping function as an identifier unique to the content-processing apparatus 10. The recorder ID is generated by the content-processing apparatus 10 having a content-ripping function on the basis of the equipment ID of the content-processing apparatus 10, and stored in the content-processing apparatus 10 with a high degree of safety. When the content-processing apparatus 10 rips off a content from a removable recording medium such as a musical CD, the content-processing apparatus 10 adds the recorder ID generated by the content-processing apparatus 10 itself to the ripped-off content, which is referred to hereafter as a rippling content. Thus, the recorder ID added to a content can be used for identifying the content-processing apparatus 10, which serves as the source of the content.

A group ID is thus an identifier assigned to every user owning a content-processing apparatus 10 and/or a content reproduction apparatus 20 as an identifier unique to the user. To put it concretely, the group ID is an identifier assigned each user account of a content-sharing service rendered by the content-sharing system 100 according to the embodiment. Thus, the group ID can be used for identifying an equipment group to which a content-processing apparatus 10 and/or a content reproduction apparatus 20 pertain and identifying the owner of the content-processing apparatus 10 and/or the content reproduction apparatus 20.

In the case of the embodiment, a group ID is generated by the content-processing apparatus 10 on the basis of a leaf ID when the content-processing apparatus 10 is registered or when a distributed content is received. The leaf ID is an identifier assigned to every user. For example, when a user is registered in the group management server 32, the group management server 32 generates a leaf ID assigned to the user. Thus, the leaf ID is typical user identification information. When equipment is registered or when a content is distributed, the group management server 32 transmits a leaf ID to the content-processing apparatus 10.

The content-processing apparatus 10 generates a group ID on the basis of a service ID and a leaf ID received from the group management server 32. The service ID is an ID assigned to every content distribution service or ripping-content-sharing service rendered in the content-sharing system 100 as an ID unique to the service. The content distribution service is a service distributing a content from a content distribution server to the content-processing apparatus 10 whereas the ripping-content-sharing service is a service of allowing a ripping content to be shared by a plurality of content-processing apparatus 10 and a plurality of content reproduction apparatus 20 as apparatus owned by the same user through a process of registering a group assigned to the user.

For example, if the content distribution service and the ripping-content-sharing service are not managed separately, that is, if a service ID common to both the content distribution service and the ripping-content-sharing service is used, a service ID and a leaf ID are combined to generate a combined group ID as described above. The process of generating a group ID on the basis of a service ID and a leaf ID is expressed by the following equation:

Group ID=Service ID+Leaf ID

If the content distribution service and the ripping-content-sharing service are managed separately, on the other hand, a content distribution service ID unique to the content distribution service and a ripping-content-sharing service ID unique to the ripping-content-sharing service are both generated as service IDs assigned the content distribution service and the ripping-content-sharing service respectively. Thus, in this case, the processes of generating group IDs on the basis of service IDs and a leaf ID are expressed by the following equations:

First group ID=Content distribution service ID+Leaf ID

Second group ID=Ripping-content-sharing service ID+Leaf ID

The first group ID is added to a content distributed by the content distribution server as a group ID used for identifying a user purchasing the content. On the other hand, the second group ID serves as a criterion used in a process to register a recorder ID on a source-ID list to be described later as a criterion as to whether or not the recorder ID can be added to the list. A recorder ID is registered on the list of source IDs in order to allow a ripping content to be shared by content-processing apparatus 10 and content reproduction apparatus 20.

The embodiment adopts the latter method for generating the first and second group IDs. In order to allow the description to be written with a high degree of convenience, however, both the first and second group IDs are expressed by a group ID without distinguishing the first and second group IDs from each other.

Such a group ID is added by the content-processing apparatus 10 to a content distributed by the content distribution server to the content-processing apparatus 10. By adding a group ID to a distributed content, it is possible to identify the user serving as the purchaser of the content, that is, it is possible to identify the source of the content.

As described above, a content with a source ID added thereto by the source-ID addition section 1 employed in the content-processing apparatus 10 can be copied from the content-processing apparatus 10 to the content reproduction apparatus 20 or vice versa with a high degree of freedom. As explained earlier, the source ID is either a recorder ID or a group ID. That is to say, in a copyright management system adopting the group management method, unlike the conventional copyright management system adopting the conventional check-in/check-out method, an operation to copy a content with a source ID added thereto is not subjected to a process to limit the number of copy operations.

The content reproduction section 2 implemented as a machine for reproducing a content or software for reproduction of a content is provided in a content-processing apparatus 10 or a content reproduction apparatus 20. The content reproduction section 2 has a source-ID list L, which includes source IDs each assigned to a content to indicate that reproduction of the content in the content reproduction section is allowed. The source-ID list L is provided for each content reproduction section 2, and source-IDs included on the list L vary in dependence on the content reproduction section 2.

When reproducing a content having a source ID added thereto, the content reproduction section 2 checks the source-ID list L to produce a result of determination as to whether or not the content is a reproducible content. That is to say, if the source ID attached to the content is a source ID included on the source-ID list L, the content reproduction section 2 produces a determination result indicating that the content is a reproducible content. If the source ID attached to the content is not a source ID included on the source-ID list L, on the other hand, the content reproduction section 2 produces a determination result indicating that the content is not a reproducible content. In this way, the content reproduction section 2 controls reproduction of contents for every source ID unit, that is, for every content source.

In addition, the content reproduction section 2 is allowed to request the list management section 3 to add a new source ID to the source-ID list L owned by the content reproduction section 2 itself. That is to say, in order for the content reproduction section 2 to reproduce a content with its new source ID not added yet to the source-ID list L owned by the content reproduction section 2 itself, it is necessary to add the new source ID to the source-ID list L. In order to add the new source ID to the source-ID list L, the content reproduction section 2 requests the list management section 3 authorized to update the source-ID list L to permit the addition of the new source ID.

The list management section 3 is provided inside the content-processing apparatus 10 as a unit for updating the source-ID list L owned by the content reproduction section 2. A process to update the source-ID list L is an operation to add a source ID to the source-ID list L or delete a source ID from the source-ID list L. A source ID added to the source-ID list L by the list management section 3 enables the content reproduction section 2 to reproduce a content having the source ID attached thereto. On the other hand, a source ID deleted from the source-ID list L by the list management section 3 disables the content reproduction section 2 from reproducing a content having the source ID attached thereto.

The list management section 3 acquires an apparatus group certificate G serving as shared information indicating association of a group ID with a recorder ID, updating the source-ID list L on the basis of the group certificate G. To put it concretely, if the group ID included in the group certificate G matches a group ID included on the source-ID list L, the list management section 3 adds the recorder ID included in the group certificate G to the source-ID list L. In this way, a recorder ID registered in an equipment group assigned to a user as the recorder ID of the content-processing apparatus 10 can be added to the source-ID list L so that it is possible to reproduce a ripping content ripped off by the content-processing apparatus 10.

In the content-sharing system 100 according to the embodiment, the source-ID addition section 1, the content reproduction section 2 and the list management section 3 control reproduction of contents in every content-processing apparatus 10 and content reproduction apparatus 20 as described above in order to manage copyrights of contents copied from any content-processing apparatus 10 to any other content-processing apparatus 10. It is to be noted that, as will be described later in detail, the content-sharing system 100 has been designed as a system capable of executing not only the copyright management based on the group management method explained above, but also the copyright management based on the conventional check-in/check-out method.

2. System Configuration

Figure 3:
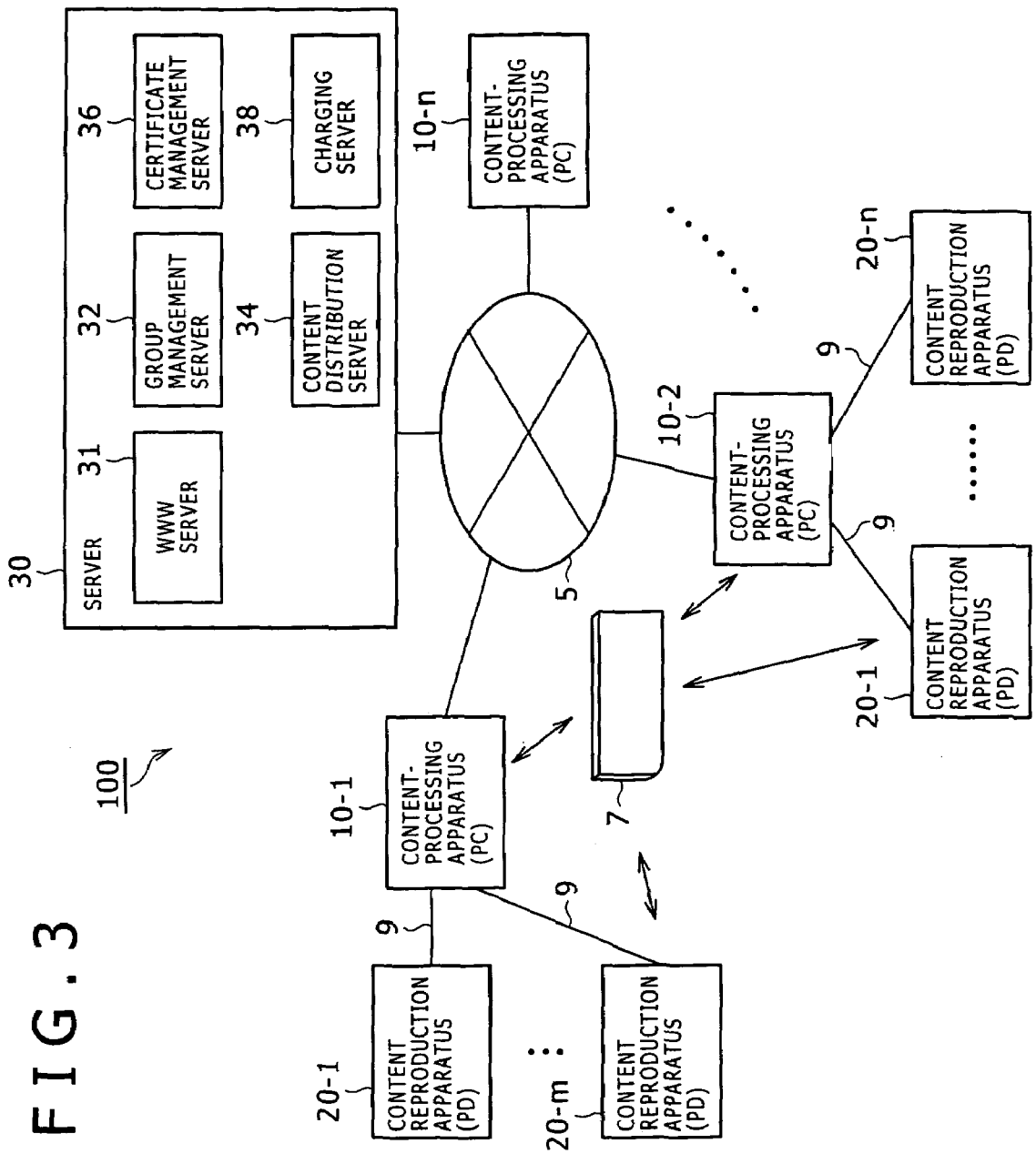
[FIG. 3]

Next, the entire configuration of the content-sharing system 100 according to the embodiment is explained by referring to FIG. 3. It is to be noted that FIG. 3 is a block diagram showing an outline of the entire configuration of the content-sharing system 100 provided by the embodiment.

As shown in FIG. 3, the content-sharing system 100 includes a plurality of content-processing apparatus 10-1, 10-2, . . . and 10-n, a plurality of content reproduction apparatus 20-1, 20-2, . . . , 20-m and 20-n, servers 30, a network 5, local lines 9 and a storage medium 7. In some cases, the content-processing apparatus 10-1, 10-2, . . . , and 10-n may each be denoted by generic reference numeral 10. By the same token, in some cases, the content reproduction apparatus 20-1, 20-2, . . . , 20-m and 20-n may each be denoted by generic reference numeral 20. The network 5 and local lines 9 are means for connecting the content-processing apparatus 10-1, 10-2, . . . , and 10-n, the content reproduction apparatus 20-1, 20-2, . . . , 20-m and 20-n and the servers 30 to each other. The servers 30 include a WWW (World Wide Web) server 31, a group management server 32, a content distribution server 34, a certificate management server 36 and a charging server 38.

The content-processing apparatus 10 is an apparatus capable of recording and reproducing a content. To put it more concretely, the content-processing apparatus 10 is implemented as a computer such as a PC (Personal Computer), which can be a note PC or a desk-top PC. However, the implementation of the content-processing apparatus 10 is not limited to the computer. That is to say, the content-processing apparatus 10 can be any apparatus having a function for carrying out communications through the network 5. Examples of the apparatus are a PDA (Personal Digital Assistant), a home game machine and an information electrical appliance.

The content-processing apparatus 10 can be connected to the servers 30 by the network 5 and is thus capable of communicating with the servers 30. It is possible to install software for a content distribution service and software for a ripping-content-sharing service in the content-processing apparatus 10. Thus, the content-processing apparatus 10 is capable of receiving a content distributed by the content distribution server 34 and recording the received content in storage means such as a storage unit or the storage medium 7.

In addition, the content-processing apparatus 10 is also capable of creating a new content by carrying out a self-recording process such as an audio self-recording process or a video self-recording process, a ripping process or another process, and recording the created content onto a storage unit or the storage medium 7. It is to be noted that the self-recording process is a process carried out by an image-taking apparatus or sound collection apparatus employed in the content-processing apparatus 10 itself to record an image taken by the image-taking apparatus or a sound collected by the sound collection apparatus as digital data, respectively. On the other hand, the ripping process is a process to extract digital content data such as digital audio data or digital video data from a recording medium such as a musical CD, a video DVD or a software CD-ROM, convert the extracted data into file-formatted data, which can be processed by a computer, and record the file-formatted data onto a storage apparatus or the storage medium 7.

The content-processing apparatus 10 encodes the distributed content or the ripping content by compression in accordance with a predetermined encoding/compression method such as an ATTRAC3 (Advanced Transform Acoustic Coding 3, which is a trademark of Sony Corporation) method or an MP3 (MPEG Audio Layer 3) method, encrypts the encoded/compressed content in accordance with an encryption method such as a DES (Data Encryption Standard) method and records the encrypted data onto a storage unit or the storage medium 7.

In addition, the content-processing apparatus 10 is capable of exchanging a distributed content or a ripping content with another content-processing apparatus 10 or a content reproduction apparatus 20 by way of the network 5 or local lines 9 or by storing the content in a storage medium 7 serving as exchange means. Thus, a content can be presented to or acquired from any of a plurality of content-processing apparatus 10 and content reproduction apparatus 20. As a result, the content can be shared by the content-processing apparatus 10 and the content reproduction apparatus 20.

The content-processing apparatus 10 is registered in an apparatus group in the group management server 32 connected to the content-processing apparatus 10 by the network 5. Furthermore, the content-processing apparatus 10 includes configuration elements corresponding to the source-ID addition section 1, the content reproduction section 2 and list management section 3, which have been described earlier. As such, the content-processing apparatus 10 has been designed into a configuration conforming to the group management method adopted as a copyright management method. Moreover, as will be described later in detail, the content-processing apparatus 10 is also compatible with the conventional check-in/check-out method adopted as a copyright management method.

The content reproduction apparatus 20 is a PD (Portable Device) having a function for a portable content reproduction apparatus. To put it more concretely, the content reproduction apparatus 20 has the configuration of a portable audio player having an HDD (hard-disk drive) with a typical storage capacity of several tens of GBs. However, the configuration of the content reproduction apparatus 20 is not limited to such a portable audio player. For example, the content reproduction apparatus 20 can be implemented as any one of a variety of portable apparatus such as a portable audio/video player, a PDA, a hand phone and a PHS. In addition, the storage unit employed internally in the content reproduction apparatus 20 and the externally mountable storage medium 7 are not limited to an HDD. That is to say, the internal storage unit and the external storage medium 7 can each be a randomly accessible recording medium such as an optical disk, a magneto-optical disk, a flash memory, an FeRAM or a magnetic memory. It is to be noted that the content reproduction apparatus 20 can also be an apparatus capable of only reproducing a content.

A content reproduction apparatus 20 can be connected locally to a content-processing apparatus 10 by for example a local line 9 so that various kinds of data can be communicated between the content reproduction apparatus 20 and the content-processing apparatus 10. The local line 9 is a wire cable such as a USB (Universal Serial Bus) cable or an SCSI (Small Computer System Interface) cable. It is to be noted that the content-processing apparatus 10 and the content reproduction apparatus 20 can also each be designed so that various kinds of data can be communicated between the content reproduction apparatus 20 and the content-processing apparatus 10 by radio communication.

The content reproduction apparatus 20 is capable of reproducing a content transmitted by the content-processing apparatus 10 through local line 9 or a content received from the storage medium 7.

In addition, the content reproduction apparatus 20 can be registered in an apparatus group in the group management server 32 through the content-processing apparatus 10. Furthermore, the content reproduction apparatus 20 has a configuration corresponding to the content reproduction section 2 described earlier. Thus, the content reproduction apparatus 20 has a configuration capable of keeping up with the group management method adopted as a copyright management method. The content reproduction apparatus 20 is also compatible with the conventional check-in/check-out method adopted as a copyright management method. As will be described later in detail, by properly setting the content reproduction apparatus 20, the copyright management method can be switched from the group management method to the conventional check-in/check-out method or vice versa.

The servers 30 have the configuration of a computer provided with functions of a server. As described earlier, the servers 30 include the WWW server 31, the group management server 32, the content distribution server 34, the certificate management server 36 and the charging server 38.

The WWW server 31 is a server for establishing a communication with the content-processing apparatus 10 through a connection to the network and carrying out processing such as a user-registering process and a user authentication process. After authentication of the user is completed, the WWW server 31 connects the content-processing apparatus 10 to the group management server 32 or the content distribution server 34.

As described before, for every user, the group management server 32 is a server for registering a content-processing apparatus 10 or content reproduction apparatus 20 owned by a registered user in an apparatus group assigned to the user at a request received from the content-processing apparatus 10 as a request for an apparatus-registering process.

The content distribution server 34 is a server for rendering a content distribution service. At a request received from a content-processing apparatus 10 owned by a registered user as a request for distribution of a content, the content distribution server 34 transmits the content to the content-processing apparatus 10 by way of the network 5. The content distribution server 34 is designed as an EMD (Electronic Music Distribution) server for rendering an EMD service. The content distribution server 34 encodes a musical content to be distributed by compression in accordance with an encoding/compression method such as the ATTRAC3 method or the MP3 method, and encrypts the encrypted/compressed content in accordance with an encryption method such as the DES method before transmission to the content-processing apparatus 10. In addition, the content distribution server 34 encrypts a content key for decrypting the encrypted content to be distributed and transmits the encrypted content key to the content-processing apparatus 10 along with the encrypted content.

The certificate management server 36 is a server for acquiring group certificates G issued by content-processing apparatus 10, managing the acquired group certificates G and distributing an apparatus group certificate G to content-processing apparatus 10 pertaining to the same apparatus group as the content-processing apparatus 10 issuing the certificate G. In this way, any specific content-processing apparatus 10 is capable of sharing a ripping content of another content-processing apparatus 10 if the recorder ID of the other content-processing apparatus 10 pertaining to the same apparatus group as the specific content-processing apparatus 10 has been added to a source-ID list.

The charging server 38 is a server for charging the price of a content distributed by the content distribution server 34 to a user purchasing the content.

Each of the WWW server 31, the group management server 32, the content distribution server 34, the certificate management server 36 and the charging server 38 can be partially or wholly implemented by hardware and they can be servers physically separated from each other.

The network 5 is a communication line for connecting content-processing apparatus 10 to the servers 30 in such a way that the content-processing apparatus 10 and the servers 30 are capable of communicating with each other in two directions. The network 5 can be a public line network or a dedicated line network and may be a radio or wire network. Examples of the public line network are the Internet, a telephone line network and a satellite communication network, whereas examples of the dedicated line network are a WAN, a LAN and an IP-VPN.

In addition, the network 5 also includes a private network. From the copyright-management point of view, the private network is perceived as a network for connecting a plurality of content-processing apparatus 10 to each other as content-processing apparatus 10 sharing contents in a private domain. To put it concretely, examples of the private network are a network for connecting a plurality of content-processing apparatus 10 used by the same user to each other, a home network for connecting a plurality of content-processing apparatus 10 used in the same home to each other and a LAN for connecting a plurality of content-processing apparatus 10 used in a small-scale limited group to each other. Examples of the small-scale limited group are a particular society and an association of friends.

The storage medium 7 is a removable medium that can be used for storing various kinds of data such as a content, an apparatus group certificate G and a program. Examples of the storage medium 7 are an optical disk, a magnetic disk and a variety of semiconductor memories. Examples of the optical disk are a DVD-R, a DVD-RW, a DVD-RAM, a CD-R, a CD-RW and a magnetic-optical disk. On the other hand, examples of the magnetic disk are a flexible disk and a hard disk. It is to be noted that the storage medium 7 can be a recording medium having a copyright management function for restricting operations such as processes to copy and reproduce a content by, for example, encrypting the content to be copied and reproduced before storing the content into the storage medium 7.

The storage medium 7 functions as a medium for facilitating presentation and acquisition of a content among content-processing apparatus 10. For example, the content-processing apparatus 10-1 writes a content into the storage medium 7 and the content-processing apparatus 10-2 reads out the content from the storage medium 7. In this case, the content-processing apparatus 10-1 provides the content to the content-processing apparatus 10-2. In addition, the content-processing apparatus 10-1 is also capable of providing a content to a content reproduction apparatus 20 not connected to the network 5 by way of the storage medium 7 and acquiring a content from the content reproduction apparatus 20 by way of the storage medium 7. The storage medium 7 also functions as a medium for facilitating presentation and acquisition of an apparatus group certificate G among content-processing apparatus 10. Furthermore, the storage medium 7 can be inserted into a content sales terminal (not shown in the figure) provided at the storefront of a store. The user operates the sales terminal to store a purchased content into the storage medium 7 to be eventually provided to a content-processing apparatus 10.

3. Content-Processing Apparatus (PC)

Next, the configuration of the content-processing apparatus 10 (PC) according to the embodiment is explained in detail as follows.

Figure 4:
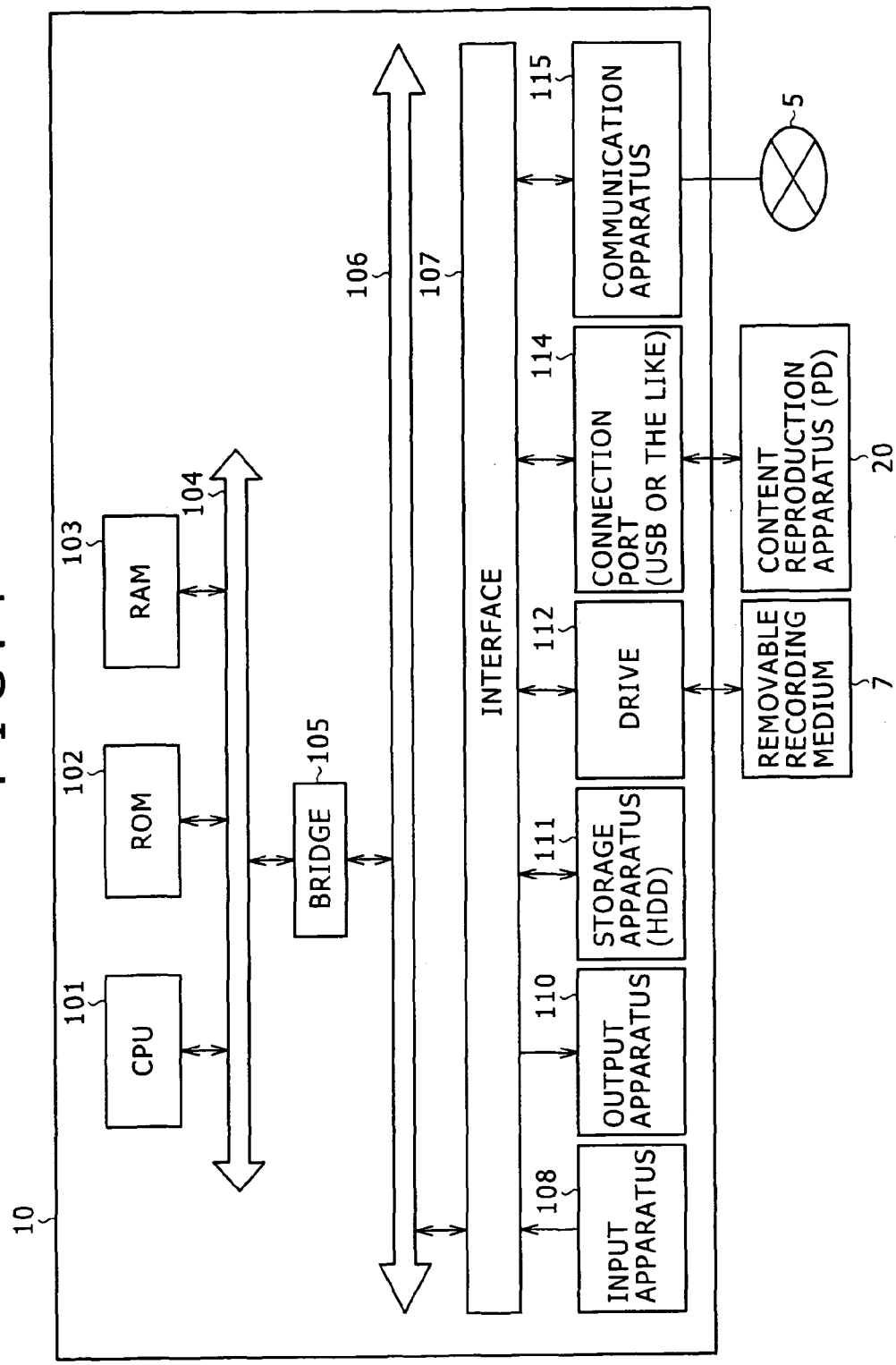
[FIG. 4]

First of all, the hardware configuration of the content-processing apparatus 10 according to the embodiment is explained by referring to FIG. 4. It is to be noted that FIG. 4 is a block diagram showing the hardware configuration of the content-processing apparatus 10 provided by the embodiment.

As shown in FIG. 4, the content-processing apparatus 10 includes a CPU (Central Processing Unit) 101, a ROM (Read Only Memory) 102, a RAM (Random Access Memory) 103, a host bus 104, a bridge 105, an external bus 106, an interface 107, an input apparatus 108, an output apparatus 110, an HDD serving as a storage apparatus 111, a drive 112, a connection port 114 and a communication apparatus 115.

The CPU 101 is a component functioning as a processing apparatus as well as a control apparatus. The CPU 101 operates in accordance with a variety of programs to control the other components employed in the content-processing apparatus 10. The ROM 102 is a memory used for storing the programs to be executed by the CPU 101 and data such as processing parameters. The RAM 103 is a memory used for temporarily storing a program being executed by the CPU 101 and data such as parameters changing in the course of execution of the program. The CPU 101, the ROM 102 and the RAM 103 are connected to each other by the host bus 104 including a CPU bus.

The host bus 104 is connected by the bridge 105 to the external bus 106 such as a PCI (Peripheral Component Interconnect/Interface) bus.

The input apparatus 108 includes operation means and an input control circuit for passing on an input signal to the CPU 101. The operation means includes a mouse, a keyboard, a touch panel, buttons, switches and a lever. The user of the content-processing apparatus 10 is capable of operating the input apparatus 108 to enter various kinds of data to the content-processing apparatus 10 and a command making a request for an operation.

The output apparatus 110 includes a display apparatus and an audio output apparatus. Examples of the display apparatus are a CRT (Cathode Ray Tube) display apparatus, an LCD (Liquid Crystal Display) apparatus and lamps. On the other hand, an example of the audio output unit is a speaker. The output apparatus 110 outputs a reproduced content. To put it concretely, the display apparatus shows various kinds of information such as reproduced video data in the form of texts and images. On the other hand, the audio output apparatus generates reproduced audio data.

Figure 5:
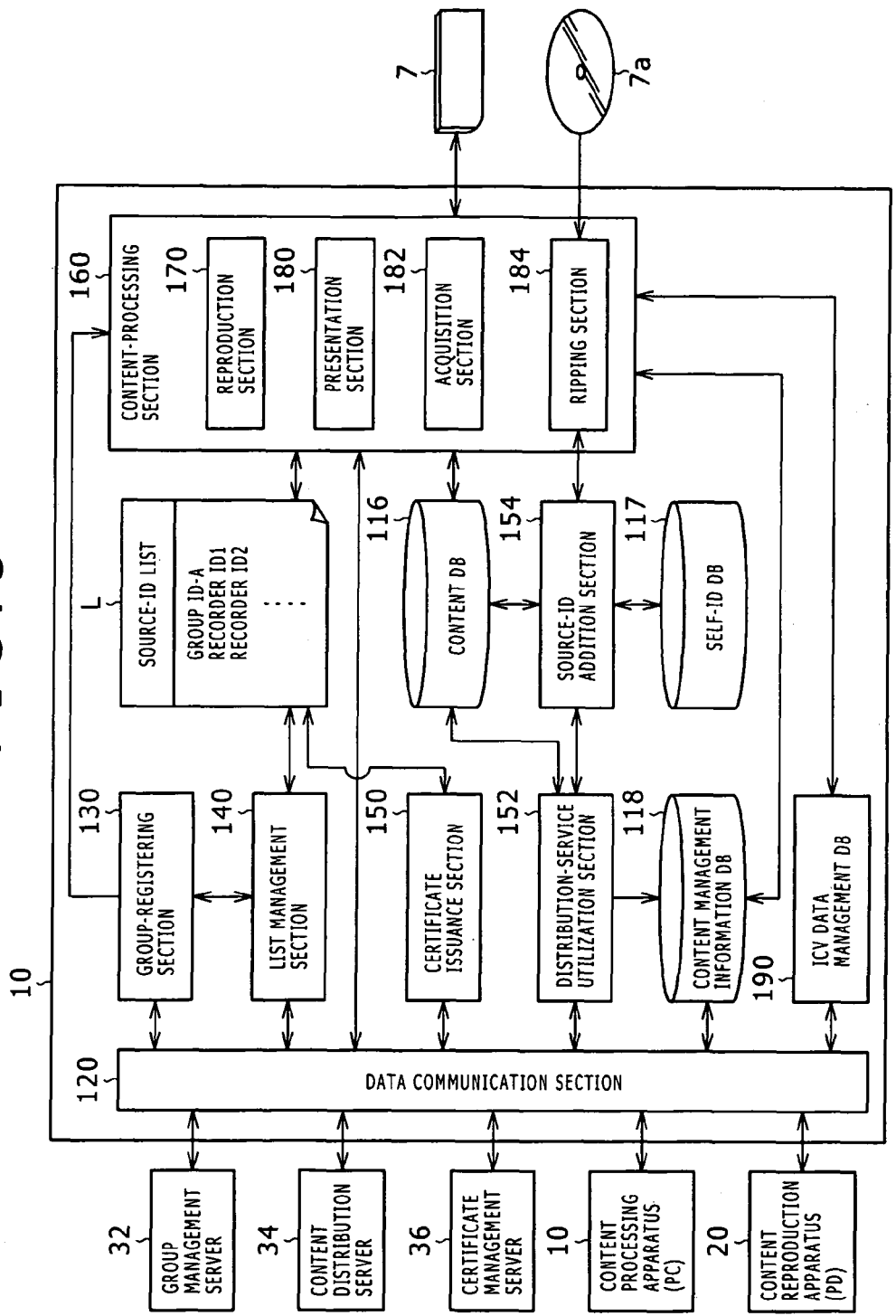
[FIG. 5]

The storage apparatus 111 is an apparatus included in the content-processing apparatus 10 according to the embodiment as a typical storage apparatus for storing data. The storage apparatus 111 is implemented as an HDD (Hard Disk Drive). The storage apparatus 111 drives a hard disk used for storing programs to be executed by the CPU 101 and various kinds of data. In addition, the storage apparatus 111 is also used for storing, among others, a source-ID list L, a content database 116, a self-ID database 117 and a content management information database 118 as shown in FIG. 5 to be described later.

The drive 112 is a reader and writer for reading out data from a recording medium and writing data onto the recording medium 7. The drive 112 is incorporated in the content processing apparatus 10 or is externally provided. The removable storage medium 7 includes a magnetic disk, an optical disk, a magneto-optical disk or a semiconductor memory. That is to say, the drive 112 reproduces various kinds of data from the storage medium 7 mounted on the content-processing apparatus 10 and records data onto the storage medium 7. The reproduced and recorded data includes contents, group certificates G and programs.

To put it concretely, the drive 112 reads out data from the removable storage medium 7 and transfers the data to the RAM 103 by way of the interface 107, the external bus 106, the bridge 105 and the host bus 104. If necessary, the CPU 101 stores the data into a memory such as the ROM 102 or the storage apparatus 111. On the other hand, the drive 112 receives data recorded in a memory such as the ROM 102 or the storage apparatus 111, newly reproduced data or data acquired from an external apparatus from the CPU 101, and stores the data into the removable storage medium 7.

The connection port 114 is a port for connecting the content-processing apparatus 10 to an external peripheral apparatus such as the content reproduction apparatus 20. The connection port 114 has a connection terminal such as a USB terminal or an IEEE1394 terminal. The connection port 114 is connected to the CPU 101 through components including the interface 107, the external bus 106, the bridge 105 and the host bus 104. By virtue of the connection port 114, the content-processing apparatus 10 is capable of exchanging various kinds of data with the content reproduction apparatus 20 by way of a local line 9.

The communication apparatus 115 is a communication interface implemented by components including a communication device for connecting the content-processing apparatus 10 to the network 5. By virtue of the communication apparatus 115, the content-processing apparatus 10 is capable of exchanging various kinds of data with external apparatus such as other content-processing apparatus 10 and the servers 30 by way of the network 5. The exchanged data includes a content, a source-ID list L, an apparatus group certificate G and a control signal.

Next, main functions of the content-processing apparatus 10 according to the embodiment are explained by referring to FIG. 5. It is to be noted that FIG. 5 is a block diagram showing an outline of functions of the content-processing apparatus 10 provided by the embodiment.

As shown in FIG. 5, the content-processing apparatus 10 includes a data communication section 120, a group-registering section 130, a list management section 140, a certificate issuance section 150, a distribution-service utilization section 152, a source-ID addition section 154, a content-processing section 160, an ICV-data management section 190, the content database 116, the self-ID database 117 and the content management information database 118.

The data communication section 120 is a unit for allowing the content-processing apparatus 10 to exchange various kinds of data with external apparatus. For example, the data communication section 120 allows the content-processing apparatus 10 to exchange data with other content-processing apparatus 10 or the servers 30 by way of the network 5 by using the communication apparatus 115. In addition, the data communication section 120 allows the content-processing apparatus 10 to exchange data with the content reproduction apparatus 20 by way of a local line 9 by using the connection port 114.

The group-registering section 130 is a unit for carrying out a user-registering process to register a user in the group management server 32 and carrying out a group-registering process (or an apparatus-registering process) to register the content-processing apparatus 10 in a group managed by the group management server 32. In the group-registering process, the group-registering section 130 transmits group-registering request information to the group management server 32. The group-registering request information includes a group-registering request notice, a user ID, a password, a terminal ID and a recorder ID. The terminal ID is an ID used for uniquely identifying the content-processing apparatus 10, which is implemented by a PC. The terminal ID and the recorder ID are each generated in each content-processing apparatus 10 uniquely on the basis of a random number generated originally, the device ID of the content-processing apparatus 10 or other data.

Following the group-registering process to register the content-processing apparatus 10 in an apparatus group, the group-registering section 130 receives service data from the group management server 32. The service data includes a leaf ID and a service common key. The group-registering section 130 further passes Leaf ID received from the group management server 32 to list management section 140 and the received service common key to the content-processing section 160. The service common key also referred to as a secret key is a key necessary for decrypting a content, which has been encrypted to allow the content to be stored with a high degree of safety and, hence, prevent the content from being interpolated.

In addition, the group-registering section 130 also carries out a group de-registering process to de-register the content-processing apparatus 10 from an apparatus group managed by the group management server 32. Also in this group-de-registering process, much like the group-registering process, the group-registering section 130 transmits group-de-registering request information to the group management server 32. The group-de-registering request information includes an apparatus group-de-registering request notice, a user ID, a password and a terminal ID. Upon completion of the group-de-registering process, the group-registering section 130 notifies list management section 140 that the group-de-registering process has been completed.

In addition, the group-registering section 130 is also capable of registering the content reproduction apparatus 20 connected to the content-processing apparatus 10 in an apparatus group managed by the group management server 32. The processes carried out by the group-registering section 130 to register the content-processing apparatus 10 and the content reproduction apparatus 20 in an apparatus group managed by the group management server 32 and de-register the content-processing apparatus 10 and the content reproduction apparatus 20 from the apparatus group will be described later in detail.

List management section 140 is a configuration element corresponding to list management section 3 shown in FIG. 2. List management section 140 has a function to update the source-ID list L owned by the content-processing apparatus 10.

For example, at a group-registering time to register a group ID on the source-ID list L, list management section 140 adds a service ID to a leaf ID received from the group-registering section 130 and converts source-ID list Leaf ID including the service ID added thereto into a group ID. Then, list management section 140 registers the group ID on the source-ID list L. List management section 140 compares a group ID included in an apparatus group certificate G acquired from the group management server 32 or another content-processing apparatus 10 with group IDs on the source-ID list L. If the source ID included in the group certificate G matches any of the group IDs on the source-ID list L, a recorder ID included in the group certificate G is added to the source-ID list L. It is to be noted that, if validity term information is set in a source ID such as a group ID or a recorder ID, list management section 140 also writes the validity term information of the source ID on the source-ID list L when registering the source ID on the source-ID list L.

In addition, list management section 140 deletes all source IDs from the source-ID list L at a time referred to as an apparatus group-de-registering time. Furthermore, list management section 140 is capable of updating the source-ID list L owned by the content reproduction apparatus 20 connected to the content-processing apparatus 10. It is to be noted that the process carried out by list management section 140 to update the source-ID list L as described above will be explained in detail later.

It is also worth noting that the source-ID list L is stored with a high degree of safety in either of the storage apparatus 111 and the ROM 102, which are employed in the content-processing apparatus 10. To put it concretely, the source-ID list L is stored in a state of being encrypted or including a digital signature to prevent a user from interpolating the source-ID list L.

In the embodiment, at a group-registering time, a group ID generated on the basis of a leaf ID is registered on the source-ID list L, which is then stored in the content-processing apparatus 10. By registering the group ID on the source-ID list L in this way, the group ID can be utilized as a source ID for allowing reproduction of a distributed content including the group ID added thereto so that the reproduction of the distributed content can be controlled on the basis of the group ID. It is to be noted that, for example, instead of using a group ID as such a source ID as described above, the group ID can be used only as a second group ID, which is merely generated for a ripping-content-sharing service as a reference additional to a recorder ID for a source ID to be recorded on the source-ID list L. That is to say, the second group ID itself is not always recorded on the source-ID list L. In this case, the group ID may be stored in another storage area of the storage apparatus 111. For example, the group ID can be stored in the self-ID database 117 or the ROM 102.

The certificate issuance section 150 has a function to issue an apparatus group certificate G for certifying an apparatus group including the content-processing apparatus 10 employing the certificate issuance section 150. To put it concretely, with the content-processing apparatus 10 registered in an apparatus group identified by a group ID-A, for example, the certificate issuance section 150 issues a group certificate G, which associates the recorder ID1 of the content-processing apparatus 10 with the group ID-A. Such a group certificate G can be used for proving that that the content-processing apparatus 10 having the recorder ID1 pertains to the apparatus group identified by the group ID-A as an apparatus group owned by the user of the content-processing apparatus 10. In addition, the group certificate G includes an interpolation detection digital signature such as a MAC (Message Authentication Code). Thus, the group certificate G itself can be prevented from being interpolated.

A process to issue a group certificate G is carried out as follows. The certificate issuance section 150 reads out the recorder ID of the content-processing apparatus 10 and the group ID from the storage apparatus 111, puts a digital signature on the recorder ID and the group ID, and carries out an encoding process on the recorder ID and the group ID with the digital signature put thereon.

The certificate issuance section 150 may issue a group ID with any arbitrary timing after a group-registering process. For example, the certificate issuance section 150 may issue a group certificate G for the content-processing apparatus 10 in response to an input entered by the user of the content-processing apparatus 10 or at a request received from another content-processing apparatus 10 as a request for a group certificate G. In addition, after a group-registering process, the certificate issuance section 150 may issue a group certificate G and transmit the issued group certificate G to the certificate management server 36.

Furthermore, the certificate issuance section 150 may add validity term information to an issued group certificate G. Thus, the content-processing apparatus 10 acquiring the group certificate G is capable of adding a recorder ID included in the group certificate G to the source-ID list L only before the validity term information included in the group certificate G is expired.

Moreover, the certificate issuance section 150 is capable of arbitrarily setting a route through which a group certificate G issued as described above is to be transmitted to another content-processing apparatus 10. For example, the certificate issuance section 150 may set a route passing through the certificate management server 36 as a route through which a group certificate G is to be transmitted to another content-processing apparatus 10. By using such a route, the certificate management server 36 is capable of executing uniform management on group certificates G distributed to content-processing apparatus 10 before passing on the group certificates G to the content-processing apparatus 10 pertaining to the same apparatus group.

A method for distributing group certificates G can also be set arbitrarily. For example, a group certificate G can be directly transmitted to a content-processing apparatus 10 by way of the network 5 or local lines 9, or transmitted by attaching the group certificate G to an electronic mail. As an alternative, a group certificate G may be posted on a home page. As another alternative, a group certificate G can be transferred to a content-processing apparatus 10 by storing the group certificate G on a storage medium 7 and then delivering the storage medium 7 to the other content-processing apparatus 10. As a further alternative, the group certificate G can be recorded on the storage medium 7 along with a content and the storage medium 7 is then delivered to another content-processing apparatus 10. In this way, a ripping content, a recorder ID added to the ripping content and the group ID of the content-processing apparatus 10 ripping off the content from a recording medium can be delivered to the other content-processing apparatus 10. Thus, a content-processing apparatus 10 pertaining to the same apparatus group as a content-processing apparatus 10 is capable of immediately reproducing the ripping content.

A group certificate G given to another content-processing apparatus 10 is used in the other content-processing apparatus 10 in a content-sharing process, that is, a process to add a recorder ID to the source-ID list L. That is to say, the other content-processing apparatus 10 receiving a group certificate G from a specific content-processing apparatus 10 pertaining to the same apparatus group as the other content-processing apparatus 10 is capable of obtaining the recorder ID of the specific content-processing apparatus 10 having the same group ID and adding the recorder ID to the source-ID list L.

Thus, by issuing a group certificate G associating the group ID with the recorder ID and giving the group certificate G to another content-processing apparatus 10 pertaining to the same apparatus group as the specific content-processing apparatus 10, the recorder ID can be shared with the other content-processing apparatus 10 without directly connecting the specific content-processing apparatus 10 to the other content-processing apparatus 10.

It is to be noted that a certificate management section not shown in the figure can be provided as a section for storing group certificates G in the certificate database also not shown in the figure and managing the group certificates G stored in the certificate database. The group certificate G is a group certificate G issued by the certificate issuance section 150, a group certificate G received from another content-processing apparatus 10 or a group certificate G received from the certificate management server 36. Thus, the certificate management section is capable of reading out a group certificate G obtained in the past from the certificate database and giving the group certificate G read out from the certificate database to another content-processing apparatus 10.

The distribution-service utilization section 152 is a unit for carrying out processing related to a content distribution service in conjunction with the content distribution server 34.

To put it concretely, the distribution-service utilization section 152 is a unit for exchanging various kinds of information with the content distribution server 34 and for supporting operations to input and output the information. The information includes user authentication information, charging information and content distribution request information. Examples of the user authentication information are a user ID and a password.

In addition, the distribution-service utilization section 152 also receives a distributed content and its license, which are transmitted by the content distribution server 34 by way of the network 5 and the communication apparatus 115. To put it concretely, when the user of the content-processing apparatus 10 purchases a content by using a content distribution service, the distribution-service utilization section 152 downloads a file containing the distributed content and a file containing a license defining usage rule information from the content distribution server 34 as separate files. In the case of a content according to copyright management adopting the group management method, license of the distributed content includes a leaf ID assigned to the user in a group-registering process. In the case of a content according to copyright management adopting the check-in/check-out method, on the other hand, license of the distributed content includes information describing content usage rule information such as a limit of the number of check-in/check-out operations, a limit of the number of reproductions and a reproducibility term.

The distribution-service utilization section 152 reprocesses the data of the distributed content and the data of license issued for the content to create a single content file including both the content and license.

At that time, in the case of the distributed content adopting the group management method, the source-ID addition section 154 adds a group ID to the content data of the distributed content. The source-ID addition section 154 is a configuration element corresponding to the source-ID addition section 1 described before. Thus, the source-ID addition section 154 attaches a group ID to the distributed content. To put it concretely, the source-ID addition section 154 carries out a process to convert a leaf ID included in license issued for the distributed content into a group ID. In the process to convert a leaf ID into a group ID, a service ID of the content distribution service is added to leaf ID. Thus, by attaching a group ID representing the user and the service to the distributed content, the distributed content can be associated with the user and the service.

As described above, the distribution-service utilization section 152 and the source-ID addition section 154 create a content file as a result of combining the file containing a distributed content with a file containing a license for the distributed content.

To put it concretely, as shown in FIG. 6(*a*), a content file F1 conforming to the group management method includes a content ID, content data encrypted by using a content key, the content key encrypted by using a system common key and a license including a source ID such as a group ID. The system common key is a key that can be used only by the content-sharing system 100.

As shown in FIG. 6(*b*), on the other hand, a content file F2 conforming to the check-in/check-out method includes a content ID, content data encrypted by using a content key, the content key encrypted by using a system common key and a license describing usage rule information. Licenses included in the content files F1 and F2 are each a license encrypted so that interpolation of license will be detected. Thus, a source ID or a usage rule can be associated with a license with a high degree of safety. In addition, the content-processing apparatus 10 also holds common secret information so that the content-processing apparatus 10 is capable of decrypting an encoded content key and checking whether or not a license has been interpolated. Thus, even if a content is shared in the content-sharing system 100, it is possible to prevent a source ID and usage rule added to the content from being interpolated.

The distribution-service utilization section 152 stores a content file created as described above in the content database 116 of the storage apparatus 111. In this way, in this embodiment, a content and its license are managed as a single file stored in the content database 116. It is to be noted, however, that the management of contents and their licenses is not limited to such management of single files. For example, a content and its license can also be managed as separate files. In this case, the file of the content may be stored in the content database 116 while the file of its license may be stored in a license database, and the content can be associated with license by using a content ID, which is included in both the content and license.

In addition, when a content is distributed from the content distribution server 34 to a content-processing apparatus 10, the distribution-service utilization section 152 receives also attribute information of the distributed content. The attribute information includes the title information of the distributed content, the content ID of the distributed content, a distribution time and date of the distributed content, the data size of the distributed content, the data format of the distributed content and the type of the copyright management method. The title information of a distributed content includes the title information of the song, the name of the artist (or the singer), the name of the album, the genre of the content and a reproduction duration of the song. The distribution-service utilization section 152 stores the attributes of the distributed content, the recording location of the distributed content and other data in the content management information database 118 as content management information. An example of the recording location of the distributed content is an address in the content database 116.

The distribution-service utilization section 152 described above is implemented by software installed in the content-processing apparatus 10 as software for a content distribution service corresponding to the content distribution service utilized by the user. It is to be noted that the distribution-service utilization section 152 can be provided for each of a plurality of content distribution services utilized by the user.

The source-ID addition section 154 is a unit for adding the group ID of the content-processing apparatus 10 to a ripping content, which is defined as a content ripped off from a musical CD7*a* by a ripping section 184 to be explained later. To put it concretely, the source-ID addition section 154 reads out the recorder ID of the content-processing apparatus 10 from the self-ID database 117, creates a license including this recorder ID and associates license with the data of the ripping content. That is to say, the source-ID addition section 154 creates the file F1 including a content ID, encrypted data of a ripping content, an encrypted content key and a license including a recorder ID as shown in FIG. 6(*a*). The source-ID addition section 154 then stores the ripping content including the recorder ID in the content database 116.

It is to be noted that, typically, the completion time of a process to rip off a content is taken as an ideal timing to add the recorder ID. By immediately adding a recorder ID to a ripping content in this way, the recorder ID can be added to the rippling content with a high degree of reliability before the ripping content requiring copy management propagates inside the content-sharing system 100. It is to be noted that the timing to add a recorder ID to a ripping content is not limited to the timing explained in this example. For example, when the ripping content is reproduced for the first time or when the ripping content is copied to another content-processing apparatus 10, a recorder ID may be added to the ripping content.

The self-ID database 117 is a database used for storing IDs assigned to the content-processing apparatus 10 employing the self-ID database 117. The IDs assigned to the content-processing apparatus 10 include the device ID, recorder ID and terminal ID of the content-processing apparatus 10.

The device ID is an identifier assigned to every apparatus such as a content-processing apparatus 10 or a content reproduction apparatus 20 as an identifier unique to the apparatus. The device ID is assigned to the content-processing apparatus 10 for example at a shipping time at the factory and stored in the self-ID database 117 of the content-processing apparatus 10 with a high degree of safety.

On the other hand, the terminal ID is an ID assigned to every content-processing apparatus 10 (PC) as an ID unique to the PC. As described above, the recorder ID is an ID assigned to every content-processing apparatus 10 having a ripping function as an ID unique to the content-processing apparatus 10. The terminal ID and the recorder ID are each generated by the content-processing apparatus 10 on the basis of the device ID or a random number as an ID unique to the content-processing apparatus 10, encrypted to avoid illegal interpolation and stored in the self-ID database 117 with a high degree of safety.

The content-processing section 160 is a unit for carrying out a variety of processes on a content. The content-processing section 160 is implemented by installation of an application program in the content-processing apparatus 10 as an application program for utilizing contents, and/or installation of a DRM module in the content-processing apparatus 10 as a DRM module for executing copyright management on applications of the contents. In this case, by utilizing contents, reproduction or transfer of the contents is implied. The content-processing section 160 has a content reproduction section 170, a content-providing section 180, a content acquisition section 182 and the ripping section 184 cited above.

The content reproduction section 170 is a configuration element corresponding to the content reproduction section 2 shown in FIG. 2. The content-processing section 170 is implemented by content reproduction software installed in a reproduction apparatus having a content reproduction function or the content-processing apparatus 10 having a content reproduction function so that the content reproduction section 170 is capable of reproducing a variety of contents. Data of a content reproduced by the content reproduction section 170 is output from the output apparatus 110.

In addition, the content reproduction section 170 is compatible with both a content conforming to the group management method and a content conforming to the check-in/check-out method and capable of executing both reproduction control based on the group management method and reproduction control based on the check-in/check-out method. To put it concretely, in the case of the reproduction control based on the group management method, the content reproduction section 170 controls reproduction of a processed content on the basis of a result of determination as to whether or not a source ID added to the content is included on the source-ID list L. In the case of the reproduction control based on the check-in/check-out method, on the other hand, the content reproduction section 170 controls reproduction of a processed content on the basis of a result of determination as to whether or not usage rule information described in a license issued for the content is satisfied. The detail of the content reproduction 170 will be described later.

It is to be noted that two or more content reproduction sections 170 can be provided in one content-processing apparatus 10. For example, two or more pieces of content reproduction software are installed in one content-processing apparatus 10 to implement two or more content reproduction sections 170. As an alternative configuration, two or more reproduction apparatuses are provided, or a piece of content reproduction software is used in conjunction with reproduction apparatuses in one content-processing apparatus 10 to implement two or more content reproduction sections 170 according to content distribution services and/or copyright management methods.

The content-providing section 180 is a unit for providing a content to another content-processing apparatus 10 or a content reproduction apparatus 20. On the other hand, the content acquisition section 182 is a unit for acquiring a content from another content-processing apparatus 10 or a content reproduction apparatus 20. The content-providing section 180 and the content acquisition section 182 carry out a process to provide or acquire a content by way of the network 5 or a local line 9 or by using a recording medium 7 as content transfer media.

It is to be noted that, when a content is reproduced, provided or acquired, the content-processing section 160 may control the above process to provide or acquire a content on the basis of content management information stored in the content management information database 118 and display the content management information on the output apparatus 110.

The ripping section 184 is a unit for ripping off a musical or video content recorded in the recording medium 7a such as a CD or a DVD. To put it concretely, the ripping section 184 controls the drive 112 in accordance with a user input to retrieve musical or video data from the recording medium 7a and creates a content by conversion of the musical or video data into data having a format that can be processed by the content-processing apparatus 10. An example of the format that can be processed by the content-processing apparatus 10 is the ATRAC3 format. Then, the source-ID addition section 154 adds the recorder ID of the content-processing apparatus 10 to the content ripped off from the recording medium 7a in this way.

It is to be noted that, in addition to the ripping section 184, the content-processing apparatus 10 may be provided with a self-recording section not shown in the figure as a section for creating a new content by carrying out a self-audio/video recording process. The self-recording section may collect sounds from surroundings of the content-processing apparatus 10, take a picture of a photographing object, generate audio and video data and carry out a predetermined process on the data in order to create a new content. As an alternative, the self-recording section converts the format of audio/video data of a radio/television program received through the communication apparatus 115 into a recordable format in order to create a new content. By adding a recorder ID to a content created by the self-recording section, the content can be subjected to the copyright management adopting the group management method.

The ICV-data management section 190 is a unit for managing ICV (Integrity Check Value) data of the content-processing apparatus 10 and ICV data of a content reproduction apparatus 20 connected to the content-processing apparatus 10. The ICV data is data used for checking validity of a content process at a content-process execution time.

In the case of the copyright management adopting the group management method, the ICV data includes a hash value with a key as a MAC value of the source-ID list L. Thus, on the basis of the ICV data, the ICV-data management section 190 produces a result of determination as to whether or not the source-ID list L is valid, that is, whether or not the source-ID list L has been interpolated illegally. In the case of the copyright management adopting the check-in/check-out method, on the other hand, the ICV data includes a hash value with a key as a MAC value of license issued for the content. Thus, on the basis of the ICV data, the ICV-data management section 190 produces a result of determination as to whether or not license is valid, that is, whether or not license has been interpolated illegally.

If the result of determination indicates that the source-ID list L or license is valid, the ICV-data management section 190 allows the content-processing section 160 to carry out the content process. If the result of determination indicates that the source-ID list L or license is not valid, on the other hand, the ICV-data management section 190 does not allow the content-processing section 160 to carry out the content process.

In addition, the ICV data includes a flag used as a typical method indicator showing whether the copyright management method is the group management method or the check-in/check-out method. For example, the flag set at "0" indicates that the copyright management method is the group management method. On the other hand, the flag set at "1" indicates that the copyright management method is the check-in/check-out method. Thus, the content-processing section 160 processes the content in accordance with a copyright management method indicated by the flag.

The ICV-data management section 190 is capable of managing not only the ICV data regarding the content-processing apparatus 10, but also the ICV data regarding a content reproduction apparatus 20 connected to the content-processing apparatus 10 as well. Thus, the ICV-data management section 190 is capable of setting the copyright management method of the content reproduction apparatus 20 by having the content-processing apparatus 10 set the flag included in the ICV data of the content reproduction apparatus 20 as a typical method indicator. At that time, the process to set the copyright management method of the content reproduction apparatus 20 may be carried out on the basis of region information showing a region in which the content-sharing system 100 is used. If the content reproduction apparatus 20 is used in the US, for example, the group management method is adopted as the copyright management method. If the content reproduction apparatus 20 is used in Japan, on the other hand, the check-in/check-out method is adopted as the copyright management method.

In addition, the content-processing apparatus 10 may be provided with a transfer control section not shown in the figure as a section for controlling transfers of contents between the content-processing apparatus 10 (PC) and the content reproduction apparatus 20 (PD). To be more specific, at a request based on a user input, the transfer control section controls a transfer of a content stored in the content-processing apparatus 10 to the content reproduction apparatus 20 or a transfer of a content stored in the content reproduction apparatus 20 to the content-processing apparatus 10.

The transfer control section is capable of executing not only control of transfers of contents subjected to copyright management, that is, contents each including a source ID added thereto, but also control of contents exempted from copyright management, that is, contents each including no source ID added thereto. In the case of the control of contents exempted from copyright management, for example, when a request for a transfer of a content from the content-processing apparatus 10 to the content reproduction apparatus 20 or a request for a transfer of a content from the content reproduction apparatus 20 to the content-processing apparatus 10 is entered, the transfer control section compares group IDs on the source-ID list L of the content-processing apparatus 10 with group IDs on the source-ID list L of the content reproduction apparatus 20. If the result of the comparison indicates that the group IDs on the source-ID list L of the content-processing apparatus 10 match the group IDs on the source-ID list L of the content reproduction apparatus 20, the transfer control section allows the requested transfer. If the result of the comparison indicates that the group IDs on the source-ID list L of the content-processing apparatus 10 do not match the group IDs on the source-ID list L of the content reproduction apparatus 20, on the other hand, the transfer control section does not allow the requested transfer. Thus, the transfer control section is capable of restricting not only control of transfers of contents subjected to copyright management, but also control of contents exempted from copyright management, that is, contents for which there is no limit of the number of executable operations to copy the contents from one apparatus to another apparatus.

The configuration elements employed in the content-processing apparatus 10 have been described above. The data communication section 120, the group-registering section 130, list management section 140, the certificate issuance section 150, the distribution-service utilization section 152, the source-ID addition section 154, the content-processing section 160, the ICV-data management section 190 and the transfer control section may each be implemented as hardware having the functions of the section, or by installing a program in the content-processing apparatus 10 as a program to be executed by a computer for carrying out the functions of the section.

Next, by referring to FIG. 7, the content reproduction section 170 provided by the embodiment is explained in detail. It is to be noted that FIG. 7 is a block diagram showing an outline of functions of the content reproduction section 170 provided by the embodiment.

As shown in FIG. 7, the content reproduction section 170 includes a reproducibility determination section 172, a reproduction execution section 174 and a list-updating request section 176.

The reproducibility determination section 172 is a unit for controlling reproduction of a requested content. The reproducibility determination section 172 is capable of executing both reproduction control based on the group management method and reproduction control based on the check-in/check-out method.

In execution of the reproduction control based on the group management method, the reproducibility determination section 172 produces a result of determination as to whether or not a requested content can be reproduced on the basis of a source ID added to the content and the source-ID list L. In this case, the source ID can be a recorder ID or a group ID.

To put it concretely, first of all, when the reproducibility determination section 172 receives a request for reproduction of a content from the input apparatus 108, the reproducibility determination section 172 reads out the requested content from the content database 116 and produces a result of determination as to whether or not the content includes a source ID added thereto, that is, a result of determination as to whether or not a license in the content file of the content includes the source ID. If the result of the determination indicates that the content does not include a source ID, the reproducibility determination section 172 recognizes the content as a content exempted from the copyright management and, hence, allows the content to be reproduced. In this case, the reproducibility determination section 172 outputs a content-reproduction request signal to the reproduction execution section 174. If the result of the determination indicates that the content includes a source ID, that is, the content includes a recorder ID or a group ID, on the other hand, the reproducibility determination section 172 recognizes the content as a content subjected to the copyright management. In this case, the reproducibility determination section 172 carries out a process described as follows.

First of all, the reproducibility determination section 172 reads out or extracts a source ID from the license included in the content file with the source-ID list L, the contents of which are to be compared with the source ID. Then, the reproducibility determination section 172 compares the source ID read out from the content file with source IDs on the source-ID list L in order to determine as to whether or not the source ID read out from the content file matches any one of source IDs on the source-ID list L. If the result of the comparison indicates that the source ID read out from the content file matches any one of the source IDs on the source-ID list L, the reproducibility determination section 172 checks the validity term of the source ID. If the validity term of the source ID has not been expired yet, the reproducibility determination section 172 allows the content to be reproduced. In this case, the reproducibility determination section 172 outputs a content-reproduction request signal to the reproduction execution section 174. If the result of the comparison indicates that the source ID read out from the content file does not match any one of the source IDs on the source-ID list L or the validity term of the source ID has been already expired, on the other hand, the reproducibility determination section 172 does not allow the content to be reproduced. In this case, the reproducibility determination section 172 does not output a content-reproduction request signal to the reproduction execution section 174. Thus, the reproduction execution section 174 is not capable of reproducing the content. It is to be noted that, in this case, an error notice may be displayed to indicate that the reproduction condition is not satisfied.

As described above, the reproducibility determination section 172 provided by the embodiment imposes a limitation on reproduction of a content by completely prohibiting the reproduction of the content contained in a file including a source ID not registered on the source-ID list L. However, the limitation on reproduction of a content is not limited to the complete prohibition of the reproduction of the content contained in a file including a source ID not registered on the source-ID list L. For example, the limitation imposed by the reproducibility determination section 172 on reproduction of a content can be permission of partial reproduction of the content contained in a file including a source ID not registered on the source-ID list L, permission of reproduction of such a content at a degraded picture or sound quality or other quality or permission of reproduction of such a content only a predetermined number of times such as once and prohibition of reproduction of the content thereafter. By partial reproduction of a content, reproduction of a part of the content or reproduction of the content only during a predetermined period of time is implied.

In addition, if the source ID included in the content is not a source ID registered on the source-ID list L, typically, the reproducibility determination section 172 supplies the source ID to the list-updating request section 176.

In execution of the reproduction control based on the check-in/check-out method, on the other hand, the reproducibility determination section 172 produces a result of determination as to whether or not reproduction of a requested content is to be permitted on the basis of usage rule information described in a license issued for the content. As described before, the usage rule information includes a limit of the number of allowed reproductions and a reproduction validity term. If the result of the determination indicates that the usage rule information is satisfied, the reproducibility determination section 172 allows the content to be reproduced. In this case, the reproducibility determination section 172 outputs a content-reproduction request signal to the reproduction execution section 174. If the result of the determination indicates that the usage rule information is not satisfied, on the other hand, the reproducibility determination section 172 does not allow the content to be reproduced. In this case, the reproducibility determination section 172 does not output a content-reproduction request signal to the reproduction execution section 174.

In accordance with a content-reproduction request signal received from the reproducibility determination section 172, the reproduction execution section 174 reproduces the content specified by the signal. To put it concretely, first of all, the reproduction execution section 174 decrypts an encrypted content key by using a service common key. Then, the reproduction execution section 174 decrypts the encrypted content by using the decrypted content key. Finally, the reproduction execution section 174 decodes the decrypted content, reproduces the decoded content and outputs the reproduced content from the output section 110.

The list-updating request section 176 is a unit for requesting the list management section 140 to register a recorder ID on the source-ID list L. A process to make a request for registering a recorder ID on the source-ID list L is carried out by the list-updating request section 176 by outputting an ID-registering request signal specifying the recorder ID to be registered to the list management section 140.

To put it concretely, when the list-updating request section 176 receives a source ID not registered on the source-ID list L from the reproducibility determination section 172, for example, the list-updating request section 176 produces a result of determination as to whether or not the source ID is a recorder ID or a group ID. If the result of the determination indicates that the source ID is a recorder ID, the list-updating request section 176 requests the list management section 140 to register the recorder ID on the source-ID list L. The list-updating request section 176 may automatically carry out the process to make a request for registering a recorder ID on the source-ID list L or at a request made by the user in response to an inquiry issued by the list-updating request section 176 to the user as an inquiry about whether or not the user desires the registration of the recorder ID. If the result of the determination indicates that the source ID is a group ID, on the other hand, the list-updating request section 176 does not request the list management section 140 to register the group ID on the source-ID list L. This is because a content-processing apparatus 10 can only be registered in one apparatus group owned by a user.

Next, the list management section 140 provided by the embodiment is explained in detail by referring to FIG. 8. It is to be noted that FIG. 8 is a block diagram showing an outline of the configuration of the list management section 140 provided by the embodiment.

As shown in FIG. 8, the list management section 140 has a certificate request section 141, a certificate acquisition section 142, a recorder-ID-updating section 144, a list synchronization section 146, a self-ID addition section 148 and a group-ID-updating section 149.

The certificate request section 141 is a unit for transmitting a certificate request signal automatically or at a request made by the user to another content-processing apparatus 10 or to the certificate management server 36 as a signal to make a request for a group certificate G issued for the other content-processing apparatus 10 pertaining to the same apparatus group. For example, the certificate request section 141 transmits the certificate request signal to the other content-processing apparatus 10 or the certificate management server 36 by specifying the recorder ID received from the content reproduction section 170 as described above as a signal making a request for a group certificate G including the specified recorder ID. In addition, with any timing, the certificate request section 141 may transfer a group ID assigned to the content-processing apparatus 10 employing the certificate request section 141 to another content-processing apparatus 10 or the certificate management server 36 to make a request for one or more group certificates G each including a recorder ID associated with the group ID as recorder IDs of other content-processing apparatus 10 pertaining to the same apparatus group as the content-processing apparatus 10 employing the certificate request section 141.

The certificate acquisition section 142 is a unit for acquiring a group certificate G from another content-processing apparatus 10 or the certificate management server 36. To put it concretely, the certificate acquisition section 142 is capable of receiving and acquiring a group certificate G transmitted by another content-processing apparatus 10 or the certificate management server 36 by way of the network 5 and the communication apparatus 115. In addition, the certificate acquisition section 142 is capable of acquiring a group certificate G from another content-processing apparatus 10 by requesting the drive 112 to read out the group certificate G from the storage medium 7 provided from the other content-processing apparatus 10. The certificate acquisition section 142 supplies the group certificate G acquired as described above to the recorder-ID-updating section 144.

The recorder-ID-updating section 144 is a unit for registering a recorder ID on the source-ID list L on the basis of a group certificate G received from the certificate acquisition section 142. To put it concretely, first of all, the recorder-ID-updating section 144 reads out a group ID included in the group certificate G and compares the group ID with those on the source-ID list L in order to produce a result of determination as to whether or not the group ID matches any of those on the source-ID list L. If the result of the determination indicates that the group ID matches any of those on the source-ID list L, the recorder-ID-updating section 144 reads out a recorder ID included in the group certificate G as a recorder ID of another content-processing apparatus 10 and registers the recorder ID included in the group certificate G on the source-ID list L. If the result of the determination indicates that the group ID does not match any one of those on the source-ID list L, on the other hand, the recorder-ID-updating section 144 does not register the recorder ID included in the group certificate G on the source-ID list L.

In this way, the recorder-ID-updating section 144 is capable of registering the recorder ID of a content-processing apparatus 10 pertaining to the same apparatus group as the content-processing apparatus 10 on the source-ID list L. It is to be noted that the recorder-ID-updating section 144 may impose limitation on the operation to register a recorder ID on the source-ID list L by setting an upper limit of the number of recorder IDs that can be registered on the source-ID list L.

The list synchronization section 146 is a unit provided with a function for synchronizing a plurality of source-ID lists L. The function for synchronizing a plurality of source-ID lists L is a function to merge a plurality of source-ID lists L different from each other into a synchronized source-ID list L containing all recorder IDs included in the original source-ID lists L without duplications.

A process of synchronizing a plurality of source-ID lists L can only be carried out by any of specific content-processing apparatus 10 each having a group ID identifying an apparatus group common to the content-processing apparatus 10. To put it concretely, the list synchronization section 146 acquires a source-ID list L owned by another content-processing apparatus 10 or the content reproduction apparatus 20 and compares group IDs on the acquired source-ID list L with group IDs on the source-ID list L owned by the content-processing apparatus 10 employing the list synchronization section 146. Only if the group IDs on the acquired the source-ID list L match the group IDs on the source-ID list L owned by the content-processing apparatus 10 employing the list synchronization section 146, does the list synchronization section 146 synchronize the source-ID lists L.

The process of synchronizing a plurality of source-ID lists L results in a synchronized source-ID list L containing recorder IDs included in the original source-ID lists L owned by a plurality of apparatus registered in the same apparatus group. Thus, the specific content-processing apparatus 10 are capable of sharing a ripping content and reproducing the content.

It is to be noted that the process of synchronizing a plurality of source-ID lists L can be carried out by the list synchronization section 146 employed in any of the specific content-processing apparatus 10 connected to each other by a private network periodically or with any arbitrary timing. As an alternative, the process of synchronizing a plurality of source-ID lists L may be carried out by the list synchronization section 146 employed in any of the specific content-processing apparatus 10 connected to each other by a private network in accordance with a command entered by the user. In addition, the process of synchronizing a plurality of source-ID lists L may be carried out by the list synchronization section 146 employed in not only any of the specific content-processing apparatus 10 connected to each other by a private network and any of the content-processing apparatus 10 connected to each other by local lines 9, but also any of the specific content-processing apparatus 10 placed at remote locations and connected to each other by the network 5.

The self-ID addition section 148 is a unit for registering the recorder ID of the content-processing apparatus 10 on the source-ID list L, for example, unconditionally. To put it concretely, the self-ID addition section 148 reads out the recorder ID of the content-processing apparatus 10 from the self-ID database 117 and records the recorder ID on the source-ID list L. Thus, without regard to whether or not a group-registering process has been done, the content-processing apparatus 10 is capable of reproducing a ripping content ripped off by itself from a recording medium. It is to be noted that a group ID can be generated by a self-ID addition section on the basis of a random number or the like and stored in the self-ID database 117.

The group-ID-updating section 149 is a unit for registering a group ID, which is received from the group-registering section 130 for example when the content-processing apparatus 10 is subjected to a group-registering process, on the source-ID list L. Thus, the content-processing apparatus 10 is capable of reproducing a distributed content contained in a file including the registered group ID.

When a group-de-registering notice is received from the group-registering section 130, the group-ID-updating section 149 deletes all source IDs, which can be recorder IDs or group IDs, from the source-ID list L. However, only the recorder ID of the content-processing apparatus 10 is left on the source-ID list L. With only the recorder ID of the content-processing apparatus 10 left on the source-ID list L, the content-processing apparatus 10 is capable of reproducing only a ripping content created by itself and a content exempted from the copyright management.

It is to be noted that the recorder-ID-updating section 144 and the group-ID-updating section 149 are also capable of updating a source-ID list L received from a content reproduction apparatus 20 and returning the updated source-ID list L to the content reproduction apparatus 20.

The list management section 140 provided by the embodiment has been explained so far. As described above, the list management section 140 registers a group ID obtained as a result of a group-registering process on the source-ID list L. In addition, the list management section 140 also registers the recorder ID of another content-processing apparatus 10 on the source-ID list L if the other content-processing apparatus 10 pertains to the same group ID as the content-processing apparatus 10. Thus, content-processing apparatus 10 pertaining to the same apparatus group are capable of reproducing a copied distributed content and a copied ripping content with a high degree of freedom. As for a content-processing apparatus 10 pertaining to another apparatus group or a content-processing apparatus 10 not registered in an apparatus group, reproduction of a copied content is restricted in order to prevent the content from being utilized illegally.

It is also possible to provide a configuration in which only one list management section 140 is provided as a representative to a selected content-processing apparatus 10 among a plurality of content-processing apparatus 10 and content reproduction apparatus 20 connected to each other by a private network. The representative list management section 140 may then update the source-ID lists L for the content-processing apparatus 10 and the content reproduction apparatus 20 in an integrated manner in a bulk operation. In this case, it is desirable to provide the representative list management section 140 in a server connected to the private network.

4. Content Processing Apparatus (PD)

Next, the configuration of the content reproduction apparatus 20 (PD) according to the embodiment is explained in detail.

First of all, a hardware configuration of the content reproduction apparatus 20 according to the embodiment is explained by referring to FIG. 9. It is to be noted that FIG. 9 is a block diagram showing an outline of the hardware configuration of the content reproduction apparatus 20 provided by the embodiment.

As shown in FIG. 9, the content reproduction apparatus 20 includes a main control apparatus 201, a flash memory 202, a RAM 203, a data-processing apparatus 204, a bus 206, an input apparatus 208, a display apparatus 210, a storage apparatus (or an HDD) 211, a decoder 213, a communication apparatus 215, an audio output circuit 216, a remote controller 218 and a headphones 219.

The main control apparatus 201 functions as a control apparatus for controlling the other components of the content reproduction apparatus 20. The flash memory 202 is a memory used for storing programs each used for prescribing an operation of the main control apparatus 201 and various kinds of data. The RAM 203 is an SDRAM (Synchronous DRAM) used for temporarily storing various kinds of data related to operations carried out by the main control apparatus 201.

The data-processing apparatus 204 is a system LSI or the like for processing data transferred among components in the content reproduction apparatus 20. The bus 206 is data lines for connecting components such as the main control apparatus 201, the flash memory 202, the RAM 203, the data-processing apparatus 204, the input apparatus 208, the display apparatus 210, the storage apparatus (or the HDD) 211, the decoder 213, the communication apparatus 215 and the audio output circuit 216 to each other.

The input apparatus 208 and the remote controller 218 each include operation means and an input control circuit. The operation means includes a touch panel, button keys, a lever and a dial. On the other hand, the input control circuit is a circuit for generating an input signal in accordance with an operation carried out by the user on the operation means and supplying the input signal to the main control apparatus 201. The user of the content reproduction apparatus 20 operates the input apparatus 208 and/or the remote controller 218 to be described later to enter various kinds of data and a command making a request for processing to the content reproduction apparatus 20.

The display apparatus 210 includes an LCD panel and an LCD control circuit. In accordance with control executed by the main control apparatus 201, the display apparatus 210 displays various kinds of information as texts or images. As will be described later, for example, the display apparatus 210 is capable of displaying the title information of every content in the content reproduction apparatus 20 along with information revealing whether or not the content can be reproduced.

The storage apparatus 211 is an apparatus included in the content reproduction apparatus 20 according to the embodiment as a typical storage apparatus for storing various kinds of data. Typically, the storage apparatus 211 is implemented as an HDD (Hard Disk Drive) having a typical storage capacity of several tens of GB. The stored data includes compressed contents, programs to be executed by the main control apparatus 201 and processing data.

The decoder 213 is a unit for carrying out processing including a process to decrypt an encrypted content, a decoding process, a surround process and a process to convert processed content data into PCM data.

The communication apparatus 215 has a configuration including a USB controller and a USB terminal. The communication apparatus 215 is a unit for exchanging various kinds of data with a content-processing apparatus 10 connected to the content reproduction apparatus 20 by a local line 9 such as a USB cable. The exchanged data includes a content, a source-ID L, ICV data, content management information and a control signal.

The audio output circuit 216 is a unit for outputting analog audio data to the remote controller 218. The analog audio data is data obtained as a result of a decryption process carried out by the decoder 213 on a content and a DA conversion process carried out by the CPU 201 on a decrypted content. The remote controller 218 passes the analog audio data to the headphones 219 to be finally output by a speaker embedded in the headphones 219.

The following description explains main data flows in the content reproduction apparatus 20 having the hardware configuration described above.

The description begins with data flows, which occur when the content reproduction apparatus 20 (PD) receives a content from the content-processing apparatus 10 (PC). Typically, the content-processing apparatus 10 and the content reproduction apparatus 20 are connected to each other by a local line 9 such as a USB cable. To the content-processing apparatus 10, the content reproduction apparatus 20 appears as a removable HDD. In this state, when the content-processing apparatus 10 transmits a content and control information such as ICV data to the content reproduction apparatus 20, the communication apparatus 215 receives the content and the control information. The communication apparatus 215 stores the content directly into the storage apparatus 211. On the other hand, the communication apparatus 215 supplies the control information to the main control apparatus 201 by way of the data-processing apparatus 204 to be stored in a predetermined storage area.

Next, the description explains data flows, which occur when the content reproduction apparatus 20 (PD) reproduces a content. First of all, the main control apparatus 201 receives a request for reproduction of a content. If the main control apparatus 201 allows the reproduction of the content, the data-processing apparatus 204 reads out the content from the storage apparatus 211 and transfers the content to the RAM 203. Concurrently with the transfer of the content to the RAM 203, the content already transferred to the RAM 203 is supplied to the decoder 213. Then, the decoder 213 carries out processing including a process to decrypt the encrypted content, a decoding process, a surround process and a process to convert processed content data into PCM data, transferring the PCM data to the main control apparatus 201. The main control apparatus 201 drives a DA converter not shown in the figure to convert the PCM data into analog audio data while adjusting the volume, and supply the analog audio data to an amplifier employed in the audio output circuit 216. The audio output circuit 216 passes the analog audio data to the headphones 219 by way of the remote controller 218 to be eventually output from the headphones 219.

Figure 10:
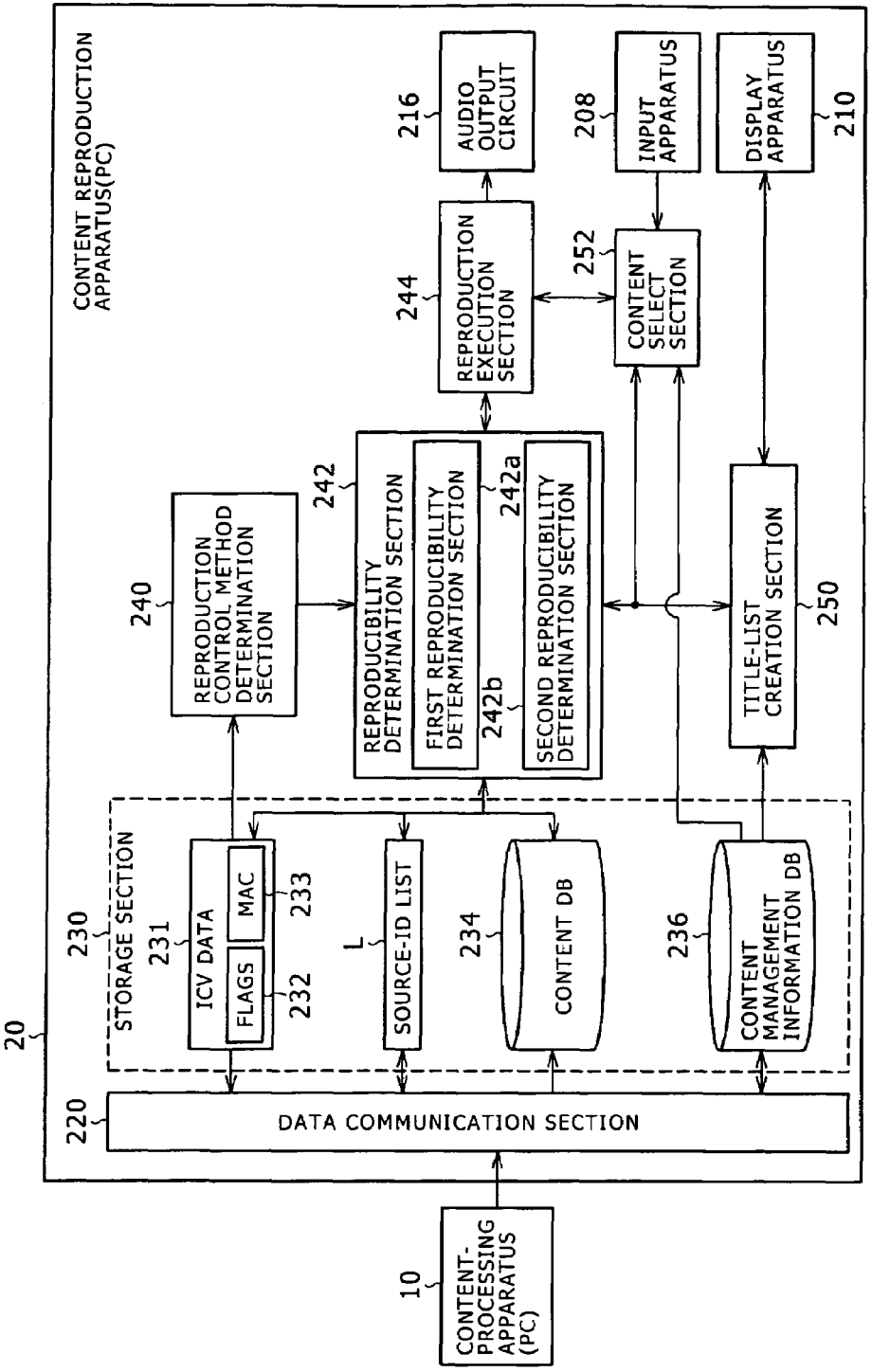
[FIG. 10]

Next, main functions of the content reproduction apparatus 20 according to the embodiment are explained by referring to FIG. 10. It is to be noted that FIG. 10 is a block diagram showing an outline of the functions executed by the content reproduction apparatus 20 provided by the embodiment.

As shown in FIG. 10, the content reproduction apparatus 20 has a data communication section 220, a storage section 230, a reproduction-control-method recognition section 240, a reproducibility determination section 242, a reproduction execution section 244, a title-list creation section 250 and a content select section 252.

The data communication section 220 is a unit for exchanging data with the content-processing apparatus 10 through a local line 9 by utilizing the communication apparatus 215.

The storage section 230 includes the storage apparatus 211 cited above and the flash memory 202, which are used for storing various kinds of data in the content reproduction apparatus 20. The storage section 230 is also used for storing ICV data 231, the source-ID list L, a content database 234 and a content management control information database 236.

The ICV data 231 is data generated by the ICV-data management section 190 employed in the content-processing apparatus 10, which then transmits the data to the content reproduction apparatus 20. The ICV data 231 is used as data for checking validity of a content reproduction process to be carried out in the content reproduction apparatus 20. The ICV data 231 includes a 1-bit flag 232 in its head and a MAC value 233.

The flag 232 is typical method recognition information indicating which reproduction control method (or which copyright management method) is adopted by the content reproduction apparatus 20. If the group management method is adopted by the content-processing apparatus 10 as the reproduction control method of the content reproduction apparatus 20, the flag 232 is reset for example to "0". If the check-in/check-out method is adopted by the content-processing apparatus 10 as the reproduction control method of the content reproduction apparatus 20, on the other hand, the flag 232 is set at "1".

In addition, if the group management method is adopted by the content-processing apparatus 10 as the reproduction control method of the content reproduction apparatus 20, the MAC value 233 is set at a value equal to the MAC value of the source-ID list L. If the check-in/check-out method is adopted by the content-processing apparatus 10 as the reproduction control method of the content reproduction apparatus 20, on the other hand, the MAC value is set at a value generated in accordance with each license including usage rule information for a content.

Furthermore, the source-ID list L stored in the storage section 230 is about identical with the source-ID list L of the content-processing apparatus 10. When the content reproduction apparatus 20 is registered in an apparatus group, a group ID assigned to the content reproduction apparatus 20 is added to the source-ID list L stored in the storage section 230. Moreover, the source-ID list L stored in the storage section 230 also includes the recorder ID of every content-processing apparatus 10 pertaining to the same apparatus group as the content reproduction apparatus 20. In this embodiment, the source-ID list L stored in the storage section 230 is updated by the list management section 140 employed in the content-processing apparatus 10. However, a list management section can also be incorporated in the content reproduction apparatus 20 as a section for updating the source-ID list L owned by the content reproduction apparatus 20 itself.

Figure 6A:
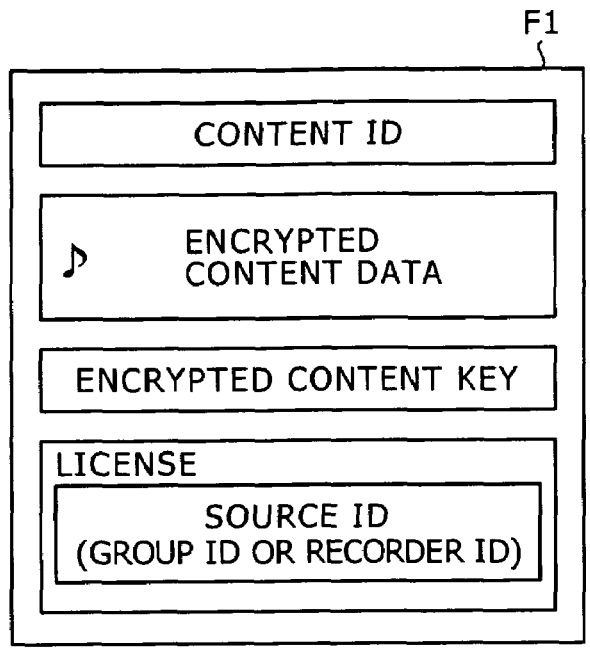
[FIG. 6(a)]
Figure 6B:
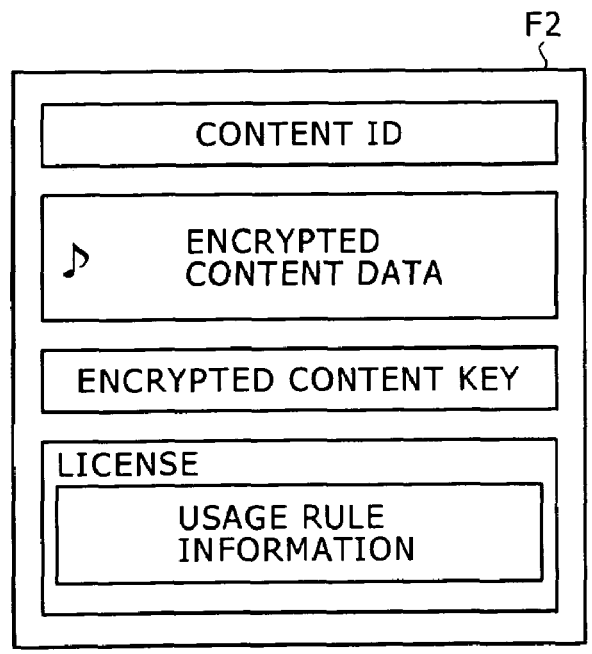
[FIG. 6(b)]

The content database 234 is a database used for storing a content transferred from the content-processing apparatus 10. If the group management method is adopted as the reproduction control method of the content reproduction apparatus 20, the content database 234 is used for storing contents each having an added license including a source ID as shown in FIG. 6(a). If the check-in/check-out method is adopted as the reproduction control method of the content reproduction apparatus 20, on the other hand, the content database 234 is used for storing contents each having an added license including usage rule information as shown in FIG. 6(b).

Much like the content management control information database 118 included in the content-processing apparatus 10, the content management control information database 236 is a database used for storing attribute information and recording location information of every content stored in the content database 234. The attribute information of a content includes the ID and title information of the content. The title information of a content can be any of a song name, artist name and album name of the content. An example of the recording location is an address in the content database 234.

The database of the self ID, which is not shown in the figure, in the storage section 230 stores, for example, a device ID of the content reproduction apparatus 20. The device ID is the ID added in units of the content reproduction apparatus 20 before factory shipment. The device ID is used at group registering process of the content reproduction apparatus 20.

The reproduction-control-method recognition section 240 is a unit for reading out the flag 232 from the ICV data 231 at a content reproduction time and recognizing a method adopted as the reproduction control method of the content reproduction apparatus 20 set by the content processing apparatus 10 on the basis of the flag 232. To put it concretely, if the flag 232 is "0", the reproduction-control-method recognition section 240 recognizes the group management method (a first reproduction control method) as the reproduction control method of the content reproduction apparatus 20. If the flag 232 is "1", on the other hand, the reproduction-control-method recognition section 240 recognizes the check-in/check-out method (a second reproduction control method) as the reproduction control method of the content reproduction apparatus 20. The reproduction-control-method recognition section 240 supplies the recognized reproduction control method of the content reproduction apparatus 20 to the reproducibility determination section 242.

The reproducibility determination section 242 is a unit for producing a result of determination as to whether or not a content requested as a content to be reproduced in accordance with a reproduction control method recognized by the reproduction-control-method recognition section 240 can be reproduced. The reproducibility determination section 242 has a first reproducibility determination section 242a for executing reproduction control according to the group management method adopted as a copyright management scheme and a second reproducibility determination section 242b for executing reproduction control according to the check-in/check-out method adopted as a copyright management scheme.

If the reproduction-control-method recognition section 240 recognizes the group management method (or the first reproduction control method) as the reproduction control method of the content reproduction apparatus 20, the reproducibility determination section 242 drives the first reproducibility determination section 242a to produce a result of determination as to whether or not a content to be reproduced is reproducible on the basis of a source ID added to the content and the source-ID list L. It is to be noted that, if a validity term has been set in the source ID on the source-ID list L and the validity term has not been expired, reproduction of the content is permitted.

If the reproduction-control-method recognition section 240 recognizes the check-in/check-out method (or the second reproduction control method) as the reproduction control method of the content reproduction apparatus 20, on the other hand, the reproducibility determination section 242 drives the second reproducibility determination section 242b to produce a result of determination as to whether or not a content to be reproduced is reproducible on the basis of usage rule information described in a license added to the content. The usage rule information includes a limit of the number of permitted reproductions and a reproduction validity term. It is to be noted that, since the reproducibility determination section 242 has about the same functions as the reproducibility determination section 172 employed in a content-processing apparatus 10, details of the reproducibility determination section 242 are not explained.

The reproduction execution section 244 is a unit for reproducing a content determined by the reproducibility determination section 242 to be a reproducible content and supplying the reproduced content to the audio output circuit 216. It is to be noted that, since the reproduction execution section 244 has about the same functions as the reproduction execution section 174 employed in a content-processing apparatus 10, details of the reproduction execution section 244 are not explained.

The title-list creation section 250 is a unit for reading out title information of all or some contents stored in the content database 234 from the content management control information database 236 and creating a list of content title information. In the following description, the list of content title information is referred to as a content-title list. The content-title list is a table of song names each representing a musical content. The content-title list also includes additional information such as the artist name, album name and reproduction duration of every musical content on the list. The title-list creation section 250 displays a created content-title list on the display apparatus 210. Thus, the user is capable of viewing the content-title list, selecting the title information of a content to be reproduced from the list, specifying the selected title by operating the input apparatus 208 and making a request for reproduction of the content represented by the specified title. As described above, the title-list creation section 250 and the display apparatus 210 are configured to function as a typical display section for displaying titles of one or more contents held by the content reproduction apparatus 20.

The content select section 252 is a unit for selecting a content to be reproduced on the basis of an input entered by the user via the input apparatus 208 and supplying information on the selected content to the reproducibility determination section 242. To put it concretely, text information is generated as a text representing the content, the reproduction of which is desired by the user, and the content select section 252 reads out the ID and storage location of the desired content from the content management control information database 236 and supplies the ID and the storage location to the reproducibility determination section 242. The reproducibility determination section 242 then produces a result of determination as to whether or not the selected content to be reproduced is reproducible and requests the reproduction execution section 244 to reproduce the content only if the content is found reproducible.

The title-list creation section 250 is also capable of creating a content-title list to be displayed on the display apparatus 210 as a list distinguishing title information of reproducible contents from title information of irreproducible ones. In this case, first of all, the title-list creation section 250 requests the reproducibility determination section 242 to produce a result of determination as to whether or not every content to be reproduced is reproducible. Then, on the basis of the result of the determination, the title-list creation section 250 creates a content-title list to be displayed on the display apparatus 210 as a list distinguishing title information of reproducible contents from title information of irreproducible ones. Thus, the user is capable of selecting a content to be reproduced among the reproducible ones by specifying the title information of the desired content. If the user selects the title information of a content to be reproduced among the reproducible ones displayed on the display apparatus 210, in this way, the content select section 252 outputs the ID and storage location of the content corresponding to the selected title information to the reproducibility determination section 242. The content can be reproduced without the need to produce a result of determination in the reproducibility determination section 242 as a determination of whether or not the content is reproducible.

The functional configuration of the content reproduction apparatus 20 according to the embodiment has been explained so far. The content reproduction apparatus 20 is capable of selectively executing reproduction control based on the group management method or reproduction control based on the check-in/check-out method in accordance with setting made by the content-processing apparatus 10. Thus, the content reproduction apparatus 20 not only enhances the convenience provided to the user of the content reproduction apparatus 20, but also allows the development work to be carried out with a higher degree of efficiency and, hence, the cost of the development work to be reduced due to the fact that it is no longer necessary to develop and design a variety of models of the content reproduction apparatus 20 as models tailored to a variety of reproduction control methods.

In addition, the content reproduction apparatus 20 is compatible with the group management method adopted as a copyright management method for controlling reproduction of contents on the basis of a source ID added to each of the content and the source-ID list L. Thus, the user is allowed to download a content from the content-processing apparatus 10 owned by the user to the content reproduction apparatus 20 with a high degree of freedom and reproduce the downloaded content in the content reproduction apparatus 20. As a result, the degree of freedom of content usability is increased, resulting in a user-friendlier system in comparison with the conventional check-in/check-out method.

It is to be noted that the units such as the data communication section 220, the reproduction-control-method recognition section 240, the reproducibility determination section 242, the reproduction execution section 244, the title-list creation section 250 and the content select section 252 can each be implemented as hardware having the functions of the unit. As an alternative, each of the units can also be realized by installing a program in the content reproduction apparatus 20 as a program to be executed by a computer of the content reproduction apparatus 20 to carry out the functions of the unit.

In addition, in the embodiment described above, if no source ID is added to a content, the reproducibility determination section 242 employed in the content reproduction apparatus 20 produces a determination result indicating that the content is exempted from the copyright protection. In this case, the reproducibility determination section 242 permits reproduction of the content and outputs a signal making a request for reproduction of the content to the reproduction execution section 244. That is to say, the content reproduction apparatus 20 is designed into a configuration allowing a content exempted from the copyright protection such as a content having no source ID to be reproduced with a high degree of freedom. The group management method described earlier is possible to implement limitations on utilization of contents exempted from the copyright protection as explained below.

First of all, at step 1, when a transfer control section employed in the content-processing apparatus 10 as a section shown in none of the figures receives a request for a transfer of a content stored in the content database 116 as a content exempted from the copyright protection to a content reproduction apparatus 20 by a local line 9, the transfer control section acquires a the source-ID list L stored in the content reproduction apparatus 20.

Then, at step 2, the transfer control section compares group IDs included on the source-ID list L acquired from the content reproduction apparatus 20 with group IDs included on the source-ID list L owned by the content-processing apparatus 10 employing the transfer control section.

If the result of the comparison indicates that the group IDs included on the source-ID list L acquired from the content reproduction apparatus 20 match the group IDs included on the source-ID list L owned by the content-processing apparatus 10, at step 3, the transfer control section allows the content received the transfer request and exempted from the copyright protection to be transferred from the content-processing apparatus 10 to the content reproduction apparatus 20. If the result of the comparison indicates that the two group IDs do not match each other, on the other hand, the transfer control section does not allow the transfer.

In addition, while a transfer of a content exempted from the copyright protection from a content reproduction apparatus 20 to the content-processing apparatus 10 is basically prohibited, it is possible to provide a configuration allowing such a transfer by adoption of the group management method. The technique adopted in the configuration is explained as follows.

First of all, at step 1, when the transfer control section employed in the content-processing apparatus 10 receives a request from the content reproduction apparatus 20 as a request for a transfer of a content stored in the content reproduction apparatus 20 connected by a local line 9 to the content-processing apparatus 10. The content is exempted from the copyright protection and stored the content reproduction apparatus 20. Received the transfer request, the transfer control section acquires a the source-ID list L stored in the content reproduction apparatus 20.

Then, at step 2, the transfer control section compares group IDs included on the source-ID list L acquired from the content reproduction apparatus 20 with group IDs included on the source-ID list L owned by the content-processing apparatus 10 employing the transfer control section.

If the result of the comparison indicates that the group IDs included on the source-ID list L acquired from the content reproduction apparatus 20 match the group IDs included on the source-ID list L owned by the content-processing apparatus 10, at step 3, the transfer control section allows the content received the transfer request and exempted from the copyright protection to be transferred from the content reproduction apparatus 20 to the content-processing apparatus 10. If the result of the comparison indicates that the two group IDs do not match each other, on the other hand, the transfer control section does not allow the transfer.

As described above, the group management method provided by the embodiment can be adopted to control transfers of contents between the content-processing apparatus 10 and a content reproduction apparatus 20. Thus, utilization of contents can be restricted by imposing limitations on transfers of copied contents exempted from the copyright protection.

5. Servers

Figure 11:
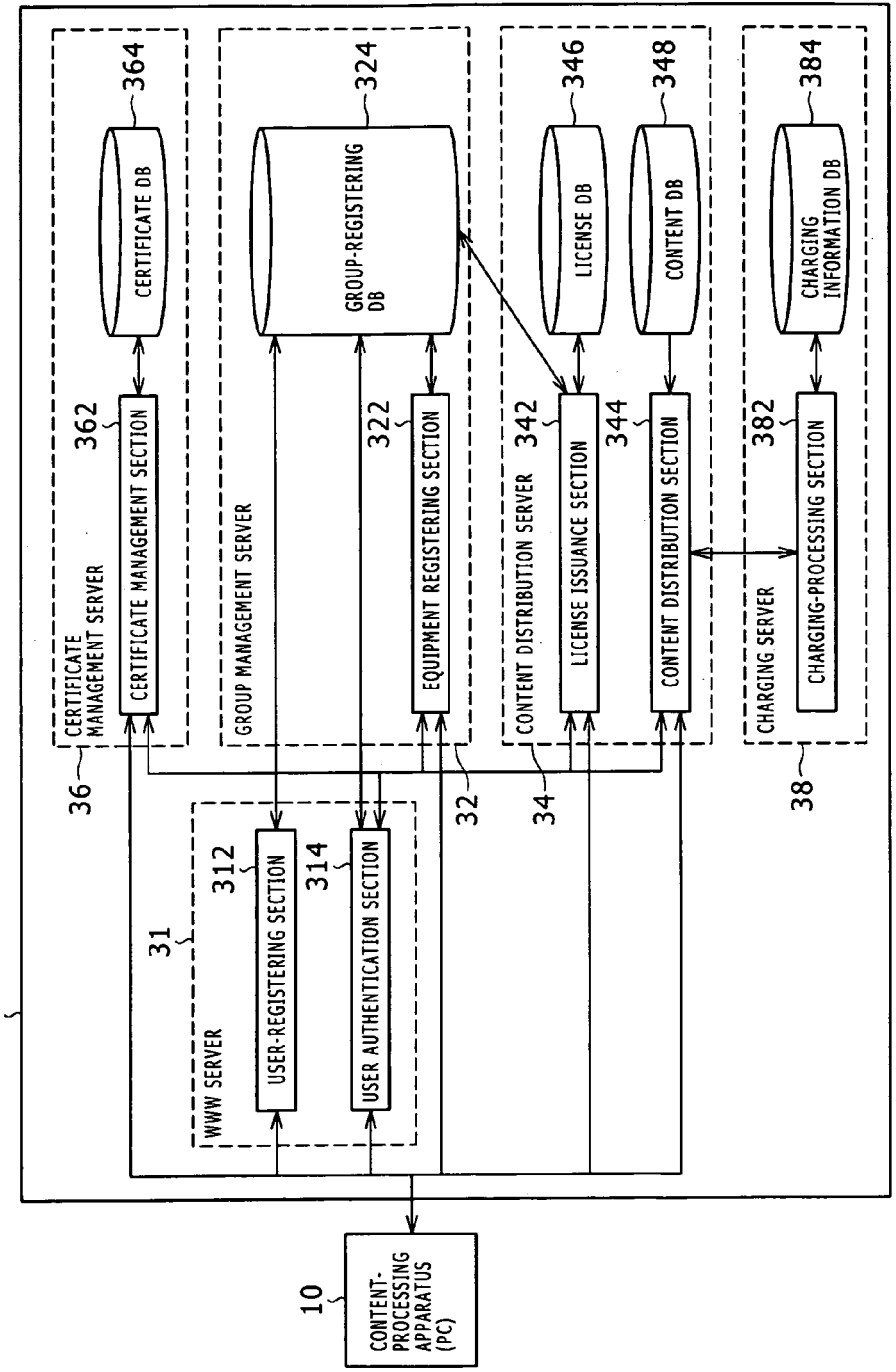
[FIG. 11]

Next, the configuration of the servers 30 is explained in detail by referring to FIG. 11. It is to be noted that FIG. 11 is a block diagram showing an outline of functions of the servers 30 provided by the embodiment.

As shown in FIG. 11, the servers 30 include the WWW server 31, the group management server 32, the content distribution server 34, the certificate management server 36 and the charging server 38.

The WWW server 31, the group management server 32 and the certificate management server 36 form a section for executing a content-sharing service to register a plurality of content-processing apparatus 10 and content reproduction apparatus 20 owned by the same user in an apparatus group and allow a content to be shared by the registered content-processing apparatus 10 and the registered content reproduction apparatus 20. On the other hand, the WWW server 31, the content distribution server 34 and the charging server 38 form a section for executing a content distribution service to distribute a paid content to the user of the content-processing apparatus 10.

Each of the functional configurations of the WWW server 31, the group management server 32, the content distribution server 34, the certificate management server 36 and the charging server 38 is explained below. It is to be noted that, since the hardware configurations of the WWW server 31, the group management server 32, the content distribution server 34, the certificate management server 36 and the charging server 38 are similar to the hardware configuration shown in FIG. 4 as the hardware configuration of the content-processing apparatus 10 (PC), these hardware configurations are not described.

First of all, the WWW server 31 is explained. The WWW server 31 accepts a request made by a content-processing apparatus 10 making an access to the WWW server 31 by way of the network 5, and controls communications between the content-processing apparatus 10 and the servers 30. The WWW server 31 has a user-registering section 312 and a user authentication section 314.

The user-registering section 312 is a unit for carrying out a registering process, registration-changing process and de-registering process for a new user desiring utilization of the content-sharing service and/or the content distribution service. The user-registering section 312 is also a unit for executing management of user account information of such a new user. The user account information includes a user ID, a credit number and a password. For each user registered as a user entitled to the services, a leaf ID unique to the user is provided. Various kinds of user account information determined in a registering process carried out by the user-registering section 312 and the leaf ID are stored in a group-registering database 324. However, implementation of the servers 30 is not limited to this typical scheme. For example, a user-registering database can be provided in the WWW server 31 as a database used for managing user account information and leaf IDs.

The user authentication section 314 is a unit for carrying out a user authentication process to authenticate a user owning a content-processing apparatus 10, which has made a request for a connection between the content-processing apparatus 10 and the servers 30, in order to verify that the user is indeed the registered user entitled to the content-sharing service and/or the content distribution service as described above. The request for a connection can be a request for a group-registering process, request or a group-de-registering process, a request for distribution of a content, a request for a certificate, a request for a change of user account information or another request. The user authentication process is carried out on the basis of user account information entered by the user and user account information stored in the group-registering database 324. An authenticated user is capable of making a login to the group management server 32, the content distribution server 34, the certificate management server 36 or another resource.

Next, the group management server 32 is explained. The group management server 32 is a server for registering a plurality of content-processing apparatus 10 and content reproduction apparatus 20 owned by the same user in an apparatus group. The group management server 32 has an apparatus-registering section 322 and the group-registering database 324 mentioned before.

The group-registering database 324 is a database stored in a storage apparatus not shown in the figure. The storage apparatus is an HDD incorporated in the group management server 32. As shown in FIG. 12, for each user, the group-registering database 324 is associated with user account information, a leaf ID 3243, an apparatus ID 3244, and a recorder ID 3245. In this example, the user account information includes a user ID 3241 and a credit-card number 3242. The leaf ID 3243 is a leaf ID assigned to the user. The apparatus ID 3244 is an apparatus ID assigned to either of the content-processing apparatus 10 or the content reproduction apparatus 20, which have been registered in an apparatus group. The recorder ID 3245 is a recorder ID assigned to a content-processing apparatus 10 registered in an apparatus group as a content-processing apparatus 10 having a ripping function.

Typically, a user ID (or a user account) 3241 is associated with a leaf ID 3243. However, a leaf ID 3243 may be associated with apparatus IDs 3244 of one or more content-processing apparatus 10 or content reproduction apparatus 20 pertaining to an apparatus group assigned to a user represented by the leaf ID 3243. In this case, an apparatus ID can be a terminal ID or a device ID. To be more specific, in the case of the content-processing apparatus 10 (PC), the apparatus ID 3244 is a terminal ID assigned to the PC. In the case of the content reproduction apparatus 20 (PD), on the other hand, the apparatus ID 3244 is a device ID assigned to the PC. In the case of a terminal ID, the terminal ID is associated with a recorder ID, which is a recorder ID assigned to a content-processing apparatus 10 having a ripping function.

The apparatus-registering section 322 is a unit for registering a content-processing apparatus 10 or a content reproduction apparatus 20 in an apparatus group, which is owned by a user authenticated by the user authentication section 314, in accordance with a registering request made by the content-processing apparatus 10 or the content reproduction apparatus 20. This group-registering process is carried out, for example, when group-registering request information is received from the group-registering section 130 employed in the content-processing apparatus 10 after a user authentication process has been done. Typically, the group-registering request information includes a group-registering request notice, a terminal ID or a device ID and a recorder ID. In the process to register an apparatus in an apparatus group, an apparatus ID (terminal ID, device ID and recorder ID) assigned to the content-processing apparatus 10 or the content reproduction apparatus 20 is recorded on the column of the apparatus ID 3244 in the group-registering database 324, being associated with the authenticated user. In this way, the apparatus ID of the apparatus registered in the apparatus group is associated with a leaf ID (apparatus group) assigned to the authenticated user.

In addition, the apparatus-registering section 322 prohibits registration of a same content-processing apparatus 10 in different apparatus groups. Thus, the apparatus-registering section 322 searches the group-registering database 324. If the apparatus-registering section 322 found that the apparatus ID of the content-processing apparatus 10 is already stored, the apparatus-registering section 322 rejects the request for a group-registering process to register the content-processing apparatus 10 or a content reproduction apparatus 20 in an apparatus group so that the apparatus ID is not registered again in the group-registering database 324. Thus, a content-processing apparatus 10 or a content reproduction apparatus 20 can be registered only in one apparatus group.

The apparatus-registering section 322 is also capable of setting an upper limit of the number of content-processing apparatus 10 or content reproduction apparatus 20 that can be registered in an apparatus group. To put it concretely, the apparatus-registering section 322 is also capable of setting an upper limit of the number of content-processing apparatus 10 that can be associated with a leaf ID assigned to a user. For example, the apparatus-registering section 322 may set an upper limit of the number of content-processing apparatus 10 that can be registered in an apparatus group at a predetermined number (for example, three) so that only up to the upper limit number of (for example, three) terminal IDs can be associated with a leaf ID. In this case, if the content-processing apparatus 10 (PC) having a terminal ID as its apparatus ID makes a request for a group-registering process that would exceed the upper limit, the apparatus-registering section 322 will reject the request. Thus, since the number of content-processing apparatus 10 that can be registered in the same apparatus group can be limited, for example to three or less, the number of content-processing apparatus 10 registered in a same apparatus group and each capable of receiving distributed content can be limited.

As another example of the upper limit, for example, the apparatus-registering section 322 may set the upper limit of recorder IDs that can be associated with a leaf ID in the same group ID at a typical number of 10. In this case, if the content-processing apparatus 10 (PC) having a recorder ID makes a request for a group-registering process that would exceed the upper limit, the apparatus-registering section 322 will reject the request. Thus, since the number of content-processing apparatus 10 that has a ripping function and can be registered in the same apparatus group can be limited, the number of content-processing apparatus 10 that is capable of serving as a source of a sharable ripping content in the same apparatus group can be limited.

In addition, when the apparatus-registering section 322 registers a content-processing apparatus 10 in a predetermined apparatus group as described above, the apparatus-registering section 322 transmits service data to the registered content-processing apparatus 10 as a notice. The service data includes a leaf ID assigned to the authenticated user owning the content-processing apparatus 10 (or assigned to the predetermined apparatus group) and a service common key for utilizing a content. The content-processing apparatus 10 registered in the predetermined apparatus group receives the leaf ID and converts the leaf ID into a group ID before registering the group ID onto the source-ID list L owned by the content-processing apparatus 10.

It is to be noted that, instead of transmitting a leaf ID from the apparatus-registering section 322 employed in the group management server 32 to the content-processing apparatus 10 as a notice as described above, the apparatus-registering section 322 may generate a group ID on the basis of information such the leaf ID in advance and then transmit the generated group ID to the content-processing apparatus 10 as a notice. In this case, the content-processing apparatus 10 does not have to generate the group ID by itself. The content-processing apparatus 10 needs only to register the group ID received from the group management server 32 on the source-ID list L as it is.

In addition, the apparatus-registering section 322 removes a content-processing apparatus 10 making a request for a group-de-registering process from an apparatus group owned by the authenticated user of the content-processing apparatus 10. This group-de-registering process is carried out when group-de-registering request information is received from the group-registering section 130 employed in the content-processing apparatus 10 after a user authentication process has been done. Typically, the group-registering request information includes a de-registering request notice, a terminal ID or a device ID and a recorder ID. In the process to de-register a content-processing apparatus 10 or a content reproduction apparatus 20 from an apparatus group, an apparatus ID (terminal ID or device ID) assigned to the content-processing apparatus 10 or the content reproduction apparatus 20 is deleted from the column of the apparatus ID 3244 in the group-registering database 324. However, a recorder ID assigned to the de-registered content-processing apparatus 10 (PC) is not removed from the group-registering database 324. Thus, even if some content-processing apparatus 10 have been de-registered from an apparatus group, another content-processing apparatus 10 having the ripping function, the group-registering process of which would cause the predetermined upper limit of 10 to be exceeded, cannot be registered in the group-registering database 324 as a new content-processing apparatus 10. As a result, the number of content-processing apparatus 10 that can each be registered as a content-processing apparatus 10 capable of creating a sharable ripping content can be limited, allowing the management of copyrights of ripping contents to be executed strictly.

Next, the certificate management server 36 is explained. The certificate management server 36 is a server for collecting group certificates G issued by content-processing apparatus 10, managing the collected group certificates G and distributing each of the group certificates G to other content-processing apparatus 10 pertaining to an apparatus group owned by the same user as the content-processing apparatus 10 issuing the group certificate G. The certificate management server 36 has a certificate management section 362 and a certificate database 364.

The certificate database 364 is stored in a storage apparatus (not shown in the figure) as an HDD incorporated in the certificate management server 36. The certificate database 364 is a database used for storing group certificates G issued by content-processing apparatus 10 by associating each of the group certificates G with the user of the content-processing apparatus 10 issuing the group certificates G, that is, by associating each of the group certificates G with a leaf ID.

The certificate management section 362 is a unit for acquiring group certificates G, which are issued by content-processing apparatus 10, through the network 5 and storing the group certificates G by associating each of the group certificates G with the user of the content-processing apparatus 10 issuing the group certificates G. In addition, the certificate management section 362 reads out group certificates G issued by one or more content-processing apparatus 10 pertaining to an apparatus group owned by a certain user from the certificate database 364, and distributes the group certificates G to other content-processing apparatus 10 pertaining to the same user group.

For example, after a content-processing apparatus 10 is registered in an apparatus group by the group management server 32, the certificate management section 362 acquires a group certificate G, which associates the recorder ID and group ID of the content-processing apparatus 10 with each other, from the content-processing apparatus 10 and saves the group certificate G in the certificate database 364. Furthermore, after another content-processing apparatus 10 is newly registered in the same apparatus group, the certificate management section 362 delivers the group certificate G acquired from the previously registered content-processing apparatus 10 to the newly registered other content-processing apparatus 10. Thus, the newly registered other content-processing apparatus 10 is capable of obtaining the recorder ID of the previously registered content-processing apparatus 10 from the group certificate G and registering the recorder ID on the source-ID list L of the newly registered other content-processing apparatus 10 so as to allow a ripping content to be shared by the previously registered content-processing apparatus 10 and the newly registered other content-processing apparatus 10.

In addition, if the certificate management section 362 receives a request for a delivery of a group certificate G from any specific content-processing apparatus 10 or any specific content-processing apparatus 10 makes an access to the servers 30, the certificate management section 362 may transmit the group certificate G of another content-processing apparatus 10, which pertains to the same apparatus group, to the specific content-processing apparatus 10.

Furthermore, when a content-processing apparatus 10 is de-registered from an apparatus group, the certificate management section 362 deletes the group certificate G of the de-registered content-processing apparatus 10 from the certificate database 364.

In this way, the certificate management section 362 employed in the certificate management server 36 manages group certificates G issued by content-processing apparatus 10 in an integrated manner and distributes a group certificate G issued by any particular content-processing apparatus 10 to other content-processing apparatus 10 pertaining to the same apparatus group. Thus, any specific content-processing apparatus 10 is capable of obtaining a group certificate G from another content-processing apparatus 10 pertaining to the same apparatus group without the need to connect the specific content-processing apparatus 10 and the other content-processing apparatus 10 to each other directly. Since group certificates G are managed in an integrated manner in the certificate management server 36, a previously registered content-processing apparatus 10 is always capable of acquiring the group certificate G of another content-processing apparatus 10 most recently registered in the same apparatus group. In this way, a previously registered content-processing apparatus 10 is capable of acquiring the group certificates G of all other content-processing apparatus 10 registered in the same apparatus group and records the recorder IDs of all the other content-processing apparatus 10 on the source-ID list L of the previously registered content-processing apparatus 10.

Next, the content distribution server 34 is explained. The content distribution server 34 is a server for distributing a paid content to a content-processing apparatus 10 owned by every user registered as a user entitled to the content distribution service. The content distribution server 34 has a configuration capable of distributing both a content conforming to the copyright management scheme adopting the group management method and a content conforming to the copyright management scheme adopting the check-in/check-out method.

The content distribution server 34 has a license issuance section 342, a content distribution section 344, a license database 346 and a content database 348.

The license database 346 and the content database 348 are each a database stored in a storage apparatus shown in none of the figures as a storage section such as an HDD employed in the content distribution server 34. The license database 346 is a database used for storing a license issued for a content as a license in accordance with distribution of the content. On the other hand, the content database 348 is a database used for storing a plurality of contents to be distributed in a content distribution service.

The content distribution section 344 is a unit for distributing a list of distributable contents to authenticated users so as to allow the users to view the list and select a content from the list as a content, the distribution of which is desired. The content distribution section 344 also transmits such a desired content to a content-processing apparatus 10, which is being utilized by a user desiring the content, by way of the network 5. It is to be noted that a process to transmit such a desired content to a desiring user is carried out with, for example, a charging process taken as a precondition. The charging process will be described later.

In addition, the content distribution section 344 also transmits information on a distributed content stored in the content database 348 by associating with the distributed content. The information in a distributed content includes the ID of the content and title information. The title information can be any of a song name, artist names, album name and reproduction duration.

The license issuance section 342 is a unit for issuing a license describing information on a usage right to utilize a content to be distributed by the content distribution section 344 for the content. The license issuance section 342 is capable of issuing licenses of different types according to the type of the copyright management method.

In the case of the copyright management adopting the group management method, for example, the license issuance section 342 issues a license including a leaf ID issued for a user purchasing a distributed content, associating the license with the content. At that time, the license issuance section 342 may acquire the leaf ID issued for the user from the group-registering database 324 or from the user authentication section 314.

As the license issuance section 342 issues a license in this way, the content distribution server 34 associates a file containing the distributed content with a file of the license including a leaf ID issued for a user purchasing the distributed content, and then transmits the files to the content-processing apparatus 10 of the user. The content-processing apparatus 10 receiving the distributed content and the license converts the leaf ID into a group ID and adds the group ID to the content in order to execute the copyright management adopting the group management method by using the leaf ID as the source ID for the distributed content.

In the case of the copyright management adopting the check-in/check-out method, on the other hand, the license issuance section 342 issues a license describing usage rule information including a limit on the number of allowable check-in/check-out operations, a limit on the number of allowable reproduction operations and reproduction validity term, associating the license with the content to be distributed. At that time, the license issuance section 342 may create a license of a usage-rule type desired by the user on the basis of license-patterned information stored in the license database 346.

When the license issuance section 342 issues a license for a content to be distributed to a content-processing apparatus 10 as described above, the content distribution server 34 associates a file containing the content to be distributed with a file containing the license describing usage rule information, and then transmits the files to the content-processing apparatus 10. The content-processing apparatus 10 receiving the distributed content and the license describing usage rule information executes the copyright management adopting the check-in/check-out method on the basis of the license.

The license issuance section 342 manages issued licenses by storing them in the license database 346.

As described above, the content distribution server 34 transmits a distributed content and a license associated with the content to a content-processing apparatus 10 as one set. In this case, in a process to transmit a distributed content according to the group management method, the content distribution server 34 includes a leaf ID in the license and, in a process to transmit a distributed content according to the check-in/check-out method, on the other hand, the content distribution server 34 includes usage rule information in the license.

It is to be noted that, as described above, the content distribution server 34 transmits a distributed content and a license associated with the content to a content-processing apparatus 10 as separate files. However, the content distribution server 34 may also transmit a distributed content and a license associated with the content to a content-processing apparatus 10 as a single joint file. In addition, as described above, in a process to transmit a distributed content according to the group management method to a content-processing apparatus 10, the content distribution server 34 notifies the content-processing apparatus 10 of a leaf ID, on the basis of which, the content-processing apparatus 10 generates a group ID. However, the generation of a group ID is not limited to this technique provided by the embodiment. For example, instead of transmitting a leaf ID to a content-processing apparatus 10, the content distribution server 34 may generate a group ID on the basis of a leaf ID in advance and inform the content-processing apparatus 10 of the generated group ID.

Next, the charging server 38 is explained. The charging server 38 is a server for carrying out a charging process in accordance with distribution of a content from the content distribution server 34 to a content-processing apparatus 10. The charging server 38 has a charging process section 382 and a charging information database 384.

The charging information database 384 is a database composed of information on charging for every user. The charging information database 384 is a database stored in a storage apparatus (not shown in the figures) such as an HDD employed in the charging server 38.

The charging process section 382 is a unit for carrying out a charging process of requesting payment with an amount determined by a distributed content. Charging information resulting from a charging process is stored in the charging information database 384. The charging information includes the requested amount of payment, a payment-amount computation method and a charging date.

6. Content-Sharing Method

Figure 13:
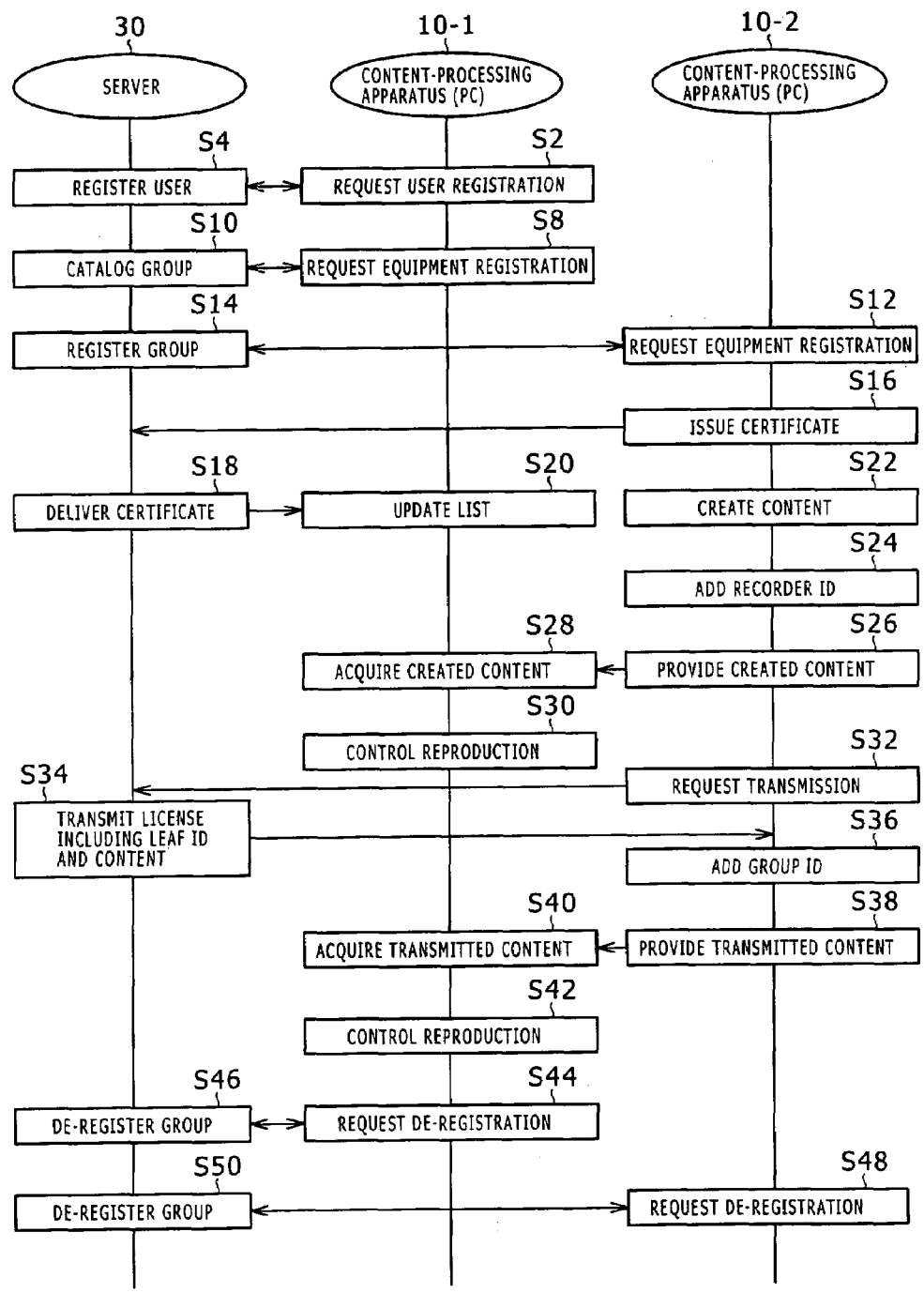
[FIG. 13]

By referring to FIG. 13, the following description explains basic flows of a content-sharing method in the content-sharing system 100 described above. FIG. 13 shows timing charts representing basic flows of the content-sharing method provided by the embodiment.

As shown in FIG. 13, first of all, at a step S2, a new user utilizes any of a content-processing apparatus 10-1 (PC) owned by itself to request the WWW server 31 functioning as one of the servers 30 to carry out a user-registering process as a content-sharing service according to the copyright management scheme based on the group management method. Then, at a step S4, the WWW server 31 carries out a user authentication process to authenticate the user, assigns a leaf ID to the successfully authenticated user and registers the successfully authenticated user. It is to be noted that the user-registering process of the content-sharing service can be carried out also as a content distribution service as well. In addition, the user-registering process can also be carried out by the group management server 32 in place of the WWW server 31.

Then, at steps S8 and S12, the user utilizes any of the content-processing apparatus 10-1 (PC) owned by itself and a content-processing apparatus 10-2 to request the servers 30 to carry out an apparatus-registering process. Subsequently, at steps S10 and S14, the group management server 32 registers the content-processing apparatus 10-1 and the content-processing apparatus 10-2 in an apparatus group assigned to the user at the requests made by the content-processing apparatus 10-1 and the content-processing apparatus 10-2 respectively. The group management server 32 also transmits the leaf ID assigned to the user to the content-processing apparatus 10-1 and the content-processing apparatus 10-2. In addition, each of the content-processing apparatus 10-1 and the content-processing apparatus 10-2 converts the leaf ID received from the group management server 32 into a group ID and registers the group ID on the source-ID list L of its own. It is to be noted that the apparatus-registering process to register the content-processing apparatus 10-1 in an apparatus group does not have to be carried out at the same time as the apparatus-registering process to register the content-processing apparatus 10-2 in the same apparatus group. That is to say, the apparatus-registering process can be carried out with their respective arbitrary timings different from each other.

Then, at a step S16, the content-processing apparatus 10-2 issues a group certificate G associating the group ID of the content-processing apparatus 10-2 with a recorder ID owned by the content-processing apparatus 10-2 and transmits the group certificate G to the certificate management server 36 functioning as one of the servers 30. Subsequently, at a step S18, the certificate management server 36 transmits the group certificate G of the content-processing apparatus 10-2 to the content-processing apparatus 10-1. It is to be noted that the group certificate G of the content-processing apparatus 10-2 does not have to be transmitted to the content-processing apparatus 10-1 by way of the certificate management server 36 as described above, but the group certificate G can also be transmitted from the content-processing apparatus 10-2 to the content-processing apparatus 10-1 directly. By the same token, the group certificate G of the content-processing apparatus 10-1 can also be transmitted to the content-processing apparatus 10-2 as well.

Then, at a step S20, the content-processing apparatus 10-1 receiving the group certificate G of the content-processing apparatus 10-2 updates the source-ID list L owned by the content-processing apparatus 10-1. In the apparatus-registering processes described above, the content-processing apparatus 10-1 and the content-processing apparatus 10-2 were registered in the same apparatus group so that the content-processing apparatus 10-1 and the content-processing apparatus 10-2 have the same group ID. Thus, the content-processing apparatus 10-1 adds a recorder ID included in the group certificate G of the content-processing apparatus 10-2 to the source-ID list L owned by the content-processing apparatus 10-1. If the content-processing apparatus 10-1 and the content-processing apparatus 10-2 have been registered in different apparatus groups, on the other hand, the content-processing apparatus 10-1 and the content-processing apparatus 10-2 will have different group IDs. In this case, the content-processing apparatus 10-1 is not allowed to add a recorder ID included in the group certificate G of the content-processing apparatus 10-2 to the source-ID list L owned by the content-processing apparatus 10-1.

With the above processes completed, the following description explains a case in which the content-processing apparatus 10-1 acquires a content provided by the content-processing apparatus 10-2 and shares the content.

The description begins with an explanation of a case in which a content to be shared is a ripping content or the like. First of all, at a step S22, the content-processing apparatus 10-2 creates a content by carrying out a ripping or self-recording process. Then, at the next step S24, the content-processing apparatus 10-2 adds a recorder ID assigned to the content-processing apparatus 10-2 to the created content. Subsequently, at the next step S26, the content-processing apparatus 10-2 provides the created content including the recorder ID added thereto to the content-processing apparatus 10-1 by way of the network 5 and a local line 9, or by using a storage medium 7.

Then, at a step S28, the content-processing apparatus 10-1 receives the created content and, at the next step S30, the content-processing apparatus 10-1 carries out a process to control reproduction of the created content, for example, at a request made by the user as a request for the reproduction of the created content. To be more specific, if the recorder ID included in the created content is an ID included on the source-ID list L owned by the content-processing apparatus 10-1, the content-processing apparatus 10-1 is capable of reproducing the created content. If the recorder ID included in the created content is not an ID included on the source-ID list L owned by the content-processing apparatus 10-1, on the other hand, the content-processing apparatus 10-1 is not capable of reproducing the created content.

The following description explains a case in which the distributed content is shared. First of all, at a step S32, the content-processing apparatus 10-2 transmits a request to the group management server 32 as a request for distribution of a content. Then, at a step S34, the group management server 32 transmits the requested content and its license including a leaf ID assigned to the content-processing apparatus 10-2 to the content-processing apparatus 10-2. Subsequently, at a step S36, the content-processing apparatus 10-2 converts the leaf ID included in the received license into a group ID and adds the group ID to the received content. Then, at the next step S38, the content-processing apparatus 10-2 provides the distributed content including the group ID added thereto to the content-processing apparatus 10-1 in the same way as the created content described above. Subsequently, at a step S40, the content-processing apparatus 10-1 receives the distributed content and, at the next step S42, the content-processing apparatus 10-1 carries out a process to control reproduction of the distributed content, for example, at a request made by the user as a request for the reproduction of the distributed content. To be more specific, if the group ID included in the distributed content is an ID included on the source-ID list L owned by the content-processing apparatus 10-1, the content-processing apparatus 10-1 is capable of reproducing the distributed content. If the group ID included in the distributed content is not an ID included on the source-ID list L owned by the content-processing apparatus 10-1, on the other hand, the content-processing apparatus 10-1 is not capable of reproducing the distributed content.

At a step S44, the content-processing apparatus 10-1 makes a request for a de-registering process. In this case, the group management server 32 removes the content-processing apparatus 10-1 from the apparatus group at a step S46. By the same token, at a step S48, the content-processing apparatus 10-2 makes a request for a de-registering process. In this case, the group management server 32 removes the content-processing apparatus 10-2 from the apparatus group at a step S50.

As described above, in accordance with a content-sharing method in the content-sharing system 100, by registering a plurality of content-processing apparatus 10 owned by the same user in the same apparatus group, the content-processing apparatus 10 are capable of sharing created and distributed contents with a relatively high degree of freedom.

7. Group-Registering/De-Registering Processes

The following description explains processes to register or de-register the content-processing apparatus 10 (PC) and the content reproduction apparatus 20 (PD) in or from an apparatus group managed by the group management server 32. It is to be noted that processing flows described below are started after a process to register a user owning content-processing apparatus 10 in the group management server 32 as a content-sharing service has been completed and a leaf ID has been assigned to the user.

Figure 14:
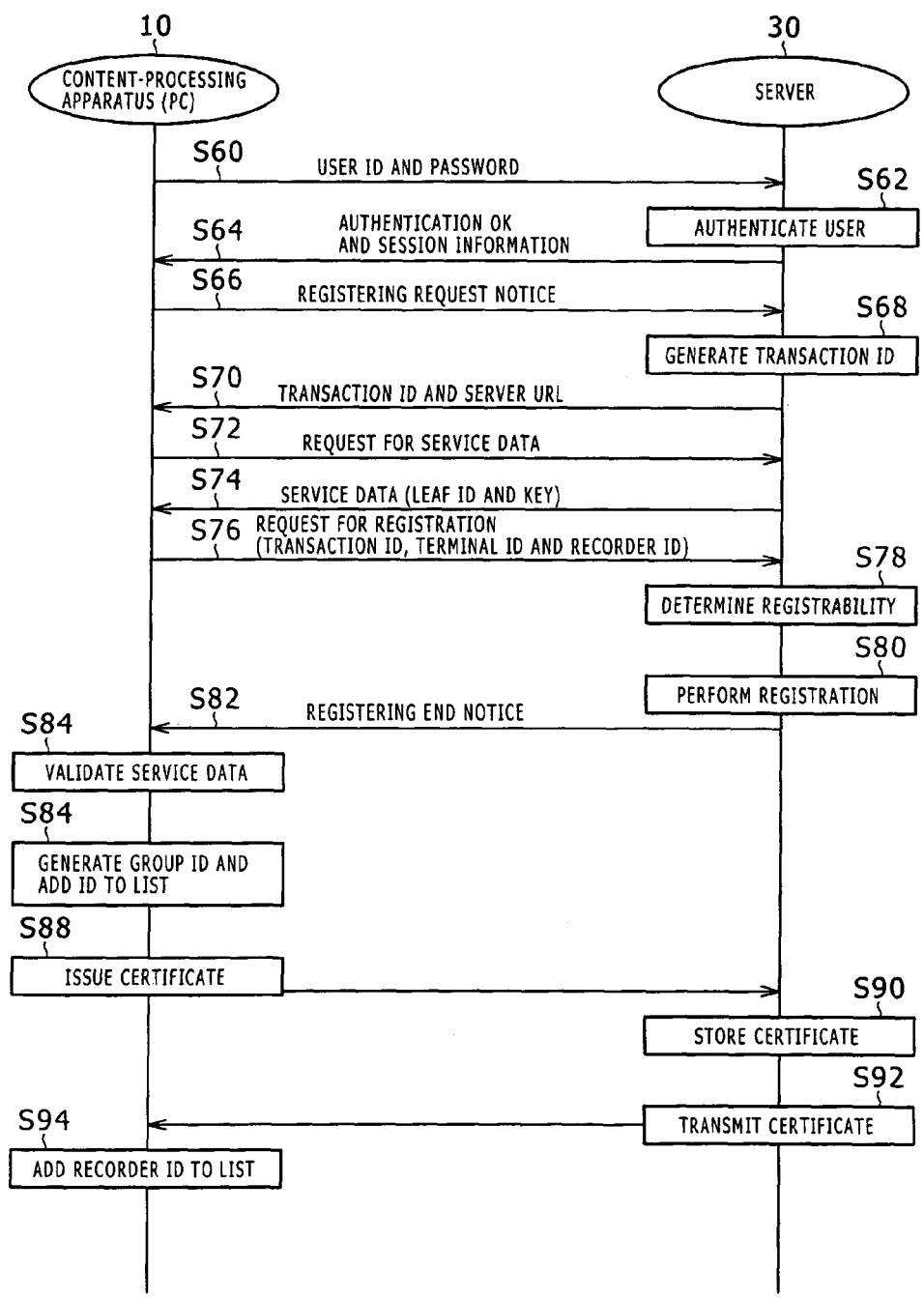
[FIG. 14]

The description begins with an explanation of a group-registering process to register the content-processing apparatus 10 (PC) provided by the embodiment in an apparatus group managed by the group management server 32 with reference to FIG. 14. FIG. 14 shows timing charts representing the group-registering process to register the content-processing apparatus 10 (PC) of the embodiment.

As shown in FIG. 14, first of all, at steps S60 to S70, a communication connection through the network 5 between the content-processing apparatus 10 making a request for a group-registering process and the servers 30 is safely established, and the user of the content-processing apparatus 10 is authenticated. The processes of the steps S60 to S70 are carried out by the browser of the content-processing apparatus 10 in conjunction with the WWW server 31 functioning as one of the servers 30.

To put it concretely, first of all, at the step S60, the content-processing apparatus 10 making a request for a group-registering process transmits a user ID and a password to the WWW server 31. Then, at a step S62, the WWW server 31 authenticates the user by verifying the received user ID and the received password with every user ID and password stored in the group-registering database 324. If the result of the user authentication indicates that the user was not authenticated successfully, the WWW server 31 does not permit the login, aborting the group-registering process. If the result of the user authentication indicates that the user has been authenticated successfully, on the other hand, the WWW server 31 permits the login. In this case, at the next step S64, the WWW server 31 transmits a message indicating that the user has been authenticated successfully and session information used for carrying out safe communications to the content-processing apparatus 10. Then, at a step S66, the content-processing apparatus 10 transmits a registering request notice to the WWW server 31. The registering request notice informs the WWW server 31 that the content-processing apparatus 10 has made an access to the servers 30, making a request for a group-registering process. Then, at a step S68, the WWW server 31 generates a transaction ID. Subsequently, at the next step S70, the WWW server 31 transmits the generated transaction ID and a URL (Uniform Resource Locator) to the content-processing apparatus 10. The URL is typical address information assigned to the group management server 32. Thus, the content-processing apparatus 10 is capable of making an access to the group management server 32 at the received URL.

At subsequent steps S72 to S86, the content-processing apparatus 10 is actually registered in the group management server 32. Processes of the steps S72 to S86 are carried out by the copyright management section employed in the content-processing apparatus 10 in conjunction with the group management server 32 functioning as one of the servers 30.

To put it concretely, first of all, at the step S72, the content-processing apparatus 10 transmits a request for service data to the group management server 32. Then, at a step S74, at the request, the group management server 32 transmits the service data to the content-processing apparatus 10. The service data includes a leaf ID assigned to the authenticated user and a service common key mentioned earlier. Subsequently, at a step S76, the content-processing apparatus 10 transmits the transaction ID received at the step S70 as well as terminal and recorder IDs assigned to the content-processing apparatus 10 to the group management server 32 in order to make a request for a group-registering process. The terminal and recorder IDs are each an ID generated by the content-processing apparatus 10 itself. It is to be noted that, since the information exchanged at the steps S74 and S76 is protected by using the session information against external interpolations, the exchanged information can be transmitted and received with a high degree of safety.

Then, at a step S78, the group management server 32 produces a result of determination as to whether or not the content-processing apparatus 10 can be registered in an apparatus group. The group management server 32 determines whether or not the content-processing apparatus 10 can be registered in the apparatus group by checking if the registration would cause an upper limit of the number of content-processing apparatus 10 that can be registered in the apparatus group to be exceeded. The upper limit of the number of content-processing apparatus 10 that can be registered in the apparatus group may be actually represented by an upper limit of the number of terminal IDs (for example, three) and an upper limit of the number of recorder IDs (for example, 10). To put it in more detail, let us assume for example that three content-processing apparatus 10 with the terminal IDs thereof different from each other have already been registered in the apparatus group of the authenticated user. In this case, the group management server 32 will reject a request for a group-registering process to register a new content-processing apparatus 10 in the apparatus group. As another example, let us assume that 10 content-processing apparatus 10 with the recorder IDs thereof different from each other have once been registered in the apparatus group of the authenticated user in the past (it doesn't matter whether or not some of the content-processing apparatus 10 may have been registered in the apparatus group at the present time). In this case, the group management server 32 will reject a request for a group-registering process to register a new content-processing apparatus 10 in the apparatus group.

If the determination result produced at the step S78 indicates the requested group-registering process is not permitted, the group management server 32 transmits an error message indicating that the requested group-registering process is not permitted to the content-processing apparatus 10. If the determination result produced at the step S78 indicates the requested group-registering process is permitted, on the other hand, at the next step S80, the group management server 32 registers the content-processing apparatus 10 making the request for a group-registering process in the apparatus group. To put it concretely, the group management server 32 writes and registers the terminal and recorder IDs received from the content-processing apparatus 10 making the request for a group-registering process in a record included in the group-registering database 324 as a record allocated to the authenticated user. Then, at the next step S82, the group management server 32 transmits a registering completion notice to the registered content-processing apparatus 10.

Subsequently, receiving the registering completion notice at a step S84, the content-processing apparatus 10 validates the service data received at the step S74. Then, at the next step S86, the content-processing apparatus 10 generates group IDs, that is, both the first group ID and the second group ID, on the basis of the leaf ID included in the validated service data. The content-processing apparatus 10 then registers the generated group IDs on the source-ID list owned by the content-processing apparatus 10. Thus, the content-processing apparatus 10 becomes capable of reproducing a distributed content having the registered group ID added thereto. In addition, the content-processing apparatus 10 is also capable of registering a recorder ID included in a group certificate G having the registered group ID on the source-ID list L owned by the content-processing apparatus 10.

After the group-registering process to register a content-processing apparatus 10 in an apparatus group has been completed, a process to issue a certificate and a process to distribute the issued certificate may be carried out at subsequent steps described as follows. First of all, at a step S88 the newly registered content-processing apparatus 10 issues a group certificate G including leaf and recorder IDs assigned to the newly registered content-processing apparatus 10, transmitting the issued group certificate G to the certificate management server 36. Then, at a step S90, the certificate management server 36 stores the received group certificate G in the certificate database 364. Thus, if another content-processing apparatus 10 has been registered in the same apparatus group as the newly registered content-processing apparatus 10, the group certificate G distributed to the other content-processing apparatus 10 allows the other content-processing apparatus 10 to share the recorder ID included in the group certificate G.

In addition, one or more other content-processing apparatus 10 may have already been registered in the same apparatus group as the newly registered content-processing apparatus 10. In this case, at the next step S92, the certificate management server 36 transmits the group certificates G of the other already registered content-processing apparatus 10 to the newly registered content-processing apparatus 10. Then, at a step S94, the newly registered content-processing apparatus 10 reads out a recorder ID from each of the group certificates G and stores the recorder ID on the source-ID list L owned by the newly registered content-processing apparatus 10. In this way, the newly registered content-processing apparatus 10 becomes capable of reproducing a ripping content ripped off by any of the other content-processing apparatus 10 already registered in the same apparatus group.

Figure 15:
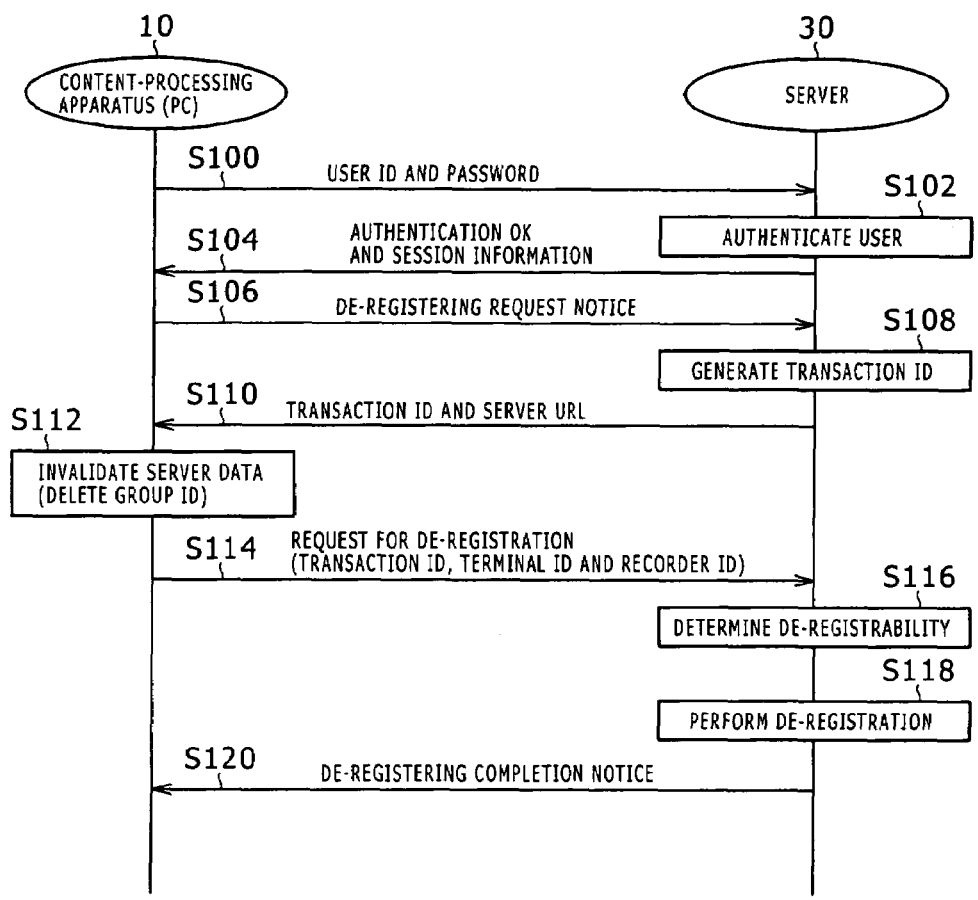
[FIG. 15]

By referring to FIG. 15, the following description explains a group-de-registering process to remove the content-processing apparatus 10 (PC) provided by the embodiment from an apparatus group, in which the content-processing apparatus 10 has been registered. FIG. 15 shows timing charts representing the group-de-registering process to de-register the content-processing apparatus 10 (PC) of the embodiment.

As shown in FIG. 15, first of all, at steps S100 to S110, a communication connection through the network 5 between the content-processing apparatus 10 making a request for a group-de-registering process and the servers 30 is safely established, and the user of the content-processing apparatus 10 is authenticated. The processes of the steps S100 to S110 are carried out by the browser of the content-processing apparatus 10 in conjunction with the WWW server 31 functioning as one of the servers 30. It is to be noted that, except a process carried out by the content-processing apparatus 10 at a step S106 to transmit a notice making a request for a group-de-registering process to the WWW server 31, processes carried out at the steps S100 to S110 are about the same as the processes carried out at the steps S60 to S70 of the timing charts explained earlier by referring to FIG. 14 to register a content-processing apparatus 10 in an apparatus group. Thus, the detailed descriptions of the processes are not repeated.

At subsequent steps S112 to S120, the content-processing apparatus 10 is actually de-registered from the group management server 32. Processes of the steps S112 to S120 are carried out by the copyright management section employed in the content-processing apparatus 10 in conjunction with the group management server 32 functioning as one of the servers 30.

To put it concretely, first of all, at the step S112, the content-processing apparatus 10 invalidates the service data received from the group management server 32 and stored in the content-processing apparatus 10 in a group-registering process. To put it more concretely, the content-processing apparatus 10 deletes group and recorder IDs from the source-ID list L owned by the content-processing apparatus 10. By deleting these source IDs, the content-processing apparatus 10 becomes no longer capable of reproducing a content having any of these source IDs added thereto.

Then, at the next step S114, the content-processing apparatus 10 transmits the transaction ID received at the step S110 as well as terminal and recorder IDs owned by the content-processing apparatus 10 itself to the group management server 32 in order to request the group management server 32 to de-register the content-processing apparatus 10 from the apparatus group. It is to be noted that, since the information transmitted at the step S114 is protected by using the session information against external interpolations, the transmitted information can be delivered with a high degree of safety.

When the group management server 32 receives the request for a group-de-registering process from the content-processing apparatus 10 at a step S116, the group management server 32 produces a result of determination as to whether or not the content-processing apparatus 10 can be de-registered from the apparatus group. If the content-processing apparatus 10 making the request for a group-de-registering process has not been registered, the request is an illegal request or the like, for example, the group management server 32 does not accept the request.

If the determination result produced at the step S116 indicates that the content-processing apparatus 10 cannot be de-registered, the group management server 32 transmits a message indicating that the content-processing apparatus 10 cannot be de-registered to the content-processing apparatus 10.

If the determination result produced at the step S116 indicates that the content-processing apparatus 10 can be de-registered, on the other hand, the group management server 32 carries out the process to de-register the content-processing apparatus 10 from the apparatus group at the next step S118. To put it concretely, the group management server 32 deletes the terminal ID of the content-processing apparatus 10 making the request for the group-de-registering process from a record stored in the group-registering database 324 as the record allocated to the authenticated user owning the content-processing apparatus 10. At that time, the recorder ID of the content-processing apparatus 10 making the request for the group-de-registering process is not deleted from the record stored in the group-registering database 324, being left in the group-registering database 324. Thus, in offering the ripping-content-sharing service, it is possible to avoid an operation to register too many content-processing apparatus 10 each having a ripping function. As a result, it is possible to solve a problem caused by sharing of ripping contents generated by too many content-processing apparatus 10 each having a ripping function.

Then, at the next step S120, the group management server 32 transmits a de-registering process completion notice to the content-processing apparatus 10 that has just been de-registered from the apparatus group.

As described above, in a process to de-register a content-processing apparatus 10 from an apparatus group, first of all, the content-processing apparatus 10 invalidates the service data at the step S112. Then, the group management server 32 carries out the process to de-register the content-processing apparatus 10 from the apparatus group at the step S118. Thus, with regard to the content-processing apparatus 10 de-registered from the apparatus group, the service data held by the content-processing apparatus 10 is certainly invalidated by deletion of group and recorder IDs from the source-ID list L owned by the content-processing apparatus 10. As a result, it is possible to avoid a situation in which the service data is not actually invalidated in the content-processing apparatus 10 in spite of the fact that the content-processing apparatus 10 has been de-registered from the group management server 32.

The processes to register and de-register a content-processing apparatus 10 (PC) have been described so far. It is to be noted that an already registered content-processing apparatus 10 cannot be re-registered unless the content-processing apparatus 10 is once de-registered.

Figure 16:
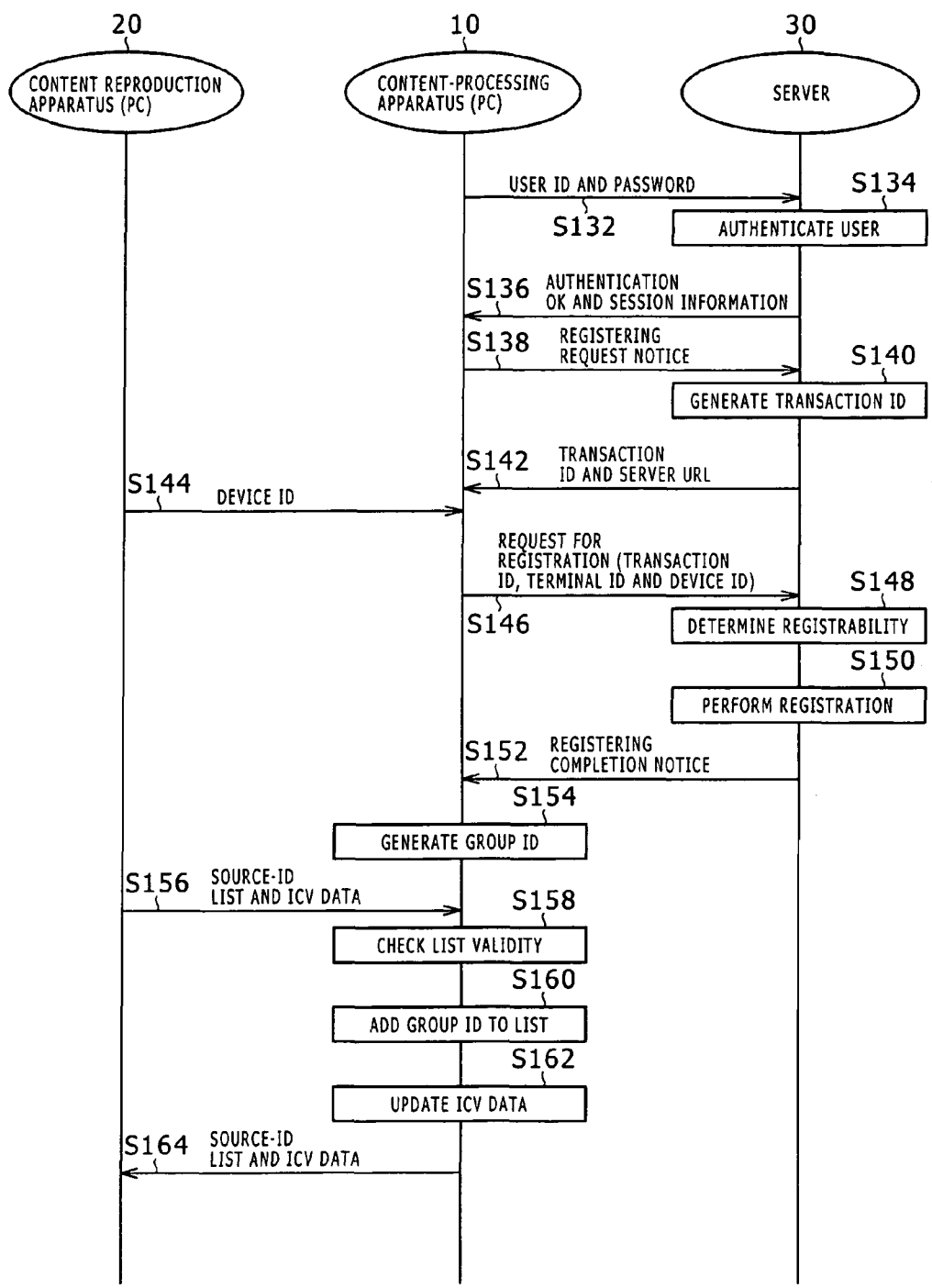
[FIG. 16]

By referring to FIG. 16, the following description explains a group-registering process to register a content reproduction apparatus 20 (PD) provided by the embodiment in an apparatus group managed by the group management server 32. FIG. 16 shows timing charts representing the group-registering process to register the content reproduction apparatus (PD) provided by the embodiment.

In a process to register a content reproduction apparatus 20 (PD), first of all, the content reproduction apparatus 20 is connected to an already registered a content-processing apparatus 10 (PC) by a local line 9. Then, the content-processing apparatus 10 (PC) registers the content reproduction apparatus 20 (PD) in an apparatus group.

As shown in FIG. 16, first of all, at steps S132 to S142, operations are carried out to safely establish a connection through the network 5 between the servers 30 and the content-processing apparatus 10 already connected to the content reproduction apparatus 20 to be registered. During these operations, the user of the content-processing apparatus 10 actually making a request for a group-registering process is authenticated. The processes of the steps S132 to S142 are carried out by the browser of the content-processing apparatus 10 in conjunction with the WWW server 31 functioning as one of the servers 30. It is to be noted that, except a process carried out by the content-processing apparatus 10 at a step S138 to transmit a notice making a request for a group-registering process of registering the content reproduction apparatus 20 to the WWW server 31, processes carried out at the steps S132 to S142 are about the same as the processes carried out at the steps S60 to S70 of the timing charts explained earlier by referring to FIG. 14 to register a content-processing apparatus 10 in an apparatus group. Thus, the detailed descriptions of the processes are not repeated.

Then, at subsequent steps S144 to S164, the content-processing apparatus 10 carries out processes to actually register the content reproduction apparatus 20 in the group management server 32. The processes of the steps S144 to S164 are carried out jointly by the content reproduction apparatus 20, the copyright management section employed in the content-processing apparatus 10 and the group management server 32 functioning as a server included in the servers 30.

To put it concretely, first of all, at the step S144, the content-processing apparatus 10 acquires the device ID of the content reproduction apparatus 20 to be registered from the content reproduction apparatus 20 through a local line 9. Then, at a step S146, the content-processing apparatus 10 transmits the transaction ID received at the step S142, a terminal ID assigned to the content-processing apparatus 10 and the recorder ID of the content reproduction apparatus 20 to the group management server 32 in order to request the group management server 32 to carry out a group-registering process to register the content reproduction apparatus 20. It is to be noted that, since the information exchanged at the step S144 is protected by using the session information against external interpolations, the exchanged information can be transmitted and received with a high degree of safety.

Then, at a step S148, the group management server 32 produces a result of determination as to whether or not the content reproduction apparatus 20 can be registered in an apparatus group. In this embodiment, there is no limit on the number of content reproduction apparatus 20 that can be registered in the group management server 32. Thus, the content reproduction apparatus 20 is registered in an apparatus group unconditionally. However, the implementations of the present invention are not limited to this embodiment. That is to say, it is possible to set a limit on the number of content reproduction apparatus 20 that can be registered in the group management server 32. In addition, if the content-processing apparatus 10 making the request for a group-registering process is an apparatus not registered yet in the group management server 32, the group management server 32 will turn down the request.

If the determination result produced at the step S148 indicates the requested group-registering process is not permitted, the group management server 32 transmits an error message indicating that the requested group-registering process is not permitted to the content-processing apparatus 10.

If the determination result produced at the step S148 indicates the requested group-registering process is permitted, on the other hand, at the next step S150, the group management server 32 carries out the process to register the content reproduction apparatus 20 in the apparatus group. To put it concretely, first of all, the group management server 32 identifies a record included in the group-registering database 324 as a record provided for the authenticated user on the basis of information including a terminal ID assigned to the content-processing apparatus 10 making the request for the group-registering process. Then, the group management server 32 writes the device ID assigned to the content reproduction apparatus 20 to be registered in the record. Furthermore, at the next step S152, the group management server 32 transmits a registering completion notice to the content-processing apparatus 10 making the request for the group-registering process.

Subsequently, receiving the registering completion notice at a step S154, the content-processing apparatus 10 generates group IDs, that is, both the first group ID and the second group ID, on the basis of the leaf ID included in the validated service data received in a process to register the content-processing apparatus 10 itself in the apparatus group.

Then, at the next step S156, the content-processing apparatus 10 acquires a source-ID list L and ICV data, which are owned by the registered content reproduction apparatus 20, from the content reproduction apparatus 20.

Subsequently, at the next step S158, the content-processing apparatus 10 checks validity of the source-ID list L received at the step S156 on the basis of the ICV data also received at the step S156. As described above, in accordance with the copyright management scheme adopting the group management method, the ICV data includes a MAC value, which is the hash value of the source-ID list L. Thus, the content-processing apparatus 10 computes the MAC value of the source-ID list L received from the content-processing apparatus 10 and compares the computed MAC value with the MAC value included in the ICV data in order to produce a result of determination as to whether or not the source-ID list L has been interpolated.

If the process carried out at the step S158 to check the validity of the source-ID list L produces a determination result indicating that the source-ID list L is invalid, that is, the source-ID list L has been interpolated, the invalidity of the source-ID list L is regarded as occurrence of an error. In this case, the source-ID list L is not updated.

If the process carried out at the step S158 to check the validity of the source-ID list L produces a determination result indicating that the source-ID list L is valid, on the other hand, the content-processing apparatus 10 updates the source-ID list L owned by the content reproduction apparatus 20 at the next step S160. To put it concretely, the content-processing apparatus 10 adds the group ID generated at the step S154 to the source-ID list L received from the content reproduction apparatus 20. At that time, the content-processing apparatus 10 may also add the recorder ID included in its own source-ID list L to the source-ID list L received from the content reproduction apparatus 20.

Then, at the next step S162, the content-processing apparatus 10 further updates the ICV data of the content reproduction apparatus 20. To put it concretely, the content-processing apparatus 10 computes the MAC value of the source-ID list L, which was updated at the step S160 into a new source-ID list L of the content reproduction apparatus 20, and generates new ICV data to include the computed MAC value.

Later on, at the next step S164, the content-processing apparatus 10 transmits the source-ID list L updated at the step S160 and the ICV data updated at the step S162 to the content reproduction apparatus 20, which then stores the source-ID list L and the ICV data in a storage section employed in the content reproduction apparatus 20. It is to be noted that, at the steps S156 and S164, the ICV data is exchanged between the content-processing apparatus 10 and the content reproduction apparatus 20 by using session information to prevent the ICV data from being interpolated.

By carrying out a group-processing process to register a content reproduction apparatus 20 in an apparatus group as described above, the group ID is added to the source-ID list L of the content reproduction apparatus 20 so that the content reproduction apparatus 20 becomes capable of reproducing a distributed content having the group ID added thereto.

Figure 17:
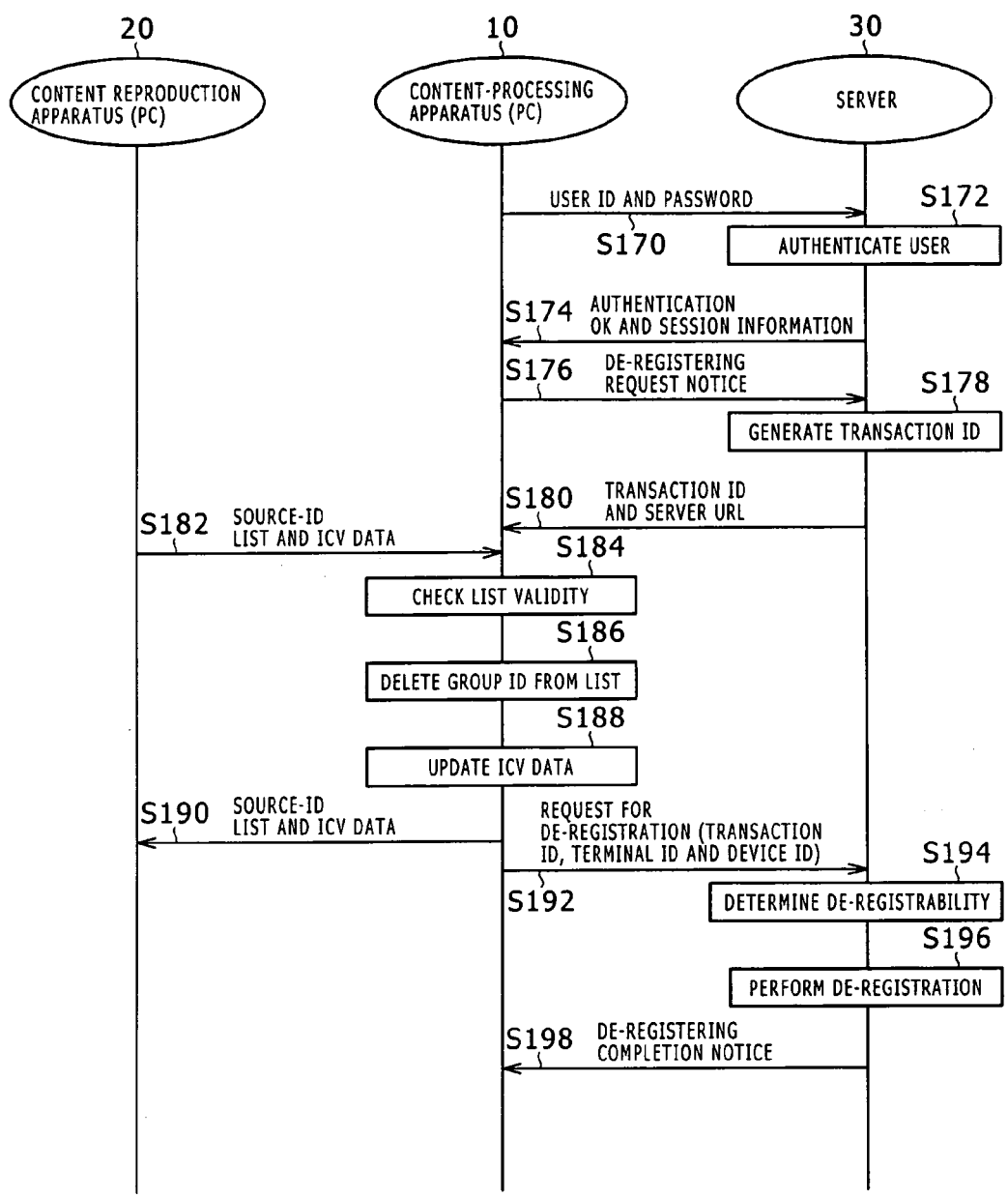
[FIG. 17]

By referring to FIG. 17, the following description explains a group-de-registering process to remove the content reproduction apparatus 20 (PD) provided by the embodiment from an apparatus group, in which the content reproduction apparatus 20 has been registered. FIG. 17 shows timing charts representing the group-de-registering process to de-register the content reproduction apparatus 20 (PD) of the embodiment.

Much like the group-registering process to register the content reproduction apparatus 20 (PD) provided by the embodiment into an apparatus group, the group-de-registering process to remove the content reproduction apparatus 20 (PD) provided by the embodiment from an apparatus group is carried out by the content-processing apparatus 10 (PC) requesting the servers 30 to carry out the group-de-registering process after the PD has been connected to the PC by a local line 9.

As shown in FIG. 17, first of all, at steps S170 to S180, operations are carried out to safely establish a connection through the network 5 between the servers 30 and the content-processing apparatus 10 making a request for a group-de-registering process. During these operations, the user of the content-processing apparatus 10 actually making a request for a group-registering process is authenticated. The processes of the steps S170 to S180 are carried out by the browser of the content-processing apparatus 10 in conjunction with the WWW server 31 functioning as one of the servers 30. It is to be noted that, except a process carried out by the content-processing apparatus 10 at a step S176 to transmit a notice making a request for a group-de-registering process of de-registering the content reproduction apparatus 20 to the WWW server 31, processes carried out at the steps S170 to S180 are about the same as the processes carried out at the steps S60 to S70 of the timing charts explained earlier by referring to FIG. 14 to register a content-processing apparatus 10 in an apparatus group. Thus, the detailed descriptions of the processes are not repeated.

Then, at subsequent steps S182 to S198, processes are actually carried out to de-register the content processing-apparatus 10. The processes of the steps S182 to S198 are carried out jointly by the copyright management section employed in the content-processing apparatus 10 making the request for a group-de-registering process and the group management server 32 functioning as a server included in the servers 30.

To put it concretely, first of all, at the step S182, the content-processing apparatus 10 acquires the source-ID list L and the ICV data, which are owned by the content reproduction apparatus 20 to be de-registered, from the content reproduction apparatus 20.

Then, at the next step S184, in the same way as the step S158, the content-processing apparatus 10 checks validity of the source-ID list L received at the step S182 on the basis of the ICV data also received at the step S182. If the process to check the validity of the source-ID list L produces a determination result indicating that the source-ID list L is invalid, that is, the source-ID list L has been interpolated, the invalidity of the source-ID list L is regarded as occurrence of an error. In this case, the source-ID list L is not updated.

If the process carried out at the step S184 to check the validity of the source-ID list L produces a determination result indicating that the source-ID list L is valid, on the other hand, the content-processing apparatus 10 updates the source-ID list L owned by the content reproduction apparatus 20 at the next step S186. To put it concretely, the content-processing apparatus 10 deletes the group ID from the source-ID list L received from the content reproduction apparatus 20. At that time, the content-processing apparatus 10 may also delete its recorder ID from the source-ID list L. Thus, the content reproduction apparatus 20 is no longer capable of reproducing a content including these deleted source IDs.

Then, at the next step S188, the content-processing apparatus 10 further updates the ICV data of the content reproduction apparatus 20. To put it concretely, the content-processing apparatus 10 computes the MAC value of the source-ID list L updated at the step S186 into a new source-ID list L of the content reproduction apparatus 20, and generates new ICV data to include the computed MAC value.

Later on, at the next step S190, the content-processing apparatus 10 transmits the source-ID list L updated at the step S186 and the ICV data updated at the step S188 to the content reproduction apparatus 20, which then stores the source-ID list L and the ICV data in a storage section employed in the content reproduction apparatus 20.

Then, at the next step S192, the content-processing apparatus 10 requests the group management server 32 to carry out a process to remove the content reproduction apparatus 20 to be de-register from the apparatus group. To put it concretely, the content-processing apparatus 10 transmits the transaction ID received at the step S180, the terminal ID of its own and the device ID of the content reproduction apparatus 20 to be de-registered to the group management server 32 in order to request the group management server 32 to carry out a group-de-registering process. It is to be noted that, since the information transmitted at the step S192 is protected by using the session information against external interpolations, the transmitted information can be delivered with a high degree of safety.

When the group management server 32 receives the request for a group-de-registering process from the content-processing apparatus 10 at a step S194, the group management server 32 produces a result of determination as to whether or not the content reproduction apparatus 20 can be de-registered from the apparatus group. If the request for a group-de-registering process is an illegal request, for example, the group management server 32 does not accept the request.

If the determination result produced at the step S194 indicates that the content reproduction apparatus 20 cannot be de-registered, the group management server 32 transmits a message indicating that the content reproduction apparatus 20 cannot be de-registered to the content-processing apparatus 10.

If the determination result produced at the step S194 indicates that the content reproduction apparatus 20 can be de-registered, on the other hand, the group management server 32 carries out the process to de-register the content reproduction apparatus 20 from the apparatus group at the next step S196. To put it concretely, first of all, the group management server 32 identifies a record included in the group-registering database 324 as a record provided for the authenticated user on the basis of information including a terminal ID assigned to the content-processing apparatus 10 making the request for the group-registering process. Then, the group management server 32 deletes the device D of the content reproduction apparatus 20 to be de-registered from the apparatus group.

Then, at the next step S198, the group management server 32 transmits a de-registering process completion notice to the content-processing apparatus 10 making the request for a group-de-registering process.

As described above, in a process to de-register a content reproduction apparatus 20 from an apparatus group, first of all, the content-processing apparatus 10 deletes the group ID from the source-ID list L of the content reproduction apparatus 20 at the step S186. Then, at the step S196, the group management server 32 carries out the process to de-register a content reproduction apparatus 20 from the apparatus group. Thus, with regard to the content reproduction apparatus 20 de-registered from the apparatus group by the group management server 32, the group ID can be certainly deleted from the source-ID list L of the content reproduction apparatus 20. As a result, it is possible to get rid of a situation in which the group ID is left in the actual source-ID list L owned by the content reproduction apparatus 20 regardless of the fact that the content reproduction apparatus 20 has been de-registered from the group management server 32.

The above descriptions have explained basic flows of the group-registering/de-registering processes to register and de-register a content-processing apparatus 10 (PC) and a content reproduction apparatus 20 (PD). The group-registering/de-registering processes allow the owner of the content-processing apparatus 10 and the content reproduction apparatus 20 to be changed. That is to say, the group of the content-processing apparatus 10 can be changed by carrying out the group-de-registering process and, then, the group-registering process.

It is to be noted that, even when a content-processing apparatus 10 having a ripping function is newly registered in an apparatus group or when the group of the content-processing apparatus 10 is changed, the recorder ID assigned to the content-processing apparatus 10 does not change. Thus, even after the content-processing apparatus 10 is newly registered in an apparatus group or after the group of the content-processing apparatus 10 is changed, any apparatus pertaining to the same apparatus group as the content-processing apparatus 10 is capable of freely reproducing a content, which is ripped off by the content-processing apparatus 10 before the content-processing apparatus 10 is newly registered in an apparatus group or before the group of the content-processing apparatus 10 is changed. As a result, convenience offered by a content-processing apparatus 10 having a ripping function to the user is enhanced and there is a merit to purchase such a content-processing apparatus 10.

8. Reproduction Control Adopting the Group Management Method

Figure 18:
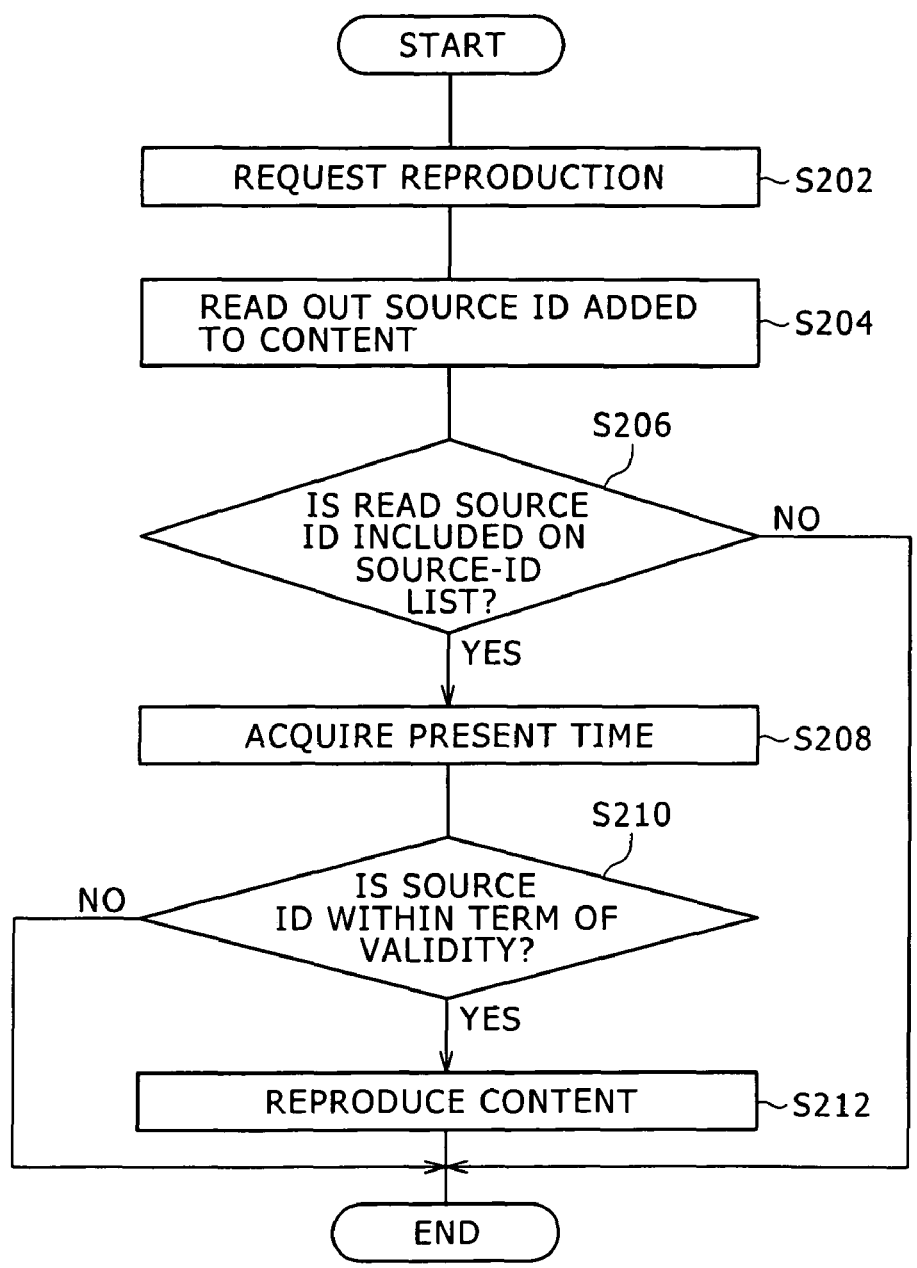
[FIG. 18]

By referring to FIG. 18, the following description explains processing to control reproduction of a content by adoption of the group management method in a content-processing apparatus 10 provided by the embodiment. FIG. 18 shows a flowchart representing a content reproduction control process carried out by a content-processing apparatus 10 (PC) provided by the embodiment, in accordance with the group management method. The processing to control reproduction of a content by adoption of the group management method is a process to control reproduction of a content on the basis of a source ID added to the content and a source-ID list L.

As shown in FIG. 18, first of all, at a step S202, for example, a user makes a request for reproduction of a desired content. The step S202 is referred to as a content-reproduction request step. To put it concretely, the user operates the input apparatus 108 of the content-processing apparatus 10 to select the desired content and enters a command to the content reproduction section 170 as a command requesting the content reproduction section 170 to reproduce the selected content.

Then, at the next step S204, a source ID added to the content is read out from the content. To put it in detail, at the step S204, first of all, the reproducibility determination section 172 employed in the content reproduction section 170 reads out the content, the reproduction of which is desired, from the content database 116, a storage medium 7 or other storage means. Then, the reproducibility determination section 172 reads out a source ID included in a license added to the content.

Then, at the next step S206, the source ID read out from the content is compared with those included on the source-ID list L of the content-processing apparatus 10 in order to determine as to whether or not the source ID matches any one of those on the source-ID list L. To put it concretely, at the step S206, first of all, the reproducibility determination section 172 employed in the content reproduction section 170 reads out the source-ID list L from the storage section 111. Then, the reproducibility determination section 172 compares the source ID read out from the content with those included on the source-ID list L in order to produce a result of determination as to whether or not the source ID is included on the source-ID list L.

If the result of the determination indicates that the source ID read out from the content is included on the source-ID list L, the reproducibility determination section 172 permits the reproduction of the content. In this case, the flow of the content-reproduction control processing goes on to a step S208. If the result of the determination indicates that the source ID read out from the content is not included on the source-ID list L, on the other hand, the reproducibility determination section 172 does not permit the reproduction of the content. In this case, the content-reproduction control processing is ended.

At the step S208, the present time is acquired. To put it in detail, at the step S208, the reproducibility determination section 172 acquires the present time from a timer apparatus (not shown in the figure) embedded in the content-processing apparatus 10.

At the next step S210, the acquired present time is examined to produce a result of determination as to whether or not the present time is still within a validity term of the source ID read out from the content. To put it concretely, at the step S210, first of all, the reproducibility determination section 172 reads out a validity term for a source ID, which has been read out from the content, from the source-ID list L. The validity term for the source ID read out from the license has been stored on the source-ID list L by for example being associated with the source ID.

Then, the reproducibility determination section 172 produces a result of determination as to whether or not the acquired present time is still within the validity term of the source ID. If the result of the determination indicates that the acquired present time is no longer within the validity term of the source ID, the validity term of the source ID is determined to have been expired. In this case, the reproducibility determination section 172 doe not permit reproduction of the content, ending the content-reproduction control processing.

If the result of the determination indicates that the acquired present time is still within the validity term of the source ID, on the other hand, the reproducibility determination section 172 permits reproduction of the content. Then, the flow of the content-reproduction control processing goes on to a step S212. At the step S212, the reproduction execution section 174 reproduces the content.

As described above, the processing to control reproduction of a content by adopting the group management method provided by the embodiment is carried out on the basis of a source ID included on the source-ID list L as a source ID added to the content and a validity term of the source ID. In accordance with the processing to control reproduction of contents, for each source ID, the validity term is set as the validity term of reproduction of a content to which the source ID is added and used as a criterion as to whether or not the content is a content that can be reproduced. It is to be noted that such a validity term is not always set for each source ID.

Figure 19:
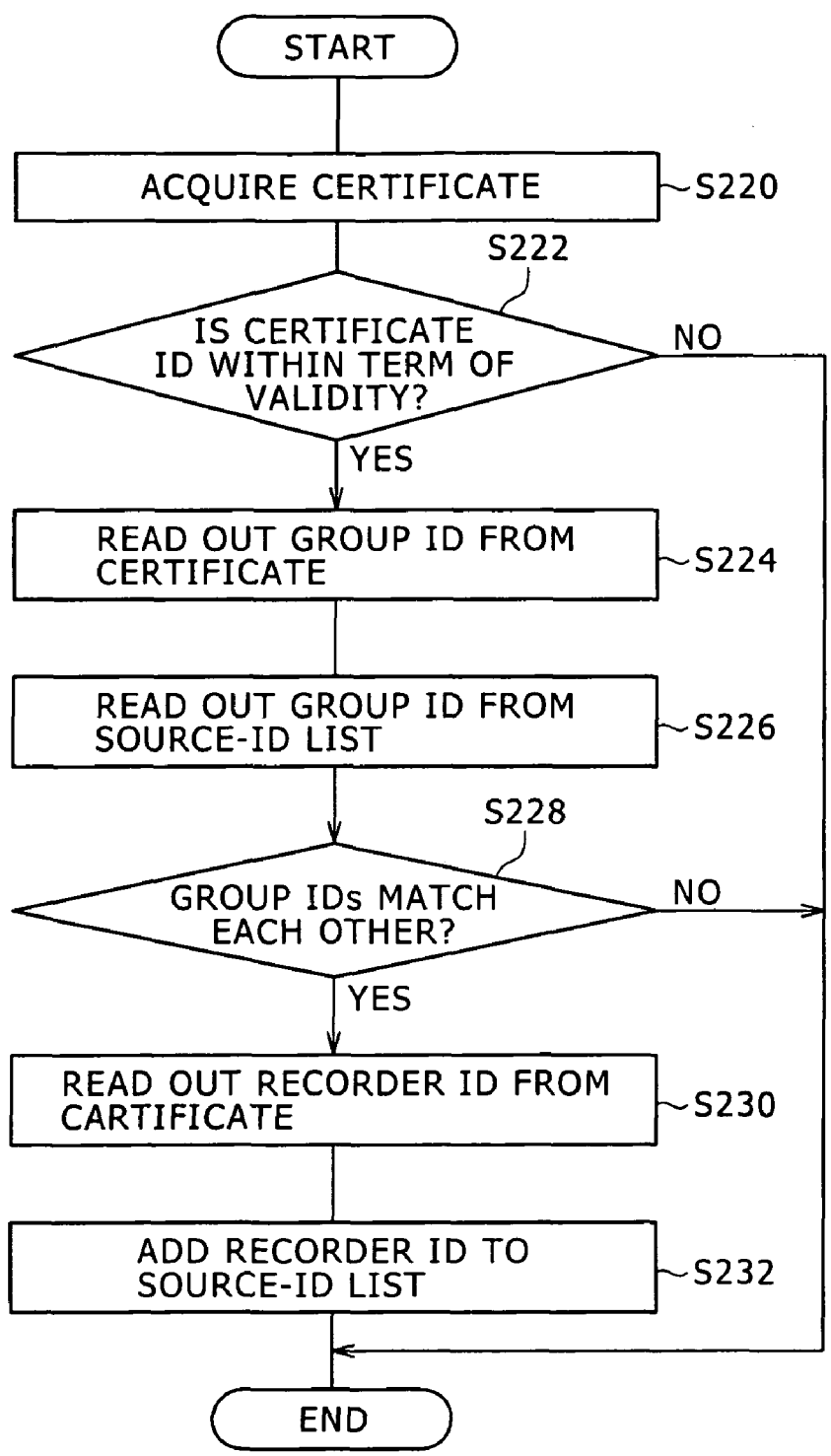
[FIG. 19]

9. Processing to Update a Source-ID List According to the Group Management Method By referring to FIG. 19, the following description explains a process carried out by a content-processing apparatus 10 (PC) provided by the embodiment, to update a source-ID list L. FIG. 19 shows a flowchart representing the process to update a source-ID list L in a content-processing apparatus 10 provided by the embodiment. The process to update a source-ID list L as represented by the flowchart shown in the figure is a typical process carried out by a content-processing apparatus 10 to update its own source-ID list L or the source-ID list L of a content reproduction apparatus 20 connected to the content-processing apparatus 10 by a local line on the basis of a received group certificate G.

The flowchart shown in FIG. 19 begins with a step S220 at which the content-processing apparatus 10 receives a group certificate G distributed from another content-processing apparatus 10 or the certificate management server 36. The content-processing apparatus 10 receives the group certificate G distributed by way of the network 5 and/or a local line 9, or by means of a storage medium 7. In the case of a storage medium 7 used as means for distributing the group certificate G, the content-processing apparatus 10 is capable of acquiring the group certificate G by reading out the group certificate G from the storage medium 7 delivered to the content-processing apparatus 10.

Then, at the next step S222, the content-processing apparatus 10 produces a result of determination as to whether or not the validity term of the received group certificate G has been expired. To put it concretely, at the step S222, first of all, the list-updating section 140 employed in the content-processing apparatus 10 reads out a validity term from the group certificate G and acquires the present time from a timer apparatus embedded in the content-processing apparatus 10. Then, the list-updating section 140 produces a result of determination as to whether or not the present time is still within the validity term of the group certificate G. If the result of determination indicates that the present time is still within the validity term of the group certificate G, the flow of the list-updating processing goes on to a step S224. If the result of determination indicates that the present time is no longer within the validity term of the group certificate G, on the other hand, the list-updating section 140 ends the list-updating processing without updating the source-ID list L.

If the flow of the list-updating processing goes on to the step S224, the list-updating section 140 reads out a group ID from the received group certificate G at the step S224.

Then, at the next step S226, the list-updating section 140 acquires a group ID of the content-processing apparatus 10 employing the list-updating section 140. In the case of this embodiment, in a content-processing apparatus 10, group IDs are kept on the source-ID list L owned by the content-processing apparatus 10. Thus, at the step S226, the list-updating section 140 reads out a group ID of the content-processing apparatus 10 from the source-ID list L.

Then, at the next step S228, the list-updating section 140 compares the group ID read out from the received group certificate G with the group ID read out from the source-ID list L as the group ID of the content-processing apparatus 10 in order to produce a result of determination as to whether or not the group ID read out from the received group certificate G matches the group ID of the content-processing apparatus 10. If the result of the determination indicates that the group ID read out from the received group certificate G matches the group ID of the content-processing apparatus 10, the list-updating section 140 permits the processing to update the source-ID list L. In this case, the flow of the list-updating processing goes on to a step S230. If the result of the determination indicates that the group ID read out from the received group certificate G does not match the group ID of the content-processing apparatus 10, on the other hand, the list-updating section 140 does not permit the processing to update the source-ID list L. In this case, the flow of the list-updating processing is ended.

At the step S230, the list-updating section 140 adds a recorder ID included in the group certificate G to the source-ID list L. To put it concretely, at the step S230, the list-updating section 140 reads out the recorder ID from the received group certificate G and writes the recorder ID into the source-ID list L. Thus, the content-processing apparatus 10 becomes capable of reproducing a ripping content including the recorder ID added thereto. Upon completion of the process carried out at this step, the processing to update the source-ID list L on the basis of a group certificate G is ended.

The descriptions given so far have explained basic configurations of the content-sharing system 100 and the content-sharing method adopted in the content-sharing system 100. In the content-sharing system 100, it is possible to implement the copyright management adopting the group management method and the copyright management based on the check-in/check-out method conforming to the SDMI.

If the copyright management based on the group management method is implemented in the content-sharing system 100, contents to be shared by a plurality of apparatus in the content-sharing system 100 are managed in content-source units, that is, in content-providing-user units or content-providing-apparatus units. To be more specific, reproduction of contents in a content-processing apparatus 10 is restricted in accordance with sources providing the contents in order to execute management of copyrights of the contents. That is to say, a process to share contents among apparatus is allowed or disallowed in management, which is executed with the content-providing source used as a unit of management.

Thus, if the source providing a content is an illegal content-providing source, the content-processing apparatus 10 acquiring contents is capable of prohibiting reproduction of all contents acquired from the illegal source providing the contents. As s result, illegal acts can be avoided effectively. Examples of the illegal acts are an act to distribute a large number of ripping contents to a large number of unspecified users and an act to make a distributed content downloadable to the public by way of the Internet.

If the source providing a specific content is a legal content-providing source, on the other hand, once the source ID of the legal source providing the specific content is registered on the source-ID list L to allow the specific content to be shared by the apparatus owning the source-ID list L, any other content provided by this legal content-providing source can be reproduced by the apparatus with a high degree of freedom even if the other content is different from the specific content. Thus, a content can be copied from an apparatus to another one among a plurality of apparatus in the domain of private use. As a result, it is possible to implement copyright management close to the conventional analog-content distribution system allowing a content to be copied an unlimited number of times as long as the copies of the content are used in the domain of private use.

Accordingly, the content-sharing system 100 according to the embodiment is capable of:

(1) carrying out a copyright management function to avoid illegal content utilization such as making no payment to a content distribution service or other services; and (2) increasing the degree of freedom to properly utilize paid contents in the domain of private use of the contents.

In addition, in the copyright management processing based on the group management method, as a rule, a process to register the source ID of a content source on the source-ID list L of an apparatus needs to be carried out only once at a registering time in the content distribution service or the ripping-content-sharing service. Thus, the copyright management processing based on the group management method can be made efficient in comparison with the copyright management processing based on the conventional check-in/check-out method whereby a copyright of a content is controlled each time the content is copied, that is, every time the content is checked out and checked in.

Content-processing apparatus 10 and content reproduction apparatus 20 are registered in an apparatus group provided for the user owning the content-processing apparatus 10 or the content reproduction apparatus 20 so that a content can be copied from any one of the content-processing apparatus 10 or the content reproduction apparatus 20 to another one within the same apparatus group with a high degree of freedom to be utilized in the other content-processing apparatus 10 or content reproduction apparatus 20. Furthermore, since it is not necessary to be aware of the copy source of the content and the number of copying operations carried out so far, the user hardly feels the existence of the copyright management system. In the domain of private use of contents, it is thus possible to raise the degree of freedom given to the user as well as the level of convenience offered to the user and, hence, carry out user-friendly copyright management.

10. Local Registration

Figure 20A:
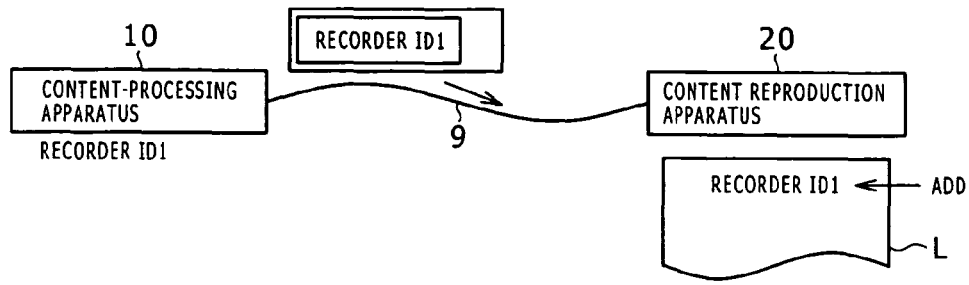
[FIG. 20(a)]
Figure 20B:
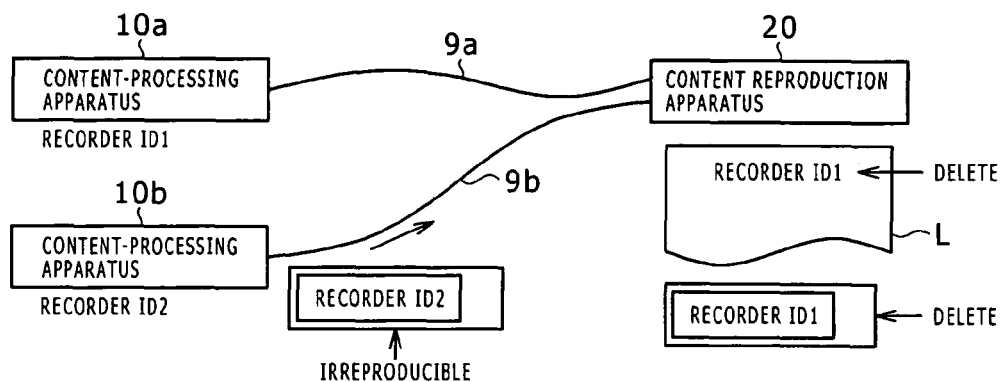
[FIG. 20(b)]
Figure 20C:
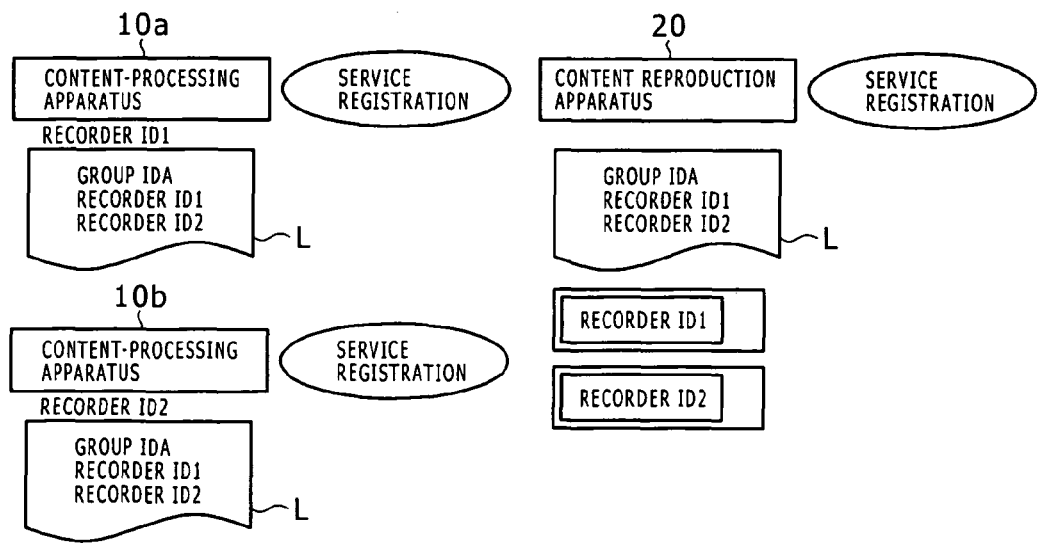
[FIG. 20(c)]

By referring to FIGS. 20(a) to 20(c), the following description explains details of a local registering process carried out in a copyright management system (that is, the content-sharing system 100) adopting the group management method provided by the embodiment. FIGS. 20(a) to 20(c) are explanatory diagrams each showing an outline configuration of a local-registering process according to the embodiment.

As shown in FIGS. 20(a) to 20(c), as a premise of a local registering process, the recorder ID of only one content-processing apparatus 10 can be registered on the source-ID list L owned by a content reproduction apparatus 20 by carrying out the local registering process. That is to say, the content reproduction apparatus 20 is capable of identifying only one content-processing apparatus 10 and reproducing a content data (or a content) ripped off by the content-processing apparatus 10.

To put it in detail, when the content-processing apparatus 10 having recorder ID1 as its recorder ID is connected to the content reproduction apparatus 20 by a cable (a local line 9) through an interface such as the USB as shown in FIG. 20(a), recorder ID1 is registered on the source-ID list L owned by the content reproduction apparatus 20. That is to say, it is possible to carry out a local registering process on the content reproduction apparatus 20 for the content-processing apparatus 10 having recorder ID1 in order to register recorder ID1 on the source-ID list L owned by the content reproduction apparatus 20.

It is to be noted that a series of local registering processes according to the embodiment will be described later. As explained above, however, the recorder ID of only one content-processing apparatus 10 can be registered on the source-ID list L owned by a content reproduction apparatus 20. Thus, for example, if another recorder ID has been recorded on the source-ID list L and a content related to the recorder ID has been stored in the content reproduction apparatus 20, a local registering process cannot be carried out.

By registering recorder ID1 of the content-processing apparatus 10 on the source-ID list L held by the content reproduction apparatus 20 as shown in FIG. 20(a), the content reproduction apparatus 20 becomes capable of reproducing a content generated in a ripping process carried out by the content reproduction apparatus 20 having recorder ID1. It is to be noted that, as shown in FIG. 20(a), recorder ID1 is attached to the content generated in a ripping process carried out by the content reproduction apparatus 20 having recorder ID1.

Next, as shown in FIG. 20(b), a local registering process has been applied to the content reproduction apparatus 20 for a content-processing apparatus 10a connected to the content reproduction apparatus 20 by a local line 9a as a content-processing apparatus 10 having recorder ID1. In this state, the content reproduction apparatus 20 is connected a content-processing apparatus 10b having recorder ID2 by a local line 9b. When the content reproduction apparatus 20 makes an attempt to acquire a content including recorder ID2 in order to reproduce the content, the content reproduction apparatus 20 is not capable of reproducing the content. This is because the recorder ID that has been registered on the source-ID list L owned by the content reproduction apparatus 20 is recorder ID1.

Even if the content reproduction apparatus 20 makes an attempt to register recorder ID2 on the source-ID list L, the content reproduction apparatus 20 is not capable of registering this recorder ID thereon since recorder ID1 has been registered on the source-ID list L. Thus, a local registering process cannot be applied to the content reproduction apparatus 20 for a content-processing apparatus 10b having recorder ID2 in order to register recorder ID2 on the source-ID list L owned by the content reproduction apparatus 20.

In order for the content reproduction apparatus 20 to reproduce the content including recorder ID2, it is necessary to erase recorder ID1, which has already been registered on the source-ID list L owned by the content reproduction apparatus 20, from the source-ID list L and delete the content including recorder ID1 from the content reproduction apparatus 20. That is to say, it is necessary to carry out a local de-registering process on the content reproduction apparatus 20.

The local de-registering process applied to the content reproduction apparatus 20 for the content-processing apparatus 10a is a process to delete the recorder ID of the content-processing apparatus 10a from the source-ID list L owned by the content reproduction apparatus 20. The local de-registering process can be initiated by not only a content-processing apparatus 10 identified by the recorder ID to be deleted from the source-ID list L, but also any other content-processing apparatus 10 connected to the content reproduction apparatus 20 by a local line 9.

In addition, the operation to delete the recorder ID can be carried out as part of a process to initialize a recording section such as an HDD employed in the content reproduction apparatus 20 by deleting all data including data recorded on the source-ID list L from the recording section. By deleting the recorder ID from the source-ID list L, a local de-registering process can be newly carried out.

If the operations are carried out to erase recorder ID1 from the source-ID list L and delete the content including recorder ID1 from the recording section, the content-processing apparatus 10b is capable of having recorder ID2 of the content-processing apparatus 10b itself registered on the source-ID list L owned by the content reproduction apparatus 20. That is to say, a local registering process can be applied to the content reproduction apparatus 20 for the content-processing apparatus 10b.

It is to be noted that, if the content reproduction apparatus 20 already subjected to a local registering process is subjected to another local registering process for another content-processing apparatus 10 in order to register the recorder ID of the other content-processing apparatus 10 on the source-ID list L, as described above, as a typical implementation of the local registering process, it is necessary to erase the recorder ID of the specific content reproduction apparatus 20 from the source-ID list L and delete the content including the recorder ID from the recording section. However, the local de-registering process is not limited to this typical implementation. For example, it is also possible to provide a configuration in which a local registering process is carried out by merely deleting the recorder ID from the source-ID list L owned by the content reproduction apparatus 20 and, by carrying out a local de-registering process in this way, another local registering process can be carried out for another content-processing apparatus 10 in order to register the recorder ID of the other content-processing apparatus 10 on the source-ID list L.

As shown in FIG. 20(c), recorder ID1 is deleted from the source-ID list L owned by the content reproduction apparatus 20 and recorder ID2 of the content-processing apparatus 10b is then registered on the source-ID list L so that the content reproduction apparatus 20 becomes capable of reproducing a content acquired from the content-processing apparatus 10b as a content including recorder ID2.

By referring to FIGS. 21(a) to 21(c), the following description explains a source-ID list L owned by a content-processing apparatus 10 already subjected to a group-registering process or a content reproduction apparatus 20 already subjected to a local registering process.

As shown in FIG. 21(a), a content-processing apparatus 10a has recorder ID1, a content-processing apparatus 10b has recorder ID2 and a content reproduction apparatus 20 has already been subjected to a local registering process. It is to be noted that the local registering process has been applied to the content reproduction apparatus 20 for the content-processing apparatus 10a having recorder ID1 in order to register recorder ID1 on the source-ID list L owned by the content reproduction apparatus 20 so that a content including recorder ID1 has been stored in the content reproduction apparatus 20.

Then, as shown in FIG. 21(b), the content-processing apparatus 10a having recorder ID1 carries out a service-registering process, which is also referred to as the group-registering process, for apparatus group IDA in order to add apparatus group IDA to the source-ID list L owned by the content-processing apparatus 10b. It is to be noted that, since recorder ID1 is the own recorder ID, recorder ID1 is already included.

By the same token, the content-processing apparatus 10b having recorder ID2 carries out a service-registering process for apparatus group IDA in order to add apparatus group IDA to the source-ID list L owned by the content-processing apparatus 10b.

As described above, apparatus group IDA is created on the source-ID list L owned by each of the apparatus as an apparatus group of the apparatus having the same group ID. Then, a group-registering process can be carried on the apparatus to add the recorder ID of each of the apparatus to the apparatus group created on the source-ID list L owned by each of the apparatus.

To put it concretely, as shown in FIG. 21(b), recorder ID1 of the content-processing apparatus 10 is added to apparatus group IDA created on the source-ID list L owned by the content-processing apparatus 10b having recorder ID2. By the same token, recorder ID2 is added to the source-ID list L owned by the content-processing apparatus 10a having recorder ID1.

It is to be noted that the timing to add recorder ID to the source-ID list L owned by the content-processing apparatus 10 as shown in FIG. 21(b) can be for example a timing with which the content-processing apparatus 10 makes an access to the group management server 32 and receives a group certificate G from the group management server 32. However, the timing to add another recorder ID to the source-ID list L is not limited to such an example. In addition, when a content-processing apparatus 10 receives a group certificate G, the content-processing apparatus 10 can add all recorder IDs associated with a group ID included in the group certificate G to the source-ID list L owned by the content-processing apparatus 10. It is needless to say that all the recorder IDs include the newly added recorder ID mentioned above.

The access cited above is a generic term of processing to process information by using the network 5 as means for communicating the information. Examples of the processing to process information by using the network 5 as means for communicating the information are utilization of the content-sharing system 100, connection to a server, reference to a file, saving of a file, deletion of a file and modification of a file.

As described above, the content-processing apparatus 10a has already been subjected to a service-registering process with respect to apparatus group IDA. Then, if a service-registering process with respect to apparatus group IDA is further applied to the content reproduction apparatus 20 already subjected to a local registering process for the content-processing apparatus 10a having recorder ID1 in order to register recorder ID1 in the source-ID list L owned by the content reproduction apparatus 20, apparatus group IDA is registered on the source-ID list L owned by the content reproduction apparatus 20. Then, recorder ID2 of the content-processing apparatus 10b is added to the source-ID list L owned by the content reproduction apparatus 20 as shown in FIG. 21(c).

Thus, the content reproduction apparatus 20 already subjected to a service-registering program with respect to apparatus group IDA is capable of reproducing contents stored in the content reproduction apparatus 20 as contents resulting from ripping processes carried out by the content-processing apparatus 10a having recorder ID1 and the content-processing apparatus 10b having recorder ID2.

It is to be noted that by carrying out a service-registering process on the content reproduction apparatus 20, first of all, apparatus group IDA is registered on the source-ID list L owned by the content reproduction apparatus 20 as described above. Then, other recorder IDs included in apparatus group IDA such as the recorder ID2 are all added on the source-ID list L owned by the content reproduction apparatus 20. The timing to add recorder ID2 to the source-ID list L owned by the content reproduction apparatus 20 is for example the timing to connect the content reproduction apparatus 20 to the content-processing apparatus 10b having recorder ID2 by using a local line 9. However, the timing is not limited to the case with this example.

Figure 22:
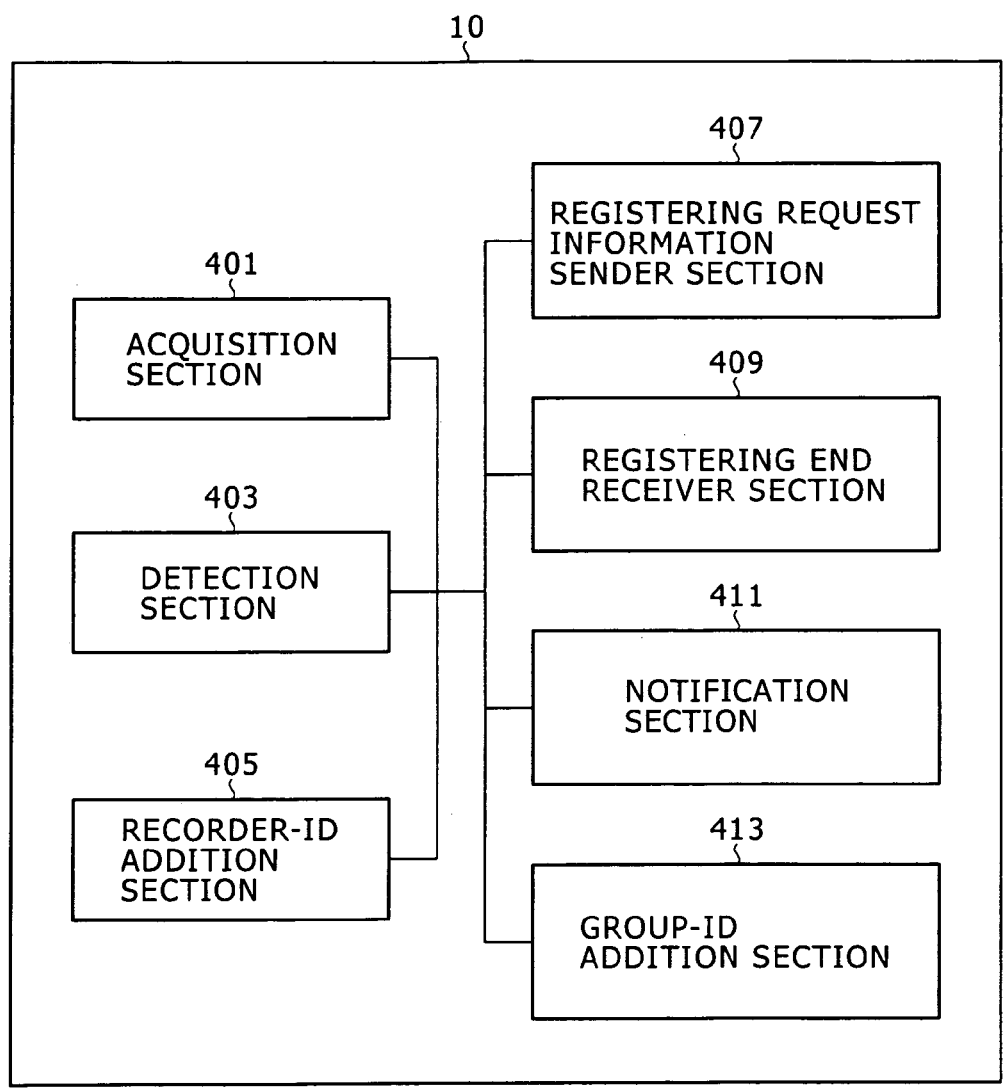
FIG. 22 is a block diagram showing an outline configuration of a group-registering section employed in a content-processing apparatus according to the same embodiment.

By referring to FIG. 22, the following description explains configuration elements related to a group-registering section employed in a content-processing apparatus 10. FIG. 22 is a block diagram showing an outline configuration of a group-registering section employed in a content-processing apparatus 10 according to the embodiment.

As shown in FIG. 22, the group-registering section employed in a content-processing apparatus 10 includes an acquisition section 401, a detection section 403, a recorder-ID addition section 405, a registering request information transmission section 407, a registering end reception section 409, a notification section 411 and a group-ID addition section 413.

The acquisition section 401 is a unit for acquiring a source-ID list L owned by a content reproduction apparatus 20 connected to the content-processing apparatus 10. The source-ID list L owned by a content reproduction apparatus 20 connected to the content-processing apparatus 10 is also referred to as a second source-ID list L. It is to be noted that the ICV data of the content reproduction apparatus 20 is also acquired along with the source-ID list L and the MAC value of the source-ID list L is computed to be compared with a MAC value included in the ICV data. That is to say, the computed MAC value is compared with the MAC value included in the ICV data acquired separately from the source-ID list L as data used for detection of interpolation in order to make sure that the source-ID list L has not been interpolated. The data used for detection of interpolation is generated in the content-processing apparatus 10 on the basis of the acquired source-ID list L.

The detection section 403 is a unit for producing a result of determination as to whether or not the content reproduction apparatus 20, the source-ID list L of which has been acquired by the acquisition section 401, has been subjected to a service-registering process. In addition, the detection section 403 also produces a result of determination as to whether or not the recorder ID of its own content-processing apparatus 10 is on the source-ID list L acquired from the content reproduction apparatus 20. Its own content-processing apparatus 10 is the content-processing apparatus 10 employing the detection section 403 or the content-processing apparatus 10 acquiring the source-ID list L owned by the content reproduction apparatus 20.

The recorder-ID addition section 405 is a unit for adding the recorder ID of its own content-processing apparatus 10 to the source-ID list L acquired by the acquisition section 401 from the content reproduction apparatus 20, which serves as a source providing the source-ID list L, and storing the source-ID list L including the added recorder ID in a storage apparatus.

A condition imposed by the recorder-ID addition section 405 as a condition for adding the recorder ID to the source-ID list L will be described later. As a typical condition for adding the recorder ID to the source-ID list L, the recorder-ID addition section 405 may impose a condition requiring that, as indicated by a determination result produced by the detection section 403, the content reproduction apparatus 20 serving as a source providing the source-ID list L has not been subjected to a service-registering process and recorders ID other than the recorder of its own content-processing apparatus 10 have not been registered on the source-ID list L. In this case, its own content-processing apparatus 10 is the content-processing apparatus 10 employing the recorder-ID addition section 405 or the content-processing apparatus 10 acquiring the source-ID list L owned by the content reproduction apparatus 20.

As described above, the recorder-ID addition section 405 is a unit for adding the recorder ID of its own content-processing apparatus 10 to the source-ID list L received from the content reproduction apparatus 20. It is to be noted, however, that the recorder-ID addition section 405 does not necessarily carry out this function. For example, the recorder-ID addition section 405 may also add the recorder ID of its own content-processing apparatus 10 to the source-ID list L already held by the content-processing apparatus 10.

The registering request information transmission section 407 is a unit for receiving a request entered to the content-processing apparatus 10 by the user operating an input section such as a mouse as a request for execution of a service-registering process on the content-processing apparatus 10 or a content reproduction apparatus 20. The registering request information transmission section 407 passes the request for execution of a service-registering process to a transmission section. It is to be noted that the transmission section transmits the request for execution of a service-registering process to the group management server 32 by way of a network.

The registering end reception section 409 is a unit for receiving a notice transmitted by the group management server 32 receiving the request for execution of a service-registering process by way of the network as a registering completion notice revealing completion of the service-registering process. It is to be noted that, if the execution of the service-registering process applied to the content-processing apparatus 10 or the content reproduction apparatus 20 is not completed normally, however, such a registering completion notice will not be received from the group management server 32. That is to say, the group management server 32 will transmit a registering error notice in place of a registering completion notice to the content-processing apparatus 10.

The notification section 411 is a unit for displaying information such as recommendation of a service-registering process on a display screen employed in the content-processing apparatus 10. In addition, the information displayed on the display screen may include recommendation to delete a content from a content reproduction apparatus 20 as a content associated with a recorder ID not relevant to the content-processing apparatus 10. An operation to delete a content is also referred to as an operation to initialize the content. It is to be noted that the displayed information such as recommendation of a service-registering process not only appears on the display screen employed in the content-processing apparatus 10 but the information may also appear on the display screen employed in the content reproduction apparatus 20.

The group-ID addition section 413 is a unit for adding a group ID recorded on the source-ID list L owned by the content-processing apparatus 10 to the source-ID list L owned by the content reproduction apparatus 20 upon reception of the registering completion notice by the registering end reception section 409. To put it concretely, the group-ID addition section 413 adds the group ID to the source-ID list L acquired by the acquisition section 401.

In addition, a function almost identical with the function of the group-ID addition section 413 can also be implemented in a configuration including the group-ID-updating section 149 explained earlier by referring to FIG. 8. That is to say, the group-ID-updating section 149 may for example add a group ID to the source-ID list L.

Figure 23:
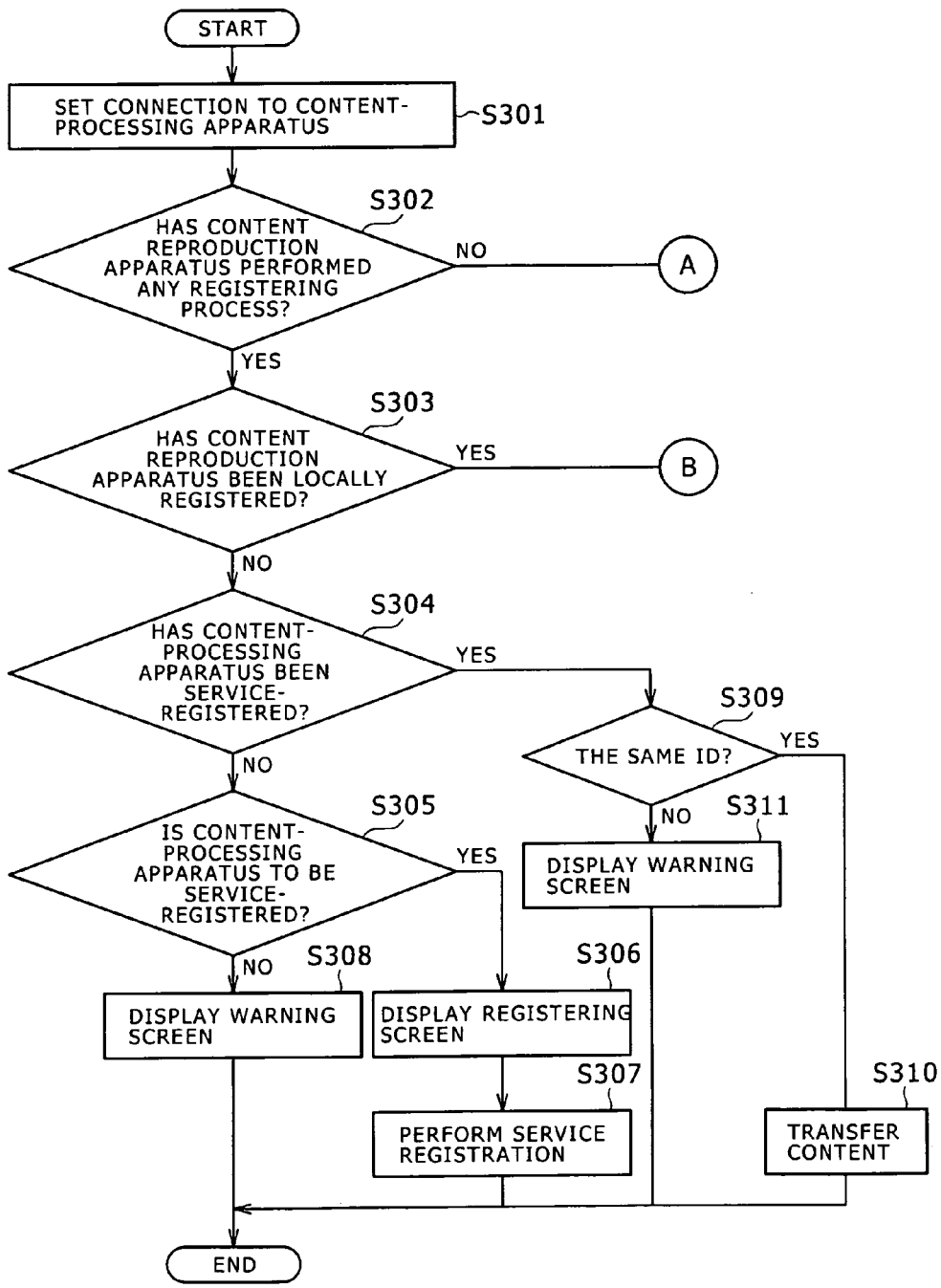
[FIG. 23]
Figure 24:
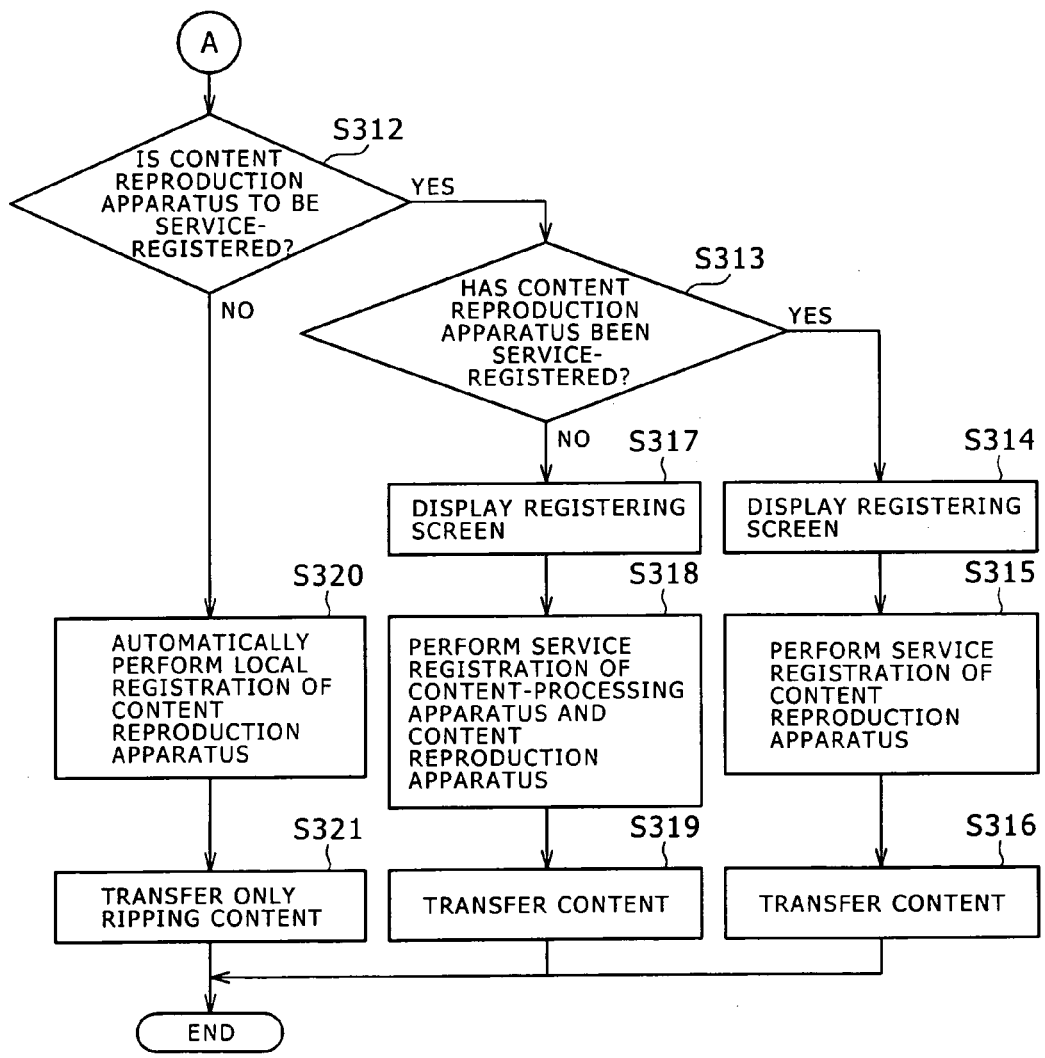
[FIG. 24]
Figure 25:
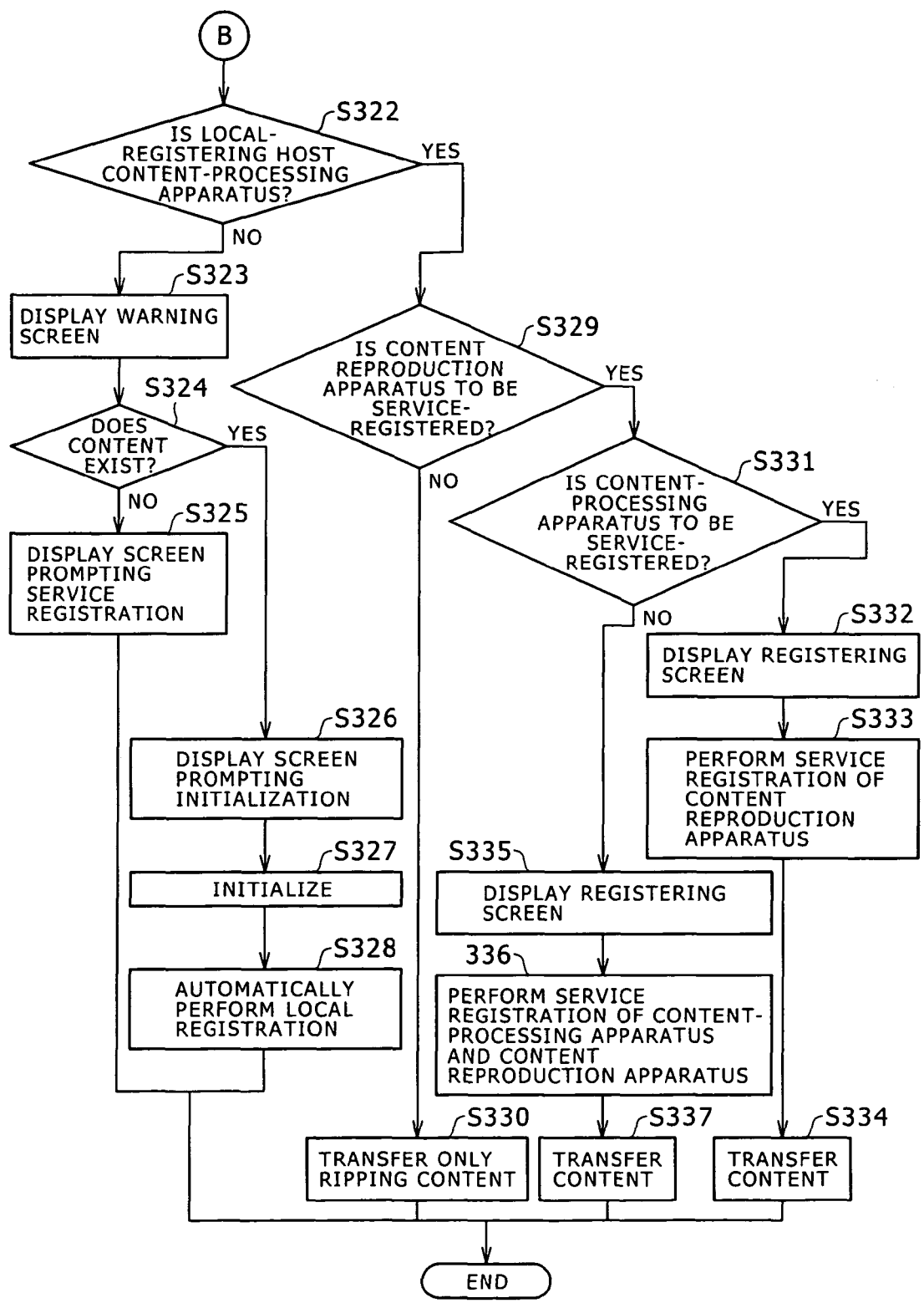
[FIG. 25]

By referring to FIGS. 23 to 25, the following description explains a series of registering processes including an automatic local registering process for a content reproduction apparatus 20 provided by the embodiment.

A flowchart shown in FIG. 23 begins with a step S301 at which, as the content reproduction apparatus 20 is connected to a content-processing apparatus 10 by a cable (a local line 9), the acquisition section 401 employed in the content-processing apparatus 10 acquires a source-ID list L owned by the content reproduction apparatus 20 connected to the content-processing apparatus 10 by the local line 9.

Then, after the acquisition section 401 acquires the source-ID list L from the content reproduction apparatus 20, at the next step S302, the detection section 403 produces a result of determination as to whether or not the content reproduction apparatus 20 has been subjected to some registering processes on the basis of the source-ID list L. For example, the detection section 403 produces a result of determination as to whether or not the source-ID list L owned by the content reproduction apparatus 20 includes the source ID or a recorder ID assigned to its own content-processing apparatus 10 serving as the content-processing apparatus 10 acquiring the source-ID list L.

If the group ID is included on the source-ID list L owned by the content reproduction apparatus 20, the detection section 403 produces a determination result indicating that the content reproduction apparatus 20 has been subjected to a service-registering process, which is also referred to as a group-registering process. If the recorder ID is not included on the source-ID list L, on the other hand, the detection section 403 produces a determination result indicating that the content reproduction apparatus 20 has been subjected to a local registering process.

If the determination result produced at the step S302 indicates that the content reproduction apparatus 20 has been subjected to some registering processes such as a local registering process or a service-registering process, the flow of the registering processing goes on to a step S303 at which the detection section 403 produces a result of determination as to whether or not the content reproduction apparatus 20 has been subjected to a local registering process. If the determination result produced at the step S303 indicates that the content reproduction apparatus 20 has not been subjected to a local registering process, the flow of the registering processing goes on to a step S304 at which the detection section 403 produces a result of determination as to whether or not the content-processing apparatus 10 has been subjected to a service-registering process. It is to be noted that the detection section 403 produces a result of determination as to whether or not the content-processing apparatus 10 has been subjected to a service-registering process by determining whether or not the source-ID list L owned by the content-processing apparatus 10 includes the group ID. As described before, the source-ID list L owned by the content-processing apparatus 10 is referred to as the first source-ID list.

If the determination result produced by the detection section 403 at the step S304 indicates that the content-processing apparatus 10 has not been subjected to a service-registering process, that is, if the content reproduction apparatus 20 connected by a cable (a local line 9) to the content-processing apparatus 10 has not been subjected to a local registering process and the content-processing apparatus 10 has not been subjected to a service-registering process, the flow of the registering processing goes on to a step S305 at which the notification section 411 generates a service-registering warning to prompt the group management server 32 to carry out a service-registering process on the content-processing apparatus 10 and displays the service-registering warning on the display screen of the content-processing apparatus 10.

At the step S305, the user sees the service-registering warning displayed by the notification section 411 on the display screen and let us assume for example that the user wants the content-processing apparatus 10 to be subjected to a service-registering process. In this case, the flow of the registering processing goes on to a step S306 at which the notification section 411 displays a registering window for a service-registering process on the display screen.

Let us assume for example that the user operates the input section such as a mouse in accordance with the registering window appearing on the display screen to enter a command making a request for a service-registering process to the registering request information transmission section 407. In this case, the registering request information transmission section 407 transmits the request for a service-registering process to the group management server 32.

Then, at the next step S307, the content-processing apparatus 10 receives a registering completion notice indicating completion of the service-registering process from the group management server 32 and generates a group ID on the basis of a leaf ID. Subsequently, the group-ID addition section 413 adds the group ID to the source-ID list L owned by the content-processing apparatus 10 and ends the service-registering process. It is to be noted that a recorder ID pertaining to the group ID is registered on the source-ID list L owned by the content-processing apparatus 10 when the group ID is added to the source-ID list L.

Figure 26:
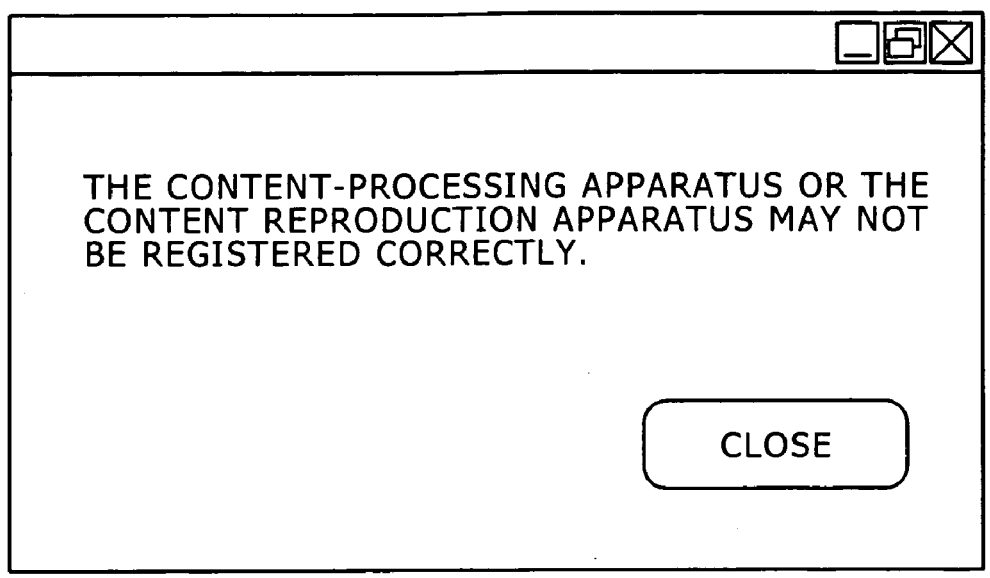
[FIG. 26]

If the user enters a response to the inquiry displayed on the screen at the step S305 to indicate that the user does not want the content reproduction apparatus 20 to be subjected to a service-registering process, on the other hand, the flow of the registering processing goes on to a step S308 at which a warning message like one shown in FIG. 26 is displayed on the display screen of the content-processing apparatus 10. The warning message shown in FIG. 26 notifies the user that the content reproduction apparatus 20 has not been registered correctly.

If the determination result produced by the detection section 403 at the step S304 indicates that the content-processing apparatus 10 has been subjected to a service-registering process, on the other hand, the flow of the registering processing goes on to a step S309 at which the detection section 403 compares the group ID registered on the source-ID list L owned by the content-processing apparatus 10 with the group ID registered on the source-ID list L owned by the content reproduction apparatus 20. If the result of the comparison indicates that the group ID registered on the source-ID list L owned by the content-processing apparatus 10 is the same as the group ID registered on the source-ID list L owned by the content reproduction apparatus 20, the flow of the registering processing goes on to a step S310 at which the content-processing apparatus 10 transmits a content indicated by the group ID registered on the source-ID list L owned by the content-processing apparatus 10 to the content reproduction apparatus 20.

If the comparison result produced at the step S309 indicates that the group ID registered on the source-ID list L owned by the content-processing apparatus 10 is not the same as the group ID registered on the source-ID list L owned by the content reproduction apparatus 20, on the other hand, the flow of the registering processing goes on to a step S311 at which the warning message shown in FIG. 26 as described earlier is displayed on the screen. In this case, the content-processing apparatus 10 is not allowed to transmit a content distributed by the content distribution server 34 to the content reproduction apparatus 20.

If the determination result produced at the step S302 indicates that the content reproduction apparatus 20 has not been subjected to any registering process, on the other hand, the flow of the registering processing goes on to a step S312 of the flowchart shown in FIG. 24. At this step, first of all, the notification section 411 displays a message recommending a service-registering process to the user on the display screen of the content-processing apparatus 10 along with a query about whether or not the content reproduction apparatus 20 is to be subjected to a service-registering process. If the user enters a response indicating that the content reproduction apparatus 20 is to be subjected to a service-registering process as the response, the flow of the registering processing goes on to a step S313 at which the detection section 403 produces a result of determination as to whether or not the content-processing apparatus 10 connected to the cable (local lines 9) has been subjected to a service-registering process.

If the determination result produced by the detection section 403 at the step S313 indicates that the content-processing apparatus 10 has been subjected to a service-registering process, the flow of the registering processing goes on to a step S314 at which a registering window for a service-registering process to be applied to the content reproduction apparatus 20 is displayed on the screen of the content-processing apparatus 10.

Let us assume for example that the user operates the input section such as a mouse in accordance with the registering window appearing on the display screen to enter a command making a request for a service-registering process to be applied to the content reproduction apparatus 20 to the registering request information transmission section 407. In this case, the registering request information transmission section 407 transmits the request for a service-registering process to the group management server 32.

Then, at the next step S315, the content-processing apparatus 10 receives a registering completion notice indicating completion of the service-registering process from the group management server 32. Subsequently, the group-ID addition section 413 adds a group ID to which the content-processing apparatus 10 pertains to the source-ID list L owned by the content reproduction apparatus 20 and ends the service-registering process. It is to be noted that a recorder ID pertaining to the group ID is registered on the source-ID list L owned by the content reproduction apparatus 20 when the group ID is added to the source-ID list L.

After the service-registering process carried out at the step S315 on the content reproduction apparatus 20 is completed, the content-processing apparatus 10 is allowed to transmit any content stored in the content-processing apparatus 10 as a content with the same group ID as that added to the source-ID list L owned by the content reproduction apparatus 20 to the content reproduction apparatus 20 at the next step S316.

If the determination result produced by the detection section 403 indicates that the content-processing apparatus 10 has not been subjected to a service-registering process, on the other hand, the flow of the registering processing goes on to a step S317. Then, the flow of the registering processing goes on to a step S318 to display a registering window for applying a service-registering process to the content-processing apparatus 10 and the content reproduction apparatus 20 on the display screen of the content-processing apparatus 10.

Let us assume for example that the user operates the input section such as a mouse in accordance with the registering window appearing on the display screen to enter a command making a request for a service-registering process to the registering request information transmission section 407. In this case, the registering request information transmission section 407 transmits the request for a service-registering process to the group management server 32.

It is to be noted that, at the step S318, a service-registering process is applied to both the content reproduction apparatus 20 and the content-processing apparatus 10. Information on the content reproduction apparatus 20 is entered to the content reproduction apparatus 20 to generate a request for the service-registering process and, by the same token, information on the content-processing apparatus 10 is entered to the content-processing apparatus 10 to generate a request for the service-registering process. The information includes a user ID and a password. As an alternative, in the case of a service-registering process to be applied to both the content reproduction apparatus 20 and the content-processing apparatus 10, information such as a user ID and password common to both the content reproduction apparatus 20 and the content-processing apparatus 10 is entered to automatically generate a request for the service-registering process. In accordance with the alternative, the operation carried out by the user to enter the information is simplified and the time to generate the request for the service-registering process is shortened.

To put it in detail, at the step S318, the content-processing apparatus 10 receives a registering completion notice revealing completion of the service-registering process applied to the content-processing apparatus 10 and the content reproduction apparatus 20 from the group management server 32 and generates a group ID on the basis of a leaf ID. Subsequently, the group-ID addition section 413 adds the group ID to the source-ID list L owned by the content-processing apparatus 10 as well as the source-ID list L owned by the content reproduction apparatus 20 and ends the service-registering process. It is to be noted that a recorder ID pertaining to the group ID is registered on the source-ID list L owned by the content-processing apparatus 10 and the source-ID list L owned by the content reproduction apparatus 20 when the group ID is added to the source-ID list L.

After the service-registering process carried out at the step S318 on the content reproduction apparatus 20 and the content-processing apparatus 10 is completed, the content-processing apparatus 10 is allowed to transmit any content stored in the content-processing apparatus 10 as a content with the same group ID as that added to the source-ID list L owned by the content-processing apparatus 10 to the content reproduction apparatus 20 at the next step S319.

If the user enters a response indicating that the content-processing apparatus 10 is not to be subjected to a service-registering process as a response to the service-registering recommendation information displayed by the notification section 411 on the screen at the step S312 after the user views the message, that is, the user does not want the content reproduction apparatus 20 to be subjected to a service-registering process in spite of the fact that the content reproduction apparatus 20 has not been subjected to any registering process, on the other hand, the flow of the registering processing goes on to a step S320, at which the recorder-ID addition section 405 employed in the content-processing apparatus 10 adds the recorder ID of the content-processing apparatus 10 employing the recorder-ID addition section 405 to an already acquired source-ID list L owned by the content reproduction apparatus 20. Then, the recorder-ID addition section 405 finds a MAC value of the updated source-ID list L as a MAC value to be included in ICV data associated with the updated source-ID list L, and generates the ICV data including the MAC value as data for detection of interpolation. Subsequently, the recorder-ID addition section 405 transmits the source-ID list L including the recorder ID and the data for detection of interpolation to the content reproduction apparatus 20 to be stored in the content reproduction apparatus 20.

As the local registering process is completed at the step S320 as described above, the content-processing apparatus 10 is allowed to transmit any content stored in the content-processing apparatus 10 as a content with the same recorder ID as that added to the source-ID list L to the content reproduction apparatus 20 at the next step S321. A content having a recorder ID is referred to as a ripping content.

Thus, if the content reproduction apparatus 20 has not been subjected to any registering process, the content-processing apparatus 10 automatically carries out a local registering process on the content-processing apparatus 10. The content reproduction apparatus 20 completing a local registering process is capable of acquiring a content stored in the content-processing apparatus 10 and reproducing the content even if the content reproduction apparatus 20 does not have a function to communicate with the content-processing apparatus 10 through a network such as the Internet. It is to be noted, however, that the content reproduction apparatus 20 is not capable of reproducing a content distributed by the content distribution server 34 unless the content reproduction apparatus 20 has completed a service-registering process.

If the determination result produced at the step S302 of the flowchart shown in FIG. 23 indicates that the content reproduction apparatus 20 has completed some registering processes and the determination result produced at the step S303 of the same flowchart indicates that the content reproduction apparatus 20 has completed a local-registering process, on the other hand, the flow of the registering processing goes on to a step S322 of a flowchart shown in FIG. 25. At this step, the content reproduction apparatus 20 is examined in order to produce a result of determination as to whether or not the content reproduction apparatus 20 is actually connected by a cable (a local line 9) to a content-processing apparatus 10 that has carried out the local-registering process on the content reproduction apparatus 20.

To put it in detail, the detection section 403 examines the source-ID list L owned by the content reproduction apparatus 20 in order to produce a result of determination as to whether or not the source-ID list L includes the same recorder ID as the recorder ID of the content-processing apparatus 10. If the result of the determination indicates that the source-ID list L owned by the content reproduction apparatus 20 includes the same recorder ID as the recorder ID of the content-processing apparatus 10, the detection section 403 determines that the content reproduction apparatus 20 is actually connected by a cable (a local line 9) to a content-processing apparatus 10 that has carried out the local-registering process on the content reproduction apparatus 20.

If the determination result produced at the step S322 indicates that the source-ID list L owned by the content reproduction apparatus 20 includes a recorder ID different from the recorder ID of the content-processing apparatus 10, the flow of the registering processing goes on to a step S323 at which a warning message is displayed on the screen of the content-processing apparatus 10. Then, the flow of the registering processing goes on to a step S324 to produce a result of determination as to whether or not a content has been stored in a storage apparatus employed in the content reproduction apparatus 20.

If the determination result produced at the step S324 indicates that no content has been stored in a storage section employed in the content reproduction apparatus 20, the flow of the registering processing goes on to a step S325 at which the notification section 411 generates a message recommending a service-registering process for prompting the group management server 32 to carry out a service-registering process for the content reproduction apparatus 20 and displays the message on the screen of the content-processing apparatus 10.

Figure 27:
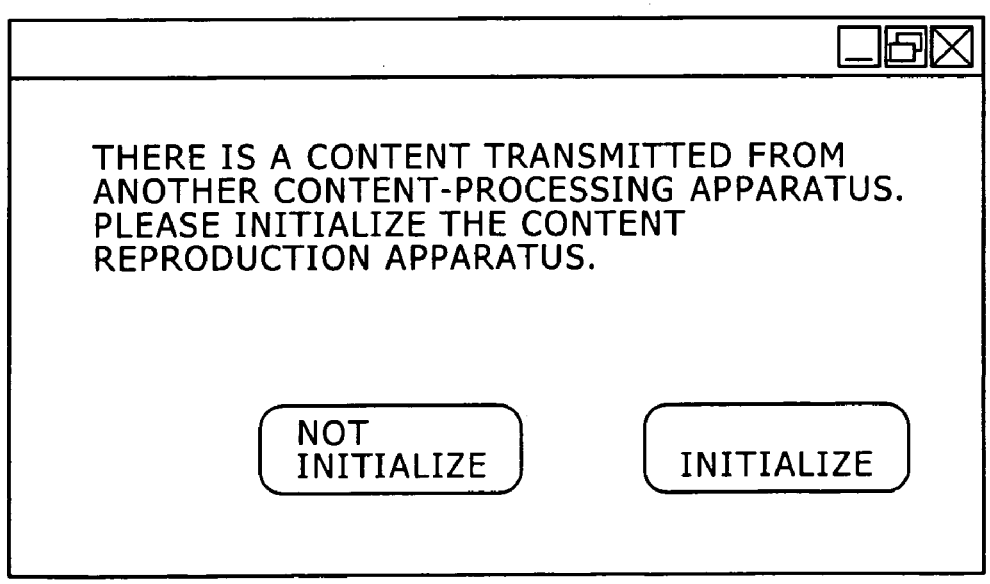
[FIG. 27]

If the determination result produced at the step S324 indicates that a content has been stored in a storage section employed in the content reproduction apparatus 20, on the other hand, the flow of the registering processing goes on to a step S326 at which a message for prompting the user to enter an input as to whether or not to select initialization as shown in FIG. 27 is displayed on the screen of the content-processing apparatus 10. As the user operates the input section to press an Initialize button appearing on the screen shown in FIG. 27, the flow of the registering processing goes on to a step S327 at which an initialization process is carried out to delete all data stored in the storage apparatus employed in the content reproduction apparatus 20.

As the process carried out at the step S327 to initialize the content reproduction apparatus 20 is completed, the flow of the registering processing goes on to a step S328 at which the recorder-ID addition section 405 employed in the content-processing apparatus 10 carries out a local registering process on the content reproduction apparatus 20. To put it concretely, at the step S328, first of all, the recorder-ID addition section 405 adds a recorder ID of the content-processing apparatus 10 employing the recorder-ID addition section 405 to the source-ID list L owned by the content reproduction apparatus 20. Then, the recorder-ID addition section 405 finds a MAC value of the updated source-ID list L as a MAC value to be included in ICV data associated with the updated source-ID list L, and generates the ICV data including the MAC value as data for detection of interpolation. Subsequently, the recorder-ID addition section 405 transmits the source-ID list L including the recorder ID and the data for detection of interpolation to the content reproduction apparatus 20 to be stored in the content reproduction apparatus 20.

Thus, by carrying out the process to initialize the content reproduction apparatus 20 at the step S327, a local de-registering process is carried out to de-register another content-processing apparatus 10 having a different recorder ID. Then, at the next step S328, a local registering process is carried out automatically on the content reproduction apparatus 20 to register the recorder ID of the content-processing apparatus 10, which is connected to the content reproduction apparatus 20 by a cable (a local line 9) as the content-processing apparatus 10 employing the recorder-ID addition section 405, on the source-ID list L.

If the determination result produced at the step S322 indicates that the source-ID list L owned by the content reproduction apparatus 20 includes the same recorder ID as the recorder ID of the content-processing apparatus 10, on the other hand, the flow of the registering processing goes on to a step S329 at which the notification section 411 displays a message recommending a service-registering process on the screen. If the user determines that a service-registering process is not to be applied to the content reproduction apparatus 20 after viewing the message displayed at the step S329, the flow of the registering processing goes on to a step S330 at which the content-processing apparatus 10 is capable of for example transmitting only a content, which has been stored in the storage apparatus employed in the content-processing apparatus 10 as a ripping content having the recorder ID of the content-processing apparatus 10 added thereto, to the content reproduction apparatus 20.

If the user determines that a service-registering process is to be applied to the content reproduction apparatus 20 after viewing the message displayed at the step S329, on the other hand, the flow of the registering processing goes on to a step S331 at which the detection section 403 produces a result of determination as to whether or not the content-processing apparatus 10 has been subjected to a service-registering process. If the result of the determination indicates that the content-processing apparatus 10 has been subjected to a service-registering process, the flow of the registering processing goes on to a step S332 at which a window for a service-registering process to be applied to the content reproduction apparatus 20 is displayed on the screen of the content-processing apparatus 10.

Then, when the user operates the input section such as a mouse in accordance with the registering window appearing on the display screen to enter a command making a request for a service-registering process to be applied to the content reproduction apparatus 20 to the registering request information transmission section 407, the registering request information transmission section 407 transmits the request for a service-registering process to the group management server 32.

As the content-processing apparatus 10 receives a registering completion notice revealing the completion of the service-registering process carried on the content reproduction apparatus 20 from the group management server 32 at the next step S333, the group-ID addition section 413 adds the group ID of an apparatus group, to which the content-processing apparatus 10 pertains, to the source-ID list L owned by the content reproduction apparatus 20, completing the service-registering process in the content-processing apparatus 10.

After the service-registering process applied to the content reproduction apparatus 20 is completed at the step S333, the flow of the registering processing goes on to a step S334 at which the content-processing apparatus 10 is capable of transmitting a content, which has been stored in the content-processing apparatus 10 as a content having the same group ID as that added to the source-ID list L owned by the content-processing apparatus 10, to the content-processing apparatus 10.

If the determination result produced at the step S331 indicates that the content-processing apparatus 10 has not been subjected to a service-registering process, on the other hand, the flow of the registering processing goes on to a step S335 at which a window for a service-registering process to be applied to the content-processing apparatus 10 and the content reproduction apparatus 20 is displayed on the screen of the content-processing apparatus 10.

When the user operates the input section such as a mouse in accordance with the registering window appearing on the display screen to enter a command making a request for a service-registering process to be applied to the content-processing apparatus 10 and the content reproduction apparatus 20 to the registering request information transmission section 407, the registering request information transmission section 407 transmits the request for a service-registering process to the group management server 32.

As the content-processing apparatus 10 receives a registering completion notice revealing completion of the service-registering process carried on the content-processing apparatus 10 and the content reproduction apparatus 20 from the group management server 32 at the next step S336, the content-processing apparatus 10 generates a group ID on the basis of a leaf ID, and the group-ID addition section 413 adds the generated group ID to the source-ID lists L owned by the content-processing apparatus 10 and the content reproduction apparatus 20, completing the service-registering process in the content-processing apparatus 10. It is to be noted that, when the group ID is added to the source-ID lists L, a recorder ID pertaining to the group ID is also added to the source-ID lists L.

After the service-registering process applied to the content-processing apparatus 10 and the content reproduction apparatus 20 is completed at the step S336, the flow of the registering processing goes on to a step S337 at which the content-processing apparatus 10 is capable of transmitting a content, which has been stored in the content-processing apparatus 10 as a content having the same group ID as that added to the source-ID list L owned by the content-processing apparatus 10, to the content reproduction apparatus 20.

In this embodiment, a content is transmitted from the content-processing apparatus 10 to the content reproduction apparatus 20 as is the case with the example described above. It is to be noted, however, that the embodiment is not limited to this typical implementation. That is to say, the embodiment can also be implemented into a configuration in which a content is transmitted from the content reproduction apparatus 20 to the content-processing apparatus 10.

In addition, in this embodiment, the acquisition section 401, the detection section 403, the recorder-ID addition section 405, the registering request information transmission section 407, the registering end reception section 409, the notification section 411 and the group-ID addition section 413, which together serve as a group-registering section in the content-processing apparatus 10, are each implemented by hardware as described above. However, the embodiment is not limited to this typical implementation. For example, at least one of these members can each be implemented by a program composed of one or more modules or components.

In addition, the series of processes described above can be carried out by special hardware or implemented by software. If the series of processes described above is implemented by software, programs composing the software are installed in content-processing apparatus 10, content reproduction apparatus 20, the servers 30 and other apparatus.

In this specification, processing steps of each of programs executed by computers of content-processing apparatus 10, content reproduction apparatus 20, the group management server 32 and other apparatus to carry out various kinds of processing do not have to be executed in an order prescribed by a flowchart along the time axis. That is to say, the steps may include processes carried out concurrently and/or individually as parallel processing or processing based on objects.

Figure 28:
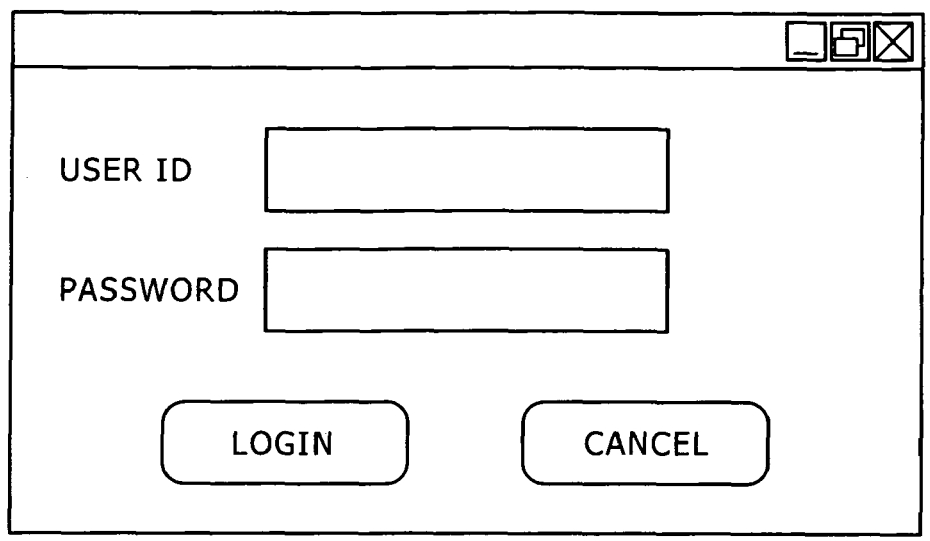
[FIG. 28]
Figure 29:
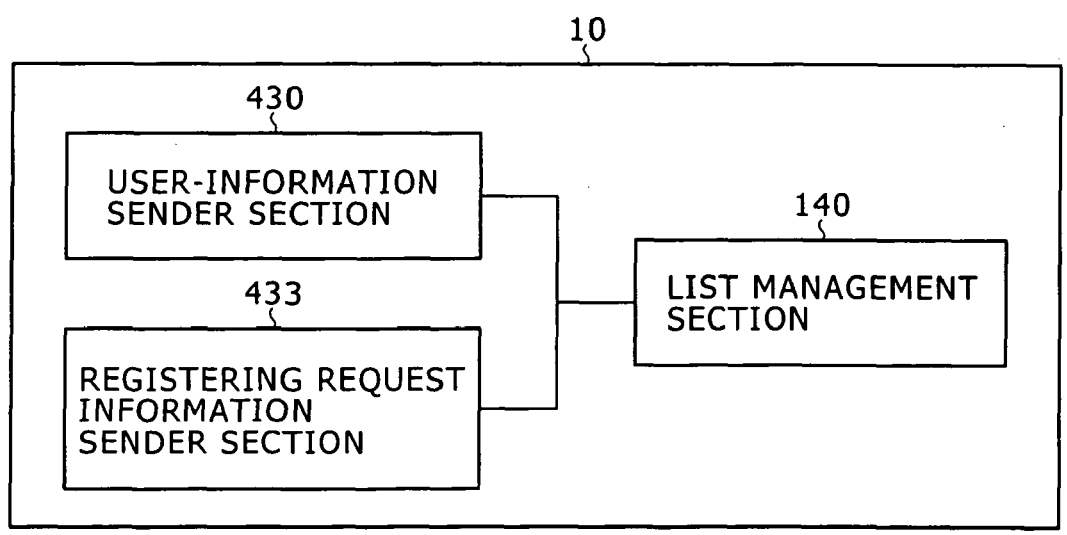
[FIG. 29]
Figure 30:
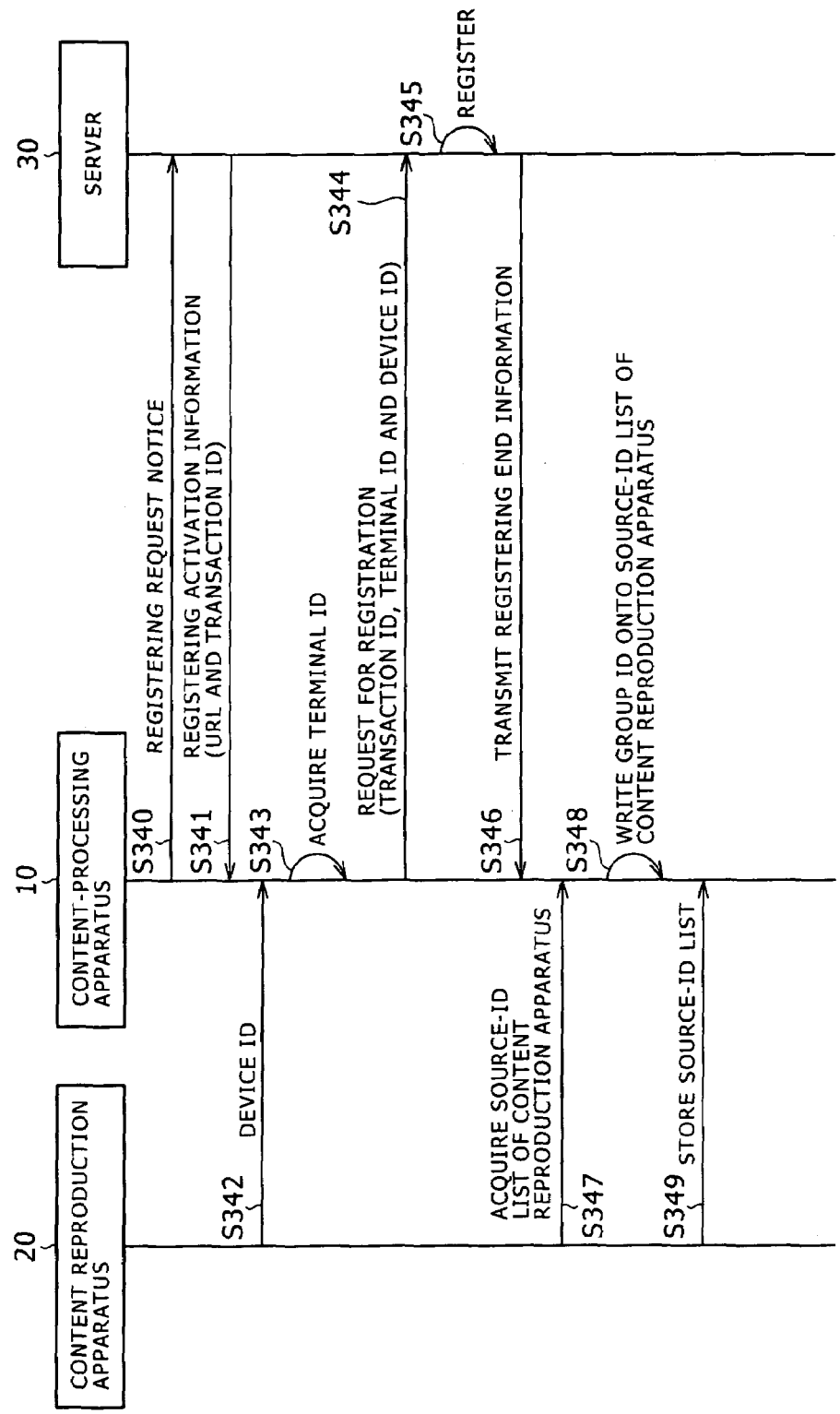
[FIG. 30]
Figure 31:
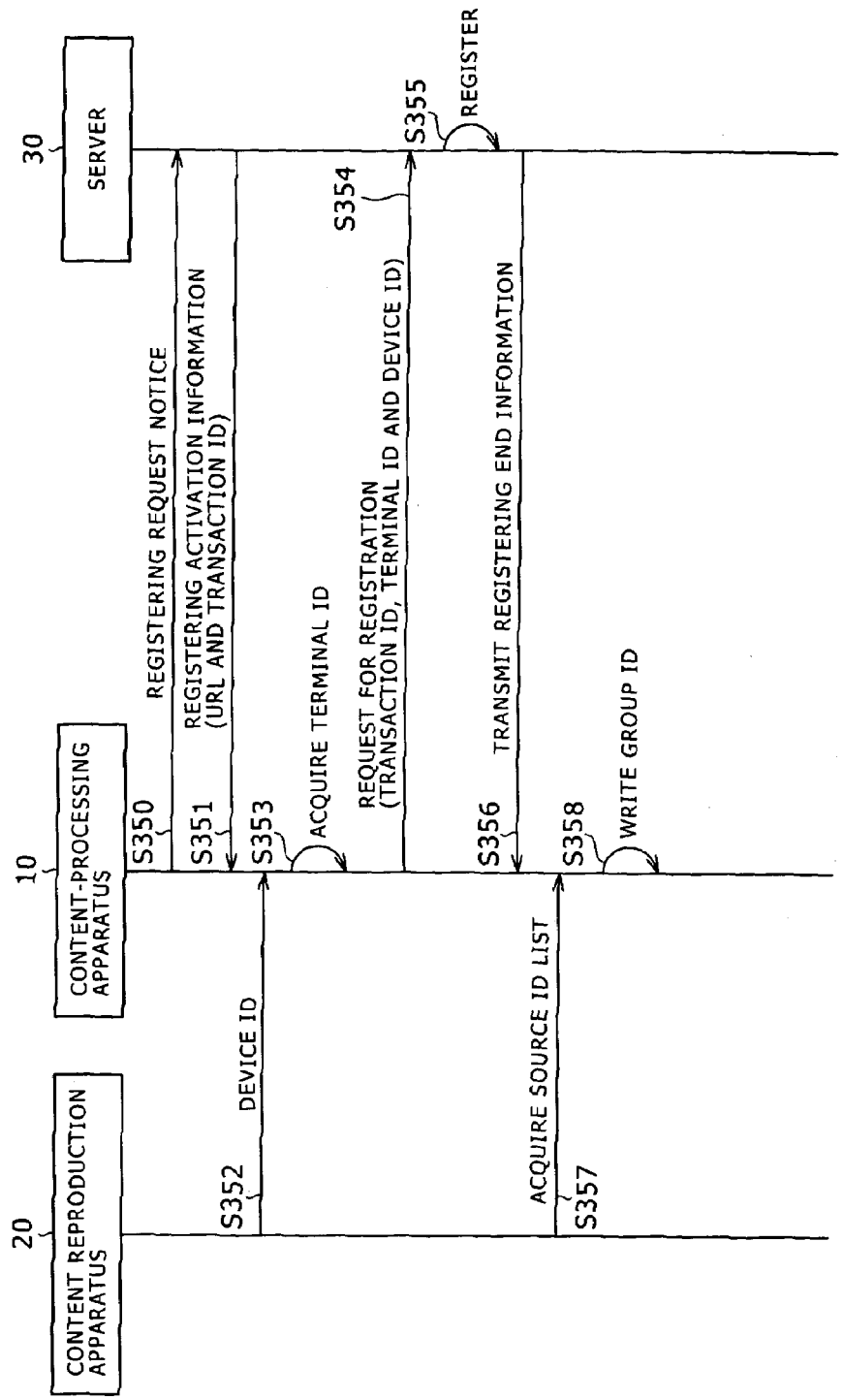
[FIG. 31]

11. Registering Content-Processing Apparatus or Content Reproduction Apparatus Having the Same ID By referring to FIGS. 28 to 31, the following description explains a service-registering process applied to content-processing apparatus 10 or content reproduction apparatus 20 for the same user ID. FIG. 28 is an explanatory diagram showing an outline of an input screen, which is displayed when a service-registering process is carried out in accordance with the embodiment. FIG. 29 is a block diagram showing an outline configuration of a group management section employed in a content-processing apparatus according to the embodiment. FIG. 30 is a diagram showing an outline sequence of a service-registering process applied to a content reproduction apparatus 20 in accordance with the embodiment. FIG. 31 is a diagram showing an outline sequence of a service-registering process applied to a content-processing apparatus 10 in accordance with the embodiment.

First of all, as described above, when a service-registering process is applied to a content-processing apparatus 10 or a content reproduction apparatus 20, the content-processing apparatus 10 makes an access to the group management server 32 through a network to transmit information necessary for the service-registering process to the group management server 32, which is a management server provided by the embodiment.

An access is a generic term of information processing to process information by utilizing a communication network. Examples of the information processing are utilization of the system, connection to a server, reference to a file, saving of a file, deletion of a file and modification of a file.

As described above, subsequently, the group management server 32 transmits a leaf ID to the content-processing apparatus 10, which then generates a group ID on the basis of the leaf ID. Then, the content-processing apparatus 10 adds the group ID to the source-ID list L owned by the content-processing apparatus 10 or the content reproduction apparatus 20 to carry out the so-called service-registering process.

An input window shown in FIG. 28 as a window transmitted from the group management server 32 is displayed on the screen. The input window is used as a window for requesting the user to enter a password and a user ID, which is an ID of the user. The user then needs to enter a user ID and a password to the input window. Even in the case of a service-registering process applied to content-processing apparatus 10 and content reproduction apparatus 20 of the same user ID, the user ID must be transmitted to the group management server 32 for each of the content-processing apparatus 10 and the content reproduction apparatus 20. Thus, the efficiency of the service-registering process is poor.

The following description explains a service-registering process, which can be carried out without the need to transmit a user ID and a password from a content-processing apparatus 10 to the group management server 32.

As shown in FIG. 29, the group management section employed in the content-processing apparatus 10 includes at least a user-information transmission section 430, a registering request information transmission section 433 and the list-updating section 140 described earlier. It is to be noted that the group management section may include the acquisition section 401 and the detection 403, which have been explained earlier in the description of the configuration of the group management section but not shown in the figure.

The user-information transmission section 430 is a unit for receiving information entered by the user by operating an input section as user information including a user ID and a password and transmitting the user information to the group management server 32 by way of a transmission section.

The registering request information transmission section 433 is a unit for generating a request for a service-registering process and transmitting the request to the group management server 32 by way of the transmission section. The request for a service-registering process includes a device ID or a terminal ID.

When a service-registering process is applied to a content reproduction apparatus 20 connected to the content-processing apparatus 10 by a local line 9, the registering request information transmission section 433 generates a request including a device ID of the content reproduction apparatus 20 as a request for a service-registering process. The device ID of the content reproduction apparatus 20 has been acquired by the acquisition section 401.

In addition, when a service-registering process is applied to a content-processing apparatus 10, the registering request information transmission section 433 generates a request including a terminal ID generated by the content-processing apparatus 10 as a request for a service-registering process.

The list-updating section 140 is a unit for receiving a leaf ID transmitted by the group management server 32 in response to a request received by the group management server 32 as a request for a service-registering process, generating a group ID on the basis of the leaf ID and registering the group ID on the source-ID list L owned by either of the content-processing apparatus 10 and a content reproduction apparatus 20, which are being subjected to the requested service-registering process.

Next, a service-registering process applied to a content reproduction apparatus 20 is explained by referring to FIG. 30. It is to be noted that, as a prerequisite for the service-registering process, the content-processing apparatus 10 connected to the content reproduction apparatus 20 has been already subjected to a service-registering process carried out in the group management server 32.

When the content reproduction apparatus 20 is connected to the content-processing apparatus 10 by a cable (a local line 9), as described before, the content-processing apparatus 10 acquires the source-ID list L owned by the content reproduction apparatus 20 from the content reproduction apparatus 20 in order to produce a result of determination as to whether or not the content reproduction apparatus 20 has been subjected to a service-registering process.

If the content-processing apparatus 10 produces a determination result indicating that the content reproduction apparatus 20 has not been subjected to a service-registering process, first of all, at a step S340 shown in FIG. 30, the content-processing apparatus 10 transmits a notice to the servers 30 by way of a network as a request for a service-registering process.

To be more specific, at the step S340, the content-processing apparatus 10 makes an access to the WWW server 31 functioning as one of the servers 30. The WWW server 31 passes the notice used as a request for a service-registering process to the group management server 32.

Then, at a step S341, the servers 30 transmit registering activation information including data required for execution of the service-registering process to the content-processing apparatus 10 in response to the notice received from the content-processing apparatus 10 as a request for the service-registering process. The registering activation information includes a transaction ID and a URL. The transaction ID is an ID required for example in retransmission of data. The URL is information showing a location used for storing, among others, a leaf ID required in generation of a group ID. The leaf ID is user identification information managed by the group management server 32.

When the content-processing apparatus 10 receives the registering activation information, the acquisition section 401 employed in the content-processing apparatus 10 acquires a device ID from the content reproduction apparatus 20 at a step S342.

After receiving the device ID at the step S342, the content-processing apparatus 10 obtains a terminal ID held by itself at a step S343.

Then, at a step S344, the registering request information transmission section 433 employed in the content-processing apparatus 10 generates a registering request, which includes the transaction ID, the terminal ID and the device ID, and transmits the registering request to the servers 30.

At a step S345, the user-registering section 312 employed in the WWW server 31 functioning as one of the servers 30 obtains a record (a registering record) of the content-processing apparatus 10, which has already been subjected to a service-registering service, on the basis of the terminal ID in order to produce a result of determination as to whether or not a service-registering process can be applied to the content reproduction apparatus 20 and, if the result of determination indicates that a service-registering process can be applied to the content reproduction apparatus 20, the user-registering section 312 newly adds the device ID to the registering record. It is to be noted that, in the registering record of the content-processing apparatus 10, user information such as a user ID and a password is associated with a terminal ID or the like. Normally, the group management server 32 uniquely identifies the registering record of the content-processing apparatus 10 by using a user ID and a password, which must be received in advance from the content-processing apparatus 10. If a terminal ID is received from the content-processing apparatus 10, however, the group management server 32 is also capable of uniquely identifying the registering record of the content-processing apparatus 10 by using the terminal ID so that the service-registering process can be completed in a short period of time and a high degree of efficiency.

It is to be noted that registering records are treated like the group-registering database 324 explained before by referring to FIG. 12. A registering record composed of columns 3241 to 3245 is a record, which is generated when an apparatus such as a content-processing apparatus 10 is registered in the group management server 32. As described earlier, a registering record is used for recording information such as a user ID, a password, a terminal ID, a device ID and a recorder ID.

First of all, the WWW server (or the management server) 31 receives user information from the content-processing apparatus 10. The user information includes a user ID and a password. Then, the user authentication section (or the authentication section) 314 employed in the WWW server 31 authenticates the user information and transmits a successful-authentication notice to the content-processing apparatus 10. The content-processing apparatus 10 is not allowed to transmit a registering request to the WWW server 31 functioning as one the servers 30 unless the content-processing apparatus 10 has received the successful-authentication notice. In accordance with the sequence shown in the figure, however, the registering request including at least a terminal ID is transmitted from the content-processing apparatus 10 to the servers 30 without the need to transmit the user information. Thus, the group management server 32 is capable of uniquely identifying the registering record of the content-processing apparatus 10 by using the terminal ID. As a result, the service-registering process can be completed in a short period of time and a high degree of efficiency.

After the user-registering section 312 newly adds the device ID of the content reproduction apparatus 20 to the registering record in the group-registering database 324 managed by the group management server 32 at the step S345 as described above, the servers 30 transmit a registering completion notice indicating that the service-registering process has been ended to the content-processing apparatus 10 at the next step S346.

After the content-processing apparatus 10 receives the registering completion notice, the acquisition section 401 employed in the content-processing apparatus 10 acquires the source-ID list L owned by the content reproduction apparatus 20 at a step S347. It is to be noted that, in order to detect interpolation of the source-ID list L acquired from the content reproduction apparatus 20, the acquisition section 401 computes the MAC value of the source-ID list L to be compared with a MAC value extracted from ICV data received along with the source-ID list L as data for detection of interpolation to make sure that the MAC values equal to each other.

Then, at a step S348, the list-updating section 140 adds the group ID of the content-processing apparatus 10 already subjected to the service-registering process to the source-ID list L acquired at the step S347. Subsequently, at a step S349, the list-updating section 140 generates data for detection of interpolation on the basis of the updated source-ID list L, storing the data and the source-ID list L in a storage apparatus employed in the content reproduction apparatus 20.

The above step is the end of the service-registering process applied to the content reproduction apparatus 20. As described above, if the content-processing apparatus 10 has been subjected to a service-registering process, it is not necessary to take the time to enter user information in order to apply a service-registering process to the content reproduction apparatus 20 owned by the same user as the content-processing apparatus 10. Thus, the service-registering process can be carried out with a high degree of efficiency. As described above, the information on a user includes a user ID and a password.

Next, a service-registering process applied to a content-processing apparatus 10 is explained by referring to FIG. 31. It is to be noted that, as a prerequisite for the service-registering process, a content reproduction apparatus 20 connected to the content-processing apparatus 10 shall have been already subjected to a service-registering process carried out to register the content reproduction apparatus 20 in the group-registering database 324 of the group management server 32.

When the content reproduction apparatus 20 is connected to the content-processing apparatus 10 by a cable (local line 9), as described above, the content-processing apparatus 10 acquires the source-ID list L owned by the content reproduction apparatus 20 in order to produce a result of determination as to whether or not the content reproduction apparatus 20 has been already subjected to a service-registering process.

It is possible to produce a result of determination as to whether or not the content-processing apparatus 10 has been already subjected to a service-registering process by determining whether or not the group ID of the content-processing apparatus 10 has been registered on the source-ID list L owned by the content-processing apparatus 10 in the same way as the determination of whether or not the content reproduction apparatus 20 has been already subjected to a service-registering process.

If the content-processing apparatus 10 produces a determination result indicating that the content-processing apparatus 10 has not been subjected to a service-registering process, as shown in FIG. 31, first of all, the content-processing apparatus 10 transmits a notice to the servers 30 as a request for a service-registering process to be applied to the content-processing apparatus 10 itself at a step S350.

Then, at a step S351, the servers 30 transmit registering activation information including data required for execution of the service-registering process to the content-processing apparatus 10 in response to the notice received from the content-processing apparatus 10 as a request for the service-registering process. The registering activation information includes a transaction ID and a URL. The transaction ID is an ID required for example in retransmission of data. The URL is information showing a location used for storing, among others, a leaf ID required in generation of a group ID. It is to be noted that the transaction ID is an ID managed by the WWW server 31 and the leaf ID is user identification information managed by the group management server 32.

When the content-processing apparatus 10 receives the registering activation information, the acquisition section 401 employed in the content-processing apparatus 10 acquires a device ID from the content reproduction apparatus 20 at a step S352.

After receiving the device ID at the step S352, the content-processing apparatus 10 obtains a terminal ID held by itself at a step S353.

Then, at a step S354, the registering request information transmission section 433 employed in the content-processing apparatus 10 generates a registering request, which includes the transaction ID, the terminal ID and the device ID, and transmits the registering request to the servers 30.

Receiving the registering request, at a step S355, the user-registering section 312 employed in the WWW server 31 obtains a record (a registering record) of the content reproduction apparatus 20, which has already been subjected to a service-registering service, on the basis of the device ID in order to produce a result of determination as to whether or not a service-registering process can be applied to the content-processing apparatus 10 and, if the result of determination indicates that a service-registering process can be applied to the content-processing apparatus 10, the user-registering section 312 newly adds the terminal ID to the registering record. It is to be noted that, in the registering record of the content reproduction apparatus 20, user information such as a user ID and a password is associated with a device ID or the like. Normally, the servers 30 uniquely identify the registering record of the content reproduction apparatus 20 by using a user ID and a password, which must be received in advance from the content-processing apparatus 10. If a device ID is received from the content-processing apparatus 10, however, the servers 30 are also capable of uniquely identifying the registering record of the content reproduction apparatus 20 by using the device ID so that the service-registering process can be completed in a short period of time and a high degree of efficiency.

After the user-registering section 312 newly adds the terminal ID of the content-processing apparatus 10 to the registering record in the group-registering database 324 managed by the group management server 32 at the step S355 as described above, the servers 30 transmit a registering completion notice indicating that the service-registering process has been ended to the content-processing apparatus 10 at the next step S356.

After the content-processing apparatus 10 receives the registering completion notice, the acquisition section 401 employed in the content-processing apparatus 10 acquires the source-ID list L owned by the content reproduction apparatus 20 at a step S357. It is to be noted that, in order to detect interpolation of the source-ID list L acquired from the content reproduction apparatus 20, the acquisition section 401 computes the MAC value of the source-ID list L to be compared with a MAC value extracted from ICV data received along with the source-ID list L as data for detection of interpolation to make sure that the MAC values equal to each other.

Then, at a step S358, the group ID of the content reproduction apparatus 20 already subjected to the service-registering process is extracted from the source-ID list L acquired at the step S357. Subsequently, the list-updating section 140 writes the group ID into the source-ID list L owned by the content-processing apparatus 10.

The above step is the end of the service-registering process applied to the content-processing apparatus 10. As described above, if the content reproduction apparatus 20 has been subjected to a service-registering process (for example, the device ID is stored in the registering record), it is not necessary to take the time to enter user information in order to apply a service-registering process to the content-processing apparatus 10 owned by the same user as the content reproduction apparatus 20. Thus, the service-registering process can be carried out with a high degree of efficiency. As described above, the information on a user includes a user ID and a password.

In addition, the series of processes described above can be carried out by special hardware or implemented by software. If the series of processes described above is implemented by software, programs composing the software are installed in content-processing apparatus 10, content reproduction apparatus 20, servers 30 and other apparatus.

In this specification, processing steps of each of programs executed by the computers to carry out various kinds of processing do not have to be executed in an order prescribed by a flowchart along the time axis. That is to say, the steps may include processes carried out concurrently and/or individually as parallel processing or processing based on objects.

In addition, in this embodiment, as described above, the user-information transmission section 430, the registering request information transmission section 433 and the list-updating section 140, which are employed in the content-processing apparatus 10, are each implemented by a program composed of one or more modules or components. However, the embodiment is not limited to this typical implementation. For example, the user-information transmission section 430, the registering request information transmission section 433 and the list-updating section 140, which are employed in the content-processing apparatus 10, can also each be implemented by hardware.

12. Method of Creating a Title List Based on Contents Reproducibility

By referring to FIGS. 32 to 44, the following description explains a method of creating a list of title information as a list based on content reproducibility.

A content-processing apparatus 10 provided by the embodiment produces a result of determination as to whether or not each content stored and held in the content-processing apparatus 10 can be reproduced in accordance with copyright management executed in the content-processing apparatus 10 and creates a list of title information as a list revealing whether or not the content identified by each of the title information can be reproduced. In the following description, such a list of title information is referred to simply as a title list. In addition, the content-processing apparatus 10 also displays the created title list on a display unit, which is one of output apparatus employed in the content-processing apparatus 10. The content-processing apparatus 10 is capable of deleting a content, which is determined to be a content that cannot be reproduced in accordance with the copyright management executed in the content-processing apparatus 10, from the content-processing apparatus 10.

In addition, the content-processing apparatus 10 provided by the embodiment also produces a result of determination as to whether or not each content stored and held in a content reproduction apparatus 20 connected to the content-processing apparatus 10 can be reproduced in accordance with copyright management executed in the content reproduction apparatus 20 and creates a list of title information as a list revealing whether or not the content identified by each of the title information can be reproduced. Furthermore, the content-processing apparatus 10 also displays the created title list on the display unit, which is one of the output apparatus employed in the content-processing apparatus 10. The content-processing apparatus 10 is capable of deleting a content, which is determined to be a content that cannot be reproduced in accordance with the copyright management executed in the content reproduction apparatus 20, from the content reproduction apparatus 20. The following description explains details of a functional configuration adopted by the content-processing apparatus 10 as a configuration for carrying out the functions described above.

Figure 32:
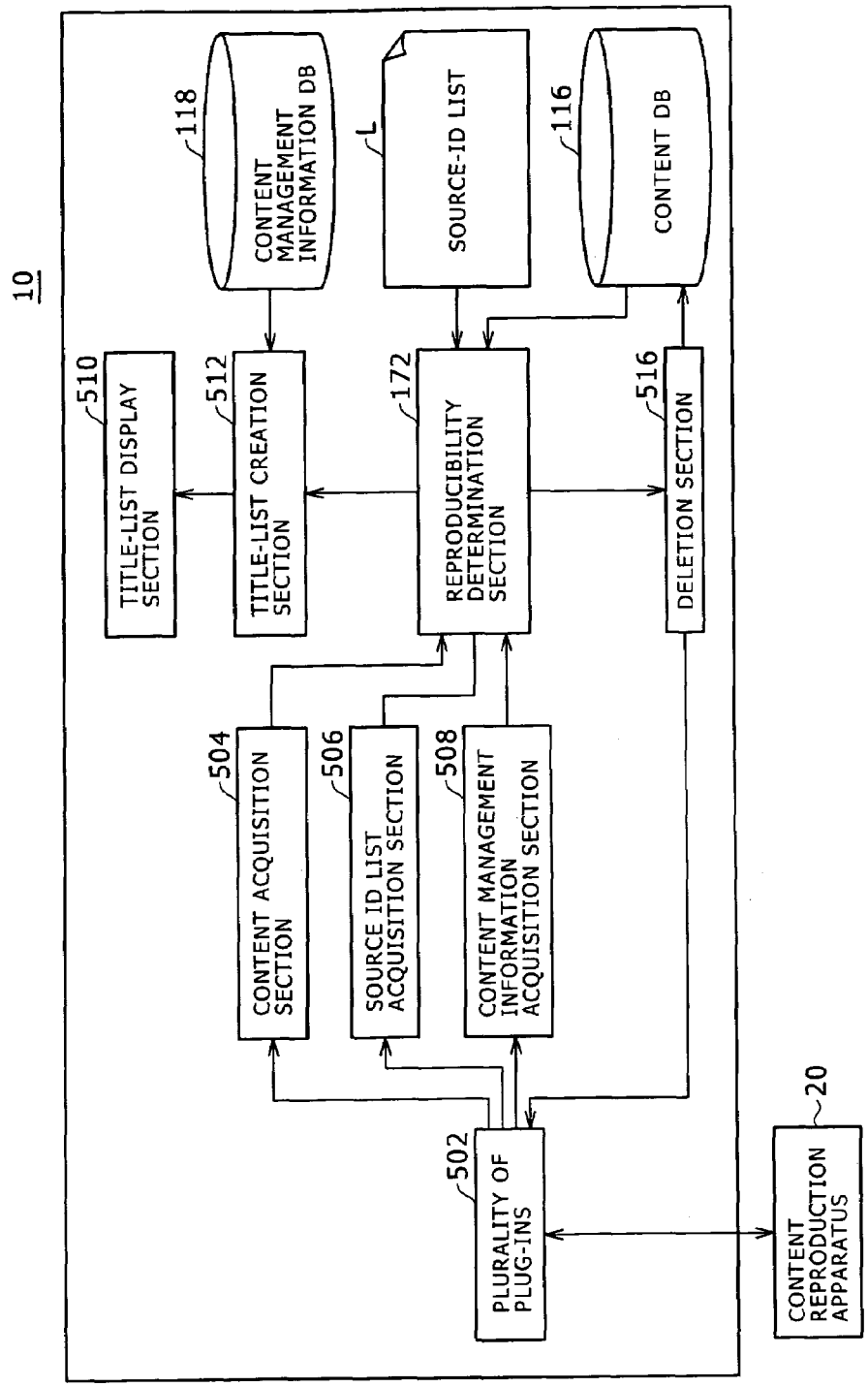
[FIG. 32]

As shown in FIG. 32, in order to carry out the functions described above, the content-processing apparatus 10 is further provided with functional elements such as plug-in modules 502, a content acquisition section 504, a source ID list acquisition section 506, a content management information acquisition section 508, a title-list display section 510, a title-list creation section 512, the reproducibility determination section 172 cited before and a deletion section 516. In addition, the storage section 111 is used for storing the content management information database 118, the content database 116 and the source-ID list L.

A plurality of aforementioned plug-in modules 502 is a plurality of plug-in modules included in the data communication section 120. By installing the plug-in modules 502 in the content-processing apparatus 10 in accordance with the types of content reproduction apparatus 20, the content-processing apparatus 10 is capable of identifying connection with a variety of content reproduction apparatus 20 and exchanging data with the content reproduction apparatus 20. Different types of content reproduction apparatus 20 include a PC, a PDA, a mobile video player, an MP3 player, an IC player, a CD player and an MD player.

A type set in each of the plug-in modules is the type of the copyright management to be executed with respect to a content reproduction apparatus 20, which recognizes connection with the plug-in module and carry out communications with the module. To be more specific, a type is set in a plug-in module for the group management method or the check-in/check-out method. Thus, if a plug-in module set for the group management method is operating, the content-processing apparatus 10 is capable producing a result of determination as to whether or not a content stored in the content reproduction apparatus 20 can be reproduced in accordance with the module management method, which is based on the source ID. If a plug-in module set for the check-in/check-out method is operating, on the other hand, the content-processing apparatus 10 is capable producing a result of determination as to whether or not a content stored in the content reproduction apparatus 20 can be reproduced in accordance with the check-in/check-out method, which is based on a license issued for the content.

The content management information acquisition section 508 is a unit having a function to acquire management information, which has been stored in a content reproduction apparatus 20 as management information of a content, from the content reproduction apparatus 20 by way of a plug-in module 502. The management information of a content includes a content ID, the address of the content identified by the content ID and the title information given to the content. If the content is a musical content, for example, the title information includes the title information of a song and the names of artists.

The content acquisition section 504 is a unit having a function to obtain the content ID of a content stored in a content reproduction apparatus 20 as well as the address of the content from the reproducibility determination section 172 and acquire the content from the content reproduction apparatus 20 by way of a plug-in module 502 on the basis of either the content ID or the address.

The source ID list acquisition section 506 is a unit having a function to acquire the source-ID list L owned by a content reproduction apparatus 20 from the content reproduction apparatus 20 by way of a plug-in module with the group management method set therein.

There are a first source-ID list and a second source-ID list as source-ID lists L to be referred to by the content-processing apparatus 10 in producing a result of determination as to whether or not a content can be reproduced. An example of the first source-ID list is a source-ID list L owned by the content-processing apparatus 10 as a list showing providers of contents that can be reproduced by the content-processing apparatus 10. An example of the second source-ID list is a source-ID list L owned by the content reproduction apparatus 20 as a list showing providers of contents that can be reproduced by the content reproduction apparatus 20.

The reproducibility determination section 172 is a unit having a function to produce a result of determination as to whether or not a content stored in the content database 116 of the content-processing apparatus 10 can be reproduced in accordance with copyright management executed in the content-processing apparatus 10. In addition, the reproducibility determination section 172 also has a function to produce a result of determination as to whether or not a content stored in a content reproduction apparatus 20 can be reproduced in accordance with copyright management executed in the content reproduction apparatus 20. First of all, the former function is explained as follows.

The reproducibility determination section 172 obtains the content ID of a content, the reproducibility of which is to be determined, from the title-list creation section 512, and acquires the content identified by the content ID from the content database 116. In addition, the reproducibility determination section 172 also acquires a source-ID list L stored in a storage apparatus employed in the content-processing apparatus 10. The reproducibility determination section 172 then reads out a source ID added to the content acquired from the content database 116 from the content, and compares the source ID read out from the content with source IDs on the source-ID list L in order to produce a result of determination as to whether or not the source-ID list L includes the source ID read out from the content. If the result of the determination indicates that the source-ID list L includes the source ID read out from the content, the content including the source ID added thereto is determined to be a content that can be reproduced. If the result of the determination indicates that the source-ID list L does not include the source ID read out from the content, on the other hand, the content including the source ID added thereto is determined to be a content that cannot be reproduced.

As described above, the reproducibility determination section 172 reads out a source ID from a content acquired from the content database 116. However, the embodiment is not limited to such a typical implementation. For example, a source ID and a content ID are stored in advance in the content management information database 118 by associating the source ID and the content ID with each other. In this case, the reproducibility determination section 172 is capable of acquiring a source ID from the content management information database 118 on the basis of its content ID instead of obtaining the source ID from a content acquired from the content database 116.

The following description explains the latter function to produce a result of determination as to whether or not a content stored in the content reproduction apparatus 20 connected to the content-processing apparatus 10 can be reproduced in accordance with copyright management executed in the content reproduction apparatus 20. The reproducibility determination section 172 carries out a selected one of processes in accordance with whether the content reproduction apparatus 20 executes copyright management by adopting the group management method or the check-in/check-out method. The processes to be selected by the reproducibility determination section 172 are explained separately as follows.

In the case of the group management method, the reproducibility determination section 172 acquires the content ID or address of a content stored in the content reproduction apparatus 20 from the title-list creation section 512 and requests the content acquisition section 504 to obtain the content from the content reproduction apparatus 20 on the basis of the content ID or the address. Then, the reproducibility determination section 172 requests the source ID list acquisition section 506 to obtain the source-ID list L owned by the content reproduction apparatus 20 from the content reproduction apparatus 20. Subsequently, the reproducibility determination section 172 acquires the source-ID list L from the source ID list acquisition section 506 and the content from the content acquisition section 504. The reproducibility determination section 172 then reads out a source ID added to the content from the content and compares the source ID read out from the content with source IDs on the source-ID list L in order to produce a result of determination as to whether or not the source-ID list L includes the source ID read out from the content. If the result of the determination indicates that the source-ID list L includes the source ID read out from the content, the content including the source ID added thereto is determined to be a content that can be reproduced. If the result of the determination indicates that the source-ID list L does not include the source ID read out from the content, on the other hand, the content including the source ID added thereto is determined to be a content that cannot be reproduced.

As described above, the reproducibility determination section 172 reads out a source ID from a content acquired from the content reproduction apparatus 20. However, the embodiment is not limited to such a typical implementation. For example, the content reproduction apparatus 20 may include a database used for storing the source ID and the content ID by associating the source ID and the content ID with each other. In this case, the reproducibility determination section 172 is capable of acquiring the database including the source ID and referring to the source ID required in producing a result of determination as to whether or not the content is a content that can be reproduced.

Next, the check-in/check-out method is explained as follows. The reproducibility determination section 172 acquires the content ID or address of a content stored in the content reproduction apparatus 20 from the title-list creation section 512 and requests the content acquisition section 504 to obtain the content from the content reproduction apparatus 20 on the basis of the content ID or the address. Subsequently, the reproducibility determination section 172 acquires the content from the content acquisition section 504 and reads out restrictions set information in a license added to the content as restrictions on reproduction of the content. To put it concretely, let us assume for example that, as a restriction set in the license as a restriction on reproduction of the content, a limit of the number of times the content can be reproduced is prescribed. In this case, the number of remaining times the content can be reproduced is examined in order to produce a result of determination as to whether or not the content can still be reproduced, that is, whether or not the number of remaining times the content can be reproduced is greater than 0. If the result of the determination indicates that the number of remaining times the content can be reproduced is positive, the content is determined to be a content that can still be reproduced. As another example, a reproducibility term is prescribed as a restriction set in the license as a restriction on reproduction of the content. In this case, the reproducibility term is examined in order to produce a result of determination as to whether or not the reproducibility term has been expired. To put it concretely, the present time retrieved from a system timer employed in the content-processing apparatus 10 is compared with the reproducibility term in order to produce a result of determination as to whether or not the present time is still within the reproducibility term. If the result of the determination indicates that the present time is still within the reproducibility term, the content is determined to be a content that can still be reproduced.

It is to be noted that, as described above, the reproducibility determination section 172 acquires a content from the content reproduction apparatus 20 and reads out restrictions set in a license added to the content as restrictions on reproduction of the content. However, the embodiment is not limited to such a typical implementation. Instead of adding a license to a content, a license can be stored in another database in the content reproduction apparatus 20 to be managed by being associated with a content ID. In this case, the content-processing apparatus 10 does not acquire the content. Instead, the content-processing apparatus 10 acquires the license to be used in producing a result of determination as to whether or not the content is a content that can be reproduced.

The deletion section 516 is a unit having a function to delete a content, which is determined by the reproducibility determination section 172 to be irreproducible in the content-processing apparatus 10, from the content database 116. In addition, the deletion section 516 also has a function to delete a content, which is determined by the reproducibility determination section 172 to be irreproducible in the content reproduction apparatus 20, from the content reproduction apparatus 20. To put it concretely, when the user enters a command by pressing an all-delete button of the input apparatus 108 to delete a content, the deletion section 516 produces a result of determination as to whether or not the content to be deleted is a content in the content reproduction apparatus 20 or a content in the content-processing apparatus 10. Then, the reproducibility determination section 172 is requested to produce a result of determination as to whether or not the content is a content that cannot be reproduced in the content-processing apparatus 10 or the content reproduction apparatus 20 in dependence on the determination result produced by the deletion section 516. The determination result produced by the reproducibility determination section 172 as a determination result indicating for example that the content is an irreproducible content includes the content ID of the content.

On the basis of the content ID received from the reproducibility determination section 172 as the content ID of the irreproducible content and on the basis of the determination result produced by the deletion section 516 that the irreproducible cannot be reproduced in the content-processing apparatus 10 or the content reproduction apparatus 20, the deletion section 516 deletes the content from the content database 116 or the content reproduction apparatus 20. If the content is to be deleted from the content database 116, the content is found on the basis of the content ID added to the content. If the content is to be deleted from the content reproduction apparatus 20, on the other hand, the content ID and a request for deletion are transmitted to the content reproduction apparatus 20 by way of a plug-in module 502. Then, the content reproduction apparatus 20 deletes a content selected from those stored in the content reproduction apparatus 20 as a content identified by the content ID.

For each content stored in the content database 116, the content management information database 118 includes a content ID assigned uniquely to the content, the address of the content and the title information of the content by associating the content ID, the address and the title information with each other.

The title-list creation section 512 is a unit having a function to create a title list of contents on the basis of inputs entered via the input apparatus 108. The title list includes information used for identifying each of the contents. If the content is a musical content, for example, the information includes the title information of a song and the names of artists. To put it concretely, when the user enters a command via the input apparatus 108 to display a list of a plurality of contents included in a group (or an album), for example, the title-list creation section 512 reads out content IDs of the contents included in the group from the content management information database 118 and supplies the content IDs to the reproducibility determination section 172, which then produces a result of determination as to whether or not the contents are contents reproducible in the content-processing apparatus 10 on the basis of the content IDs. Then, the title-list creation section 512 acquires the result of the determination from the reproducibility determination section 172, and uses title information included in the content management information database 118 to create such a title list of the contents that each of the contents can be recognized as a content that can be reproduced or not. To put it concretely, on such a title list of the contents shown in such a way that each of the contents can be recognized as a content that can be reproduced or not, for example, a reproducible content is displayed at a luminance level different from the luminance level of an irreproducible content or a reproducible content is displayed as an icon different from the icon of an irreproducible content. As an alternative, reproducible contents are put in a group separated from a group for contents that cannot be reproduced.

The title-list display section 510 is a unit having a function to display a title list created by the title-list creation section 512 on a display unit, which is one of units composing the output section 110. When the user enters a command via the input apparatus 108 to make a request for a display of a plurality of contents included in a group (or an album), for example, such a title list is displayed to the user to allow the user to view a list of title information as a list including information indicating whether or not each of the content can be reproduced in the content-processing apparatus 10.

In addition, when the user enters a command via the input apparatus 108 to make a request for a display of a plurality of contents held in the content reproduction apparatus 20, the title-list creation section 512 requests the content management information acquisition section 508 to acquire content management information from the content reproduction apparatus 20. As requested, the content management information acquisition section 508 supplies the acquired content management information to the title-list creation section 512. The title-list creation section 512 supplies each content ID and each address, which are included in the content management information as the content ID or address of every content, to the reproducibility determination section 172 in order to request the reproducibility determination section 172 to produce a result of determination as to whether or not each of the contents stored in the content reproduction apparatus 20 as a content identified by the content ID or a content located at the address is a content that can be reproduced. The reproducibility determination section 172 acquires a content identified by every supplied content ID or a content located at every supplied address from the content reproduction apparatus 20 by way of the content acquisition section 504. Later on, the reproducibility determination section 172 produces a result of determination as to whether or not each of the contents acquired from the content reproduction apparatus 20 is a content that can be reproduced, and supplies the result of the determination to the title-list creation section 512. The result of the determination includes at least each of the content IDs and information indicating whether or not each of the contents is a content that can be reproduced. On the basis of content IDs included in both the content management information and the result of the determination, title information included in the content management information and information included in the result of the determination as the information indicating whether or not each of the contents is a content that can be reproduced, the title-list creation section 512 creates a title list distinguishing reproducible contents from irreproducible ones. Reproducible and irreproducible contents are distinguished from each other in the way described above.

Figure 33:
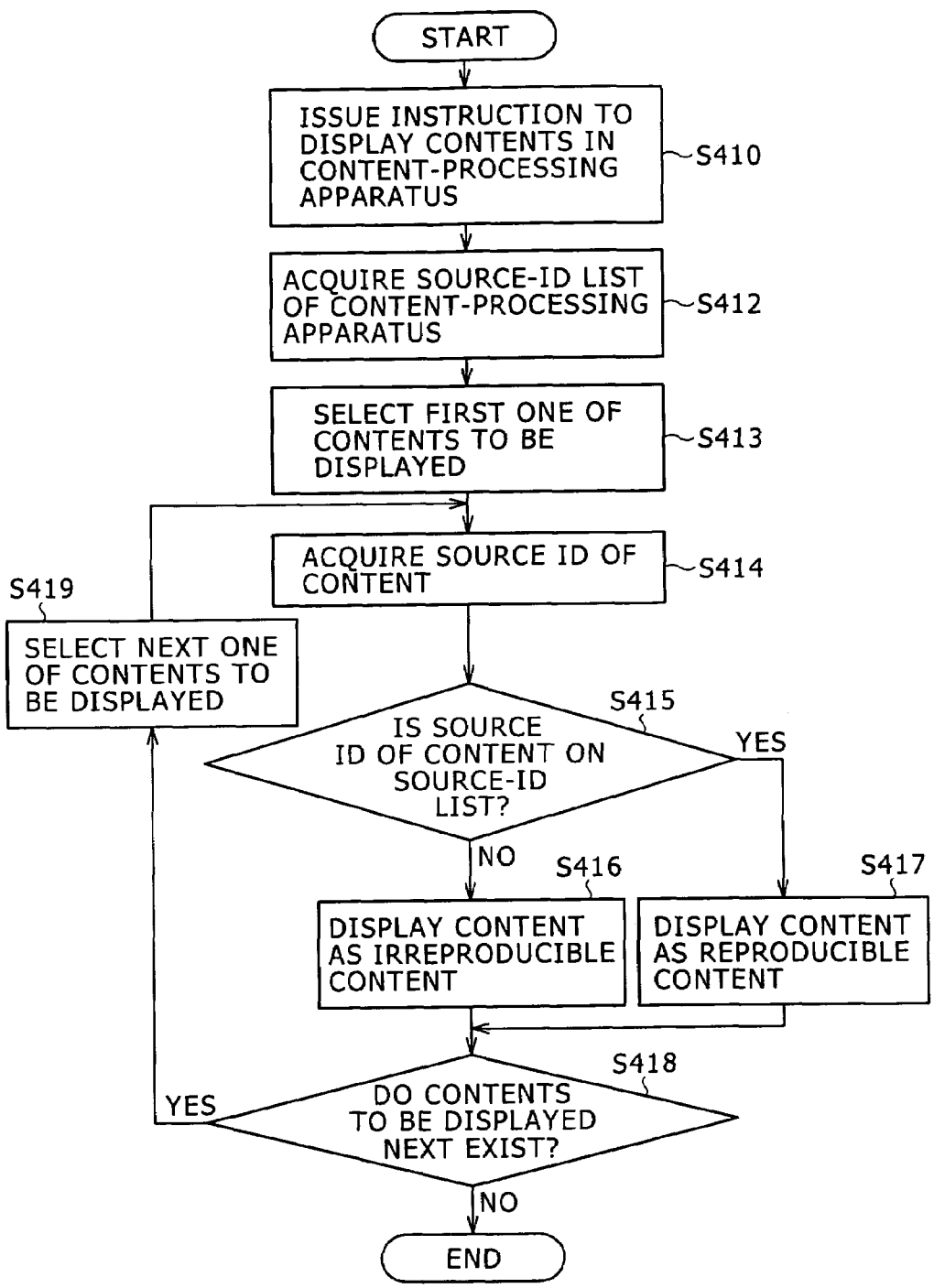
[FIG. 33]
Figure 34:
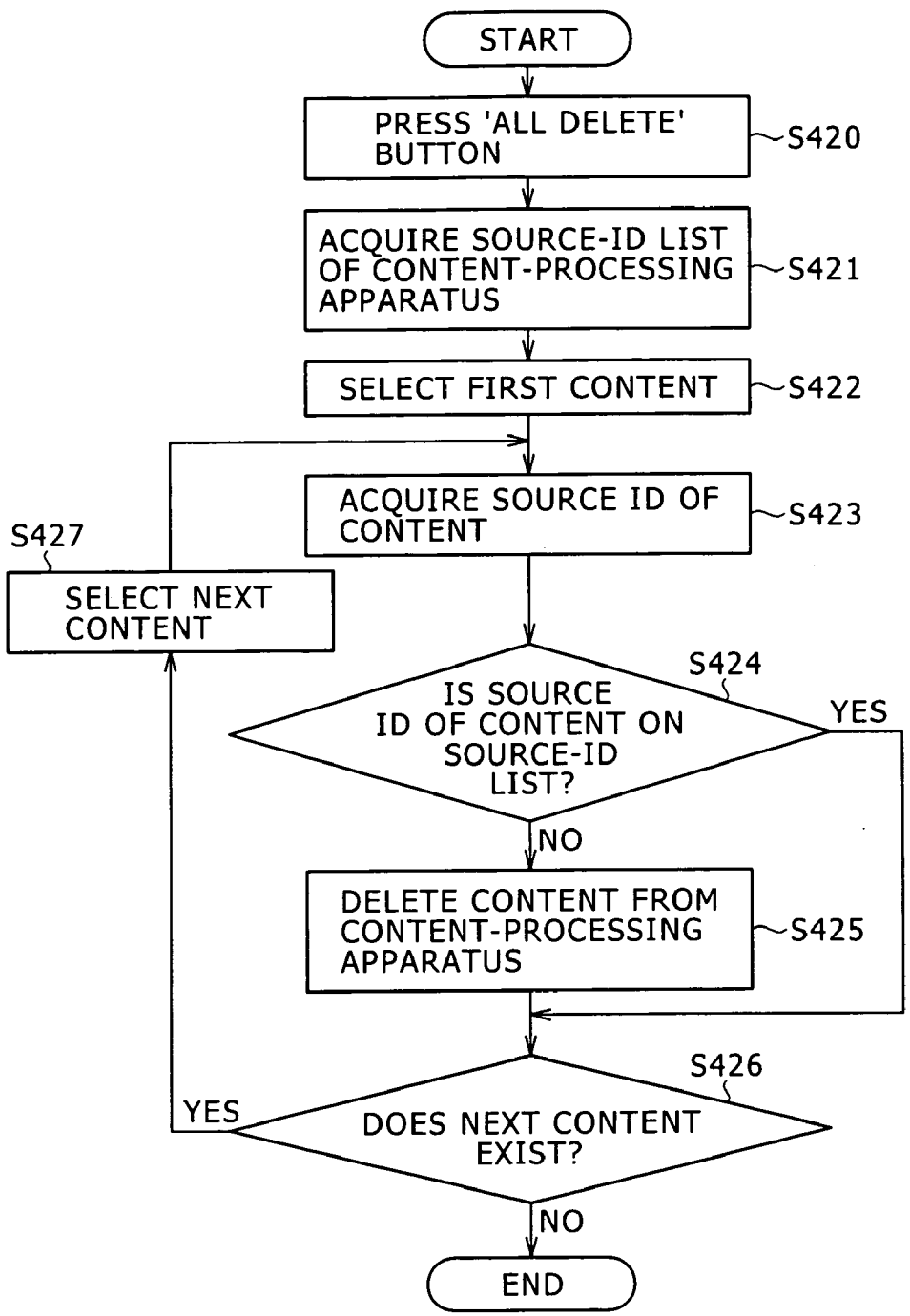
[FIG. 34]
Figure 35:
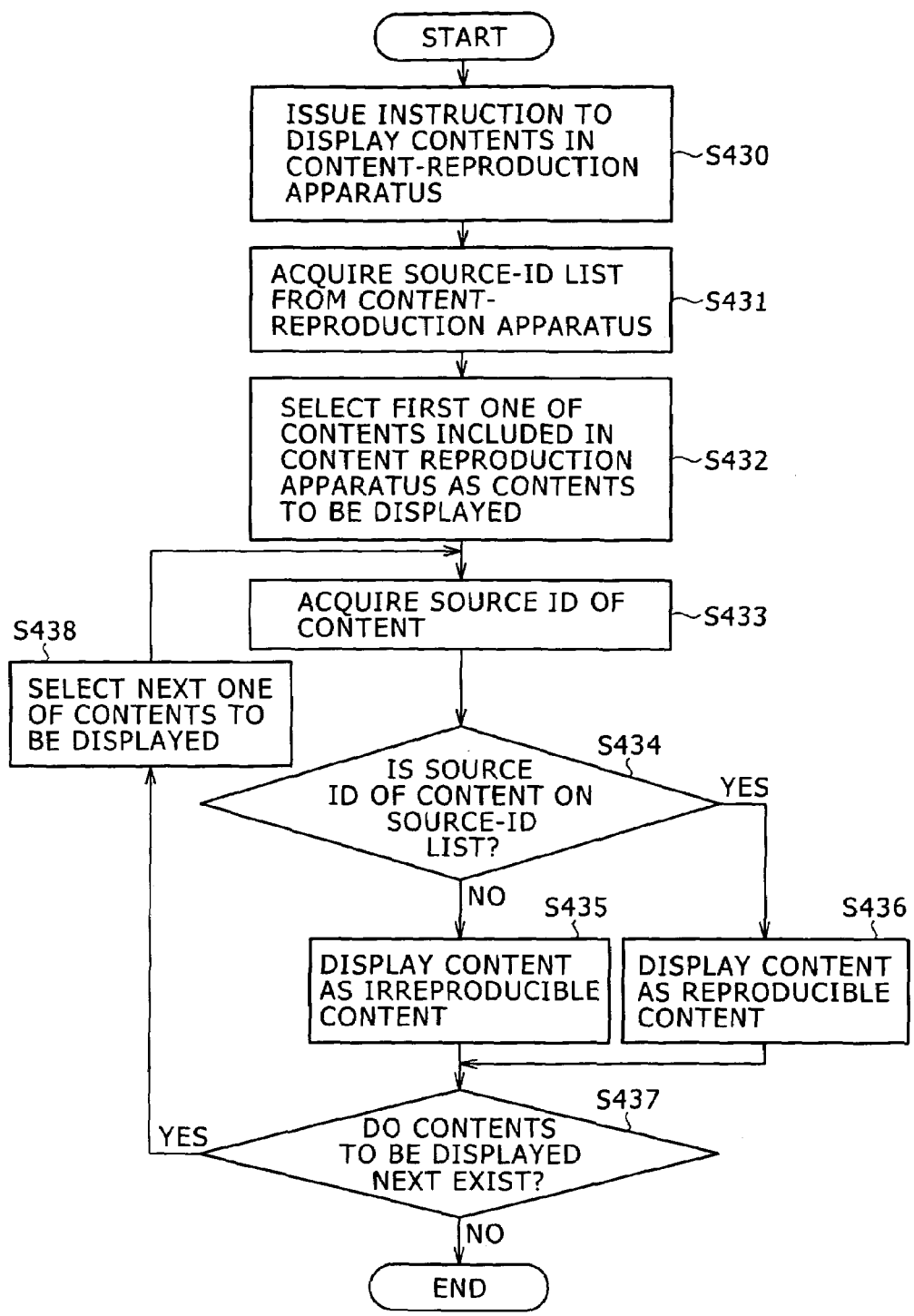
[FIG. 35]
Figure 36:
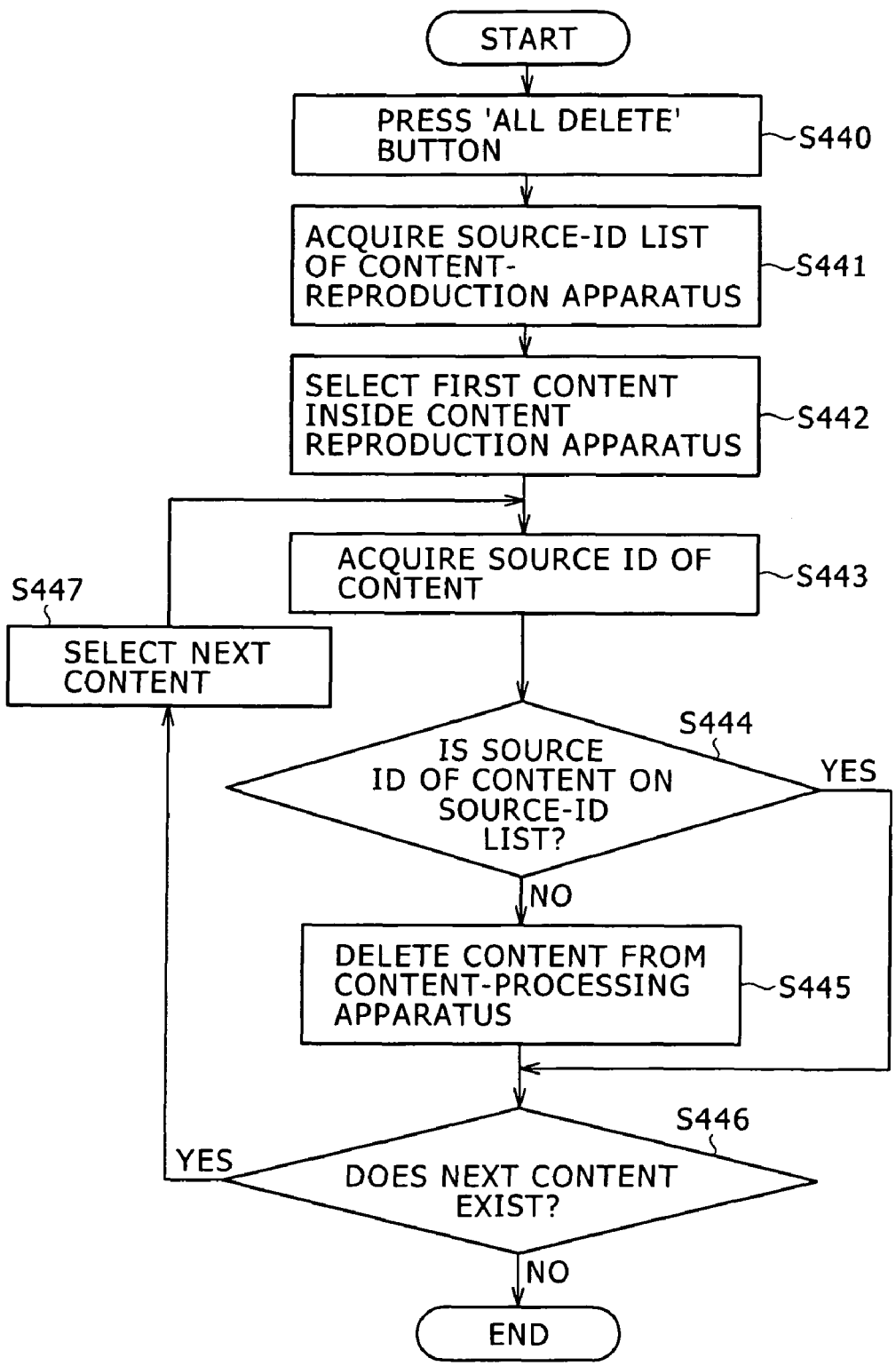
[FIG. 36]
Figure 37:
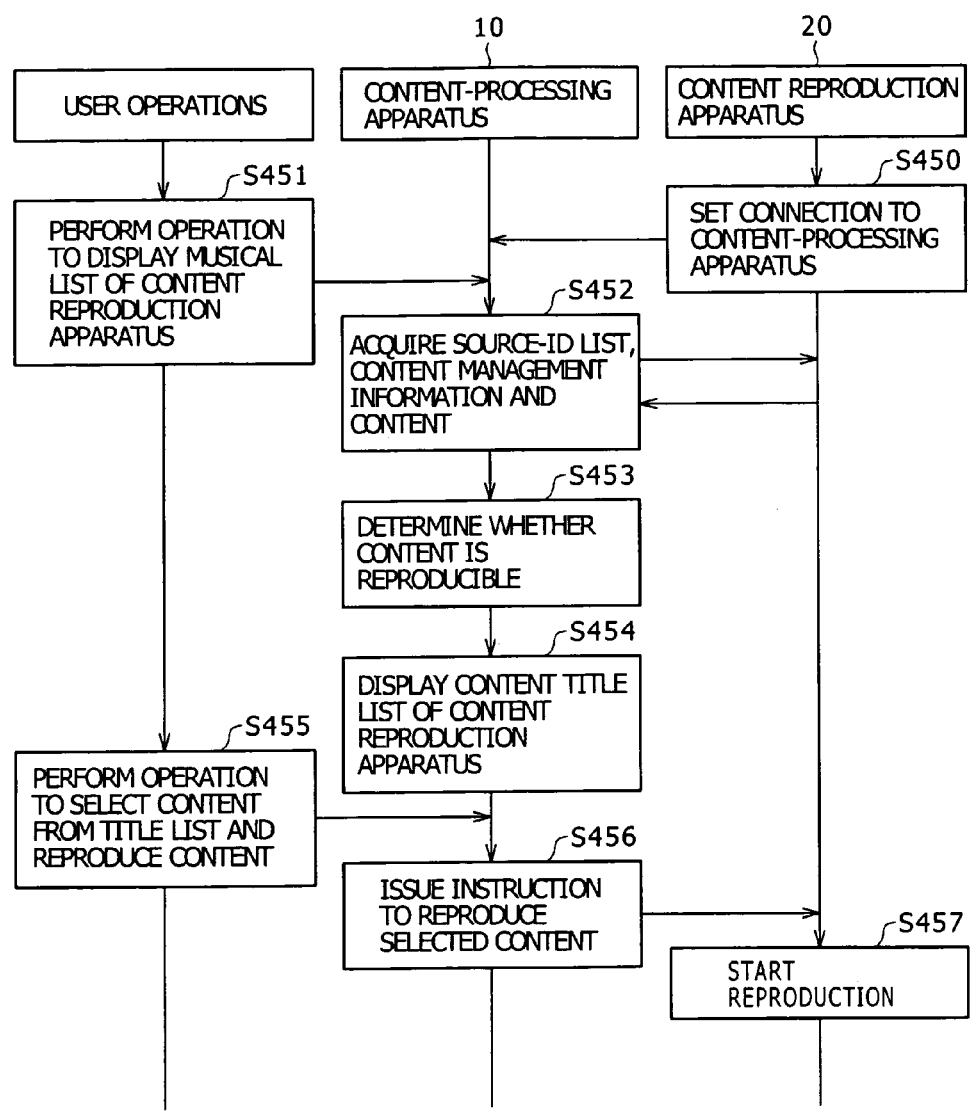
[FIG. 37]
Figure 38:
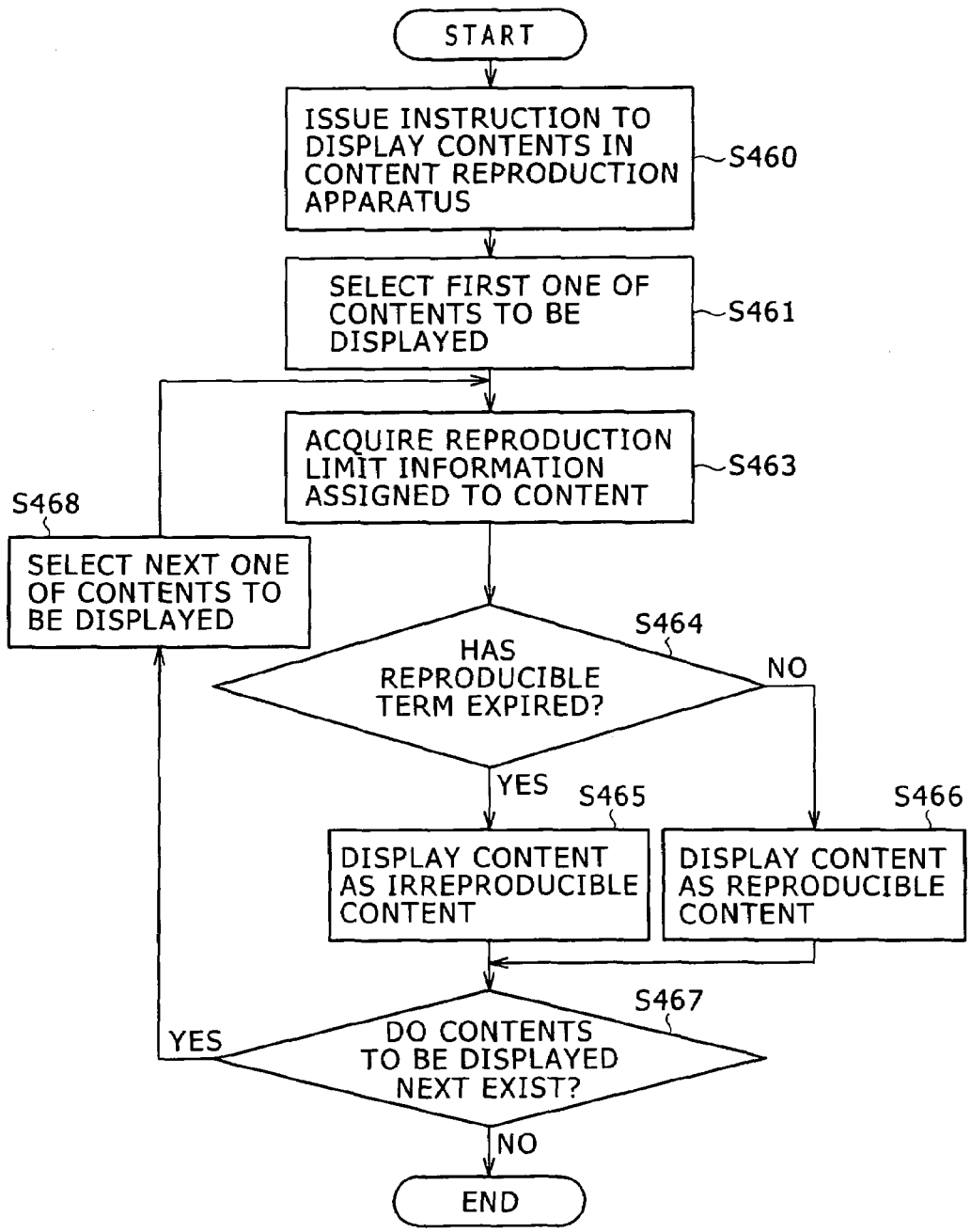
[FIG. 38]

By referring to FIG. 33, the following description explains a flowchart representing processing to display a list of contents stored in the content-processing apparatus 10 in such a way that it is possible to distinguish reproducible contents from ones that cannot be reproduced.

The flowchart begins with a step S410 at which an instruction is issued to display a list of contents stored in the content-processing apparatus 10. To put it concretely, at the step S410, as described earlier, the title-list creation section 512 specifies contents to be displayed in accordance with the instruction entered by the user via the input apparatus 108, and requests the reproducibility determination section 172 to produce a result of determination as to whether or not each of the contents can be reproduced. Then, at the next step S412, the reproducibility determination section 172 acquires the source-ID list L owned by the content-processing apparatus 10. Subsequently, at a step S413 following the step S412, the reproducibility determination section 172 selects the first one of the contents specified by the title-list creation section 512 as contents to be displayed. To put it concretely, the reproducibility determination section 172 acquires one or more content IDs from the title-list creation section 512 and, after the first content selected at the step S413, every time a step S419 is executed, the reproducibility determination section 172 selects a next content identified by one of the content IDs from the content database 116 in accordance with the order of the acquired content IDs or any other order.

Acquiring the content, the reproducibility determination section 172 reads out a source ID from the acquired content at a step S414. Then, at the next step S415 following the step S414, the reproducibility determination section 172 produces a result of determination as to whether or not the source-ID list L includes the source ID. If the result of the determination indicates that the source-ID list L includes the source ID, the flow of the list-displaying processing goes on to a step S417 at which the reproducibility determination section 172 notifies the title-list creation section 512 that the content having the source ID added thereto is a content that can be reproduced. If the determination result produced at the step S415 indicates that the source-ID list L does not include the source ID, on the other hand, the flow of the list-displaying processing goes on to a step S416 at which the reproducibility determination section 172 notifies the title-list creation section 512 that the content having the source ID added thereto is a content that cannot be reproduced. At the steps S416 and S417, the title-list creation section 512 creates a title list in accordance with the notice received from the reproducibility determination section 172, and the title-list display section 510 displays the title information of a content, indicating that the content is reproducible or irreproducible in accordance with the title list created by the title-list creation section 512. Then, the flow of the list-displaying processing goes on to a step S418 to produce a result of determination as to whether or not the titles of all the contents have been displayed.

The above description explains the flowchart of the processing to display a list of contents stored in a content-processing apparatus 10 by showing information indicating whether or not each of the contents is a content that can be reproduced. By referring to FIG. 34, the following description explains a flowchart of processing to delete a content that cannot be reproduced in accordance with copyright management from a content-processing apparatus 10.

The flowchart begins with a step S420 at which the user presses an all-delete button of the input apparatus 108 for example. When this button is pressed at the step S420, the deletion section 516 requests the reproducibility determination section 172 to produce a result of determination as to whether or not a content stored in the content database 116 of the content-processing apparatus 10 is a content that can be reproduced. As requested, first of all, the reproducibility determination section 172 obtains the source-ID list L owned by the content-processing apparatus 10 at the next step S421. At a step S422 following the step S421, a first content is selected. The reproducibility determination section 172 selects contents from the content database 116 sequentially. That is to say, at a step S427, the reproducibility determination section 172 selects a next content from the content database 116. Then, the reproducibility determination section 172 reads out a source ID from the selected content at a step S423. Subsequently, at the next step S424, the reproducibility determination section 172 produces a result of determination as to whether or not the source-ID list L includes the source ID. If the result of the determination indicates that the source-ID list L does not includes the source ID, the flow of the content deletion processing goes on to a step S425 at which the reproducibility determination section 172 notifies the deletion section 516 that the content having the source ID added thereto is a content which cannot be reproduced. In accordance with the notice, the deletion section 516 deletes the content from the content database 116. Then, the flow of the content deletion processing goes on to a step S426 to produce a result of determination as to whether or not the processes to determine reproducibility of a content and delete an irreproducible content have been carried out on all contents stored in the content database 116.

The above description explains the flowchart of processing to delete a content that cannot be reproduced in accordance with copyright management from a content-processing apparatus 10. By referring to FIG. 35, the following description explains a flowchart representing processing to display a list of contents stored in the content reproduction apparatus 20 in such a way that it is possible to distinguish reproducible contents from ones that cannot be reproduced.

The flowchart begins with a step S430 at which an instruction is issued to display a list of contents stored in the content reproduction apparatus. To put it concretely, at the step S430, as described earlier, the title-list creation section 512 requests the content management information acquisition section 508 to acquire management information of contents to be displayed from the content reproduction apparatus 20 in accordance with the instruction entered by the user via the input apparatus 108. The title-list creation section 512 then requests the reproducibility determination section 172 to produce a result of determination as to whether or not each of the contents can be reproduced on the basis of the content management information acquired by the content management information acquisition section 508.

Then, at the next step S431, the reproducibility determination section 172 acquires the source-ID list L from the content reproduction apparatus 20 by way of the source ID list acquisition section 506. Subsequently, at a step S432 following the step S431, the reproducibility determination section 172 selects the first one of contents, which are associated with the management information acquired in accordance with a request made by the title-list creation section 512 as contents to be displayed. To put it concretely, the reproducibility determination section 172 acquires one or more content IDs from the title-list creation section 512 and, after the first content selected at the step S432, every time a step S438 is executed, in accordance with the order of the acquired content IDs or any other order, the reproducibility determination section 172 acquires a next content identified by one of the content IDs from the content reproduction apparatus 20 by way of the content acquisition section 504.

Acquiring the content, the reproducibility determination section 172 reads out a source ID from the acquired content at a step S433. Then, at the next step S434 following the step S433, the reproducibility determination section 172 produces a result of determination as to whether or not the source-ID list L includes the source ID. If the result of the determination indicates that the source-ID list L includes the source ID, the flow of the list-displaying processing goes on to a step S436 at which the reproducibility determination section 172 notifies the title-list creation section 512 that the content having the source ID added thereto is a content that can be reproduced. If the determination result produced at the step S434 indicates that the source-ID list L does not include the source ID, on the other hand, the flow of the list-displaying processing goes on to a step S435 at which the reproducibility determination section 172 notifies the title-list creation section 512 that the content having the source ID added thereto is a content that cannot be reproduced. At the steps S435 and S436, the title-list creation section 512 creates a title list in accordance with the notice received from the reproducibility determination section 172 and the title information of a content is displayed as a title indicating that the content is a content that can or cannot be reproduced. Then, the flow of the list-displaying processing goes on to a step S437 to produce a result of determination as to whether or not the titles of all the contents have been displayed.

It is to be noted that, if the source-ID list L includes the validity term of the source ID, the reproducibility determination section 172 produces a result of determination that the as to whether or not a content added the source ID of which the validity term is expired is a content that cannot be reproduced.

The above description explains the flowchart representing the processing to display a list of contents stored in the content reproduction apparatus 20 in such a way that it is possible to distinguish reproducible contents from ones that cannot be reproduced. By referring to FIG. 36, the following description explains a flowchart of processing to delete a content that cannot be reproduced in a content reproduction apparatus 20 in accordance with copyright management from the content reproduction apparatus 20.

The flowchart begins with a step S440 at which the user presses an all-delete button of the input apparatus 108 for example. When this button is pressed at the step S440, the deletion section 516 requests the reproducibility determination section 172 to produce a result of determination as to whether or not a content stored in the content reproduction apparatus 20 is a content that can be reproduced. As requested, first of all, the reproducibility determination section 172 obtains the source-ID list L owned by the content reproduction apparatus 20 by way of the source ID list acquisition section 506 at the next step S441. At a step S442 following the step S441, a first content is acquired from the content reproduction apparatus 20 by way of the content acquisition section 504. The reproducibility determination section 172 acquires contents from the content reproduction apparatus 20 sequentially. At a step S447, the reproducibility determination section 172 acquires a next content. Then, the reproducibility determination section 172 reads out a source ID from the acquired content at a step S443. Subsequently, at the next step S444, the reproducibility determination section 172 produces a result of determination as to whether or not the source-ID list L includes the source ID. If the result of the determination indicates that the source-ID list L does not includes the source ID, the flow of the content deletion processing goes on to a step S445 at which the reproducibility determination section 172 notifies the deletion section 516 that the content having the source ID added thereto is a content which cannot be reproduced. In accordance with the notice, the deletion section 516 deletes the content from the content database 116. Then, the flow of the content deletion processing goes on to a step S446 to perform the processes on all contents stored in the content reproduction apparatus 20.

The above description explains the flowchart of processing to delete a content that cannot be reproduced in accordance with copyright management from a content reproduction apparatus 20. By referring to FIG. 37, the following description explains flows of processing carried out by a content-processing apparatus 10 to reproduce a content in a content reproduction apparatus 20.

First of all, at a step S450, the content reproduction apparatus 20 is connected to the content-processing apparatus 10. At a step S451 following the step S450, the user enters a command via the input apparatus 108 as a command to display a list of contents stored in the content reproduction apparatus 20. Then, at a step S452, the content-processing apparatus 10 acquires a source-ID list L, content management information and contents from the content reproduction apparatus 20. Subsequently, at the next step S453, the content-processing apparatus 10 produces a result of determination as to whether or not each of the contents is a content that can be reproduced in the same way as the processing explained earlier by referring to the flowchart shown in FIG. 35. Then, at the next step S454, a the title list is displayed as a list revealing whether or not each of contents represented by the titles on the list is a content that can be reproduced. Subsequently, at a step S455, the user selects a reproducible content from the displayed title list. The title list can also be displayed in such a way that the user is not capable of selecting an irreproducible content from the displayed title list. As the user selects a reproducible content from the displayed title list, the content-processing apparatus 10 gives a command to the content reproduction apparatus 20 to reproduce the selected content at a step S456. Since the selected content has been determined to be a reproducible content on the basis of the source ID and the source-ID list L, the content reproduction apparatus 20 needs not to again produce a result of determination as to whether or not the selected content is a content that can be reproduced. Finally, at a step S457, the content reproduction apparatus 20 reproduces the requested content.

The above description explains the flows of the processing carried out by a content-processing apparatus 10 to reproduce a content in a content reproduction apparatus 20. By referring to FIG. 38, the following description explains a flowchart representing processing to display a list of contents stored in a content reproduction apparatus 20 executing copyright management based on the check-in/check-out method as a list distinguishing reproducible contents from ones that cannot be reproduced.

The flowchart begins with a step S460 at which an instruction to display a list of contents stored in a content reproduction apparatus 20 is received. To put it concretely, at the step S460, as described earlier, the title-list creation section 512 requests the content management information acquisition section 508 to acquire management information of contents to be displayed from the content reproduction apparatus 20 in accordance with the instruction entered by the user via the input apparatus 108. The title-list creation section 512 then requests the reproducibility determination section 172 to produce a result of determination as to whether or not each of the contents can be reproduced on the basis of the content management information acquired by the content management information acquisition section 508.

Subsequently, at a the next step S461, the reproducibility determination section 172 selects the first one of contents, which are associated with the management information acquired in accordance with a request made by the title-list creation section 512 as contents to be displayed. To put it concretely, the reproducibility determination section 172 acquires one or more content IDs or addresses from the title-list creation section 512 and, after the first content selected at the step S461, every time a step S468 is executed, in accordance with the order of the acquired content IDs, or the order of the acquired addresses any other order, the reproducibility determination section 172 acquires a next content identified by one of the content IDs or a next content located at one of the addresses from the content reproduction apparatus 20 by way of the content acquisition section 504.

Then, at the next step S463, the reproducibility determination section 172 reads out restrictions on reproduction of the acquired content from a license attached to the acquired content. Subsequently, at a step S464 following the step S463, the reproducibility determination section 172 produces a result of determination as to whether or not the content is reproducible on the basis of the reproduction restrictions read out from the license. To put it concretely, as described before, if the reproduction restrictions includes a reproducibility term, the reproducibility determination section 172 compares the present time obtained from a system timer employed in the content-processing apparatus 10 with the reproducibility term in order to produce a result of determination as to whether or not the present time is still within the reproducibility term. If the result of the determination indicates that the present time is still within the reproducibility term, the flow of the list-displaying processing goes on to a step S466 at which the reproducibility determination section 172 notifies the title-list creation section 512 that the content associated with the license is a content that can be reproduced. If the determination result produced at the step S464 indicates that the present time is no longer within the reproducibility term, on the other hand, the flow of the list-displaying processing goes on to a step S465 at which the reproducibility determination section 172 notifies the title-list creation section 512 that the content associated with the license is a content that cannot be reproduced. At the steps S465 and S466, the title-list creation section 512 creates a title list in accordance with the notice received from the reproducibility determination section 172 and the title information of a content is displayed as a title revealing that the content is a content that can or cannot be reproduced. Then, the flow of the list-displaying processing goes on to a step S467 to produce a result of determination as to whether or not the titles of all the contents have been displayed.

The above description explains the flowchart representing processing to display a list of contents stored in a content reproduction apparatus 20 executing copyright management based on the check-in/check-out method as a list distinguishing reproducible contents from irreproducible ones. By referring to FIGS. 39 to 44, the following description explains examples of title lists appearing on the display unit employed in the content-processing apparatus 10.

Figure 39:
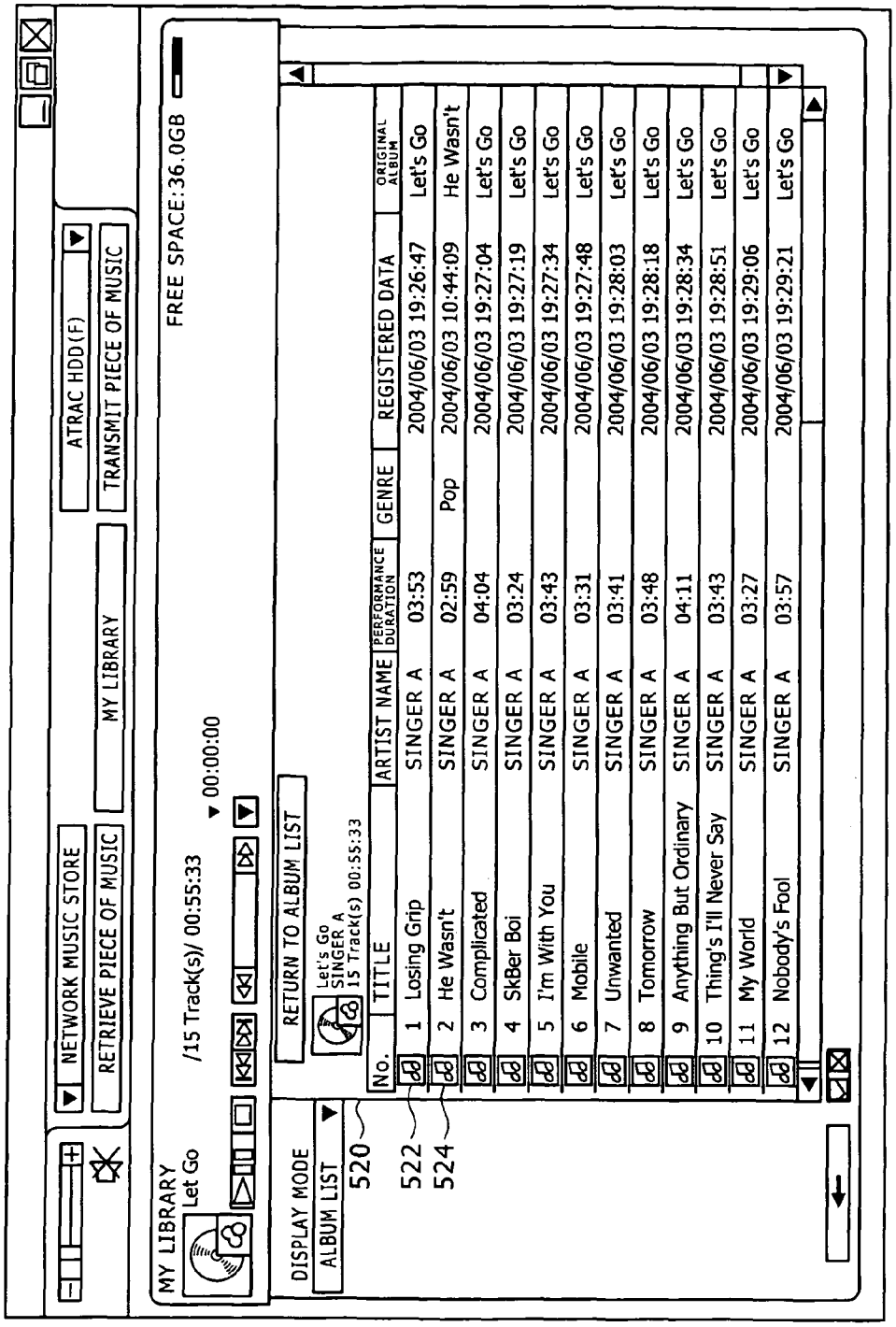
[FIG. 39]

FIG. 39 is a diagram showing a screen layout displaying a typical list of titles of contents in the content-processing apparatus 10 according to the embodiment. The title list 520 shows title information such as the name of a song, the names of artists, a performance duration and a genre. As shown in the figure, a reproducible content and an irreproducible content are displayed as respectively a reproducible icon 522 and an irreproducible icon 524, which have attributes distinguished different from each other. The attributes include colors, shapes and sizes. Each of these icons is placed at the beginning of the title information of a content represented by the icon.

Figure 40:
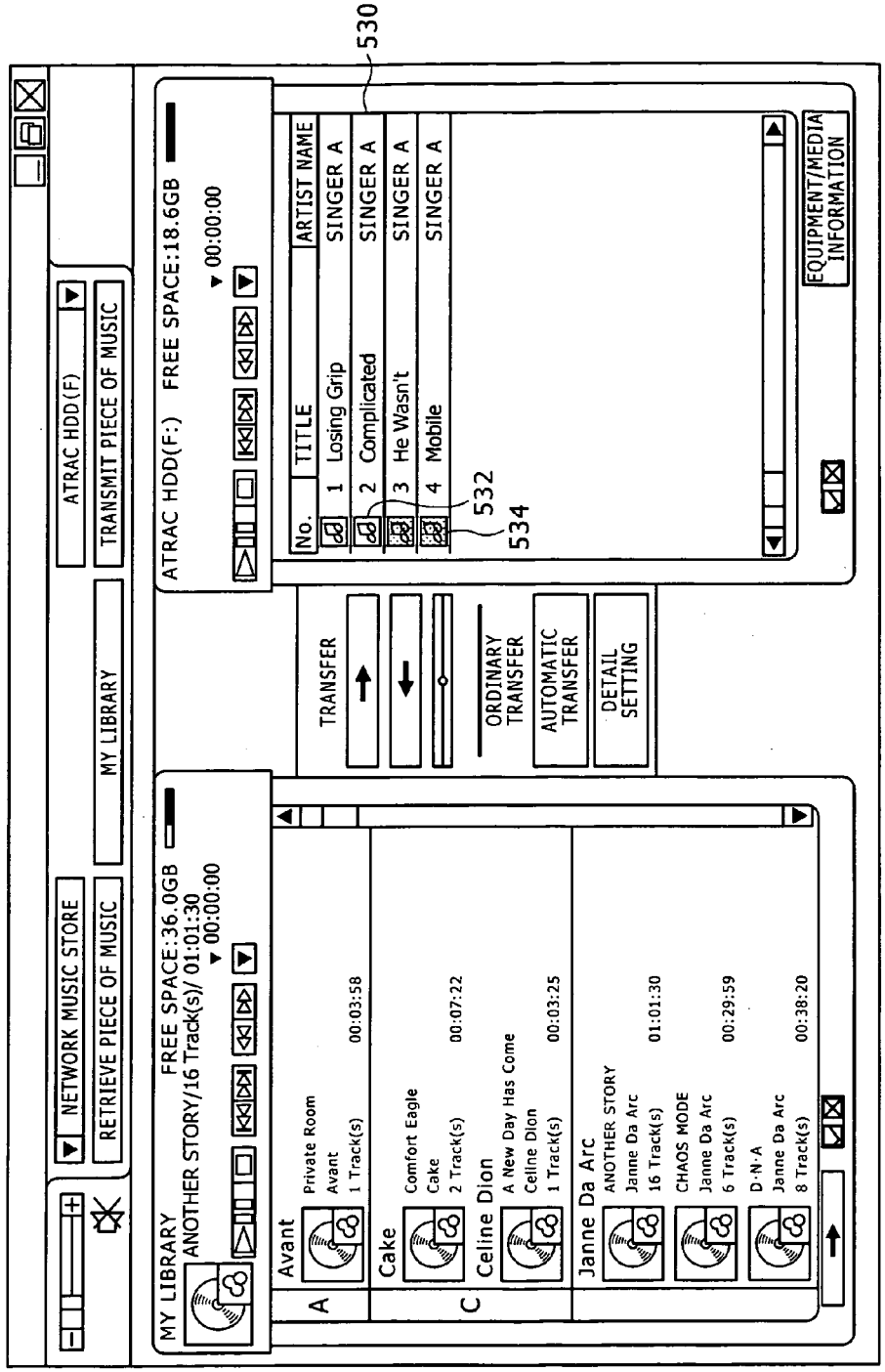
[FIG. 40]

FIG. 40 is a diagram showing a screen layout displaying a typical list of titles of contents in a content reproduction apparatus 20 according to the embodiment. As shown in the figure, a title list 530 of on a portion of the display screen for example. Also as shown in the figure, a reproducible content and an irreproducible content are displayed as respectively a reproducible icon 532 and an irreproducible icon 534, which are different from each other. Each of these icons is placed at the beginning of the title information of a content represented by the icon.

Figure 41:
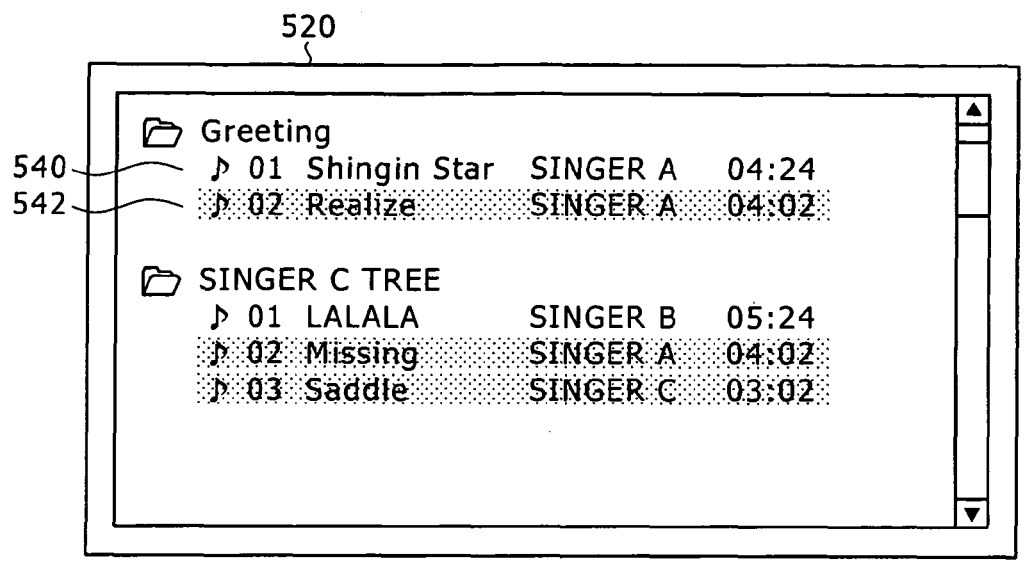
[FIG. 41]
Figure 42:
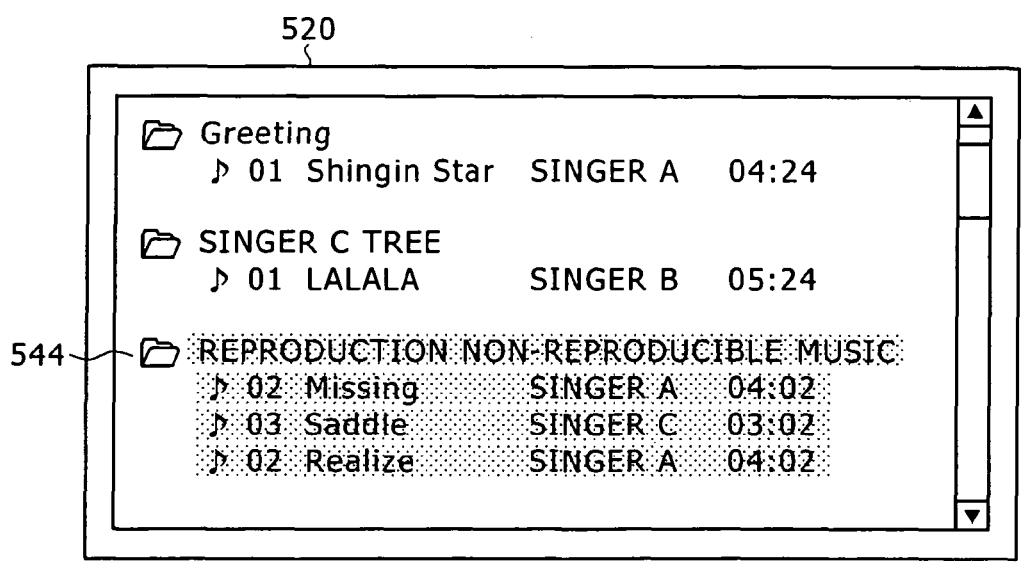
[FIG. 42]
Figure 43:
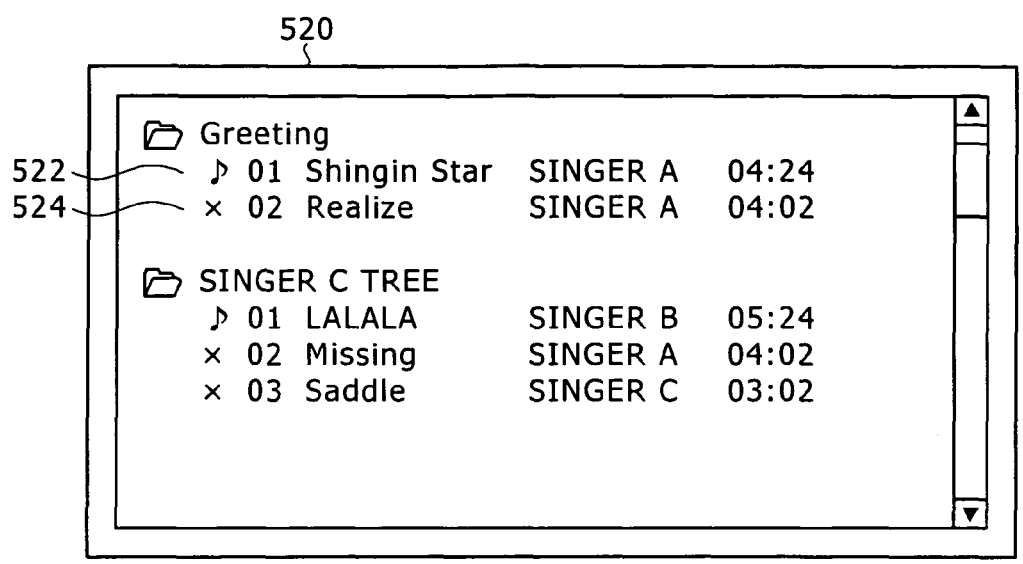
[FIG. 43]

FIGS. 41, 42 and 43 are each a diagram showing another typical screen layout showing reproducible and irreproducible icons, which can be distinguished from each other. In the case of the layout shown in FIG. 41, the reproducible and irreproducible icons are distinguished from each other by their colors or levels of luminance. As shown in the figure, for example, information on the title information of a reproducible content and information on the title information of a irreproducible content are displayed in areas 540 and 542, which have different colors or different levels of luminance so that the user is capable of distinguishing a reproducible content and an irreproducible content from each other. In addition, if reproducible and irreproducible contents are mixed in one album, the user is also capable of distinguishing reproducible contents in the album from irreproducible contents of the same album.

In the case of the layout shown in FIG. 42, reproducible contents and irreproducible contents are distinguished from each other by collecting the irreproducible contents in the display. In such a display, irreproducible contents are displayed as a group of non-reproducible songs to allow the user to distinguish reproducible contents and irreproducible contents from each other. In addition, on the display screens of the content-processing apparatus and the content reproduction apparatus, the since irreproducible contents are put in a group different from the group of reproducible contents, the user is capable of verifying irreproducible contents in the content-processing apparatus and the content reproduction apparatus.

Much like FIGS. 39 and 40, in the layout shown in FIG. 43, an icon representing reproducible contents is different from an icon representing irreproducible contents.

Figure 44:
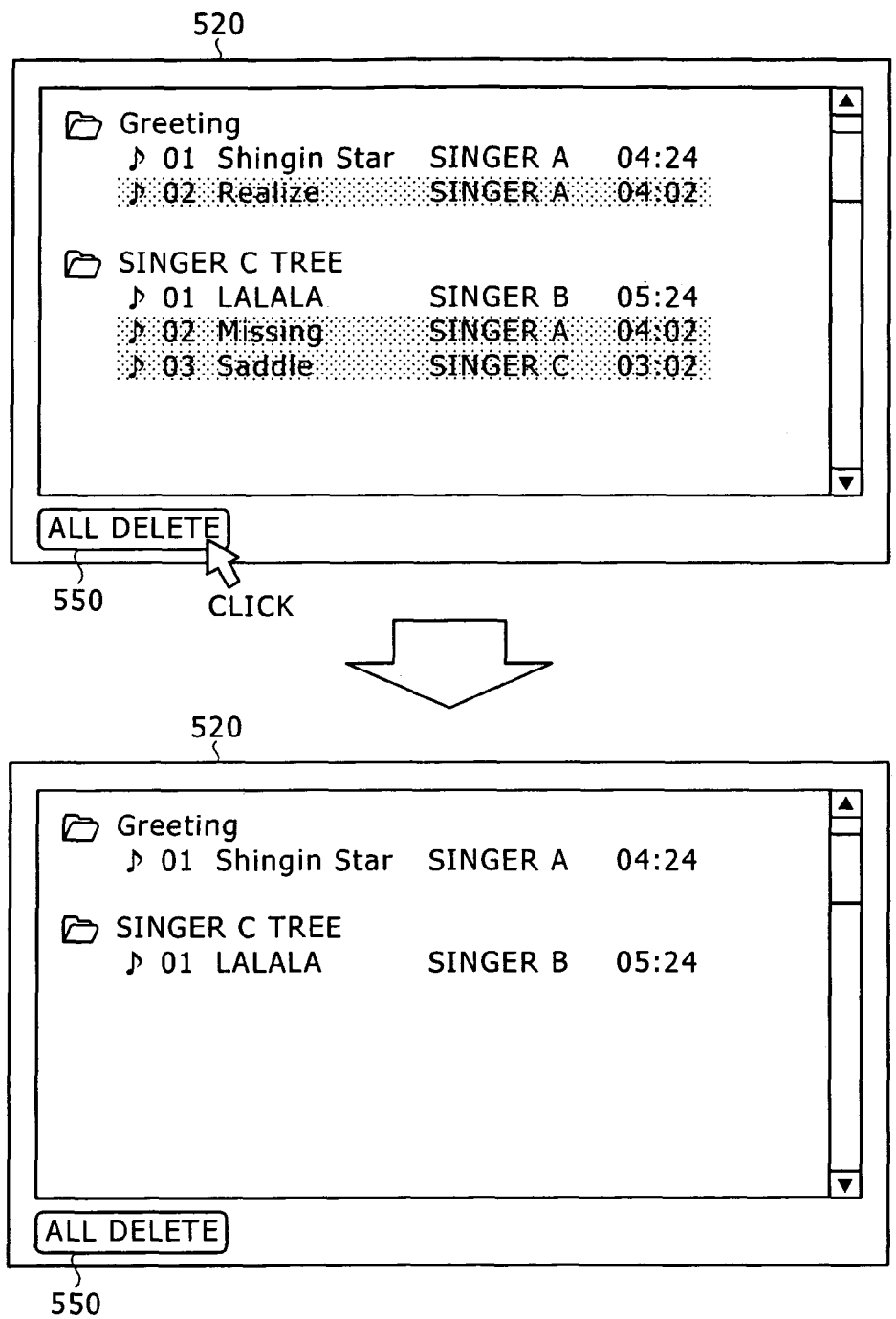
[FIG. 44]
Figure 45:
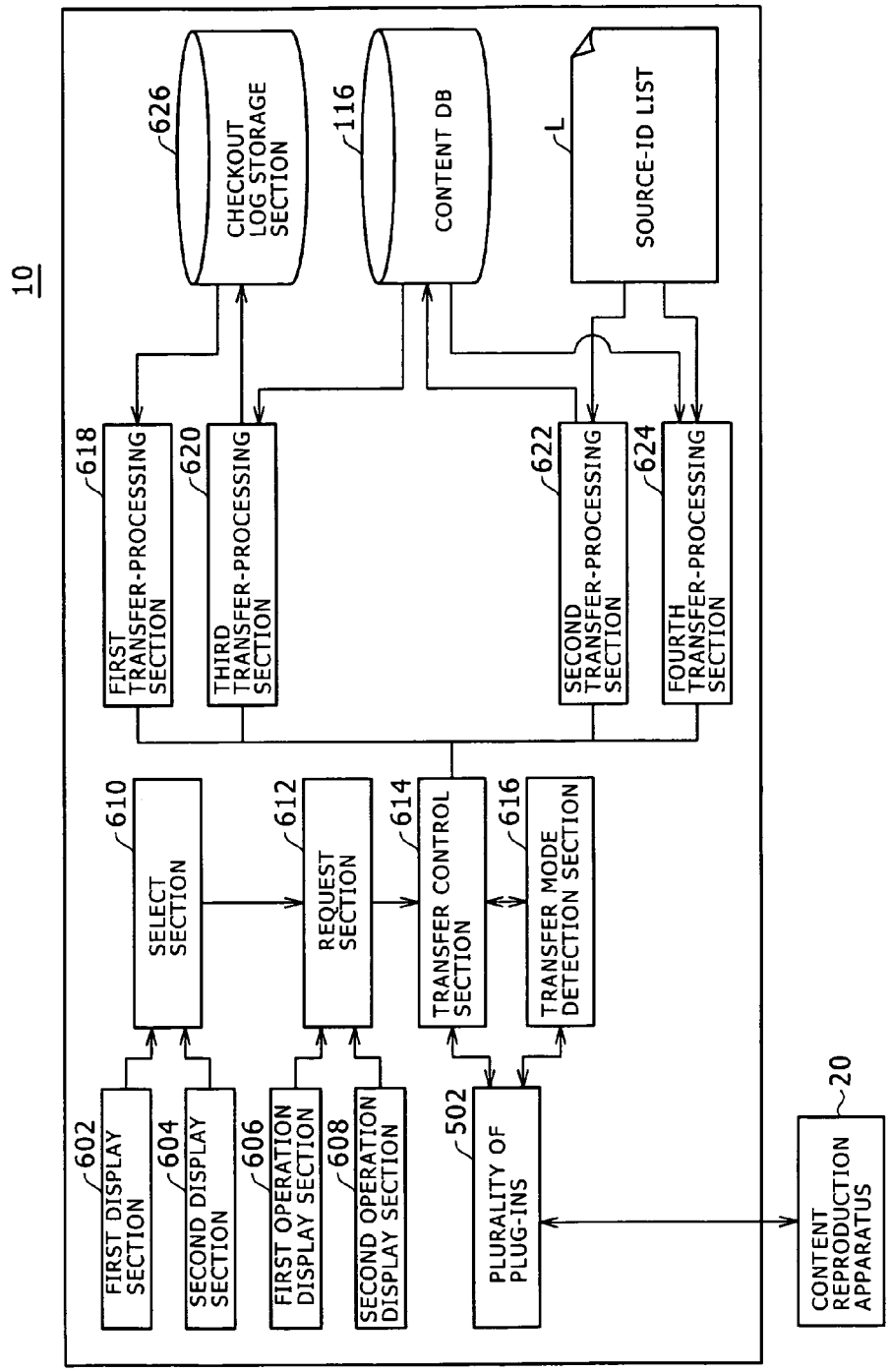
[FIG. 45]

FIG. 44 is a diagram showing a screen layout illustrating a typical screen display in a process that the user deletes an irreproducible content in accordance with the embodiment.

When the user presses, for example, an all-delete button 550 appearing on a display screen as a button of the input apparatus 108, an irreproducible content is deleted from the content-processing apparatus 10 or the content reproduction apparatus 20. At the same time, the title information of the deleted content also disappears from the title list 520 or 530 displayed on the screen.

The above descriptions explain the functional configuration, processing flow and typical screen display of the content-processing apparatus 10. In the content-processing apparatus 10 provided by this embodiment, titles of contents are displayed in such a way that contents that can be reproduced in accordance with the copyright management can be distinguished from irreproducible ones. Thus, the user is capable of determining whether or not a content is reproducible without actually making an attempt to reproduce the content. Since the display also shows the title information of contents that cannot be reproduced, the user is capable of knowing information on each of the irreproducible contents.

13. Content Transfer Method

By referring to FIGS. 45 to 53, the following description explains a content transfer method adopted by a content-processing apparatus 10 according to the embodiment. A content-processing apparatus 10 according to the embodiment exchanges contents with a content reproduction apparatus 20 connected to the content-processing apparatus 10 in accordance with a copyright management method adopted by the content reproduction apparatus 20. To put it concretely, if the copyright management method adopted by the content reproduction apparatus 20 is the group management method, the content-processing apparatus 10 receives a content held by the content reproduction apparatus 20 from the content reproduction apparatus 20. In addition, the content-processing apparatus 10 also transmits a content held by itself to the content reproduction apparatus 20. If the copyright management method adopted by the content reproduction apparatus 20 is the check-in/check-out method, on the other hand, the content-processing apparatus 10 carries out check-in/check-out processes with the content reproduction apparatus 20. The following description explains details of the functional configuration adopted by the content-processing apparatus 10 as a configuration for implementing the above functions.

In order to implement the functions described above, the content-processing apparatus 10 is provided with a first display section 602 for example, a second display section 604, a first operation display section 606, a second operation display section 608, a plurality of plug-in modules, a select section 610, a request section 612, a transfer-mode recognition section 616, a transfer control section 614, a first transfer-processing section 618, a second transfer-processing section 622, a third transfer-processing section 620, a fourth transfer-processing section 624 and a check-out log storage section 626.

The first display section 602 is a unit having a function to display title information of contents stored in a content reproduction apparatus 20 connected to the content-processing apparatus 10 on a display unit included in an output apparatus employed in the content-processing apparatus 10. The second display section 604 is a unit having a function to display title information of contents stored in the content database 116 of the content-processing apparatus 10 on the same display unit. The first display section 602 and the second display section 604 are capable of displaying the title information on the display unit at the same time in a screen layout to be described later. Thus, by viewing the same layout screen, the user is capable of confirming both the titles of contents stored in the content-processing apparatus 10 and the title information of contents stored in a content reproduction apparatus 20 connected to the content-processing apparatus 10.

The select section 610 is a unit having a function to provide the request section 612 with a content ID entered by the user via an input apparatus as a content ID corresponding to title information specified by the user among the title information of contents stored in the content-processing apparatus 10 and the title information of contents stored in a content reproduction apparatus 20. To put it concretely, the content management database is searched for the content ID corresponding to title information specified by the user and the content ID found in the search operation is supplied to the request section 612.

The first operation display section 606 is a unit having a function to display an operation item used by the user for carrying out a first operation on the display unit. The first operation is an operation carried out to transfer a content from the content reproduction apparatus 20 to the content-processing apparatus 10. The operation item is an icon displayed by the first operation display section 606 on the display unit to be clicked by the user by using a mouse or the like. When the user operates the operation item via the input apparatus, the request section 612 is notified of the operation carried out by the user on the operation item.

The second operation display section 608 is a unit having a function to display an operation item used by the user for carrying out a second operation on the display unit. The second operation is an operation carried out to transfer a content from the content-processing apparatus 10 to the content reproduction apparatus 20. The operation item is an icon displayed by the second operation display section 608 on the display unit to be clicked by the user by using a mouse or the like. When the user operates the operation item via the input apparatus, the request section 612 is notified of the operation carried out by the user on the operation item.

Receiving a content ID from the select section 610 and a notice of a first operation from the first operation display section 606, the request section 612 requests the transfer control section 614 to transfer a content identified by the content ID from the content reproduction apparatus 20 to the content-processing apparatus 10. To put it concretely, the request section 612 supplies a flag or the like to the transfer control section 614 as an indication of the existence of a request for a transfer of a content identified by the content ID provided by the select section 610 from the content reproduction apparatus 20 to the content-processing apparatus 10.

Receiving a content ID from the select section 610 and a notice of a first operation from the second operation display section 608, the request section 612 requests the transfer control section 614 to transfer a content identified by the content ID from the content-processing apparatus 10 to the content reproduction apparatus 20. To put it concretely, the request section 612 supplies a flag or the like to the transfer control section 614 as an indication of the existence of a request for a transfer of a content identified by the content ID provided by the select section 610 from the content-processing apparatus 10 to the content reproduction apparatus 20.

Receiving a request for a transfer of a content from the request section 612, the transfer control section 614 requests the transfer-mode recognition section 616 to recognize the transmission mode adopted by the content reproduction apparatus 20 connected to the content-processing apparatus 10. As requested, the transfer-mode recognition section 614 identifies an operating plug-in module among a plurality of plug-in modules and recognizes the copyright management method set in the operating plug-in module. To put it concretely, for example, a file or the like is stored in advance in a storage apparatus of the content-processing apparatus 10 as means associating the identifiers of the plug-in modules with the copyright management methods set in the plug-in modules. In this case, by referring to the file, the transfer-mode recognition section 616 is capable of recognizing the copyright management method set in the operating plug-in module. A content reproduction apparatus 20 associated with the operating plug-in module executes copyright management in accordance with the copyright management method set in the plug-in module. Thus, by recognizing the copyright management method set in the operating plug-in module, the transfer-mode recognition section 616 is capable of determining whether the copyright management method of the content reproduction apparatus 20 connected to the content-processing apparatus 10 is the group management method or the check-in/check-out method.

In accordance with a recognition result received from the transfer-mode recognition section 616 and the request made by the request section 612, the transfer control section 614 requests the first transfer-processing section 618, the second transfer-processing section 622, the third transfer-processing section 620 or the fourth transfer-processing section 624 to carry out a process to transfer a content.

If the request made by the request section 612 is a request for transmission of a content from a content reproduction apparatus 20 to the content-processing apparatus 10 and the recognition result received from the transfer-mode recognition section 616 indicates that the copyright management method of the content reproduction apparatus 20 is the check-in/check-out method (which is also referred to as a first mode), the transfer control section 614 requests the first transfer-processing section 618 to carry out a process to transfer the content.

If the request made by the request section 612 is a request for transmission of a content from the content-processing apparatus 10 to a content reproduction apparatus 20 and the recognition result received from the transfer-mode recognition section 616 indicates that the copyright management method of the content reproduction apparatus 20 is the check-in/check-out method, the transfer control section 614 requests the third transfer-processing section 620 to carry out a process to transfer the content.

If the request made by the request section 612 is a request for transmission of a content from a content reproduction apparatus 20 to the content-processing apparatus 10 and the recognition result received from the transfer-mode recognition section 616 indicates that the copyright management method of the content reproduction apparatus 20 is the group management method (which is also referred to as a second mode), the transfer control section 614 requests the second transfer-processing section 622 to carry out a process to transfer the content.

If the request made by the request section 612 is a request for transmission of a content from the content-processing apparatus 10 to a content reproduction apparatus 20 and the recognition result received from the transfer-mode recognition section 616 indicates that the copyright management method of the content reproduction apparatus 20 is the group management method, the transfer control section 614 requests the fourth transfer-processing section 624 to carry out a process to transfer the content.

The third transfer-processing section 620 is a unit for carrying out check-out processes in a transfer of a content from the content-processing apparatus 10 to a content reproduction apparatus 20. A check-out process is a process carried out by the content-processing apparatus 10 to make a copy of a content stored in the content database 116, attaches a license to the copy of the content. The license includes right information for the copy of the content. The content-processing apparatus 10 transmits the copy of the content and the license from the content-processing apparatus 10 to the content reproduction apparatus 20 so that the content can be reproduced in the content reproduction apparatus 20, However, the check-out process is also a process to restrict the right of the content-processing apparatus 10 to transfer the content to other information-processing apparatus.

To put it concretely, the third transfer-processing section 620 searches the content database 116 for a content identified by a content ID received from the transfer control section 614. Then, the third transfer-processing section 620 refers to the number of permissible check-out operations set in a license attached to the content. If the number of permissible check-out operations is greater than zero, the third transfer-processing section 620 is allowed to carry out a check-out operation on the content. In this case, the third transfer-processing section 620 creates a copy of the content and a new license for the content, attaching the license to the copy of the content. Then, the third transfer-processing section 620 transmits the created copy of the content and the created license to the content reproduction apparatus 20 by way of the transfer control section 614. Subsequently, the third transfer-processing section 620 decrements the number of permissible check-out operations set in the license attached to the content stored in the content database 116 serving as the source of the content transmitted to the content reproduction apparatus 20. In addition, by way of the transfer control section 614, the third transfer-processing section 620 acquires a device ID assigned to the content reproduction apparatus 20 serving as the recipient of the transmitted content and stores the device ID in a check-out log storage section 626 as a check-out log associating the device ID with the content ID identifying the transmitted content.

The first transfer-processing section 618 is a unit for carrying out a check-in process on a content transferred from a content reproduction apparatus 20 to the content-processing apparatus 10. The check-in process is a process to deprive the content reproduction apparatus 20 of the right to reproduce a content, which has been transferred from the content-processing apparatus 10 to the content reproduction apparatus 20 in a check-out process described above. However, the check-in process is also a process to restore the right given to the content-processing apparatus 10 as a right to carry out a check-out process to transfer the content from the content-processing apparatus 10 to another information-processing apparatus.

When a content transferred from a content reproduction apparatus 20 to the content-processing apparatus 10, the first transfer-processing section 618 acquires the content ID of the content from the transfer control section 614. The first transfer-processing section 618 also obtains a device ID of the content reproduction apparatus 20 from the content reproduction apparatus 20 by way of the transfer control section 614. The first transfer-processing section 618 then searches a check-out log stored in the check-out log storage section 626 as a log associating device IDs with content IDs for a log entry corresponding to the acquired content ID and the obtained device ID. If a log entry corresponding to the acquired content ID and the obtained device ID is found in the operation to search the check-out log stored in the check-out log storage section 626, the log entry indicates that the content identified by the acquired content ID is a content already experiencing a check-out process to transfer the content from the content-processing apparatus 10 to the content reproduction apparatus 20. In this case, the first transfer-processing section 618 carries out a check-in process on the content transferred from the content reproduction apparatus 20 to the content-processing apparatus 10. To put it concretely, the first transfer-processing section 618 transmits a request to the content reproduction apparatus 20 as a request to delete the license attached to the content identified by the content ID from the content reproduction apparatus 20 in order to request the content reproduction apparatus 20 to delete the license transmitted to the content reproduction apparatus 20. The content reproduction apparatus 20 may also be requested to delete the content identified by the content ID as well. On the other hand, the third transfer-processing section 620 searches the content database 116 of the content-processing apparatus 10 for the content identified by the content ID received from the transfer control section 614 and increments the number of permissible check-out operations set in the license attached to the content. In addition, the third transfer-processing section 620 also deletes the log entry found in the operation to search the check-out log stored in the check-out log storage section 626 from the log.

The second transfer-processing section 622 is a unit for carrying out a process to transfer a content from a content reproduction apparatus 20 to the content-processing apparatus 10. To put it concretely, first of all, the second transfer-processing section 622 acquires the source-ID list L owned by the content reproduction apparatus 20 from the content reproduction apparatus 20 by way of the transfer control section 614. The source-ID list L owned by the content reproduction apparatus 20 is also referred to as a second source-ID list L. Then, the second transfer-processing section 622 reads out a group ID from the source-ID list L owned by the content-processing apparatus 10 and a group ID from the source-ID list L owned by the content reproduction apparatus 20. The source-ID list L owned by the content-processing apparatus 10 is also referred to as a first source-ID list L. Subsequently, the second transfer-processing section 622 compares the group ID read out from the first source-ID list L with the group ID read out from the second source-ID list L in order to produce a result of determination as to whether or not the group ID read out from the first source-ID list L matches the group ID read out from the second source-ID list L. If the group ID read out from the first source-ID list L matches the group ID read out from the second source-ID list L, the content-processing apparatus 10 and the content reproduction apparatus 20 are determined to be apparatus registered in the same apparatus group managed by the management server. In this case, a transfer of a content from the content reproduction apparatus 20 to the content-processing apparatus 10 is permitted. Thus, if the group ID read out from the first source-ID list L matches the group ID read out from the second source-ID list L, the second transfer-processing section 622 requests the content reproduction apparatus 20 by way of the transfer control section 614 to transmit the content identified by the content ID and stores the content received from the content reproduction apparatus 20 in the content database 116. The first source-ID list L and/or the second source-ID list L may each include a plurality of group IDs. In this case, a transfer of a content from the content reproduction apparatus 20 to the content-processing apparatus 10 is permitted only if any of the group IDs included on the first source-ID list L matches any of the group IDs included on the second source-ID list L. In order to prevent the same content from being stored in the content database 116 more than once so as to avoid duplication, before requesting the content reproduction apparatus 20 to transmit the content to the content-processing apparatus 10, the second transfer-processing section 622 acquires the content ID identifying the content from the transfer control section 614 and searches the content database 116 for the content identified by the content ID. The second transfer-processing section 622 requests the content reproduction apparatus 20 to transmit the content to the content-processing apparatus 10 only if the content has not been stored in the content database 116.

The fourth transfer-processing section 624 is a unit for carrying out a process to transfer a content from the content-processing apparatus 10 to a content reproduction apparatus 20. To put it concretely, the fourth transfer-processing section 624 acquires the source-ID list L owned by the content reproduction apparatus 20 from the content reproduction apparatus 20 by way of the transfer control section 614. As described above, the source-ID list L owned by the content reproduction apparatus 20 is also referred to as a second source-ID list L. Then, the second transfer-processing section 622 acquires a content ID of the content to be transferred from the transfer control section 614 and searches the content database 116 for the content. Subsequently, the second transfer-processing section 622 acquires a source ID attached to the content found in the search operation and produces a result of determination as to whether or not the source-ID list L acquired from the content reproduction apparatus 20 includes the source ID. If the result of the determination indicates that the source-ID list L acquired from the content reproduction apparatus 20 includes the source ID, the content reproduction apparatus 20 is allowed to reproduce the content having the source ID attached thereto. In this case, the fourth transfer-processing section 624 transmits the content to the content reproduction apparatus 20 by way of the transfer control section 614. It is to be noted that a copy of the content can be reproduced and transmitted to the content reproduction apparatus 20 in place of the content itself.

The above description explains the functional configuration of the content-processing apparatus 10. By referring to FIGS. 46 to 49, the following description explains flowcharts of transfers of a content from a content reproduction apparatus 20 to a content-processing apparatus 10 or flowcharts of check-in processes.

Figure 46:
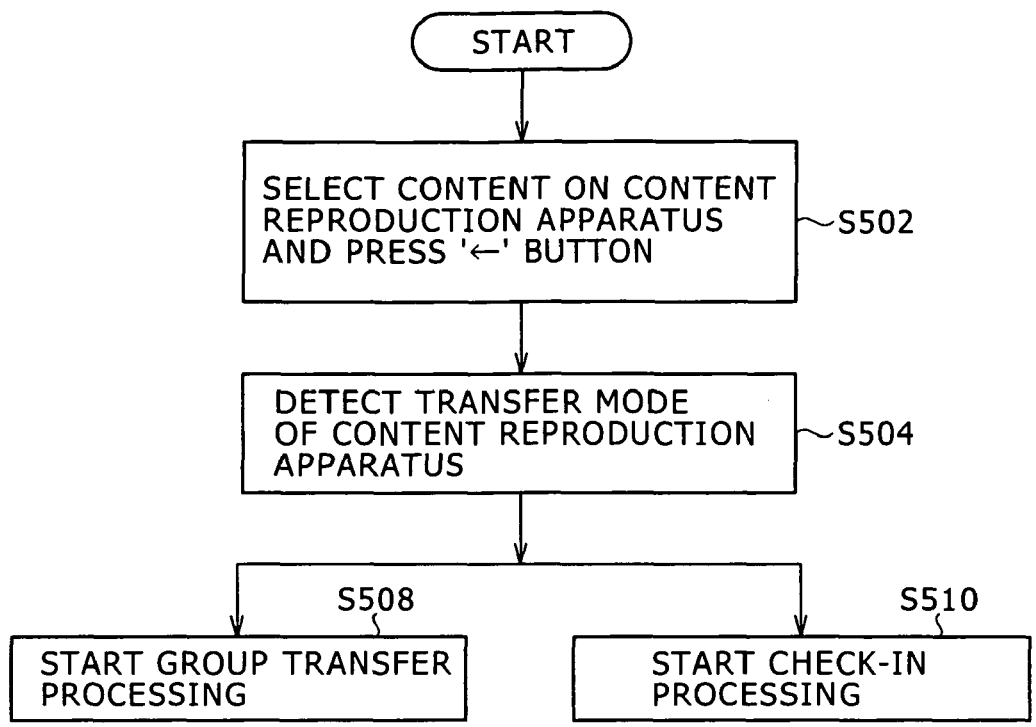
[FIG. 46]
Figure 47:
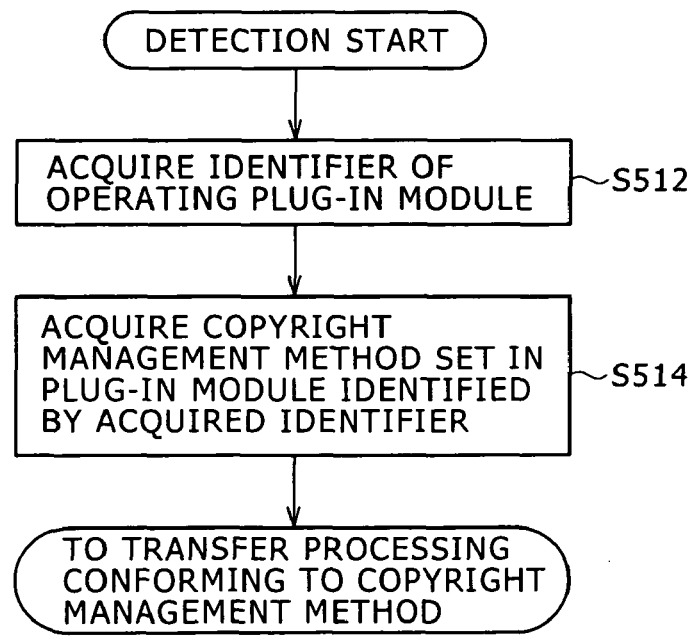
[FIG. 47]

First of all, at a step S502 of the flowchart shown in FIG. 46, the user presses a ← button in order to select the title information of a desired content from a title list displayed on the display unit employed in the content-processing apparatus 10 as a list of titles of contents stored in a content reproduction apparatus 20. The ← button pressed at the step S502 is only one of buttons employed in the operation section. When the ← button is pressed to enter a command via the input section, a request is made to transfer the content from the content reproduction apparatus 20 to the content-processing apparatus 10.

Then, at the next step S504, the content-processing apparatus 10 identifies the transfer mode of the content reproduction apparatus 20. The processing carried out at the step S504 to identify the transfer mode of the content reproduction apparatus 20 is explained in detail by referring to a flowchart shown in FIG. 47 as follows. First of all, at a step S512, the content-processing apparatus 10 acquires the identifier of an operating plug-in module. Then, on the basis of the identifier acquired at the step S512, at the next step S514, the content-processing apparatus 10 identifies a copyright management method set in the operating plug-in module. To put it concretely, the content-processing apparatus 10 identifies a copyright management method set in the operating plug-in module by, for example, referring to a file associating identifiers with copyright management methods as described above.

Let us refer back to the flowchart shown in FIG. 46. As described above, at the step S504, the content-processing apparatus 10 identifies the transfer mode (or the copyright management method) of the content reproduction apparatus 20. If the transfer mode is the group management method, the flow of the content transfer processing goes on to a step S508 at which a transfer process based on the group management method is started. If the transfer mode is the check-in/check-out method, on the other hand, the flow of the content transfer processing goes on to a step S510 at which a transfer process based on the check-in/check-out method is started.

Figure 48:
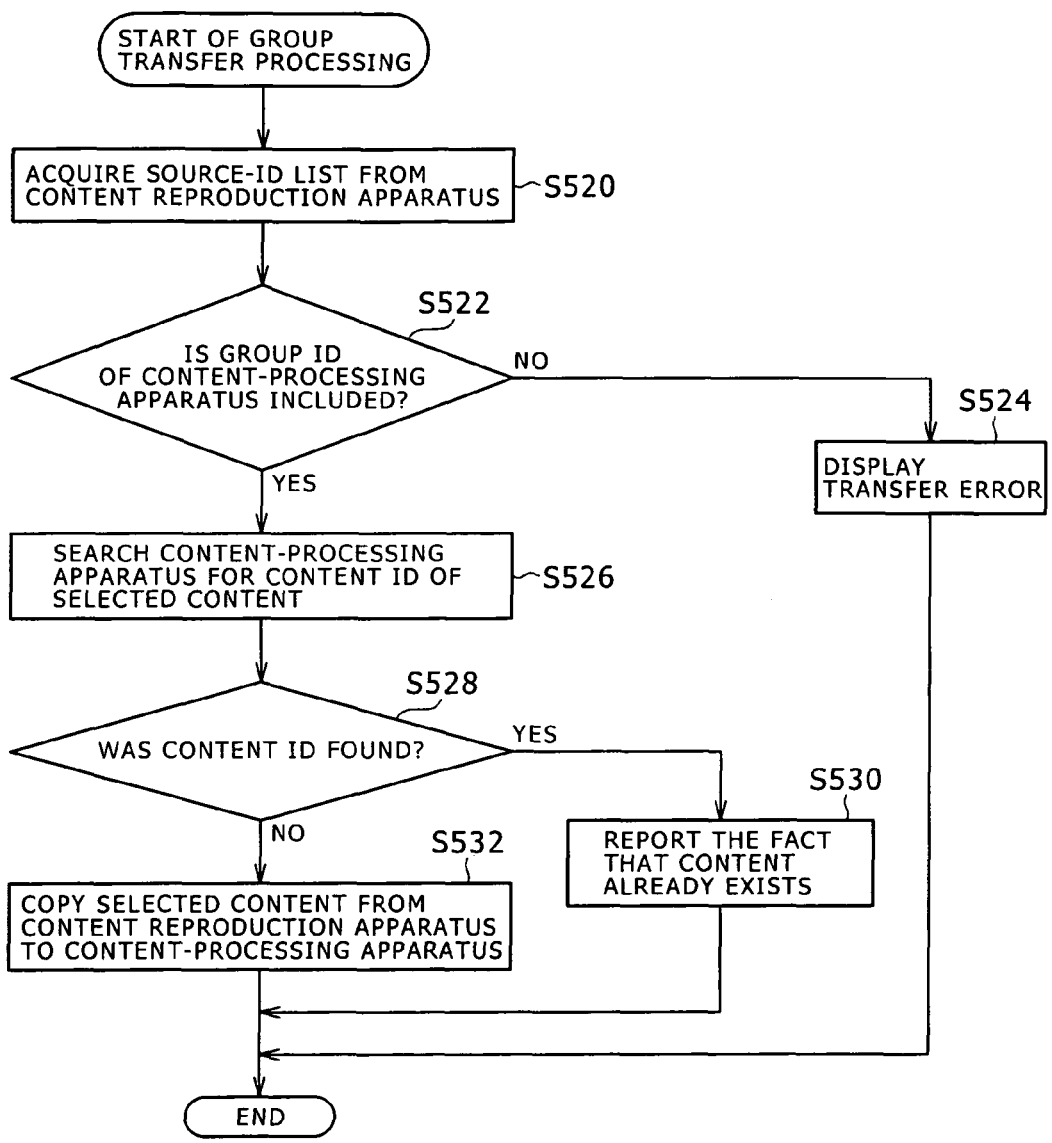
[FIG. 48]

By referring to FIG. 48, the following description explains a flowchart of a transfer based on the group management method as the transfer of a content from a content reproduction apparatus 20 to a content-processing apparatus 10.

The flowchart begins with a step S520 at which the content-processing apparatus 10 acquires the source-ID list L owned by the content reproduction apparatus 20 from the content reproduction apparatus 20. As described before, the source-ID list L owned by the content reproduction apparatus 20 is referred to as the second source-ID list L. After the step S520, the flow of the content transfer processing goes on to a step S522 at which the content-processing apparatus 10 acquires the group ID from the source-ID list L owned by the content-processing apparatus 10 itself and produces a result of determination as to whether or not the second source-ID list L includes the group ID. As described earlier, the source-ID list L owned by the content-processing apparatus 10 is referred to as the first source-ID list L. If the result of the determination indicates that the second source-ID list L does not include the group ID, the flow of the content transfer processing goes on to a step S524 at which an error message is displayed to indicate that the content cannot be transferred from the content reproduction apparatus 20 to the content-processing apparatus 10. If the result of the determination indicates that the second source-ID list L includes the group ID, on the other hand, the flow of the content transfer processing goes on to a step S526 at which the content-processing apparatus 10 produces a result of determination as to whether or not the content-processing apparatus 10 holds a content ID selected by the user as the content ID of the content to be transferred from the content reproduction apparatus 20 to the content-processing apparatus 10. Then, at the next step S528, if the determination result produced at the step S528 indicates that the content to be transferred from the content reproduction apparatus 20 to the content-processing apparatus 10 has already been stored in the content-processing apparatus 10, the flow of the content transfer processing goes on to a step S530 at which a message is displayed to notify the user that the content has already been stored in the content-processing apparatus 10.

If the determination result produced at the step S528 indicates that the content to be transferred from the content reproduction apparatus 20 to the content-processing apparatus 10 has not been stored in the content-processing apparatus 10, on the other hand, the flow of the content transfer processing goes on to a step S532 at which the content-processing apparatus 10 drives the content reproduction apparatus 20 to transmit the desired content to the content-processing apparatus 10.

Figure 49:
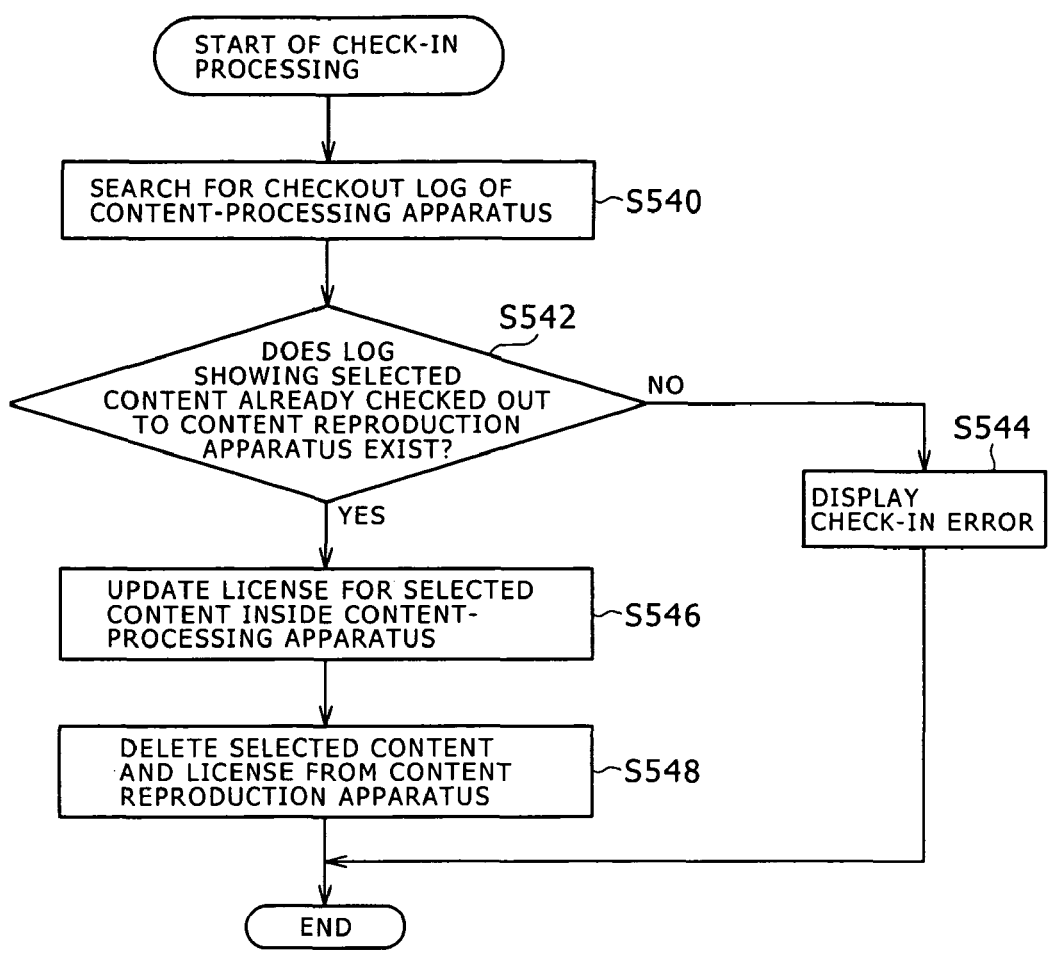
[FIG. 49]

By referring to FIG. 49, the following description explains a flowchart of a transfer based on the check-in/check-out method as the transfer of a content from a content reproduction apparatus 20 to a content-processing apparatus 10. In this case, the transfer of a content from a content reproduction apparatus 20 to a content-processing apparatus 10 is referred to as a check-in method.

The flowchart begins with a step S540 at which the content-processing apparatus 10 searches the check-out log for a content to be transferred from the content reproduction apparatus 20 to the content-processing apparatus 10 as described above on the basis of the content ID identifying the content and the device ID of the content reproduction apparatus 20 in order to make sure that the content has indeed already been subjected to a check-out process. Then, at the next step S542, the content-processing apparatus 10 produces a result of determination as to whether or not the check-out log includes a log entry of the content, which has already been subjected to a check-out process to the content reproduction apparatus 20. If the determination result produced at the step S542 indicates that the check-out log does not include a log entry of the content already been subjected to a check-out process to the content reproduction apparatus 20, the flow of the check-in process goes on to a step S544 to display a message, which states: "The content is not a content checked out from the content-processing apparatus," indicating that a check-in process cannot be carried out.

If the determination result produced at the step S542 indicates that the check-out log includes a log entry of the content already been subjected to a check-out process to the content reproduction apparatus 20, on the other hand, the flow of the check-in process goes on to a step S546 to increment a check-out count set in a license attached to the content stored in the content-processing apparatus 10 as a content identified by the content ID of the content to be checked in to the content-processing apparatus 10. The check-out count is the number of remaining permissible check-out processes that can be carried out from now on. Then, at the next step S548, the content selected as a content to be checked in to the content-processing apparatus 10 and the license attached to the content are deleted from the content reproduction apparatus 20. It is to be noted that the order in which the processes of the steps S546 and S548 are carried out can also be reversed.

The above description explains the flowchart of the processing to transfer a content from a content reproduction apparatus 20 to a content-processing apparatus 10 or the check-in process. By referring to FIGS. 50 to 52, the following description explains processing to transfer a content from a content-processing apparatus 10 to a content reproduction apparatus 20 or the check-out process.

Figure 50:
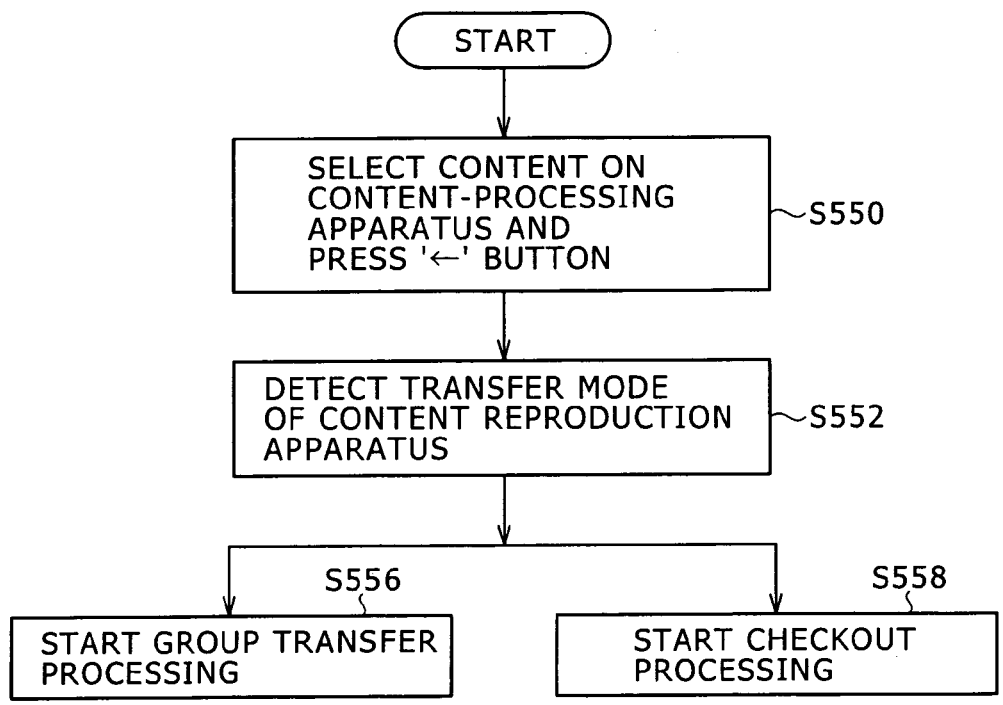
[FIG. 50]

A flowchart shown in FIG. 50 begins with a step S550 at which the user presses a → button in order to select the title information of a desired content from a title list displayed on the display unit employed in the content-processing apparatus 10 as a list of titles of contents stored in a content-processing apparatus 10. The → button pressed at the step S550 is only one of buttons employed in the operation section. When the → button is pressed to enter a command via the input section, a request is made to transfer the content from the content-processing apparatus 10 to a content reproduction apparatus 20.

Then, at the next step S552, the content-processing apparatus 10 identifies the transfer mode of the content reproduction apparatus 20. The processing carried out at the step S552 to identify the transfer mode of the content reproduction apparatus 20 is the same as the processing explained earlier by referring to the flowchart shown in FIG. 47. If the identified transfer mode is the group management method, the flow of the content transfer processing goes on to a step S556 at which a transfer process based on the group management method is started. If the transfer mode identified in the processing is the check-in/check-out method, on the other hand, the flow of the content transfer processing goes on to a step S558 at which a transfer process based on the check-in/check-out method is started.

Figure 51:
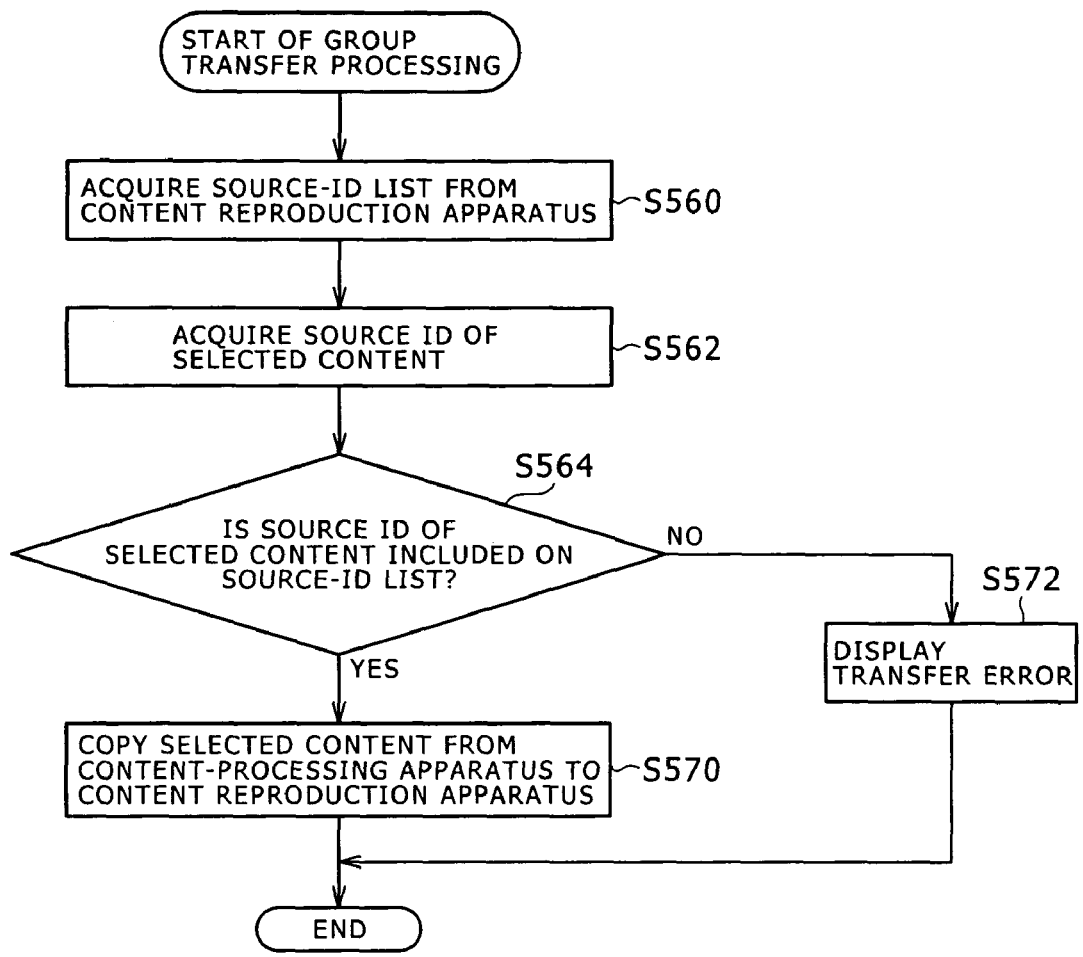
[FIG. 51]

By referring to FIG. 51, the following description explains a flowchart of a transfer based on the group management method as the transfer of a content from a content-processing apparatus 10 to a content reproduction apparatus 20.

The flowchart begins with a step S560 at which the content-processing apparatus 10 acquires the source-ID list L from the content reproduction apparatus 20. As described before, the source-ID list L owned by the content reproduction apparatus 20 is referred to as the second source-ID list L. After the step S560, the flow of the content transfer processing goes on to a step S562 at which the content-processing apparatus 10 acquires the source ID attached to a content selected by the user. Then, at the next step S564, the content-processing apparatus 10 produces a result of determination as to whether or not the second source-ID list L includes the source ID. If the result of the determination indicates that the second source-ID list L does not include the source ID, the flow of the content transfer processing goes on to a step S572. At this step, an error message is displayed as a message stating: "The content is irreproducible in the content reproduction apparatus," indicating that the content cannot be transferred from the content-processing apparatus 10 to the content reproduction apparatus 20. If the result of the determination indicates that the second source-ID list L includes the source ID, on the other hand, the flow of the content transfer processing goes on to a step S570 at which the content-processing apparatus 10 transmits the content selected by the user to the content reproduction apparatus 20.

Figure 52:
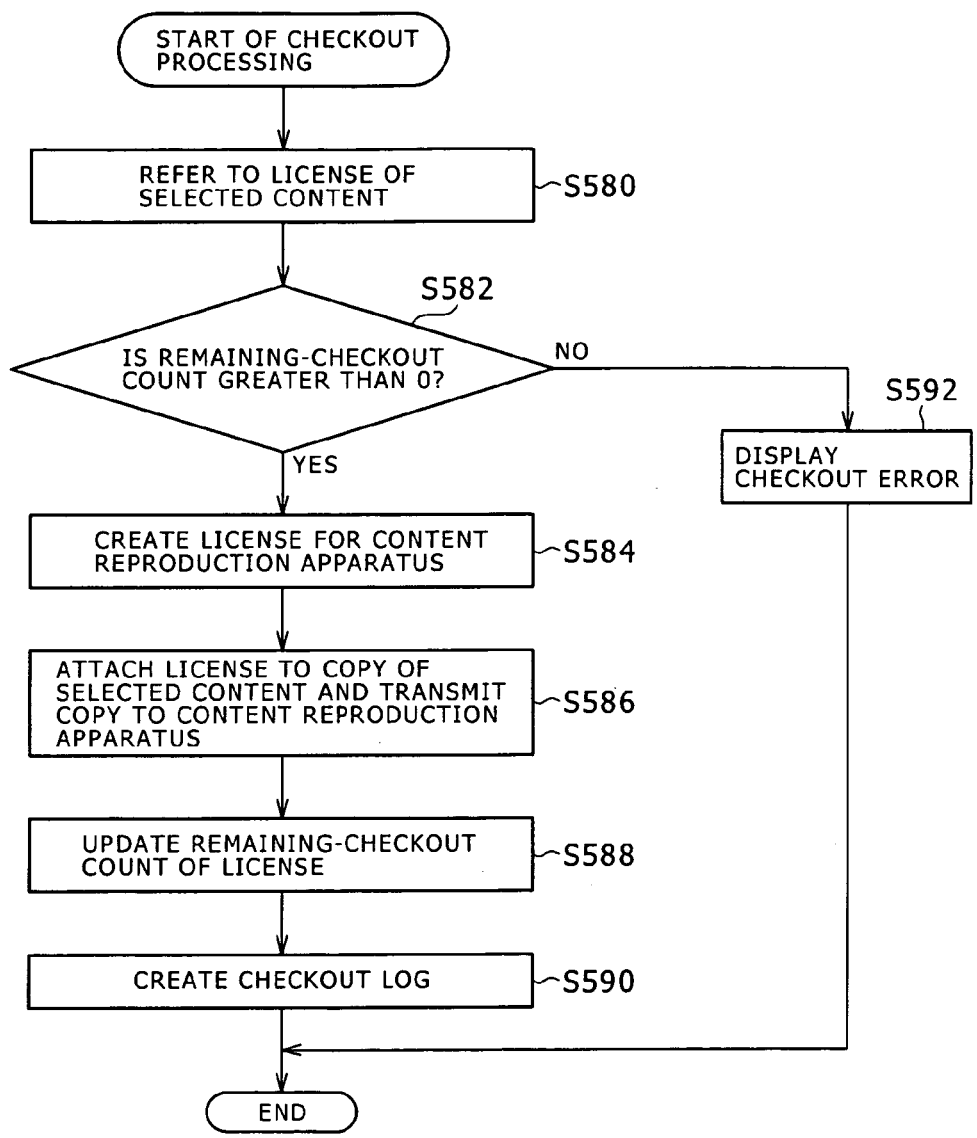
[FIG. 52]
Figure 53:
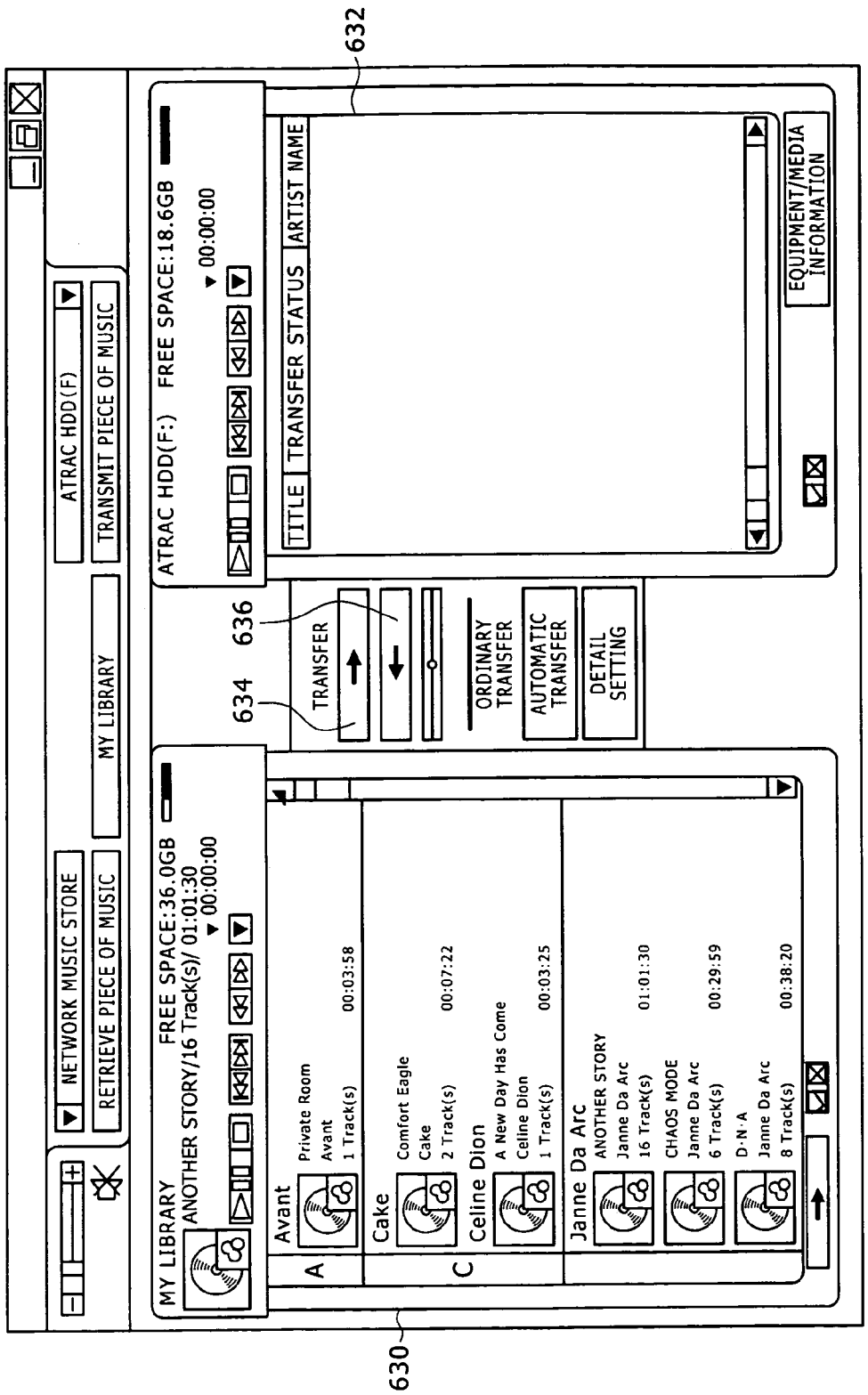
[FIG. 53]

By referring to FIG. 52, the following description explains a flowchart of a transfer based on the check-in/check-out method as the transfer of a content from a content-processing apparatus 10 to a content reproduction apparatus 20. The transfer based on the check-in/check-out method as the transfer of a content from a content-processing apparatus 10 to a content reproduction apparatus 20 is referred to as a check-out process.

First of all, at a step S580, the content-processing apparatus 10 refers to a license attached to a content selected by the user as a content to be transferred from the content-processing apparatus 10 to the content reproduction apparatus 20. Then, at the next step S582, a remaining check-out count set in the license is examined to produce a result of determination as to whether or not the count has become equal to zero. If the remaining check-out count has become equal to zero the flow of the check-out processing goes on to a step S592 at which a message is displayed to indicate that the check-out process can no longer be carried out. If the remaining check-out count is still greater than zero, on the other hand, the flow of the check-out processing goes on to a step S584 at which a license is created. The created license includes information such as a limitation on reproduction of the content in the content reproduction apparatus 20. Then, at the next step S586, the content-processing apparatus 10 attaches the created license to a copy of the content and transmits the copy with the license attached thereto to the content reproduction apparatus 20.

Then, at the next step S588, the content-processing apparatus 10 decrements the remaining check-out count by one. The remaining check-out count is a number included in the license attached to the content copy, which has been transmitted from the content-processing apparatus 10 serving as the sender of the copy to the content reproduction apparatus 20. Subsequently, at the next step S590, the content-processing apparatus 10 associates the content ID of the content checked out from the content-processing apparatus 10 to the content reproduction apparatus 20 with the device ID of the content reproduction apparatus 20, putting the content ID and the device ID on a check-out log as a log entry.

The above description explains a check-out process, which is transfer, based on the check-out method as the transfer of a content from a content-processing apparatus 10 to a content reproduction apparatus 20. By referring to FIG. 53, the following description explains a typical screen layout appearing on the display unit employed in a content-processing apparatus 10 according to the embodiment.

A title list 630 is a list displayed by the second display section 604 as a typical list of contents stored in a content-processing apparatus 10. On the other hand, a title list 632 is a list displayed by the first display section 602 as a typical list of contents stored in a content reproduction apparatus 20.

A → button 634 is a typical operation member displayed by the second operation display section 608. On the other hand, a ← button 636 is a typical operation member displayed by the first operation display section 606.

When the user selects a desired title from those on the title list 630 and presses the → button 634, the content-processing apparatus 10 transmits a content represented by the selected title to a content reproduction apparatus 20 in a check-out process. The check-out process is carried out to transmit the content from the content-processing apparatus 10 to the content reproduction apparatus 20 in accordance with either of the group management method and the check-in/check-out method, one of which is selected in accordance with the copyright management method adopted by the content reproduction apparatus 20.

When the user selects a desired title from those on the title list 632 and presses the ← button 636, on the other hand, a content reproduction apparatus 20 transmits a content represented by the selected title to the content-processing apparatus 10 in a check-in process. The check-in process is carried out to transmit the content from the content reproduction apparatus 20 to the content-processing apparatus 10 in accordance with either of the group management method and the check-in/check-out method, one of which is selected in accordance with the copyright management method adopted by the content reproduction apparatus 20.

The above description explains a typical screen layout appearing on the display unit employed in a content-processing apparatus 10.

The above descriptions explain a functional configuration of a content-processing apparatus 10 according to the embodiment, flows of processes carried out by the content-processing apparatus 10 and typical screens displayed by the content-processing apparatus 10. According to the content-processing apparatus 10 provided by the embodiment, a content can be transferred from the content-processing apparatus 10 to a content reproduction apparatus 20 or vice versa in accordance with a method, which is selected in dependence on the copyright management method adopted by the content reproduction apparatus 20. In addition, even if an operation member common to both the transfer directions is operated to make a request for such a transfer, the content-processing apparatus 10 is capable of recognizing the copyright management method adopted by the content reproduction apparatus 20 and hence selecting a transfer method accordingly. Thus, the user does not need to select a transfer method by being aware of the copyright management method adopted by the content reproduction apparatus 20.

14. Content Reproduction Control Method in a Content Reproduction Apparatus (PD)

The following description explains a process carried out by a content reproduction apparatus 20 (PD) provided by the embodiment as a process to control reproduction of a content.

As described earlier, the content reproduction apparatus 20 (PD) provided by the embodiment is compatible with both the copyright management scheme based on the group management method and the copyright management scheme based on the check-in/check-out method. That is to say, the content reproduction apparatus 20 (PD) is capable of selectively executing either reproduction control adopting the group management method based on source IDs each added to a content and based on a source-ID list L or reproduction control adopting the check-in/check-out method based on usage rule information prescribed in a license attached to every content.

A content-processing apparatus 10 (PC) sets the group management method or the check-in/check-out method as the copyright management technique in a content reproduction apparatus 20 (PD) connected to the content-processing apparatus 10 by a local line 9. In a process to set the reproduction control method, the content-processing apparatus 10 (PD) acquires ICV data 21 of the content reproduction apparatus 20 (PD) from the content reproduction apparatus 20 and updates a flag 232 included in the ICV data 231 as shown in FIG. 10 as method identification information. Then, the content-processing apparatus 10 (PC) transmits the ICV data 231 back to the content reproduction apparatus 20 (PD). If the flag 232 included in the ICV data 231 is updated to "0", for example, the group management method is adopted as the reproduction control method of the content reproduction apparatus 20 (PD). If the flag 232 included in the ICV data 231 is updated to "1", on the other hand, the check-in/check-out method is adopted as the reproduction control method of the content reproduction apparatus 20 (PD).

It is to be noted that, in this embodiment, only the content-processing apparatus 10 (PC) connected by a local line to the content reproduction apparatus 20 (PD), is capable of updating the ICV data 231 of the content reproduction apparatus 20. The content reproduction apparatus 20 (PD) is not capable of updating the ICV data 231 by itself. However, the embodiment is not limited to this typical implementation. For example, it is also possible to provide a configuration in which the content reproduction apparatus 20 (PD) is made capable of updating the ICV data 231 by itself in accordance with an input entered by the user. Thus, in such a configuration, the content reproduction apparatus 20 (PD) is capable of changing the reproduction control method thereof by itself.

Figure 54:
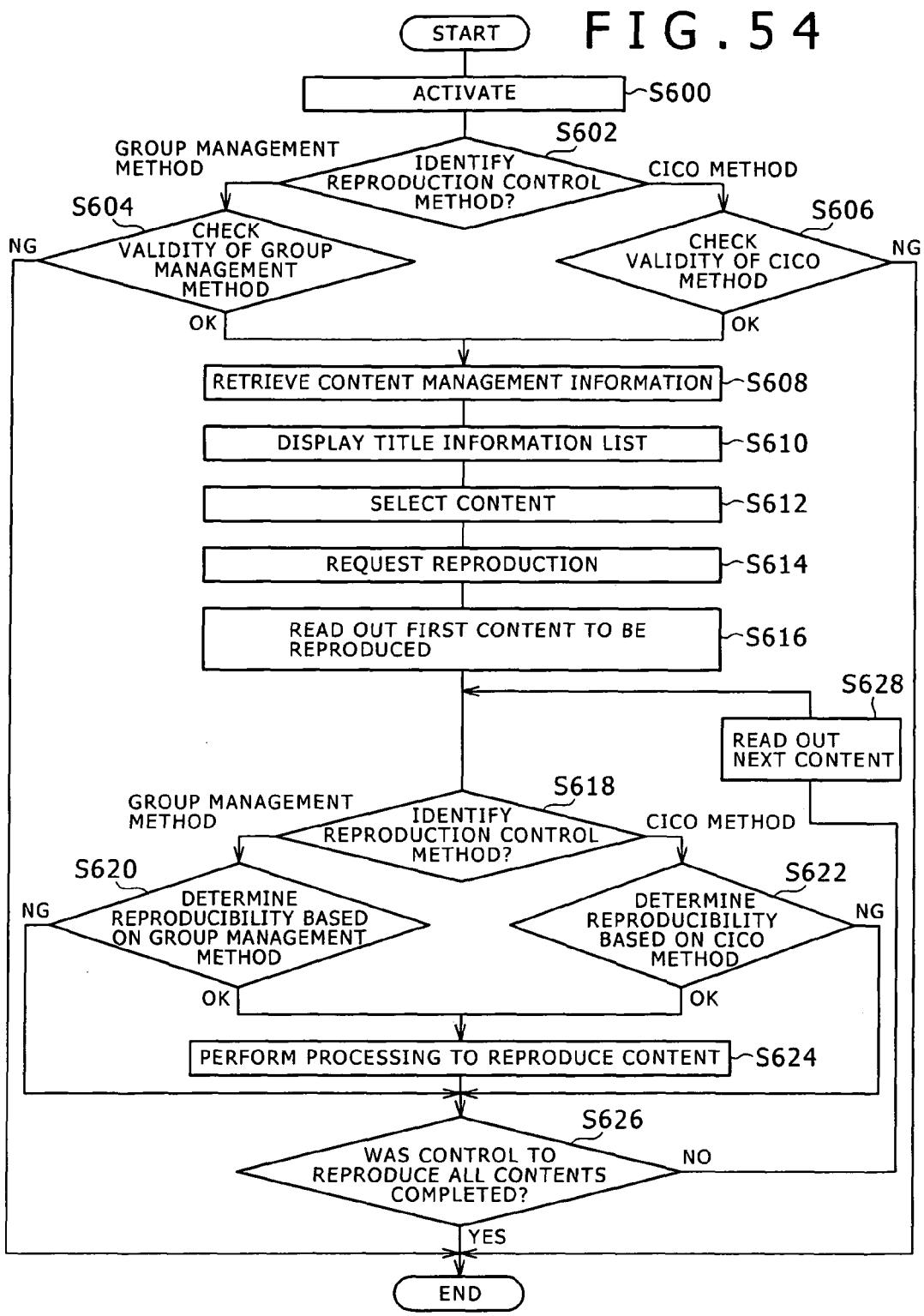
[FIG. 54]

By referring to FIGS. 54 and 10, the following description explains typical content reproduction control processing carried out by a content reproduction apparatus 20 (PD). It is to be noted that FIG. 54 shows a flowchart representing the typical processing to control reproduction of contents in a PD serving as a content reproduction apparatus 20 according to the embodiment.

The processing to control reproduction of contents is processing to let the user select contents to be reproduced among all contents stored in the content reproduction apparatus 20 and then produce a result of determination as to whether or not each of the contents selected as contents to be reproduced is a content that can be reproduced.

As shown in FIG. 54, the flowchart begins with a step S600 at which the content reproduction apparatus 20 is activated. For example, at the step S600, the user presses a power-supply button, a reproduction key or the like to start the content reproduction apparatus 20. It is to be noted that the content reproduction apparatus 20 does not have to be connected to a PC serving as a content-processing apparatus 10 in order to activate the content reproduction apparatus 20.

Then, at the next step S602, the reproduction control method determination section 240 employed in the content reproduction apparatus 20 recognizes the reproduction control method, which has been set in advance in the content reproduction apparatus 20, on the basis of information used for identifying the reproduction control method.

To put it concretely, after the activation of the content reproduction apparatus 20, the reproduction control method determination section 240 reads out ICV data 231 stored in the storage section 230 employed in the content reproduction apparatus 20 and checks a flag 232 included in the ICV data 231. As described earlier, the flag 232 is a kind of method identification information used for identifying a method to control reproduction of a content. On the basis of the ICV data 231, the reproduction control method determination section 240 produces a result of determination as to whether the group management method or the check-in/check-out method has been adopted as the reproduction control method of the content reproduction apparatus 20. As described above, the group management method and the check-in/check-out method are referred to as a first reproduction control method and a second reproduction control method respectively. If the flag 232 is "0", for example, the reproduction control method determination section 240 produces a determination result indicating that the group management method has been adopted as the reproduction control method of the content reproduction apparatus 20 (PD). In this case, the flow of the reproduction control processing goes on to a step S604. If the flag 232 is "1", on the other hand, the reproduction control method determination section 240 produces a determination result indicating that the check-in/check-out method has been adopted as the reproduction control method of the content reproduction apparatus 20 (PD). In this case, the flow of the reproduction control processing goes on to a step S606.

Then, at the step S604, the reproducibility determination section 242 employed in the content reproduction apparatus 20 checks the validity of the reproduction control based on the group management method. To put it concretely, at the step S604, on the basis of the ICV data 231 stored in the storage section 230, the reproducibility determination section 242 checks the validity of the source-ID list L stored in the storage section 230 in order to produce a result of determination as to whether or not the source-ID list L has been interpolated. As described above, the ICV data 231 of the group management method includes the MAC value 233 of the source-ID list L. The reproducibility determination section 242 computes a MAC value of the present source-ID list L read out from the storage section 230 and compares the computed MAC value with the MAC value 233 included in the ICV data 231 read out from the storage section 230 in order to produce a result of determination as to whether or not the source-ID list L has been interpolated.

At the step S606, on the other hand, the reproducibility determination section 242 employed in the content reproduction apparatus 20 checks the validity of the reproduction control based on the check-in/check-out method. To put it concretely, at the step S606, on the basis of the ICV data 231 stored in the storage section 230, the reproducibility determination section 242 checks the validity of a license attached to each content stored in the storage section 230 in order to produce a result of determination as to whether or not the license has been interpolated. As described above, the ICV data 231 of the check-in/check-out method includes the MAC value 233 of the source-ID list L. The reproducibility determination section 242 computes a MAC value of the license attached to every content stored in the storage section 230 and compares the computed MAC value with the MAC value 233 included in the ICV data 231 in order to produce a result of determination as to whether or not the license has been interpolated.

A determination result produced at the steps S604 or S606 as described above may indicate that the source-ID list L has been interpolated. In this case, no content is reproduced. Instead, a notice of an error is issued before the execution of the entire reproduction control processing is ended. If neither the source-ID list L nor the licenses has been interpolated, on the other hand, their validity is confirmed. In this case, the flow of the reproduction control processing goes on to the next step S608.

At the step S608, content management information is read out from the content management information database 236 and written into the RAM 203. The content management information read out at the step S608 includes the content ID and content title information of every content stored in the content database 234. The content title information includes the song name of the content, the names of artists and the reproduction duration of the content. An example of the recording location of a content is an address in the content database 234.

Then, at the next step S610, title list of contents is displayed on the display apparatus 210 employed in the content reproduction apparatus 20. To put it in detail, at the step S610, the title-list creation section 250 employed in the content reproduction apparatus 20 (PD) creates a title list based on titles read out from the content management information database 236 as title information of contents. The title list is a list of song names of musical contents and attributes of each of the musical contents. As described above, the attributes of a musical content include the song name of the musical content, the names of artists and the reproduction duration of the musical content. Then, the title-list creation section 250 displays the created title list on the display apparatus 210.

Subsequently, at the next step S612, the user selects contents to be reproduced. To put it in detail, at the step S612, the user views the title list appearing on the display apparatus 210 and selects one or more contents from the title list as contents that the user wants to reproduce. In order for the user to select the contents to be reproduced, the user specifies the title information of the contents by operating the input apparatus 208.

Then, at the next step S614, the user enters a command serving as a request for reproduction of the selected contents. To put it in detail, at the step S614 after the user has specified the title information of the desired contents to be reproduced as described above, the user presses a reproduction key of the input apparatus 208 or a reproduction key of the remote controller 218 in order to enter a command to start the reproduction. Then, the content select section 252 selects a content indicated by a title specified by the user as a content to be reproduced and supplies information on the content to the reproducibility determination section 242. The information on the content to be reproduced includes the content ID and storage location of the content.

Then, at the next step S616, a content indicated by a title specified by the user as a first content to be reproduced is read out from the content database 234. To put it concretely, at the step S616, the reproducibility determination section 242 searches the content database 234 for a file on the basis of information, which is input from the content select section 252 as the information on the content to be reproduced, as the file of the first content to be reproduced. The reproducibility determination section 242 then reads out the file found in the search process from the content database 234.

Then, at the next step S618, the content reproduction apparatus 20 recognizes the reproduction control method, which has been set in advance in the content reproduction apparatus 20, in the same way as the step S602 described before. If the recognition result produced at the step S618 indicates that the group management method has been adopted as the reproduction control method of the content reproduction apparatus 20, the flow of the reproduction control processing goes on to a step S620. If the result of the recognition indicates that the check-in/check-out method has been adopted as the reproduction control method of the content reproduction apparatus 20, on the other hand, the flow of the reproduction control processing goes on to a step S622. Since the same process to recognize the reproduction control method has been carried out at the step S602, the process carried out at the step S618 can actually be omitted.

Then, at the step S620, the first reproducibility determination section 242a produces a result of determination as to whether or not the content to be reproduced is a content reproducible in accordance with the group management method adopted as the reproduction control method. To put it concretely, at the step S620, the first reproducibility determination section 242a produces a result of determination as to whether or not the content to be reproduced is a reproducible content by determining whether or not the source-ID list L stored in the storage section 230 employed in the content reproduction apparatus 20 includes a source ID added to the content to be reproduced.

If the result of the determination indicates that the source-ID list L includes a source ID added to the content to be reproduced, the first reproducibility determination section 242a permits reproduction of the content. In this case, the flow of the reproduction control processing goes on to a step S624. If the result of the determination indicates that the source-ID list L does not include the source ID added to the content to be reproduced, on the other hand, the first reproducibility determination section 242a does not permit reproduction of the content. In this case, the flow of the reproduction control processing goes on to a step S626.

It is to be noted that the source ID included in the source-ID list L may have a validity term set therein. In this case, in addition to the determination process carried out at the step S620, the first reproducibility determination section 242a also produces a result of determination as to whether or not the validity term set in the source ID of the content to be reproduced has not been expired. If the result of the determination indicates that the validity term set in the source ID of the content to be reproduced has not been expired, the first reproducibility determination section 242a permits reproduction of the content. If the result of the determination indicates that the validity term set in the source ID of the content to be reproduced has been expired, on the other hand, the first reproducibility determination section 242a does not permit reproduction of the content.

At the step S622, on the other hand, the second reproducibility determination section 242b produces a result of determination as to whether or not the content to be reproduced is a content reproducible in accordance with the check-in/check-out method adopted as the reproduction control method. To put it concretely, at the step S622, the second reproducibility determination section 242b produces a result of determination as to whether or not the content to be reproduced is a reproducible content on the basis of usage rule information prescribed in a license associated with the content to be reproduced. The usage rule information includes an upper limit of the number of permitted reproduction operations and a deadline of permitted reproduction operations.

If the result of the determination indicates that the usage rule information is satisfied, the second reproducibility determination section 242b permits reproduction of the content. In this case, the flow of the reproduction control processing goes on to the step S624. The usage rule information is said to be satisfied, for example, if the deadline of permitted reproduction operations has not been reached or the number of permitted reproduction operations has not reached the upper limit. Then, when the number of permitted reproduction operations is set, the number of reproduction is incremented by one. If the result of the determination indicates that the usage rule information is not satisfied (for example, if the deadline of permitted reproduction operations has reached, or the number of permitted reproduction operations has reached the upper limit), on the other hand, the second reproducibility determination section 242b does not permit reproduction of the content. In this case, the flow of the reproduction control processing goes on to the step S626.

Then, at the step S624, the reproduction execution section 244 reproduces the content, the reproduction of which has been permitted at the step S620 or S622. As for a content, the reproduction of which was not permitted at the step S620 or S622, on the other hand, a notice indicating an error may be issued at the step S624. Such a content is not reproduced.

Then, the flow of the reproduction control processing goes on to the step S626 to produce a result of determination as to whether or not the processes of the steps S618 to S624 have been carried out on all the contents selected at the step S612 as contents to be reproduced. If the determination result produced at the step S626 indicates that the processes of the steps S618 to S624 have not been carried out on all the contents selected at the step S612 as contents to be reproduced, the flow of the reproduction control processing goes on to a step S628. At the step S628, a next content to be reproduced is read out from the content database 234. Then, the processes of the steps S618 to S624 are carried out on the next content to be reproduced. As the determination result produced at the step S626 indicates that the processes of the steps S618 to S624 have been carried out on all the contents selected at the step S612 as contents to be reproduced, the execution of the reproduction control processing is ended.

Figure 55:
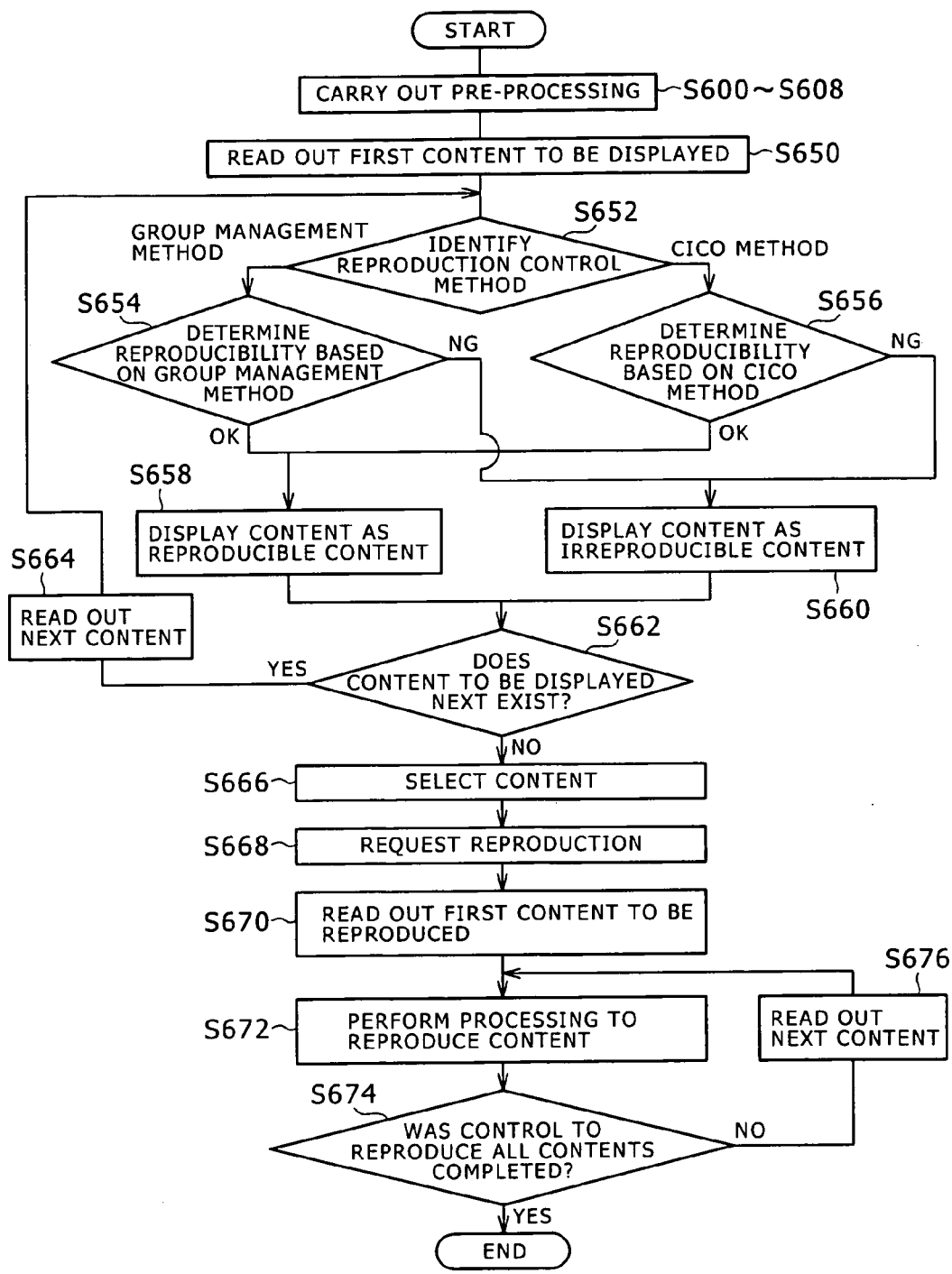
[FIG. 55]

By referring to FIGS. 55 and 10, the following description explains other typical content reproduction control processing carried out by a content reproduction apparatus 20 (PD). It is to be noted that FIG. 55 shows a flowchart representing the other typical processing to control reproduction of contents in a PD serving as a content reproduction apparatus 20 according to the embodiment.

In this processing to control reproduction of contents, first of all, the title information of all contents stored in the content reproduction apparatus 20 are displayed as a title list allowing reproducible contents to be distinguished from ones that cannot be reproduced. Then, the user viewing the title list selects contents to be reproduced among the contents that can be reproduced. Finally, the contents selected as contents to be reproduced are reproduced.

To begin with, steps S600 to S608 of the flowchart shown in FIG. 55 are identical with respectively the steps S600 to S608 of the flowchart explained earlier by referring to FIG. 54.

Then, at following steps S650 to S664, title-list display processing is carried out. The title-list display processing is processing to display a title list allowing reproducible contents to be distinguished from irreproducible ones on the display apparatus 210 employed in the content reproduction apparatus 20.

To put it concretely, first of all, at the step S650, a first content to be displayed is read out from the content database 234. To put it concretely, at the step S650, the reproducibility determination section 242 searches the content database 234 for the file of the first content to be displayed on the basis of content management information read out at the step S508 as information on the content. The content management information read out at the step S508 as information on the content includes the content ID and storage location of the content. The reproducibility determination section 242 then reads out the file from the content database 234.

In this embodiment, all contents stored in the content database 234 of the content reproduction apparatus 20 are selected as contents to be reproduced. It is to be noted, however, that the embodiment is not limited to this typical implementation. For example, only some of contents stored in the content database 234 of the content reproduction apparatus 20 can also be selected on the basis of predetermined criteria of selection as contents to be reproduced. For example, the predetermined criteria of selection for a content to be reproduced include an artist, album, genre, sales period and most recent reproduction timing of the content as well as user selection.

Then, at the next step S652, the content reproduction apparatus 20 recognizes the reproduction control method, which has been set in advance in the content reproduction apparatus 20, on the basis of information used for identifying the reproduction control method in the same way as the step S602 described before. If the recognition result produced at the step S652 indicates that the group management method has been adopted as the reproduction control method of the content reproduction apparatus 20, the flow of the reproduction control processing goes on to a step S654. If the result of the recognition indicates that the check-in/check-out method has been adopted as the reproduction control method of the content reproduction apparatus 20, on the other hand, the flow of the reproduction control processing goes on to a step S656. Since the same process to recognize the reproduction control method has been carried out at the step S602, the process carried out at the step S652 can actually be omitted.

Then, at the step S654, the first reproducibility determination section 242a produces a result of determination as to whether or not the content to be reproduced is a content reproducible in accordance with the group management method adopted as the reproduction control method. To put it concretely, at the step S654, the first reproducibility determination section 242a produces a result of determination as to whether or not the content to be reproduced is a reproducible content by determining whether or not the source-ID list L stored in the storage section 230 employed in the content reproduction apparatus 20 includes a source ID added to the content to be reproduced.

If the result of the determination indicates that the source-ID list L includes a source ID added to the content to be reproduced, the first reproducibility determination section 242a permits reproduction of the content. In this case, the flow of the reproduction control processing goes on to a step S658. If the result of the determination indicates that the source-ID list L does not include the source ID added to the content to be reproduced, on the other hand, the first reproducibility determination section 242a does not permit reproduction of the content. In this case, the flow of the reproduction control processing goes on to a step S660.

At the step S656, on the other hand, the second reproducibility determination section 242b produces a result of determination as to whether or not the content to be reproduced is a content reproducible in accordance with the check-in/check-out method adopted as the reproduction control method. To put it concretely, at the step S656, the second reproducibility determination section 242b produces a result of determination as to whether or not the content to be reproduced is a reproducible content on the basis of usage rule information prescribed in a license associated with to the content to be reproduced. The usage rule information includes an upper limit of the number of permitted reproduction operations and a deadline of permitted reproduction operations.

If the result of the determination indicates that the usage rule information is satisfied, the second reproducibility determination section 242b permits reproduction of the content. In this case, the flow of the reproduction control processing goes on to the step S658. If the result of the determination indicates that the usage rule information is not satisfied, on the other hand, the second reproducibility determination section 242b does not permit reproduction of the content. In this case, the flow of the reproduction control processing goes on to the step S660.

At the step S658, the content determined at the step S654 or S656 to be a reproducible content is displayed as a content that can be reproduced if the content is selected by the user. To put it concretely, at the step S658, the title-list creation section 250 displays the title information of the content determined as described above to be a reproducible content on the display apparatus 210 in such a way that the user is capable of recognizing the displayed content as a content that can be reproduced if the content is selected by the user.

At the step S660, on the other hand, the content determined at the step S654 or S656 to be an irreproducible content is displayed as a content that cannot be reproduced even if the content is selected by the user. To put it concretely, at the step S660, the title-list creation section 250 displays the title information of the content determined as described above to be an irreproducible content on the display apparatus 210 in such a way that the user is capable of recognizing the displayed content as a content that cannot be reproduced even if the content is selected by the user.

Then, the flow of the reproduction control processing goes on to a step S662 to produce a result of determination as to whether or not the reproducibility-determination and display processes of the steps S652 to S660 have been carried out on all the contents to be reproduced. If the determination result produced at the step S662 indicates that the reproducibility-determination and display processes of the steps S652 to S660 have not been carried out on all the contents to be reproduced, the flow of the reproduction control processing goes on to a step S664. At the step S664, the next content to be reproduced is read out from the content database 234. Then, the reproducibility-determination and display processes of the steps S652 to S660 are carried out on the next content to be reproduced. As the determination result produced at the step S662 indicates that the reproducibility-determination and display processes of the steps S652 to S660 have been carried out on all the contents to be reproduced, the flow of the reproduction control processing goes on to a step S666.

When the flow of the reproduction control processing goes on to the step S666, the display apparatus 210 reveals a title list allowing reproducible contents to be distinguished from ones that cannot be reproduced. A typical display of such a title list is shown in FIGS. 56(*a*) to 56(*c*).

Figure 56C:
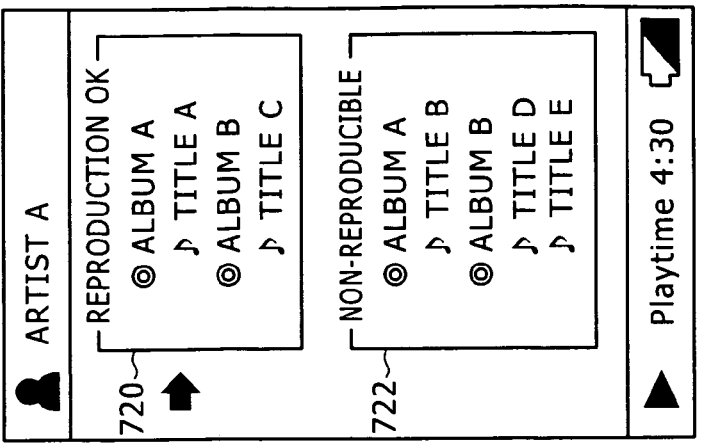
[FIG. 56(c)]
Figure 56B:
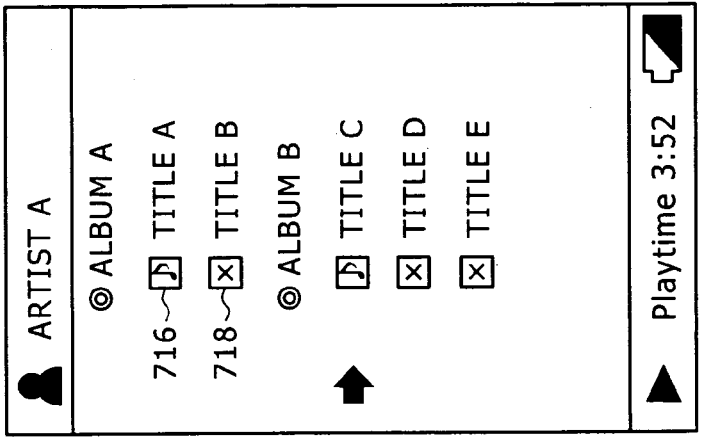
[FIG. 56(b)]
Figure 56A:
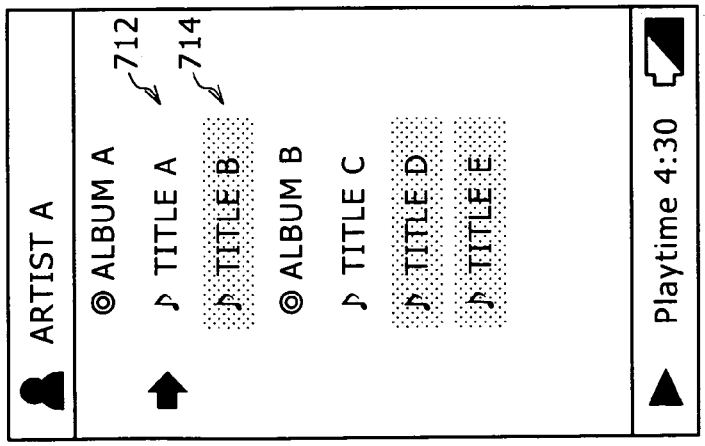
[FIG. 56(a)]

As shown in FIGS. 56(*a*) to 56(*c*), for example, a title list 710 appearing on the display apparatus 210 employed in the content reproduction apparatus 20 shows albums A and B of titles (or song names) A to E of musical contents sung by artist A. On the title list 710, titles A and C are each the title information of a content that can be reproduced. On the other hand, titles B, D and E are each the title information of a content that cannot be reproduced.

To put it concretely, in the typical title list 710 shown in FIG. 56(*a*), titles A and C of the reproducible contents are each displayed in either of a color and a level of luminance, which are different from respectively the color and level of luminance for titles B, D and E of the irreproducible contents. To be more specific, titles A and C of the reproducible contents are displayed in an area 712 with either of a color and a level of luminance, which are different from respectively the color and level of luminance for an area 714 in which titles B, D and E of the irreproducible contents are displayed so that the user is capable of distinguishing the reproducible contents from the irreproducible contents. In addition, in accordance with the display, each of the albums contains reproducible contents mixed with irreproducible contents. Thus, the user is capable of distinguishing reproducible contents in an album from irreproducible contents of the same album.

In another typical title list 710 shown in FIG. 56(*b*), each of titles A and C of the reproducible contents has a musical-notation mark serving as a reproducible icon 716. On the other hand, each of titles B, D and E of the irreproducible contents has an X mark serving as an irreproducible icon 718. By adding icons with different colors, different shapes, different patterns and/or different sizes to the titles of contents as described above, the user is capable of distinguishing reproducible contents from irreproducible contents.

In addition, in a further typical title list 710 shown in FIG. 56(*c*), titles A and C of the reproducible contents are displayed in an area segment different from that for titles B, D and E of the irreproducible contents. To be more specific, titles A and C of the reproducible contents are displayed in a reproduction-OK area segment 720 while titles B, D and E of the irreproducible contents are displayed in a non-reproducible area segment 722 separated from the reproduction-OK area segment 720. Thus, the user is capable of distinguishing the reproducible contents from the irreproducible contents. In addition, in accordance with the typical title lists, reproducible contents and irreproducible contents are displayed collectively on a screen. Thus, the user is capable of distinguishing reproducible contents stored in the content reproduction apparatus 20 from irreproducible contents stored in the same content reproduction apparatus 20 at a glance.

Let us refer back to the flowchart shown in FIG. 55. At a step S666, the user selects contents to be reproduced among contents that can be reproduced. At the step S666, the user is capable of viewing a title list displayed on the display apparatus 210 and selecting one or more contents to be reproduced among those on the title list. Then, the user specifies the title information of the contents to be reproduced by operating the input apparatus 208. As described above, the title list is displayed as a list allowing reproducible contents to be distinguished from ones that cannot be reproduced as shown in FIGS. 56(*a*) to 56(*c*). Thus, the user is capable of selecting contents to be reproduced among contents that can be reproduced.

Then, at the next step S668, the user enters a command to reproduce the selected contents. To put it concretely, after the user specifies the title information of the contents to be reproduced as described above, at the step S668, the user presses a reproduction key of the input apparatus 208 or a reproduction key of the remote controller 218 in order to enter a command to start the reproduction. Then, the content select section 252 selects a content indicated by each title information specified by the user as a content to be reproduced and supplies information on the content to the reproducibility determination section 242. The information on each content to be reproduced includes the content ID and storage location of the content.

Then, at the next step S670, a content indicated by a title specified by the user as a first content to be reproduced is read out from the content database 234. To put it concretely, at the step S670, the reproducibility determination section 242 searches the content database 234 for a file on the basis of information, which is input from the content select section 252 as the information on the content to be reproduced, as the file of the first content to be reproduced. The reproducibility determination section 242 then reads out the file found in the search process from the content database 234. Subsequently, a command is supplied to the reproduction execution section 244 as a request for reproduction of the content without the need to produce a result of determination as to whether or not the content is a content that can be reproduced. This is because the contents selected at the step S666 are always contents that can be reproduced. Thus, it is not necessary to again produce a result of determination as to whether or not the content is a content that can be reproduced.

Then, the flow of the reproduction control processing goes on to the next step S672. At the step S672, the reproduction execution section 244 reproduces the content selected as a content to be reproduced.

Subsequently, the flow of the reproduction control processing goes on to the next step S674. At the step S674, all contents selected as the contents to be reproduced are examined to produce a result of determination as to whether of not all the contents have been reproduced. If a selected content remains to be reproduced, the flow of the reproduction control processing goes on to a step S676. At the step S676, a next content to be reproduced is read out from the content database 234 and, later on, at the step S672, the content is reproduced. As the result of the determination indicates that all the contents selected at the step S666 have been reproduced, the flow of the reproduction control processing is terminated.

The above description explains a method adopted in a content reproduction apparatus 20 (PD) provided by the embodiment as a method to control reproduction of contents in the content reproduction apparatus 20. In the processing to control reproduction of contents in the content reproduction apparatus 20, the reproduction control method adopted by the content reproduction apparatus 20 is examined to produce a result of determination as to whether the reproduction control method is the group management method or the check-in/check-out method. Then, the reproduction of a content is controlled in accordance with the reproduction control method indicated by the result of the determination. Thus, the content reproduction apparatus 20 is capable of selectively executing either one of the two types of reproduction control method, i.e., the group management method or the check-in/check-out method. As a result, since it is possible to not only enhance the convenience provided to the user, but also eliminate the need to develop and design different models of the content reproduction apparatus 20 (PD) for the reproduction control methods, the efficiency of the development work can be improved while the cost of the work can be reduced.

In addition, the content reproduction apparatus 20 (PD) is compatible with the copyright management schemes based on not only the conventional check-in/check-out method, but also the group management method for controlling reproduction of a content on the basis of a source ID added to the content and on the basis of a source-ID list L. Thus, the degree of freedom enjoyed by the user to utilize contents is raised and it becomes possible to keep up with a user-friendlier copyright management scheme.

An application for managing a copyright management scheme varying from region to region may be installed in the content-processing apparatus 10 (PC). In this case, by merely setting method identification information such as the flag 232 for each copyright management scheme (or each reproduction control method) properly in the content reproduction apparatus 20, it is possible to control reproduction of a content transferred from the content-processing apparatus 10 including the application installed therein.

Furthermore, the content reproduction apparatus 20 is capable of displaying a title list of contents stored therein as a list allowing reproducible contents to be distinguished from ones that cannot be reproduced. Thus, the user is capable of knowing both the reproducible contents and the irreproducible ones and selecting some desired contents as contents to be reproduced from the reproducible ones by viewing the title list.

A preferred embodiment of the present invention has been explained by referring to diagrams. It is needless to say, however, that the scope of the present invention is not limited to the preferred embodiment. It is obvious that a person skilled in the art is capable of devising a variety of changes and improvements for the preferred embodiment within domains described in claims of this specification. Therefore, it is to be understood that such changes and improvements of course fall within the technological range of the present invention.

For example, in the embodiment, the content-processing apparatus 10 (PC) generates a group ID on the basis of a leaf ID received from the servers 30 as user identification information. However, the scope of the present invention is not limited to such a typical implementation. For example, the servers 30 may also generate a group ID for each user. In this case, at a time to register a content-processing apparatus 10, the group management server 32 transmits the group ID to the content-processing apparatus 10 instead of transmitting a leaf ID. Then, the content-processing apparatus 10 registers the group ID on the source-ID list L. In addition, the content distribution server 34 may transmit a distributed content to the content-processing apparatus 10 by associating a group ID with the content instead of associating a leaf ID with the content. At that time, the content distribution server 34 may include the group ID to the file of the distributed content in advance and transmit the file to the content-processing apparatus 10.

INDUSTRIAL APPLICABILITY

This present invention can be applied to a content reproduction apparatus, a content reproduction control method and a program, which are used in a system adopting a plurality of copyright management methods.

The invention claimed is:

1. A content reproduction apparatus comprising:
   a storage section used for storing a source-ID list showing a source ID of every content allowed to be reproduced, a recorder ID number, and method identification information each used for identifying a method of controlling reproduction of each content, said source ID includes said recorder ID number, that is generated as an ID unique to each content-processing apparatus having a ripping section for ripping out a content from a recording medium;
   a reproduction control method determination section for determining a method of controlling reproduction of a content on the basis of said method identification information;
   a first reproducibility determination section, which is used for producing a result of determination as to whether or not the content to be reproduced is reproducible by determining whether or not a source ID added to said content is a source ID included in said source-ID list in a case that said reproduction control method determination section determines that said method to control reproduction of the content is a first reproduction control method;
a second reproducibility determination section, which is used for producing a result of determination as to whether or not the content to be reproduced is reproducible on the basis of usage rule information described in a license issued to said content in a case that said reproduction control method determination section determines that said method to control reproduction of the content is a second reproduction control method; and
a reproduction execution section for reproducing the content with its source ID determined by said determination result produced by said first reproducibility determination section or said second reproducibility determination section to be the reproducible content.

2. The content reproduction apparatus according to claim 1 wherein said source ID includes a group ID generated as an ID unique to each of users registered in a group management server.

3. The content reproduction apparatus according to claim 2 wherein a group ID for a user making a request for transmission of a content from a content distribution server to a content-processing apparatus is added to said transmitted content.

4. The content reproduction apparatus according to claim 1 wherein said content-processing apparatus having a ripping section attaches said recorder ID number assigned to said content-processing apparatus itself to said content ripped off from said recording medium.

5. The content reproduction apparatus according to claim 1 wherein said usage rule information includes limit information of the number of times said content can be reproduced.

6. The content reproduction apparatus according to claim 1 wherein said usage rule information includes a deadline of a period in which said content can be reproduced.

7. The content reproduction apparatus according to claim 1, said content reproduction apparatus further comprising a communication section for setting a connection to a content-processing apparatus and communicating with said content-processing apparatus, wherein said content-processing apparatus is capable of updating said method identification information.

8. The content reproduction apparatus according to claim 1, said content reproduction apparatus further comprising a display section for displaying the title information of one or more contents held in said content reproduction apparatus, wherein said display section displays title information of contents determined by said first reproducibility determination section or said second reproducibility determination section to be reproducible contents and title information of contents determined by said first reproducibility determination section or said second reproducibility determination section to be irreproducible contents in such a way that said title information of said reproducible contents can be distinguished from said title information of said irreproducible contents.

9. The content reproduction apparatus according to claim 8, said content reproduction apparatus further comprising a content select section for selecting at least one from those displayed on said display section as title information of reproducible contents, wherein:
said storage section is used for storing content management information associating the title information of every content with location information at which said content has been stored; and
said reproduction execution section reads out a content indicated by title information, which is selected by said content select section, on the basis of said content management information and reproduces said content.

10. The content reproduction apparatus according to claim 8 wherein said display section displays title list information of contents determined to be reproducible contents with a color and/or a degree of luminance, which are different from those for irreproducible-content title information also shown on said title list as contents determined to be irreproducible contents.

11. The content reproduction apparatus according to claim 8 wherein said display section displays title list information of contents determined to be reproducible contents and title information of contents determined to be irreproducible contents in such a way that said reproducible contents and said irreproducible contents can be distinguished from each other.

12. The content reproduction apparatus according to claim 8 wherein said display section displays a title list adding different icons to title information of contents determined to be reproducible contents and title information of contents determined to be irreproducible contents, respectively.

13. The content reproduction apparatus according to claim 1, said content reproduction apparatus further comprising a communication section for setting a connection to a content-processing apparatus and communicating with said content-processing apparatus, wherein said resource-ID list stored in said storage section is updated on the basis of a source-ID list owned by said content-processing apparatus when said content reproduction apparatus is registered through said content-processing apparatus in the same apparatus group in a group management server as said content-processing apparatus.

14. The content reproduction apparatus according to claim 1, said content reproduction apparatus being a portable content reproduction apparatus having a hard-disk drive.

15. A content reproduction control method for controlling reproduction of a content in a content reproduction apparatus, said content reproduction control method comprising:
a reproduction control method determination step of determining a method to control reproduction of the content on the basis of method identification information each showing a method to control reproduction of a content;
a first reproducibility determination step, which is executed to produce a result of determination as to whether or not the content to be reproduced is reproducible by determining whether or not a source ID added to said content is a source ID included in said source-ID list in a case that said method to control reproduction of the content is determined to be a first reproduction control method at said reproduction control method determination step, said source ID including a recorder ID number that is generated as an ID unique to each content-processing apparatus having a ripping section for ripping out a content from a recording medium;
a second reproducibility determination step, which is executed to produce a result of determination as to whether or not the content to be reproduced is reproducible on the basis of usage rule information described in a license issued to said content in a case that said method to control reproduction of the content is determined to be a second reproduction control method at said reproduction control method determination step; and
a reproduction step of reproducing the content with its source ID determined by said determination result produced at said first reproducibility determination step or said second reproducibility determination step to be a reproducible content.

16. The content reproduction control method according to claim 15 wherein said source ID includes a group ID generated as an ID unique to each of users registered in a group management server.

17. The content reproduction control method according to claim 15 wherein said usage rule information includes a limit of the number of times that said content can be reproduced.

18. The content reproduction control method according to claim 15 wherein said usage rule information includes a deadline of a period in which said content can be reproduced.

19. The content reproduction control method according to claim 15, said content reproduction control method further comprising the step of requesting a content-processing apparatus connected to said content reproduction apparatus to update said method identification information.

20. The content reproduction control method according to claim 15, said content reproduction control method further comprising a display step of displaying said title information of one or more of contents held in said content reproduction apparatus, wherein said display step is executed to display title information of contents determined at said first reproducibility determination step or said second reproducibility determination step to be reproducible contents and title information of contents determined at said first reproducibility determination step or said second reproducibility determination step to be irreproducible contents in such a way that said reproducible contents can be distinguished from said irreproducible contents.

21. The content reproduction control method according to claim 20, said content representation step further comprising a content select step of selecting at least one from those displayed on said display section as title information of reproducible contents, wherein said reproduction step is executed to read out a content indicated by title information selected at said content select step on the basis of said content management information associating said title information of every content with location information used for storing said content and reproduce said content.

22. The content reproduction control method according to claim 20 wherein said display step is executed to display a title list showing title information of contents determined to be reproducible contents with a color and/or a degree of luminance, which are different from those for irreproducible content title information also shown on said title list as contents determined to be irreproducible contents.

23. The content reproduction control method according to claim 20 wherein said display step is executed to display a title list showing title information of contents determined to be reproducible contents and title information of contents determined to be irreproducible contents in such a way that said reproducible contents and said irreproducible contents can be distinguished from each other.

24. The content reproduction control method according to claim 20 wherein said display step is executed to display a title list adding different icons to title information of contents determined to be reproducible contents and title information of contents determined to be irreproducible contents, respectively.

25. The content reproduction control method according to claim 15, said content reproduction control method further comprising the step of requesting a group management server through a content-processing apparatus connected to said content reproduction apparatus to register said content reproduction apparatus in the same apparatus group as said content-processing apparatus and the step of updating said resource-ID list owned by said content reproduction apparatus on the basis of a source-ID list owned by said content-processing apparatus.

26. A non-transitory computer readable storage medium encoded with computer program instructions which, when executed, cause a processor to execute a method for controlling reproduction of a content in a content reproduction apparatus, comprising:
    a reproduction control method determination process of determining a method to control reproduction of the content on the basis of method identification information each showing a method to control reproduction of a content;
    a first reproducibility determination process, which is carried out to produce a result of determination as to whether or not the content to be reproduced is reproducible by determining whether or not a source ID added to said content is a source ID included in said source-ID list in a case that said method to control reproduction of the content is determined to be a first reproduction control method in said reproduction control method determination process, said source ID including a recorder ID number that is generated as an ID unique to each content-processing apparatus having a ripping section for ripping out a content from a recording medium;
    a second reproducibility determination process, which is carried out to produce a result of determination as to whether or not the content to be reproduced is reproducible on the basis of usage rule information described in a license issued to said content in a case that said method to control reproduction of the content is determined to be a second reproduction control method in said reproduction control method determination process; and
    a reproduction process of reproducing the content with its source ID determined by said determination result produced in said first reproducibility determination process or said second reproducibility determination process to be a reproducible content.

\* \* \* \* \*